(12) United States Patent
Kobayashi et al.

(10) Patent No.: US 9,054,894 B2
(45) Date of Patent: Jun. 9, 2015

(54) SIGNAL BLOCK SEQUENCE PROCESSING METHOD AND SIGNAL BLOCK SEQUENCE PROCESSING APPARATUS

(75) Inventors: Shoukei Kobayashi, Yokosuka (JP); Mitsuhiro Teshima, Yokosuka (JP); Takehito Yamamoto, Yokosuka (JP); Osamu Ishida, Yokosuka (JP); Yoshiaki Kisaka, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1078 days.

(21) Appl. No.: 12/667,680

(22) PCT Filed: Jul. 4, 2008

(86) PCT No.: PCT/JP2008/062230
§ 371 (c)(1),
(2), (4) Date: Jan. 4, 2010

(87) PCT Pub. No.: WO2009/005154
PCT Pub. Date: Jan. 8, 2009

(65) Prior Publication Data
US 2011/0013690 A1 Jan. 20, 2011

(30) Foreign Application Priority Data

| Jul. 5, 2007 | (JP) | 2007-177766 |
| Jul. 30, 2007 | (JP) | 2007-197789 |
| Aug. 31, 2007 | (JP) | 2007-226852 |
| Aug. 31, 2007 | (JP) | 2007-226853 |
| Jan. 11, 2008 | (JP) | 2008-004619 |
| Jan. 17, 2008 | (JP) | 2008-008536 |
| May 22, 2008 | (JP) | 2008-134811 |

(51) Int. Cl.
*H04L 29/06* (2006.01)
*H04L 12/46* (2006.01)
(Continued)

(52) U.S. Cl.
CPC ............ *H04L 12/4625* (2013.01); *H04L 69/22* (2013.01); *H04L 1/0083* (2013.01);
(Continued)

(58) Field of Classification Search
CPC ..... H04L 1/0078; H04L 1/0083; H04L 69/04; H04L 69/22; H04L 69/234; H04L 12/4633
USPC ......... 370/310, 389, 392, 394, 464, 465, 470, 370/474
See application file for complete search history.

(56) References Cited

U.S. PATENT DOCUMENTS 5,479,398 A * 12/1995 Cyr ................................ 370/537
5,757,416 A * 5/1998 Birch et al. .................... 725/144
(Continued)

FOREIGN PATENT DOCUMENTS

| JP | 2002-217940 A | 8/2002 |
| JP | 2006-135871 A | 5/2006 |

OTHER PUBLICATIONS

"IEEE Standards 802.3ae™-2002", IEEE Computer Society, Aug. 30, 2002, p. 317, Figure 49-7 (529 pages).
(Continued)

*Primary Examiner* — Curtis A Alia
(74) *Attorney, Agent, or Firm* — Fitch, Even, Tabin & Flannery LLP

(57) ABSTRACT

The present invention provides a signal block sequence processing method. According to the method, signal block headers (Bch, Bdh) are deleted from each sequence of signal blocks (B) each composed of the signal block header indicating whether a signal block payload is a control block payload (Bc') containing a control code is contained or a data block payload (Bd') containing data is contained. The resultant signal blocks are formed into one group (G). Each control block payload in the group is provided with position determination information indicating the position of the control block payload in the group. The signal block payloads are rearranged in accordance with a signal block payload rearrangement rule. The rearranged signal block payloads are contained in a super-block payload (Sc), to which a super-block header (Shc) indicative of containment of control block payloads is added. The resultant super-block (S) is output.

51 Claims, 86 Drawing Sheets

(51) Int. Cl.
H04L 1/00 (2006.01)
H04J 3/16 (2006.01)
H04L 25/49 (2006.01)

(52) U.S. Cl.
CPC ....... *H04J3/1658* (2013.01); *H04J 2203/0085* (2013.01); *H04L 12/4633* (2013.01); *H04L 25/4917* (2013.01)

(56) References Cited

U.S. PATENT DOCUMENTS

| | | | | |
|---|---|---|---|---|
| 6,295,010 | B1* | 9/2001 | Thiesfeld | 341/58 |
| 6,389,063 | B1* | 5/2002 | Kanekawa et al. | 375/222 |
| 6,556,550 | B1* | 4/2003 | Rasanen | 370/329 |
| 6,556,585 | B1* | 4/2003 | Moulsley | 370/465 |
| 6,819,679 | B1* | 11/2004 | Kerns et al. | 370/474 |
| 6,952,405 | B2 | 10/2005 | Tsang et al. | |
| 7,127,653 | B1 | 10/2006 | Gorshe | |
| 2002/0006137 | A1* | 1/2002 | Rabenko et al. | 370/466 |
| 2005/0068895 | A1* | 3/2005 | Stephens et al. | 370/235 |
| 2005/0187777 | A1* | 8/2005 | Chevallier et al. | 704/500 |
| 2006/0098686 | A1 | 5/2006 | Takakuwa et al. | |
| 2008/0112345 | A1* | 5/2008 | Sivakumar et al. | 370/310 |
| 2009/0285193 | A1* | 11/2009 | Kim et al. | 370/342 |

OTHER PUBLICATIONS

"ITU-T Recommendation G.709/Y.1331, Interfaces for the Optical Transport Network (OTN)", International Telecommunication Union, Mar. 2003 (120 pages).

"ITU-T G-Series Recommendations, Supplement 43, Transport of IEEE 10G Base-R in Optical Transport Networks (OTN)", International Telecommunication Union, Nov. 2006 (18 pages).

Yoshiaki Kisaka et al., "Fully transparent multiplexing and transport of 10GbE-LANPHY signals in 44.6-Gbits/s-based RZ-DQPSK WDM transmission", OThL1, OFC2007, 2007 (3 pages).

Stephen J. Trowbridge, "How can 40 Gb Ethernet be designed to fit existing ODU3 transport?", IEEE 802.3 Higher Speed Study Group, Jul. 16, 2007, http://grouper.ieee.org/groups/802/3/hssg/public/july07/trowbridge_01_0707.pdf (15 pages).

Kimio Tanaka, "Digital Communication Technology", Tokai University Press, Mar. 1986 (Japanese Language) (163 pages), Partial English Translation of pp. 142-145 (6 pages).

"IEEE Standards 802.3ap™-2007", IEEE Computer Society, Mar. 22, 2007 (203 pages).

John Jaeger, "HSSG Tutorial MAC / PHY Architecture", An Overview: The Next Generation of Ethernet, IEEE 802.3 Higher Speed Study Group Meeting, Nov. 12, 2007, http://www.ieee802.org/3/hssg/public/nov/07/index.htm (68 pages).

Mark Gustlin, "100GE and 40GE PCS and MID Proposal", IEEE P802.3ba 40Gb/s and 100GB/s Ethernet Task Force, Mar. 2008, http://www.ieee802.org/3/ba/public/mar08/gustlin_01_0308.pdf (25 pages).

International Preliminary Report on Patentability from the International Bureau of WIPO for International Application No. PCT/JP2008/062230 dated Feb. 4, 2010 (5 pages).

* cited by examiner

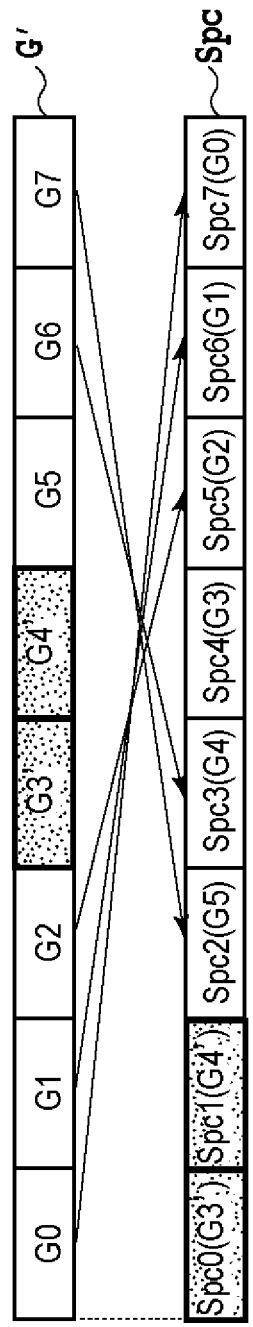

EXAMPLES OF CONDITION A

| PATTERN | COMBINATION OF TYPES OF CONSECUTIVE Bc | | PROCESSING |
|---|---|---|---|
| | PRECEDING | SUCCEEDING | |
| 1 | 0xFF | 0x78 | INSERT CLOCK ADJUSTING Bc WITH TYPE = 0x1E |
| 2 | 0xFF | 0x33 | |
| 3 | 0xFF | 0x66 | |
| 4 | 0xE1 | 0x78 | |
| 5 | 0xE1 | 0x33 | |
| 6 | 0xE1 | 0x66 | |
| 7 | 0xD2 | 0x78 | |
| 8 | 0xD2 | 0x33 | |
| 9 | 0xD2 | 0x66 | |
| 10 | 0xCC | 0x78 | |
| 11 | 0xCC | 0x33 | |
| 12 | 0xCC | 0x66 | |
| 13 | 0xB4 | 0x78 | |
| 14 | 0xAA | 0x78 | |
| 15 | 0x99 | 0x78 | |
| 16 | 0x87 | 0x78 | |
| 17 | Others | | NO INSERTION |

Table 1

FIG. 19

[CONDITION B]
IN CONSECUTIVE COLUMNS, "TERMINAL CHARACTER /T/" IS PRESENT IN PRECEDING COLUMN AND "START CHARACTER /S/" IS PRESENT IN SUCCEEDING COLUMN

| | (PRECEDING) | (SUCCEEDING) |
|---|---|---|
| Lane 3 | /D/ | /D/ |
| Lane 2 | /D/ | /D/ |
| Lane 1 | /T/ | /D/ |
| Lane 0 | /I/ | /S/ |

FIG. 24B

Table 2

| # | Control Block Formats | Block Type1 | Block Type2 | \#1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 1 | $C_0C_1C_2C_3/C_4C_5C_6C_7$ | 0x1E | 0001 |  | 2 | 2 | 2 | 2 | 4 | 2 | 1 | 1 | 1 | 3 | 3 | 3 | 1 | 3 |
| 2 | $C_0C_1C_2C_3/O_4D_5D_6D_7$ | 0x2D | 0010 | 2 |  | 2 | 2 | 4 | 2 | 2 | 1 | 3 | 3 | 1 | 3 | 1 | 1 | 3 |
| 3 | $C_0C_1C_2C_3/S_4D_5D_6D_7$ | 0x33 | 0111 | 3 | 2 |  | 2 | 2 | 2 | 4 | 1 | 1 | 3 | 3 | 3 | 1 | 3 | 1 |
| 4 | $O_0D_1D_2D_3/S_4D_5D_6D_7$ | 0x66 | 1011 | 2 | 2 | 2 |  | 2 | 2 | 2 | 1 | 3 | 1 | 1 | 3 | 3 | 3 | 1 |
| 5 | $O_0D_1D_2D_3/O_4D_5D_6D_7$ | 0x55 | 1101 | 2 | 4 | 2 | 2 |  | 2 | 2 | 3 | 1 | 1 | 3 | 1 | 3 | 3 | 1 |
| 6 | $S_0D_1D_2D_3/D_4D_5D_6D_7$ | 0x78 | 1110 | 4 | 2 | 2 | 2 | 2 |  | 2 | 3 | 3 | 3 | 1 | 1 | 1 | 1 | 3 |
| 7 | $O_0D_1D_2D_3/C_4C_5C_6C_7$ | 0x4B | 1000 | 2 | 2 | 4 | 2 | 2 | 2 |  | 3 | 3 | 1 | 1 | 1 | 3 | 1 | 3 |
| 8 | $T_0C_1C_2C_3/C_4C_5C_6C_7$ | 0x87 | 0011 | 1 | 1 | 1 | 1 | 3 | 3 | 3 |  | 2 | 2 | 2 | 4 | 2 | 2 | 2 |
| 9 | $D_0T_1C_2C_3/C_4C_5C_6C_7$ | 0x99 | 0101 | 1 | 3 | 1 | 3 | 1 | 3 | 3 | 2 |  | 2 | 4 | 2 | 2 | 2 | 2 |
| 10 | $D_0D_1T_2C_3/C_4C_5C_6C_7$ | 0xAA | 1001 | 1 | 3 | 3 | 1 | 1 | 3 | 1 | 2 | 2 |  | 2 | 2 | 4 | 2 | 2 |
| 11 | $D_0D_1D_2T_3/C_4C_5C_6C_7$ | 0xB4 | 1010 | 3 | 1 | 3 | 3 | 3 | 1 | 1 | 2 | 4 | 2 |  | 2 | 2 | 2 | 2 |
| 12 | $D_0D_1D_2D_3/T_4C_5C_6C_7$ | 0xCC | 1100 | 3 | 3 | 1 | 3 | 1 | 1 | 1 | 4 | 2 | 2 | 2 |  | 2 | 2 | 2 |
| 13 | $D_0D_1D_2D_3/D_4T_5C_6C_7$ | 0xD2 | 0110 | 3 | 1 | 3 | 3 | 3 | 3 | 3 | 2 | 2 | 4 | 2 | 2 |  | 2 | 2 |
| 14 | $D_0D_1D_2D_3/D_4D_5T_6C_7$ | 0xE1 | 0000 | 1 | 1 | 1 | 3 | 3 | 1 | 1 | 2 | 2 | 2 | 2 | 2 | 2 |  | 4 |
| 15 | $D_0D_1D_2D_3/D_4D_5D_6T_7$ | 0xFF | 1111 | 3 | 3 | 1 | 1 | 1 | 1 | 3 | 2 | 2 | 2 | 2 | 2 | 2 | 4 |  |

Dj: DATA
Cj: CONTROL CHARACTER
Sj: CONTROL CHARACTER (START)
Tj: CONTROL CHARACTER (TERMINAL)
Oj: CONTROL CHARACTER (ORDER SET)

FIG. 25

| 15 | 16 | 17 | | 3824 |
|---|---|---|---|---|
| VC | JC | | | |
| VC | JC | | 3808 x 4 + 1 | |
| VC | JC | | | |
| PSI | NJO | PJO | | |

FIG. 41

| MSh = 3bits |||
|---|---|---|
| CLASS | TYPE VALUE | SEQUENCE |
| 1 | 000 | DD |
| | 011 | DC |
| | 101 | CC |
| | 110 | CD |
| 2 | 111 | DD |
| | 100 | DC |
| | 010 | CC |
| | 001 | CD |

D: SUPER-BLOCK PAYLOAD CONTAINS NO CONTROL CODE
C: SUPER-BLOCK PAYLOAD CONTAINS CONTROL CODE

FIG. 55A

| MSh = 4bits | | |
|---|---|---|
| CLASS | TYPE VALUE | SEQUENCE |
| 1 | 0000 | DDD |
| | 0011 | DDC |
| | 0101 | DCC |
| | 0110 | CCC |
| | 1001 | CCD |
| | 1010 | CDD |
| | 1100 | CDC |
| | 1111 | DCD |
| 2 | 0001 | DDD |
| | 0010 | DDC |
| | 0100 | DCC |
| | 0111 | CCC |
| | 1000 | CCD |
| | 1011 | CDD |
| | 1101 | CDC |
| | 1110 | DCD |

D: SUPER-BLOCK PAYLOAD CONTAINS NO CONTROL CODE
C: SUPER-BLOCK PAYLOAD CONTAINS CONTROL CODE

FIG. 55B

| MSh = 5bits ||| MSh = 5bits |||
|---|---|---|---|---|---|
| CLASS | TYPE VALUE | SEQUENCE | CLASS | TYPE VALUE | SEQUENCE |
| 1 | 00000 | DDDD | 2 | 11111 | DDDD |
| | 00011 | DDDC | | 11100 | DDDC |
| | 00101 | DDCC | | 11010 | DDCC |
| | 00110 | DCCC | | 11001 | DCCC |
| | 01001 | CCCC | | 10110 | CCCC |
| | 01010 | CCCD | | 10101 | CCCD |
| | 01100 | CCDD | | 10011 | CCDD |
| | 01111 | CDDD | | 10000 | CDDD |
| | 10001 | DCDD | | 01110 | DCDD |
| | 10010 | DDCD | | 01101 | DDCD |
| | 10100 | DCCD | | 01011 | DCCD |
| | 10111 | CDDC | | 01000 | CDDC |
| | 11000 | CDCC | | 00111 | CDCC |
| | 11011 | CCDC | | 00100 | CCDC |
| | 11101 | CDCD | | 00010 | CDCD |
| | 11110 | DCDC | | 00001 | DCDC |

D: SUPER-BLOCK PAYLOAD CONTAINS NO CONTROL CODE
C: SUPER-BLOCK PAYLOAD CONTAINS CONTROL CODE

FIG. 55C

SIGNAL BLOCK SEQUENCE PROCESSING METHOD AND SIGNAL BLOCK SEQUENCE PROCESSING APPARATUS

CROSS-REFERENCE TO RELATED APPLICATION

This application is a 371 of international application PCT/JP2008/062230, filed Jul. 4, 2008, which claims foreign priority to Japanese Patent Application No. 2007-177766, filed Jul. 5, 2007, Japanese Patent Application No. 2007-197789, filed Jul. 30, 2007, Japanese Patent Application No. 2007-226852, filed Aug. 31, 2007, Japanese Patent Application No. 2007-226853, filed Aug. 31, 2007, Japanese Patent Application No. 2008-004619, filed Jan. 11, 2008, Japanese Patent Application No. 2008-008536, filed Jan. 17, 2008, Japanese Patent Application No. 2008-134811, filed May 22, 2008, which is hereby incorporated herein by reference in its entirety.

TECHNICAL FIELD

The present invention relates to a signal block sequence processing method and a signal block sequence processing apparatus which process a sequence of signal blocks each composed of a signal block payload and a signal block header, and more specifically, to a signal block sequence processing method and a signal block sequence processing apparatus which, in a signal transmission apparatus and a signal transmission system, process a sequence of signal blocks to output a super-block and/or a meta-super-block.

BACKGROUND ART

The Ethernet (registered trade mark) technique developed as a LAN (Local Area Network) technology has been more and more important in a WAN (Wide Area Network). Many Ethernet traffics are transferred via WAN.

When an Ethernet signal is transmitted via an electric/optical cable, a bit sequence provided by an upper layer is coded instead of being transmitted without change in order to facilitate transmission. For example, 10G Ethernet uses a 64B/66B block code (see, for example, Non-Patent Document 1). The 64B/66B block code is a 66-bit binary digital signal containing a 64-bit binary digital signal and a 2-bit synchronous header. The 64B/66B block code is excellent in detection of bit errors. The 64B/66B block code involves data blocks containing only data and control blocks containing control codes. A combination of data blocks and control blocks allows Ethernet signals, which have a variable Ethernet frame length, to be efficiently transmitted. Furthermore, the 64B/66B block code is appropriately compatible with a serial common interface XAUI (10 Gigabit Attachment Unit Interface) and a parallel common interface XGMII (10 Gigabit Media Independent Interface).

Moreover, the 64B/66B block code is likely to be used in 40G Ethernet and 100G Ethernet, which have been standardized as a next-generation high-speed Ethernet (see Non-Patent Document 8). Furthermore, an optical interface in 40G Ethernet and 100G Ethernet is likely to use parallel transmission in which a plurality of optical signals are transmitted and received in parallel. In particular, MLD (Multi-Lane Distribution) is highly expected to be adopted (see Non-Patent Document 9). MLD is a scheme that uses a mechanism called virtual lanes and which can deal with the plural physical lanes. In the MLD, skew may occur between virtual lanes depending on the transmission status between apparatuses. Thus, skew adjusting markers are indispensable for correcting the skew.

On the other hand, in WAN, in addition to SDH (Synchronous Digital Hierarchy), OTN (Optical Transport Network) has been standardized and used for services (see Non-Patent Document 2). OTN is a leased circuit network configured to tunnel a bit sequence transferred at a rate defined according to the SDH, on a WDM (Wavelength Division Multiplexing) optical network. Three classes for 2.5 Gb/s, 10 Gb/s, and 40 Gb/s are defined for OTN. OTN has a feature using error-correcting codes to carry out high-quality long-distance, and wide-band transmissions.

When a 10G Ethernet signal is transferred on OTN using, for example, an OPU2 (Optical channel Payload Unit 2) frame, various problems may occur as described below. There is a difference between the bit rate (10.3125 Gb/s) of the 10G Ethernet signal and the payload band (9.99528 Gb/s) of the OPU2 frame. The difference between their bitrates prevents the 10G Ethernet signal from being transmitted directly using the OPU2. Thus, a complicated method, a complicated apparatus, and a complicated system are required to transfer the 10G Ethernet signal on OTN. An example of such a method, an apparatus, and a system is based on GFP-F (Generic Framing Procedure) mapping and Direct mapping (see Non-Patent Documents 2 to 4). The GFP-F mapping is a method of terminating the 10G Ethernet signal at a MAC (Media Access Control) level and then using a GFP frame to capsulate the signal except for an IFG (Inter-Frame Gap) portion and a PR (Preamble) portion. Thus, the GFP-F mapping method sets the effective band equal to or lower than the bitrate of the OPU2 frame payload. Furthermore, the direct mapping is a method of increasing a clock rate to widen the payload bitrate of the OPU2 frame up to 10.3125 Gb/s.

Another method is to carry out code conversion to reduce the bit rate (see Non-Patent Documents 5 and 6 and Patent Documents 1 and 2). This method deletes redundant bits from block codes, collects and groups a plurality of the remaining block payloads, and provides control block payloads with position determination information. The method further adds a header indicating whether or not the group contains a control code, and subjects the group to block coding. The method further utilizes a bit difference (corresponding to bits the number of which is equal to that of the deleted redundant bits (for example, 32 bits: 1 bit/block×32 blocks)) resulting from the grouping of the plurality of block payloads from which the redundant bits have been deleted, as redundant bits for error-correcting codes for the grouped block payloads. This provides the payloads with robustness to burst errors. (see Non-Patent Document 7).

Patent Document 1: U.S. Pat. No. 6,952,405
Patent Document 2: U.S. Pat. No. 7,127,653
Non-Patent Document 1: "IEEE Standards 802.3ae-2002", IEEE, August, 2002, p. 317, FIG. 49-7
Non-Patent Document 2: "ITU-T Recommendation G.709/Y.1331 Interfaces for the Optical Transport Network (OTN)", ITU-T, March, 2003
Non-Patent Document 3: "Supplement 43 to ITU-G-series Recommendations Transport of IEEE 10G Base-R in Optical Transport Networks (OTN)", ITU-T, November, 2006
Non-Patent Document 4: Y. Kisaka et al., "Fully transparent multiplexing and transport of 10 GbE-LANPHY signals in 44.6-Gbit/s-based RZ-DQPSK WDM transmission", Oth1, OFC2007, 2007
Non-Patent Document 5: Stephen J. Trowbridge, "How can 40 Gb Ethernet be designed to fit exiting ODU3 transport?", IEEE 802.3 Higher Speed Study Group, Jul. 16, 2007, http://grouper.ieee.org/groups/802/3/hssg/public/july07/tro wbridge_01_0707.pdf Non-Patent Document 6: Kimio Tanaka, "Digital Communication Technology", TOKAI UNIVERSITY PRESS, pp. 142, March, 1986

Non-Patent Document 7: "IEEE Standards 802.3ap-2007", IEEE, March, 2007

Non-Patent Document 8: John Jaeger, "HSSG Tutorial MAC/PHY Architecture", IEEE 802.3 Higher Speed Study Group Meeting, November, 2007, http://www.ieee802.org/3/hssg/public/nov07/index.htm Non-Patent Document 9: Mark Gustlin, "100GE and 40GE PCS and MLD proposal", IEEE P802.3ba 40 Gb/s and 100 GB/s Ethernet Task Force, March 2008, http://www.ieee802.org/3/ba/public/mar08/gustlin_01_0308.pdf

DISCLOSURE OF THE INVENTION

As described above, in the GEP-F mapping, IFG and PR are not transmitted. Thus, signals of users utilizing IFG and PR for their own purposes cannot be transferred on OTN. Furthermore, the direct mapping scheme allows all the bits to be transmitted but has not been standardized yet. Thus, the Direct mapping scheme lacks compatibility. Furthermore, the 64B/66B block code is excellent in the detection of bit errors but has no function to correct errors. Thus, if even one bit becomes erroneous during transfer, the Ethernet frame containing the corresponding block is considered to be an error and discarded.

Furthermore, 512B/513B block coding in Non-Patent Document 5 adds only a 1-bit header indicating whether or not the block code contains a control code. Thus, the 512B/513B block coding does not have high robustness to block synchronization. Moreover, Non-Patent Document 5 and Patent Documents 1 and 2 provide position determination information and a compressed block type value to each control block payload but fail to refer to a specific method for providing the block type value. A possible 1-bit error in the block type value may cause a serious error in the entire block. Therefore, a method is required which uses a limited number of bits to assign a high error-robust block type value.

Furthermore, in Non-Patent Document 7, only 1 redundant bit is deleted from one block. Thus, in Non-Patent Document 7, the redundant bit length of the error-correcting code is insufficient for the information bit length, resulting in an insufficient correctable burst error length. Moreover, the error-correcting code used is designed specifically for correction of burst errors and its robustness to random errors is low.

Furthermore, if the 40G or 100G Ethernet signal contains skew adjustment markers as described above, this information needs to be correctly transmitted or notified.

The present invention has been developed in view of these problems. An object of the present invention is to provide a signal block sequence processing method and a signal block sequence processing apparatus which reduce the bit rate used to communicate a signal block composed of a signal block header and a signal block payload, thus enabling the use of a standardized method and an existing system even if LAN and WAN differ in interface speed.

Another object of the present invention is to provide a signal block sequence processing method and a signal block sequence processing apparatus which reduce the bit rate used to communicate a signal block comprising a signal block header and a signal block payload, thus enabling the use of a standardized method and an existing system even if LAN and WAN differ in interface speed, the method and apparatus further having high robustness to errors and/or allowing, even if the signal block contains skew adjustment markers, the correct transmission or notification of this information.

In some embodiments of the present invention, signal block headers are deleted from a preset number of signal blocks. The preset number of signal blocks from which the signal block headers have been deleted are formed into one group. The method then determines whether or not the group of the preset number of signal blocks contains a block payload (control block payload) in which a control code is contained. If the group contains a control block payload, the control block payload is provided with position determination information allowing the position of the control block payload in the group to be determined. Furthermore, signal block payloads (Bc', Bd') are rearranged in the group according to a signal block payload rearrangement rule predetermined to a receiving side. Moreover, the group with the signal block payloads rearranged therein is contained in a super-block payload, which is then output. A super-block header is added to the super-block payload, which is then output as a super-block. Information indicating whether or not the super-block payload contains a control block payload has been contained in the super-block header, and a super-block S is then output. Alternatively, the super-block payload is contained in a meta-super-block including a group comprising a preset number of super-block payloads and to which a meta-super-block header is added, and the meta-super-block is then output. Structure information on the group is contained in the meta-super-block header.

In some embodiment of the present invention, the signal block may be a 64B/66B code that is a redundant transmission code. According to some embodiments of the present invention, on a transmitting side, a synchronization header (2 bits) of a 64B/66B code is deleted, and remaining payloads (64 bits) are formed into groups each including eight payloads. Moreover, on the transmitting side, the payloads in the group are rearranged according to a rule for payload arrangement positions predetermined to a receiving side and corresponding to the contained information (data or a control code). Thereby the arrangement of the payloads in the group and the type of contained information at the transmitting side can be easy determined. Then, the rearranged eight payloads are contained in a payload in a super-block and/or a meta-super-block to be mapped to a transmission frame F, and the super-block and/or meta-super-block is then output. In this manner, the compressed signal blocks are used to generate a super-block, thereby the bit rate is reduced. Furthermore, an extra bandwidth resulting from the reduction in bit rate is utilized to transmit FEC (Forward Error Correction) information. This allows error robustness to be improved.

According to another embodiment of the present invention, signal block headers and a part or all of each signal block payload comprising only a clock adjusting character are deleted from a sequence of signal blocks each comprising an input signal block payload and an input signal block header. Furthermore, the signal block payloads are formed into one group. The method then determines whether or not the group of signal blocks contains a block payload (control block payload) in which a control code is contained. If the group contains a control block payload, the control block payload is provided with position determination information allowing determination of position of the control block payload in the sequence of the ungrouped signal blocks. Furthermore, signal block payloads (Be', Bd') are rearranged in the group in accordance with a block payload rearrangement rule predetermined to a receiving side. Moreover, the group in which the signal block payloads are rearranged is contained in a super-block payload, which is then output. A super-block header is added to the super-block payload, which is then output as a super-block. Information indicating whether or not the super-block payload contains a control block payload is contained in the super-block header, and the super-block is then output. Alternatively, the super-block payload is contained in a meta-super-block corresponding to a group comprising a preset number of super-block payloads and to which a meta-super-block header is added, and the meta-super-block is then output. Structure information on the group is contained in the meta-super-block header.

In some embodiments of the present invention, a 64B/66B code that is a very redundant transmission code may be a signal block. In some embodiments of the present invention, on a transmitting side, a synchronization header (2 bits) is deleted from the 64B/66B code. Those of the remaining payloads (64 bits) each of which comprises only a clock adjusting character are deleted. The resulting payloads are formed into groups each comprising a predetermined number of (for example, eight) payloads. Alternatively, the synchronization header is deleted from the 64B/66B code. Each of those of the remaining payloads (64 bits) each of which comprises only a clock adjusting character is partly deleted. The resulting payloads are generated into a new payload. A predetermined number of payloads including the generated new payload are formed into one group.

Furthermore, in some embodiments of the present invention, the control block payload is provided with, in addition to position determination information, a block type value coded so as to maximize a Humming distance between particular block types.

In some embodiments the present invention, on the transmitting side, the payloads in the group are further rearranged according to a rule for payload arrangement positions which is predetermined to a receiving side and which corresponds to information (data or control code) contained in the payloads. This allows for the receiving side to easily determine the arrangement of the payloads in the group and the type of the contained information. Then, a predetermined number of rearranged payloads are contained in a payload in a super-block and/or a meta-super-block to be mapped to a transmission frame F, and the super-block and/or meta-super-block is then output. Thus, the compressed signal blocks are used to generate the super-block, allowing a reduction in bit rate.

Furthermore, an excess bandwidth resulting from the reduction in bit rate is utilized to transmit FFC (Forward Error Correction) information.

In an embodiment, the information contained in the super-block header may be information (for example, 1 bit) indicating whether or not the super-block payload contains a control block payload or information (information defined by preset two bit sequences and coded so as to maximize a Humming distance of at least 2 bits) having a redundancy of at least 1 bit and indicating whether or not the super-block payload contains a control block payload.

Additionally, in an embodiment, the control block payload is provided with, in addition to position determination information, a block type value coded so as to maximize a Humming distance between particular block types. If the block type value indicating the block type of the control block payload does not correspond to any particular block type, the control block payload is provided with a special block type value corresponding to none of the block type values and coded so as to maximize the Humming distance.

Moreover, in some embodiments of the present invention, the receiving side receives a super-block generated from a group comprising a preset number of signal block payloads in a sequence of signal blocks each comprising a signal block payload and a signal block header containing information indicating whether each of the signal block payloads is a control block payload in which a control code is contained or a data block payload in which data is contained, or a super-block generated from a group comprising a preset number of signal block payloads in a sequence of signal blocks comprising a signal block payload and a signal block header containing information indicating whether each of the signal block payloads is a control block payload in which a control code is contained or a data block payload in which data is contained, the signal block header and a part or all of each signal block payload comprising only a clock adjusting character having been deleted from the sequence of signal blocks. Information contained in the super-block header of the received super-block and indicating whether or not the super-block payload in the super-block contains the control block payload allows determination of whether or not the super-block payload in the super-block contains the control block payload. If the super-block payload in the super-block contains the control block payload, the signal block payloads are placed back at positions in the group set before rearrangement in accordance with position determination information provided in the control block payload and indicating a position of the control block payload in the sequence of signal blocks before the signal blocks had formed into the group as well as a predetermined signal block payload rearrangement rule specifying rearrangement positions of the control block payloads and the data block payloads in the group. Furthermore, each of the signal block payloads is additionally provided with a signal block header containing information indicating whether the signal block payload is a control block payload in which a control code is contained or a data block payload in which data is contained. All pieces of the position determination information in the super-block payload are checked for duplication. If any pieces of the position determination information are duplicate, all the signal block payloads in the super-block are converted into particular error control block payloads indicative of occurrence of an error. If no pieces of the position determination information are duplicate, all block type values contained in the control block payloads in the super-block payload are extracted. The method then determines whether or not the extracted block type values meet a predetermined condition for the control block payload. If the extracted block type values meet the predetermined condition, all the signal block payloads in the super-block are converted into particular error control block payloads indicative of occurrence of an error. If the extracted block type values do not meet the predetermined condition, the method then determines whether or not a combination of block type values contained in the control block payloads of two consecutive signal block payloads or a combination of characters for control codes contained in the control block payloads of the signal block payloads meets the predetermined condition. If the combination of the block type values meets the predetermined condition, a signal block payload comprising only a clock adjusting character is inserted between the two consecutive signal block payloads. If the combination of the characters for the control codes meets the predetermined condition, the clock adjusting character is inserted into the signal block payloads, and the sequence of the signal blocks is output.

In other embodiments of the present invention, the receiving side receives a super-block generated from a group comprising a preset number of signal block payloads in a sequence of signal blocks each comprising a signal block payload and a signal block header containing information indicating whether each of the signal block payloads is a control block payload in which a control code is contained or a data block payload in which data is contained, or a super-block generated from a group comprising a preset number of signal block payloads in a sequence of signal blocks comprising a signal block payload and a signal block header containing information indicating whether each of the signal block payloads is a control block payload in which a control code is contained or a data block payload in which data is contained, the signal block header and a part or all of each signal block payload comprising only a clock adjusting character having been deleted from the sequence of signal blocks. Information contained in the super-block header of the received super-block and indicating whether or not the super-block payload in the super-block contains the control block payload allows determination of whether or not the super-block payload in the super-block contains the control block payload. If the super-block payload in the super-block contains the control block payload, the signal block payloads are placed back at positions in the group set before rearrangement in accordance with position determination information provided in the control block payload and indicating a position of the control block payload in the sequence of signal blocks before the signal blocks had formed into the group as well as a predetermined signal block payload rearrangement rule specifying rearrangement positions of the control block payloads and the data block payloads in the group. Furthermore, each of the signal block payloads is additionally provided with a signal block header containing information indicating whether the signal block payload is a control block payload in which a control code is contained or a data block payload in which data is contained. All pieces of the position determination information in the super-block payload are checked for duplication. If any pieces of the position determination information are duplicate, all the signal block payloads in the super-block are converted into particular error control block payloads indicative of occurrence of an error. If no pieces of the position determination information are duplicate, all block type values contained in the control block payloads in the super-block payload are extracted. The method then determines whether or not the extracted block type values meet a predetermined condition for the control block payload. If the extracted block type values meet the predetermined condition, all the signal block payloads in the super-block are converted into particular error control block payloads indicative of occurrence of an error. If the extracted block type values do not meet the predetermined condition, determination is made of whether or not a combination of block type values contained in the control block payloads of two consecutive signal block payloads or a combination of characters for control codes contained in the control block payloads of the signal block payloads meets the predetermined condition. If the combination of the block type values meets the predetermined condition, a signal block payload comprising only a clock adjusting character is inserted between the two consecutive signal block payloads. If the combination of the characters for the control codes meets the predetermined condition, the clock adjusting character is inserted into the signal block payloads, and the sequence of the signal blocks is output.

In some embodiments of the present invention, a 64B/66B code sequence contains a skew adjusting marker. The skew adjusting marker is coded with a 64B/66B code comprising a signal block payload in which a skew adjusting code is contained. The skew adjusting marker is thus converted into a signal block. The skew adjusting code is processed as a control code or data.

In some embodiments of the present invention, a preset number of super-block payloads are formed into a group. Furthermore, a meta-super-block header containing structure information on the group is generated. The meta-super-block header is generated based on a super-block header in which information indicating whether or not the super-block payloads in the group include a control block payload is contained. In this case, the meta-super-block header contains a type value coded so as to set a Humming distance between type values to at least two and may contain synchronization information in addition to the group configuration information. Adding the meta-super-block header to the grouped super-block payloads allows generation of a meta-super-block, which is then output.

In some embodiments of the present invention, the type value in the meta-super-block header is selected so as to equalize the numbers of positive and negative bits appearing per unit time, for example, one second.

In some embodiments of the present invention, in response to the appearance of a skew adjusting marker, a method for selecting the type value in the meta-super-block header is switched to allow a type value for the meta-super-block header to be generated. Thus, the position of the skew adjusting marker in the meta-super-block sequence is clarified, allowing the receiving side to easily determine the position.

The present invention can be implemented as a signal processing method in a signal transmission and reception apparatus. Moreover, the present invention can be implemented as a signal transmission apparatus, a signal reception apparatus, and a communication system including the signal transmission apparatus and the signal reception apparatus.

The present invention can provide a signal block sequence processing method and a signal block sequence processing apparatus which enable a standardized method, an existing system, or a system with an increase in clock speed suppressed to be utilized even with a difference in interface speed between LAN and WAN. The present invention can also provide a signal block sequence processing method and a signal block sequence processing apparatus which can provide a particular block type value to improve error robustness. The present invention can further provide a signal block sequence processing method and a signal block sequence processing apparatus which utilize an excess bandwidth resulting from a reduced bit rate to transmit FEC (Forward Error Correction), thus enabling bit error robustness to be improved without increasing an overall bit rate.

BRIEF DESCRIPTION OF THE DRAWINGS

FIG. 5C is a diagram schematically showing rearrangement of data block payloads in accordance with a signal block payload rearrangement rule, according to an embodiment of the present invention;

FIG. 19 is a diagram schematically showing the flow of a signal block sequence processing method according to an embodiment;

FIG. 24B is a diagram schematically showing conditions for allowing a transmitting side to determine whether or not a part of each signal block payload composed only of clock adjusting characters has been deleted;

FIG. 25 is a table illustrating a block type value provided to each control block payload together with position determination information;

FIG. 41 is a diagram illustrating the area of an OTN (ODU3) frame in which four 10-Gb Ethernet signals are multiplexed and accommodated according to an embodiment;

FIG. 55A is a diagram showing type values obtained by coding the configuration of a group MG in a meta-super-block into which group payloads in two super-blocks are formed;

FIG. 55B is a diagram showing type values obtained by coding the configuration of a group MG in a meta-super-block into which group payloads in three super-blocks are formed;

FIG. 55C is a diagram showing type values obtained by coding the configuration of a group MG in a meta-super-block into which group payloads in four super-blocks are formed;

BEST MODE FOR CARRYING OUT THE INVENTION

First Embodiment

As described above, according to the present invention, a signal block composed of a signal block payload and a signal block header is processed, and the resultant super-block is output. In the series of processes, signal block headers are deleted to reduce the bit rate at which the super-block is transmitted. Furthermore, according to the present invention, the super-block is processed, and the signal block on which the super-block is based is output.

A first embodiment of the present invention will be described with reference to the drawings.

Figure 1:
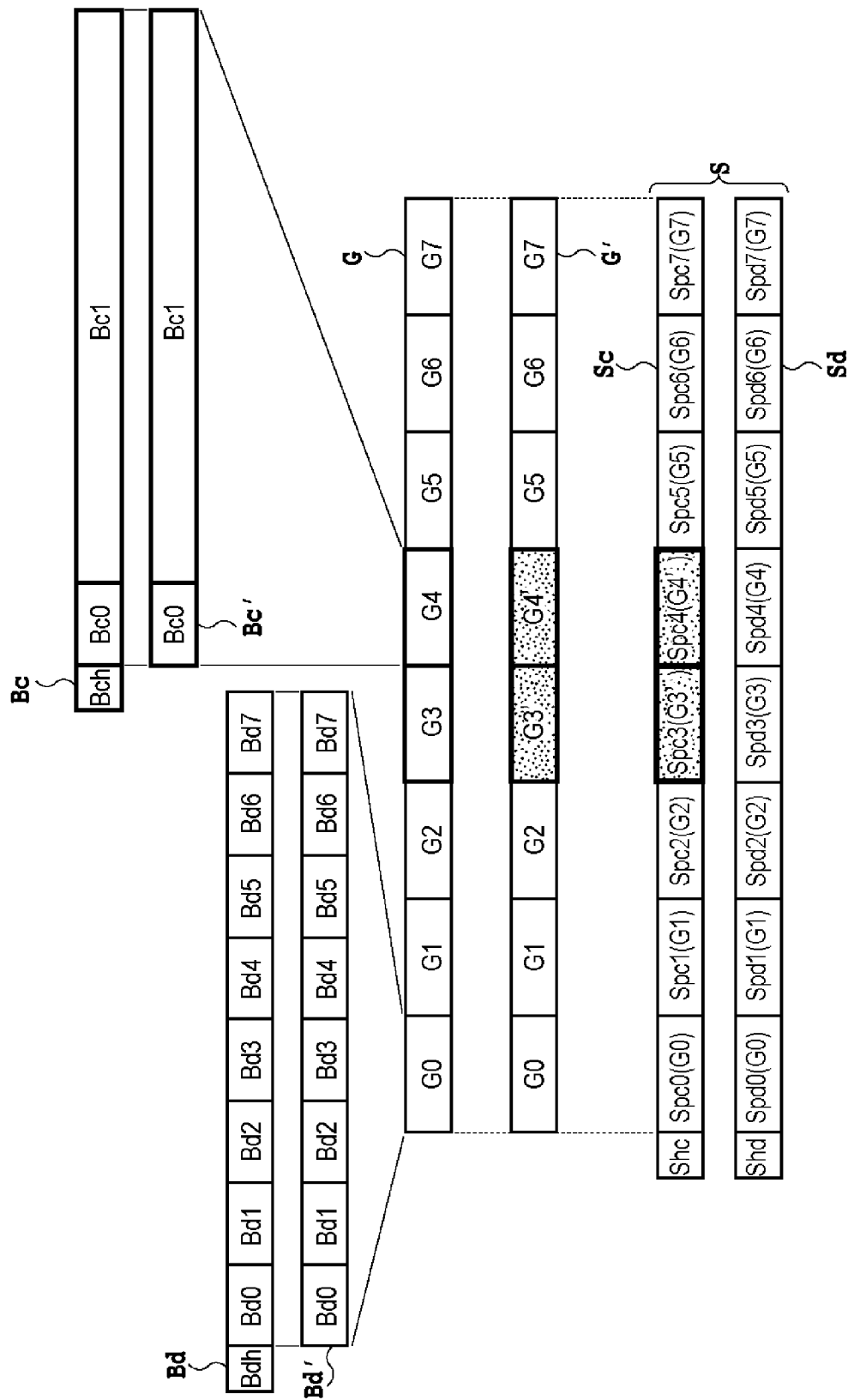
FIG. 1 is a diagram schematically showing how signal blocks are processed according to an embodiment of the present invention.

FIG. 1 is a diagram schematically showing how signal blocks are processed. In FIG. 1, a signal block payload in which data is contained (in the specification, this signal block payload is referred to as a data block payload) is denoted by Bd'. A signal block payload in which a control code is contained (in the specification, this signal block payload is referred to as a control block payload) is denoted by Bc'. Furthermore, a signal block header for the data block payload Bd' is denoted by Bdh. A signal block header for the control block payload Bc' is denoted by Bch. Moreover, a signal block composed of data block payloads Bd' and a signal block header Bdh is denoted by Bd. A signal block composed of a control block payload Bc' and a signal block header Bch is denoted by Bc. The signal block header (Bch, Bdh) contains information indicating whether the signal block payload is a control block payload Bc' or a data block payload Bd'. The control block payload Bc' contains information Bc0 indicating the type of a control code Bc1 contained in the control block payload Bc'.

According to the present embodiment, the signal block headers (Bch, Bdh) are deleted from a preset number of signal blocks included in a sequence of signal blocks. The preset number of signal block payloads (Bc', Bd') are formed into one group G. In FIG. 1, Groups each formed of eight signal block payloads are denoted by G0 to G7. G3 and G4 each denote the control block payload Bc'

Moreover, according to the present embodiment, the signal block payloads in the group G are processed, and the resultant super-block S is output. For example, the super-block S is accommodated in payloads in a transmission frame F, which is then transmitted. In FIG. 1, G' denotes the state of the group G during output of the super-block S from the group G. Furthermore, in FIG. 1, a super-block containing a control block payload Bc' is shown as a super-block Sc. A super-block containing no control block payload Bc' (composed only of data block payloads Bd') is shown as a super-block Sd.

Furthermore, according to the present embodiment, an error-correcting code fec can be generated for the generated super-block or sequence of super-blocks and added to the super-block or sequence of super-blocks to generate a super-block S+ with the error-correcting code fec added thereto, which is then output. For example, the super-block S+ is accommodated in payloads in a transmission frame F, which is then transmitted.

In the description below, an Ethernet MAC (10 Gb/s) signal constructed of 64B/66B block coding is used as an example of the signal block B as required. Furthermore, an ODUk/OPUk (k=1, 2, 3) frame is used as an example of the transmission frame F as required. Here, a 64B/66B data block corresponds to the signal block Bd. A 64B/66B control block corresponds to the signal block Bc. Additionally, the signal block header (Bch, Bdh) corresponds to, for example, a Sync code shown in FIG. 49-7 in Non-Patent Document 1. Bd0 to Bd7 in the data block payload Bd' in the signal block Bd correspond to 8-bit MAC frame data. Bc0 in the control block payload Bc' indicates a block type and corresponds to a block type field shown in FIG. 49-7 in Non-Patent Document 1. Bc1 in the control block payloads Bc' corresponds to an XGMII control code. The ODUk/OPUk frame F is a transmission frame composed of a 50-byte (ODUk header=42 bytes, OPUk header=8 bytes) header Fh and a 15,232-byte payload Fp. Furthermore, in the present embodiment, for easier understanding, the numbers of bits, data write locations, signal types, bit rates, frames, and the like are clearly specified. However, the present embodiment is not limited to these elements.

Figure 2:
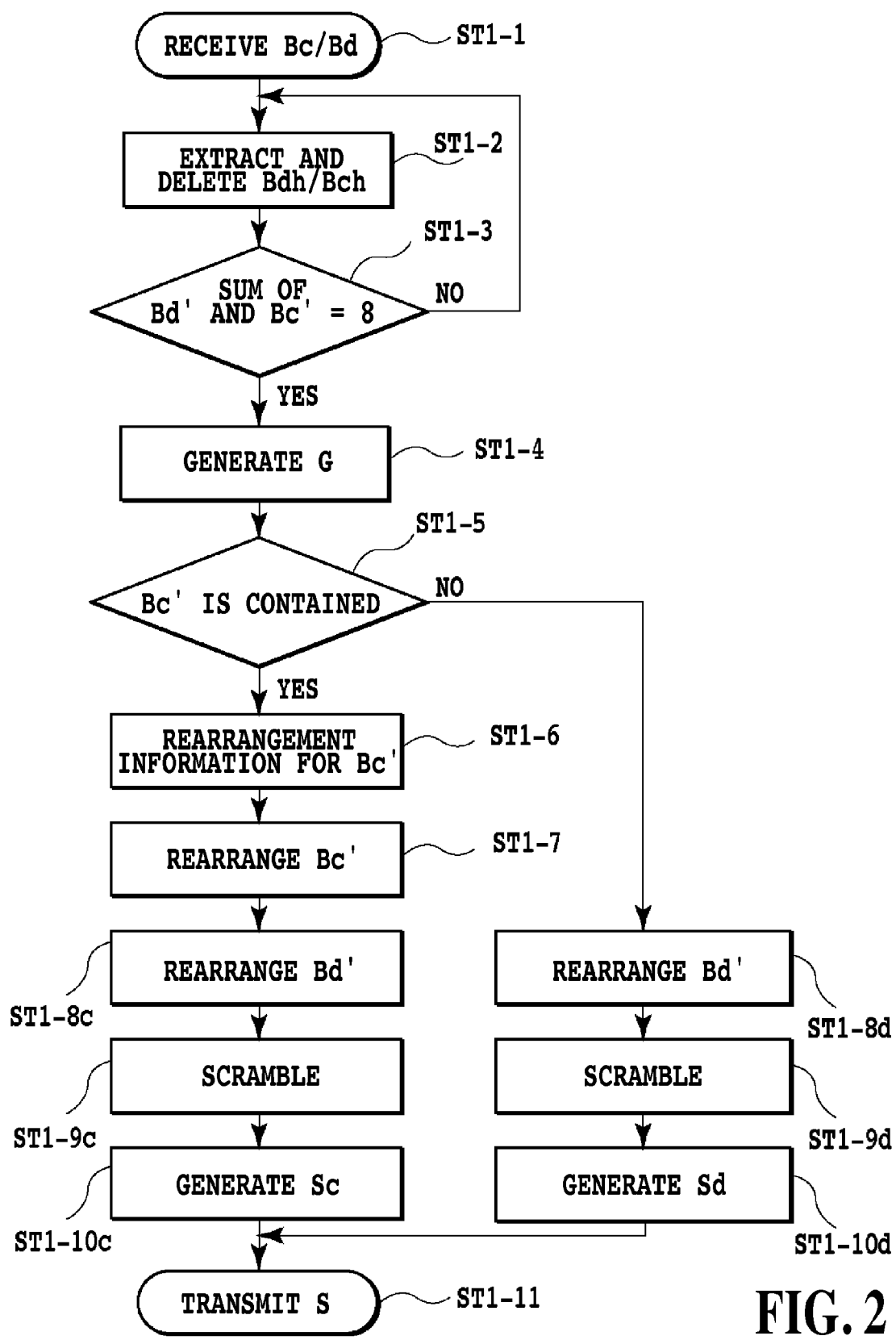
FIG. 2 is a diagram schematically showing the flow of a signal block sequence processing method according to an embodiment of the present invention.

With reference to FIGS. 1 and 2, an embodiment according to a signal block sequence processing method will be described.

Figure 14:
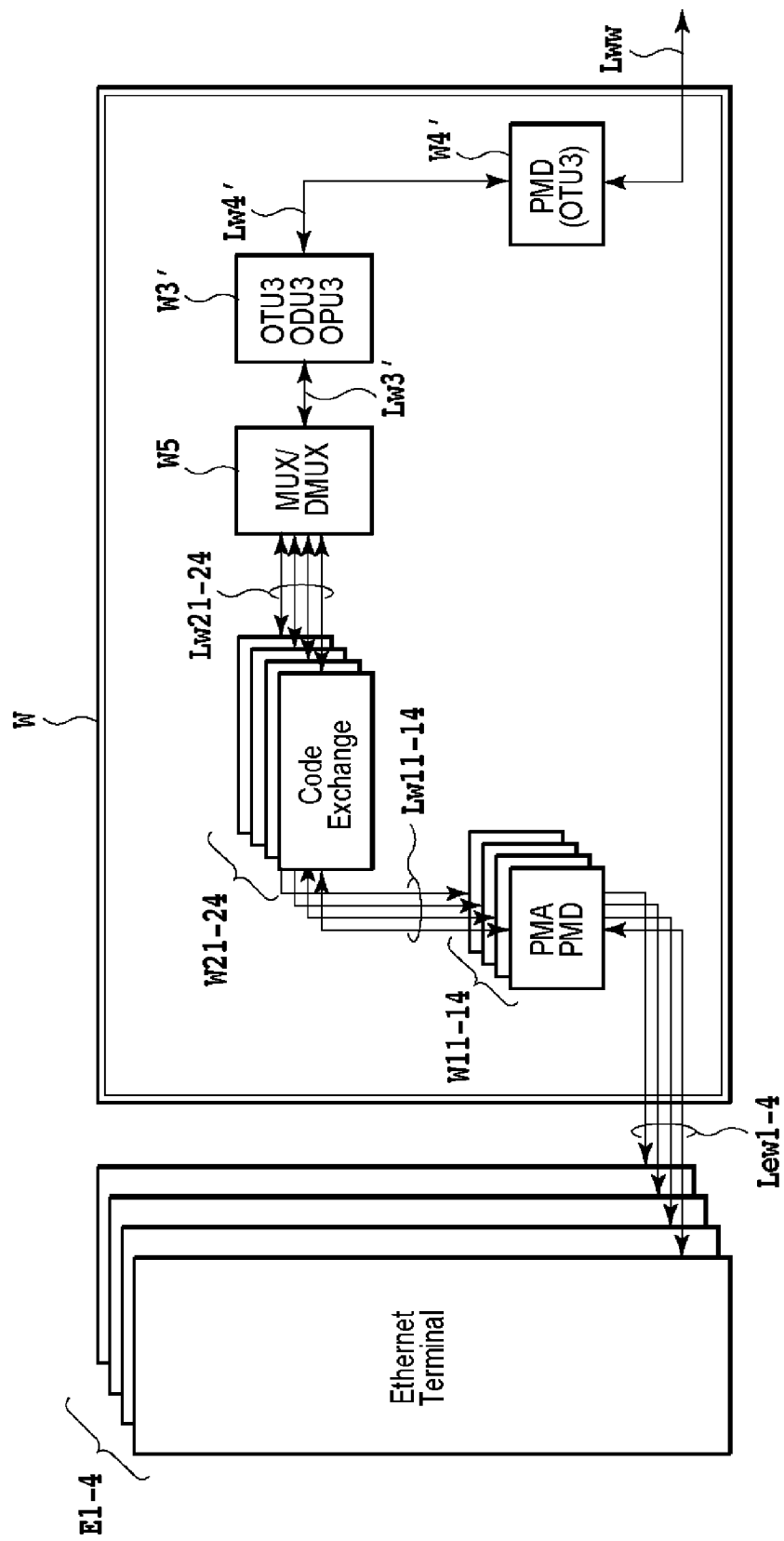
FIG. 14 is a diagram showing the configuration of an optical-signal transmission and reception apparatus according to an embodiment.

FIG. 2 is a diagram schematically showing the flow of a signal block sequence processing method according to the present embodiment. When the signal block sequence processing method according to the present embodiment starts, an optical-signal transmission apparatus receives a 64B/66B block (or sequence of 64B/66Bs) B from such a 10G Ethernet apparatus E1-4 as shown in FIG. 14 [FIG. 2: ST1-1]. The received 64B/66B block B is stored in a memory such as a register.

Then, the header Bdh (or Bch) is extracted and deleted from the received 64B/64B block B in ST1-1 to generate signal block payloads (Bd', Bc') [FIG. 2: ST1-2].

Every eight of the generated signal block payloads (Bd', Bc') [FIG. 2: ST1-3] are formed into one group G [FIG. 2: ST1-4]. The preset number (in this case, eight) of signal block payloads to be formed into one group G is selected based on a rule predetermined to a receiving side. The group G is formed by, for example, selecting the eight 64B/66B blocks B in the order of the reception (in the order in which the blocks have been written to a memory), and arranging the blocks with the order maintained. Alternatively, the group G may be formed by selecting the eight 64B/66B blocks B in an order different from that of the reception (in the order in which the blocks have been written to a memory), and arranging the blocks with the order of the selection maintained. In FIG. 1, G: G0 to G7 denotes a data block payload Bd' or a control block payload Bc'. FIG. 1 shows that the group G contains control block payloads Bc' (G3 and G4 denote control block payloads Bc'). If less than eight signal block payloads (Bd', Bc') have been generated, ST1-1 and ST1-2 are repeated.

The determination of whether or not the generated group G contains control block payloads Bc' is performed [FIG. 2: ST1-5]. Upon determining that the generated group G contains control block payloads Bc', the method provides the control block payloads Bc' (G3, G4) with position determination information (66 B block arrangement order information) indicating the positions of the control block payloads Bc' in the group G [FIG. 2: ST1-6]. Whether or not the generated group G contains control block payloads Bc' can be determined by referencing the header Bch and/or the block type Bc0 in the control block payload Bc'. In FIG. 1, the signal block payloads provided with position determination information indicating the positions of the control block payloads Bc' in the group G are denoted by G3' and G4'. The group including the signal block payloads G3' and G4' is denoted by G'.

Then, in accordance with a rule (signal block payload rearrangement rule) specifying the rearrangement positions of the data block payloads Bd' and control block payloads Bc' in the group G and predetermined to the receiving side, G3' and G4' are arranged at positions Spc3 and Spc4 in the payloads in the super-block Sc [FIG. 2: ST1-7]. Subsequently, the data block payloads Bd' (G0 to G2 and G5 to G7) are arranged at Spc0 to Spc5 and Spc5 to Spc7, respectively [FIG. 2: ST1-8c].

On the other hand, upon determining that the group G contains no control block payloads Bc' in ST1-5, the method arranges the data block payloads Bd' at positions Spd0 to Spd7 in the payloads in the super-block S in accordance with a rule (data block payload rearrangement rule) specifying the rearrangement position of data block payloads Bd' in the group and predetermined to the receiving side [FIG. 2: ST1-8d].

Here, after the signal block payloads (Bc', Bd') are arranged at Spc0 to Spc7 (Spd0 to Spd7), the signal block payloads (Bc', Bd') may be constructed of a scramble process predetermined to the receiving side to equalize the bit polarity [FIG. 2: ST1-9c or ST1-9d].

Then, if the group G contains data block payloads Bd' and control block payloads Bc', a header Shc (1 bit: 1) is added to the payloads (Spc0 to Spc7) in the super-block to generate a super-block Sc [FIG. 2: ST1-10c]. On the other hand, if the group G is composed only of data block payloads Bd', a header Shd (1 bit: 0) is added to the payloads (Spc0 to Spc7) to generate a super-block Sd [FIG. 2: ST1-10d]. Thus, the receiving side can easily extract the control block payloads Bc' from the super-block. The generated super-block S (Sc, Sd) is transmitted to the next processing [FIG. 2: ST1-11].

Figure 3:
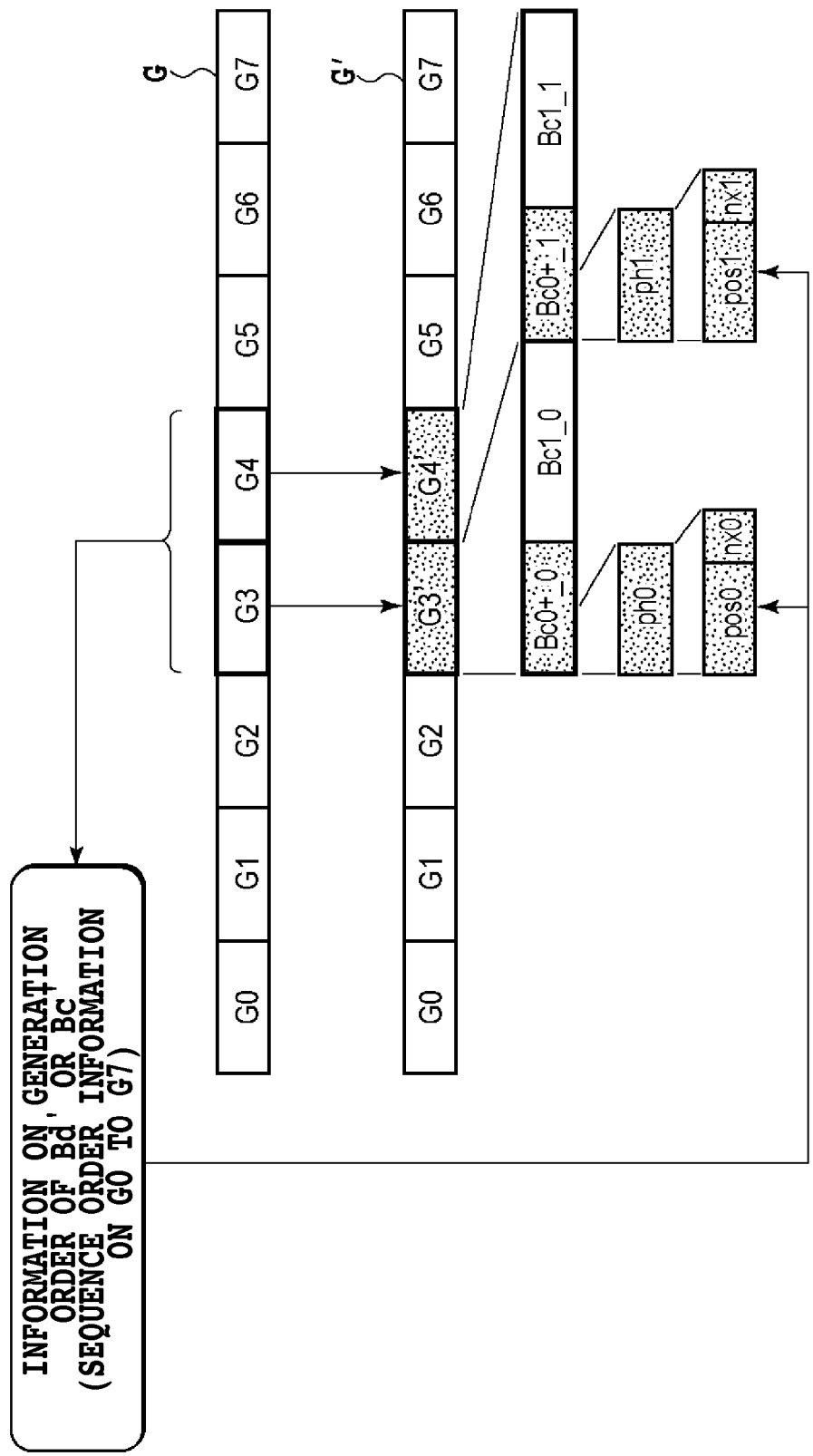
FIG. 3 is a diagram schematically showing how signal block payloads are processed according to an embodiment of the present invention.

Now, a method of providing the control block payload Bc' with position determination information [FIG. 2: ST1-6] will be described with reference to FIG. 3. FIG. 3 is a diagram schematically showing how the control block payloads are processed. In FIG. 3, the groups G and G' correspond to the groups G and G' in FIG. 1.

Position determination information is generated for each of the groups G3 and G4 in the group G. The position determination information indicates the order of generation of control block payloads Bc' that can be generated in connection with the step of generating signal block payloads (Bd', Bc') [FIG. 2: ST1-2]. Alternatively, the position determination information indicates the positions or order of control block payloads Bc' in the group G which can be generated in connection with the step of generating a group G [FIG. 2: ST1-4] or the step of determining whether or not the generated group G contains a control block payload Bc' [FIG. 2: ST1-5].

The position determination information on each of G3 and G4 can be contained by modifying the block type Bc0 of the control code contained in Bc'. In FIG. 3, the block types of G3 and G4 in which position information is contained are denoted by Bc0+_0 and Bc0+_1, respectively. The position determination information on G3 and G4 is contained as ph0 and ph1 (4 bits) contained in Bc0+_and Bc0+_1 (for example, 8 bits), respectively. Here, pos0 (3 bits) in ph0 indicates the sequence order (the position of G3) in the group G, and nx0 (1 bit: 1) indicates that a control block payload Bc' is also located in following Spc1. Similarly, post (3 bits) in ph1 indicates the sequence order (the position of G4) in the group G, and nx1 (1 bit: 0) indicates that a data block payload Bd' is located in following Spc2. In the present embodiment, the block type Bc0 is composed of 8 bits, and can use 4 bits different from the 4 bits of ph0 (ph1) to indicate to which of 15 types the control code Bc1 contained in the control block payloads Bc' belongs.

Figure 4A:
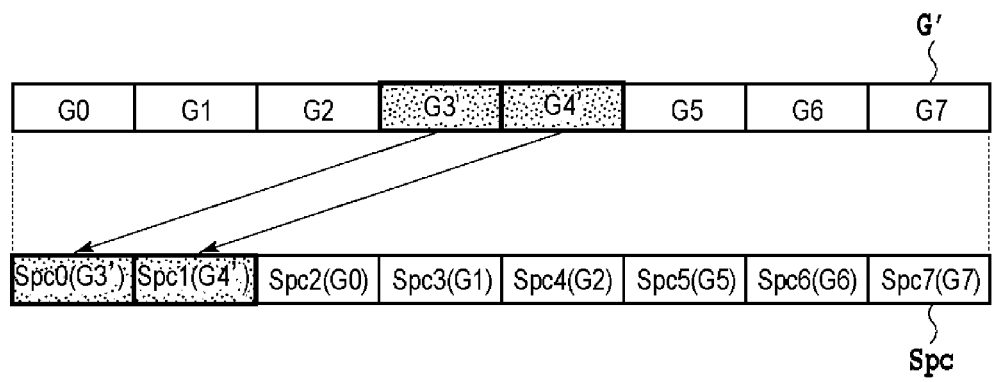
FIG. 4A is a diagram schematically showing rearrangement of control block payloads in accordance with a signal block payload rearrangement rule, according to an embodiment of the present invention.

Now, an example of the rule for the rearrangement of signal block payloads will be described below with reference to FIGS. 4A and 4B. FIG. 4A schematically shows the rearrangement of signal block payloads specified such that if the group G contains control block payloads Bc', the control block payloads Bc' (signal block payloads arranged in the positions G3' and G4' in the super-block) are always arranged consecutively from a predetermined position (consecutively in order of Spc0, Spc1, . . . ).

Figure 4B:
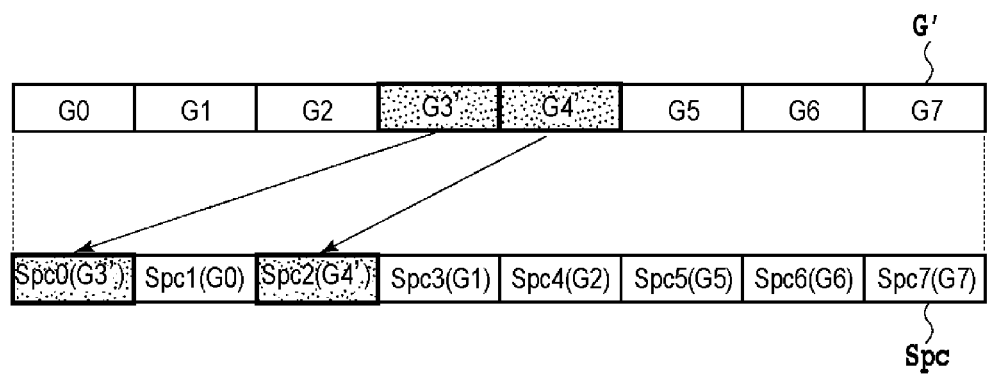
FIG. 4B is a diagram schematically showing rearrangement of control block payloads in accordance with a signal block payload rearrangement rule, according to an embodiment of the present invention.

FIG. 4B is a diagram schematically showing the rearrangement of signal block payloads specified such that if the group G contains control block payloads Bc', the control block payloads Bc' (the signal block payloads arranged in the positions G3' and G4' in the super-block) are consecutively always arranged at every other position (Spc0, Spc2, Spc4, and Spc6; if the group G contains at least five control codes, then the control block payloads Bc' are arranged at Spc1, Spc3, Spc5, and Spc7 in this order, following Spc6).

In view of the easiness with which the receiving side can extract the control block payloads Bc' from the super-block, the example shown in FIG. 4A corresponds to a preferable embodiment. However, the present invention can be implemented according to the example shown in FIG. 4B as described above.

Figure 5A:
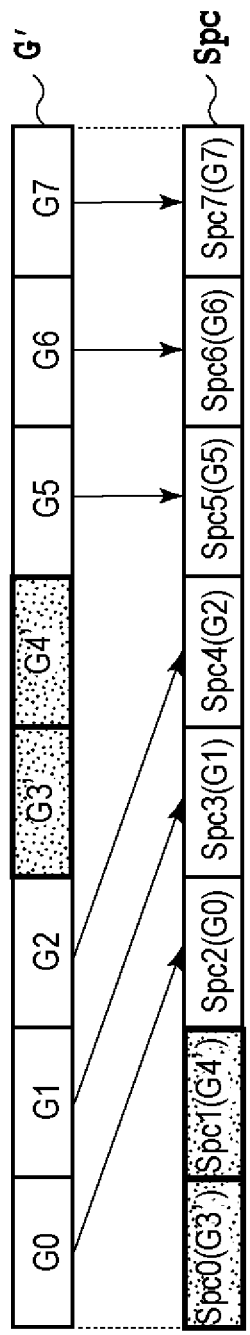
FIG. 5A is a diagram schematically showing rearrangement of data block payloads in accordance with a signal block payload rearrangement rule, according to an embodiment of the present invention.

Moreover, an example of a rule for the rearrangement of signal block payloads will be described with reference to FIGS. 5A to 5C. FIG. 5A corresponds to FIG. 4A. FIG. 5A schematically shows the rearrangement of signal block payloads specified such that after the control block payloads Bc' are consecutively arranged at Spc0 and Spc1 in this order, the data block payloads Bd' are arranged at positions where no control block payload Bc' is present (Spc2 to Spc7) with the sequence order of the data block payloads Bd' maintained (that is, with the sequence order of G0, G1, G5, G6, and G7 maintained).

Figure 5B:
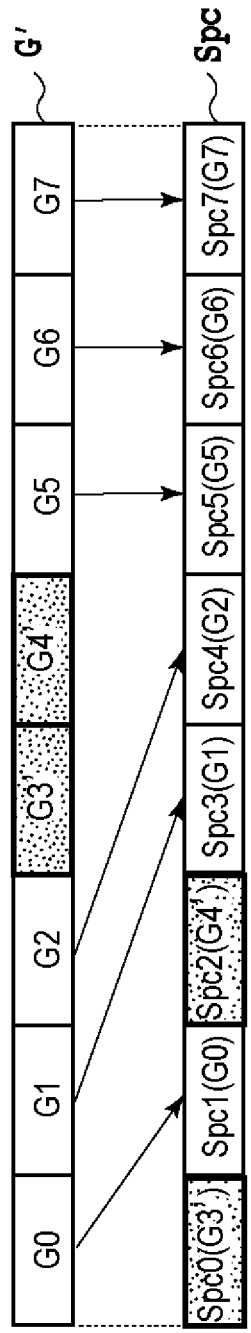
FIG. 5B is a diagram schematically showing rearrangement of data block payloads in accordance with a signal block payload rearrangement rule, according to an embodiment of the present invention.

FIG. 5B corresponds to FIG. 4B. FIG. 5B schematically shows the rearrangement of signal block payloads specified such that after the control block payloads Bc' are consecutively arranged at every other position, that is, at Spc0 and Spc2 in this order, the data block payloads Bd' are arranged at positions where no control block payload Bc' is present (Spc1 and Spc3 to Spc7) with the sequence order of the data block payloads Bd' maintained (that is, with the sequence order of G0, G1, G5, G6, and G7 maintained).

FIG. 5C corresponds to FIG. 4A. FIG. 5C schematically shows the rearrangement of signal block payloads specified such that after the control block payloads Bc' are consecutively arranged at Spc0 and Spc1 in this order, the data block payloads Bd' are arranged at positions where no control block payload Bc' is present (Spc2 to Spc7) with the reversed sequence order of the data block payloads Bd' (that is, with the sequence order of G7, G6, G5, G1, and G0).

In view of the easiness with which the receiving side can extract the data block payloads Bd' from the super-block, the example shown in FIG. 5A corresponds to a preferable embodiment. However, the present invention can be implemented according to the examples shown in FIGS. 5B and 5C as described above.

Figure 6A:
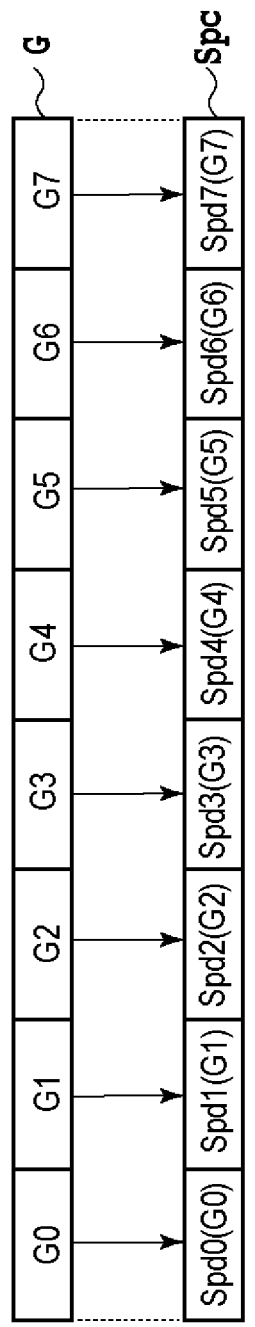
FIG. 6A is a diagram schematically showing rearrangement of data block payloads in accordance with a data block payload rearrangement rule, according to an embodiment of the present invention.

Now, an example of a rule for the rearrangement of data block payloads will be described with reference to FIGS. 6A and 6C. FIG. 6A is a diagram schematically showing the rearrangement of data block payloads specified such that if the group G contains no control block payload Bc', the data block payloads are rearranged at the positions Spd0 to Spd7 with the sequence order thereof maintained (that is, with the sequence order G0, G1, G2, G3, G4, G5, G6, and G7 maintained).

Figure 6B:
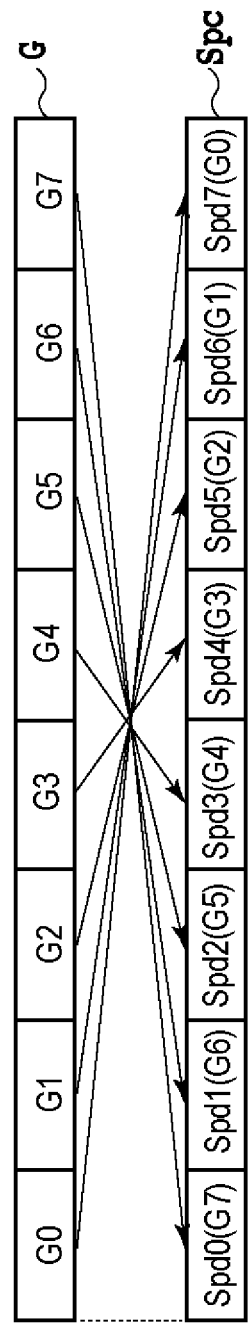
FIG. 6B is a diagram schematically showing rearrangement of data block payloads in accordance with a data block payload rearrangement rule, according to an embodiment of the present invention.

FIG. 6B is a diagram schematically showing the rearrangement of data block payloads specified such that the data block payloads Bd' are arranged at Spd0 to Spd7 in the reversed sequence order (that is, in the order of G7, G6, G5, G4, G3, G2, G1, and G0).

Figure 6C:
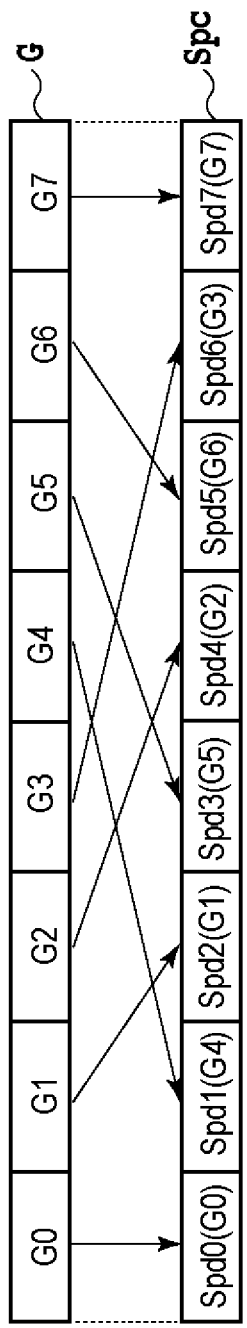
FIG. 6C is a diagram schematically showing rearrangement of data block payloads in accordance with a data block payload rearrangement rule, according to an embodiment of the present invention.

FIG. 6C is a diagram schematically showing the rearrangement of data block payloads specified such that the data block payloads are always consecutively arranged at every other position starting with a predetermined position.

In view of the easiness with which the receiving side can restore signal blocks, the example shown in FIG. 6A corresponds to a preferable embodiment. However, the present invention can be implemented according to the examples shown in FIGS. 6B and 6C as described above.

Figure 7:
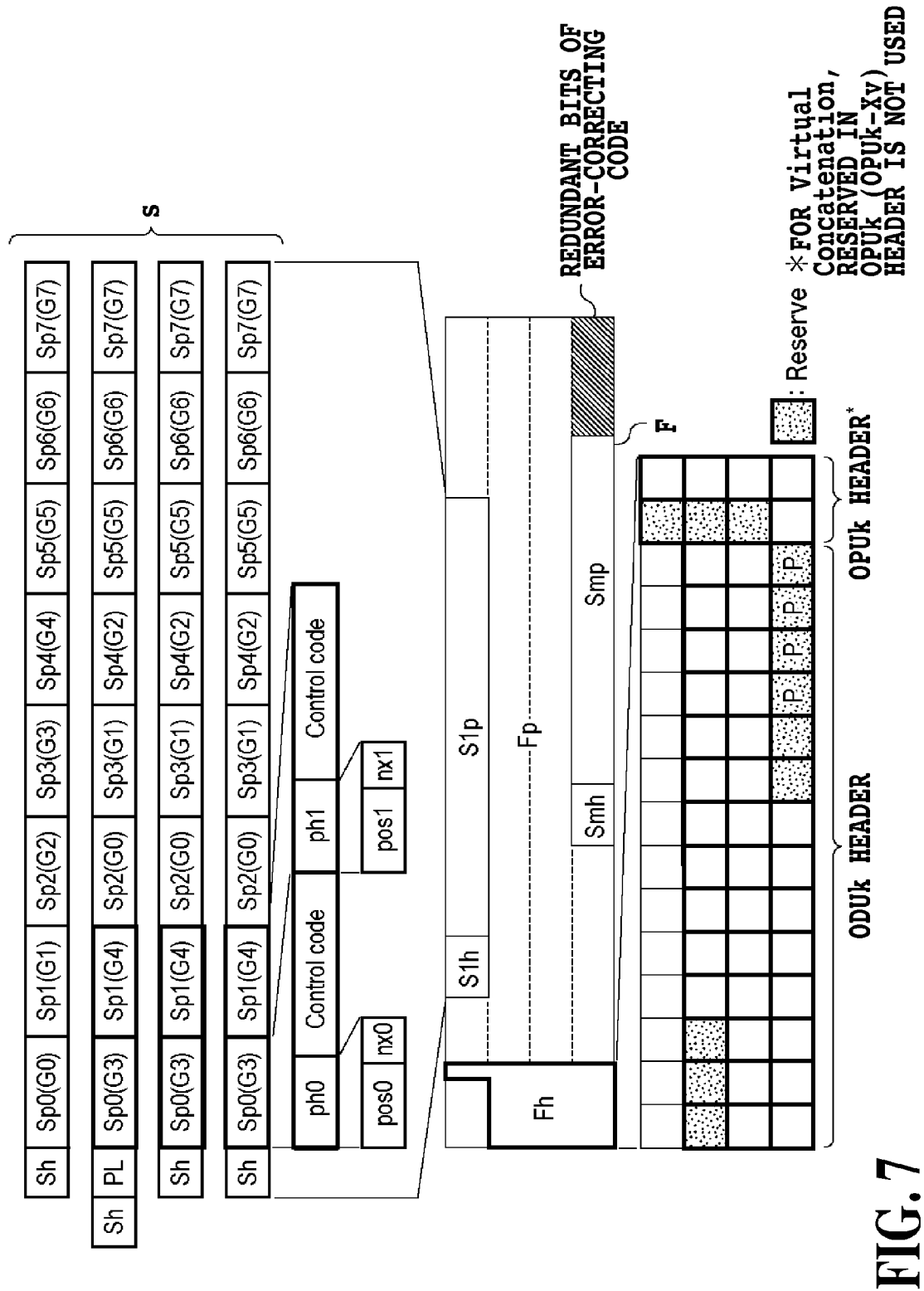
FIG. 7 is a diagram schematically showing mapping of a generated super-block S to an ODUk/OPUk (k=1, 2, or 3) frame.
Figure 8:
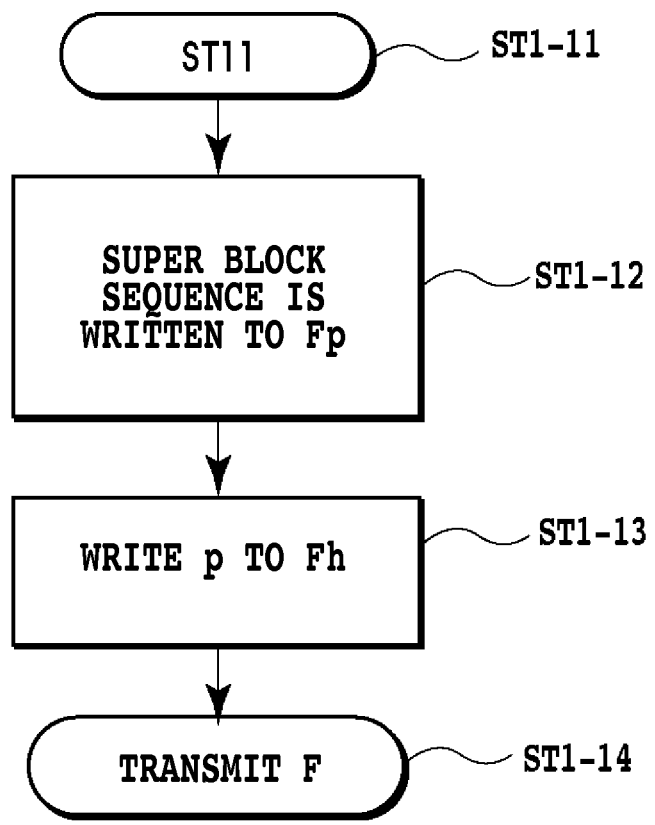
FIG. 8 is a diagram schematically showing the flow of output of a super-block according to an embodiment.

Now, the output of super-blocks Swill be described with reference to FIGS. 7 and 8. The super-blocks S can be mapped to the payloads in the transmission frame F before output. FIG. 7 is a diagram schematically showing how the generated super-blocks S are mapped to the ODUk/OPUk (k=1, 2, 3) frame. FIG. 7 shows plural super-blocks S that can be contained in the OPUk frame according to the embodiment of the present invention. Furthermore, in the transmission frame F shown in FIG. 7, redundant bits are shown which are generated using the super-blocks S as information bits in the error-correcting codes. FIG. 8 is a diagram schematically showing the flow of the output of the super-blocks S.

As shown in FIG. 8, the super-blocks S output in ST1-11 (FIG. 2) are sequentially mapped to the payloads in the ODUk/OPUk frame [FIG. 8: ST1-12].

A pointer (p) indicating the position of a super-block S1 with the first appearing header (header S1h) is referenced and contained at a particular position in a reserve area in the ODUk/OPUk frame [FIG. 8: ST1-13]. As shown in FIG. 7, a plurality of reserve areas may be used depending on the situation. If a plurality of super-block sequences S are multiplexed and the multiplexed super-block sequences S are mapped to the payloads in the ODUk/OPUk frame, pointers allowing the de-multiplexed super-block sequences S to be identified are generated and contained. Thus, the receiving side can easily extract the super-block sequences S from the ODUk/OPUk frame.

The generated ODUk/OPUk frame is transmitted to the next processing function [FIG. 8: ST1-14].

Figure 9A:
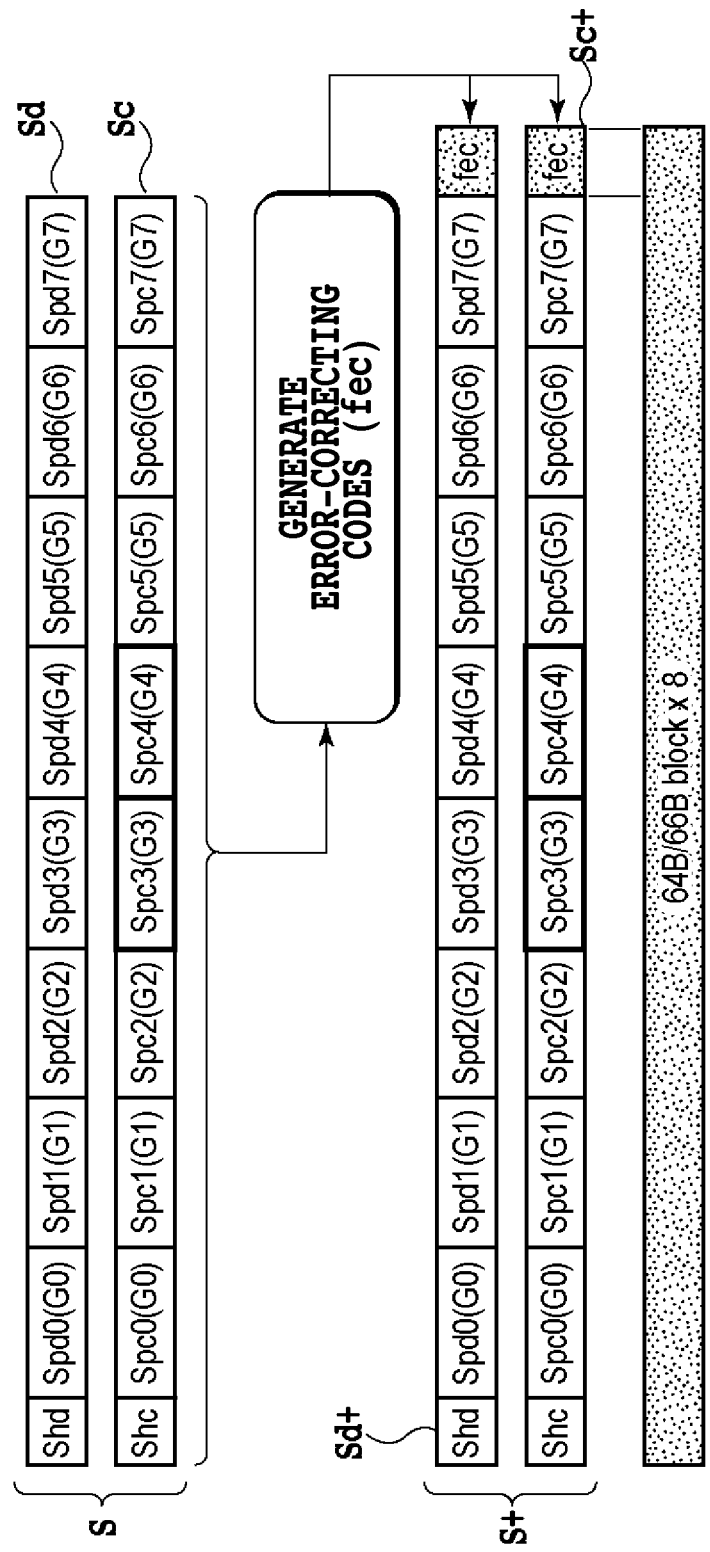
FIG. 9A is a diagram schematically showing the addition of error correcting codes fec to a super-block.
Figure 9B:
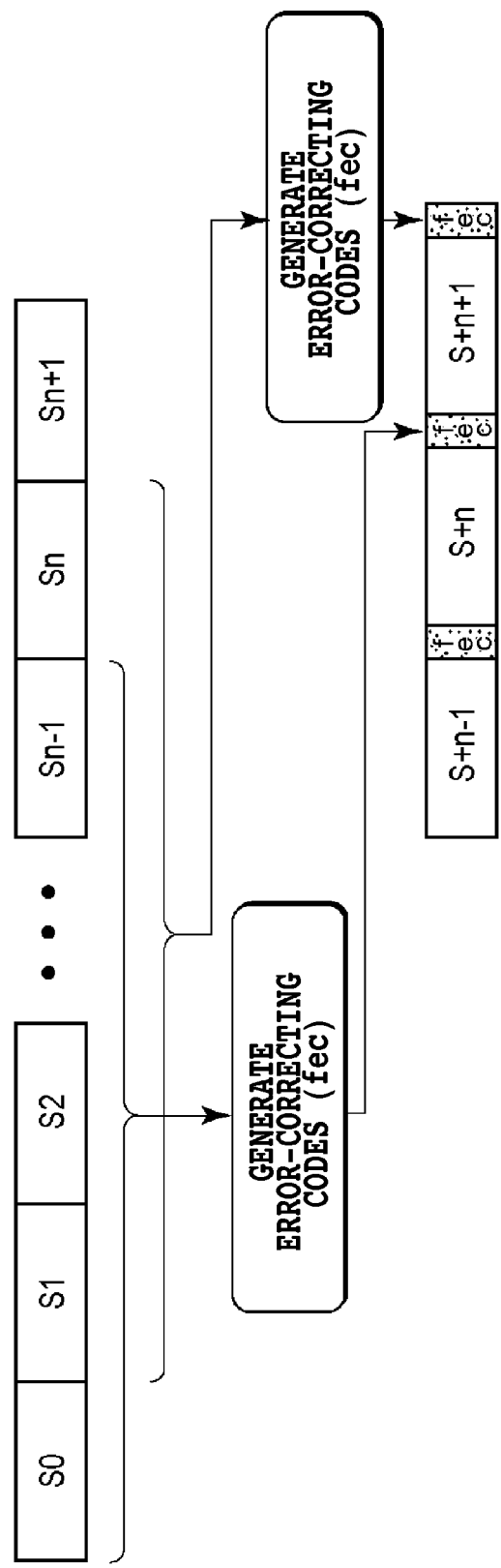
FIG. 9B is a diagram schematically showing the addition of error-correcting codes fec to a super-block.
Figure 10:
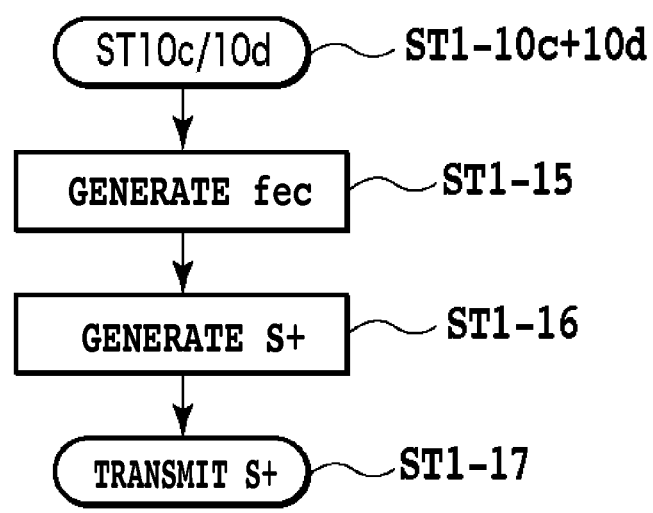
FIG. 10 is a diagram schematically showing the flow of generation of error-correcting codes fec and generation of a super frame (sequence) S+.

Now, the addition of the error-correcting code fec to a super-block (sequence) will be described with reference to FIGS. 9A, 9B, and 10. FIG. 9A is a diagram schematically showing the addition of the error-correcting code fec to a super-block. FIG. 9B is a diagram schematically showing the addition of the error-correcting code fec to a sequence of super-blocks. FIG. 10 is a diagram schematically showing the flow of generation of an error-correcting-code fec and a super-frame (sequence) S+.

As shown in FIG. 10, an error-correcting code fec is generated from one or more of the super-block S generated in ST1-10c or ST1-10d (FIG. 2) [FIG. 10: ST1-15].

As shown in FIG. 9A, if an error-correcting code fec is generated for one super-block, the generated fec is applied to the super-block S to newly generate a super-block S+ [FIG. 10: ST1-16]. The generated super-block S+ is transmitted to the next processing [FIG. 10: ST1-17]. Here, provided that the number of 64B/66B blocks is the same as that of signal block payloads (data block payloads Bd' or control block payloads Bc') in the super-block S+ and the length (bit number) of the 64B/64B blocks is the same as that of the signal block payloads, high error-robustness (high redundant) transmission is possible in spite of the same bit rate (clock rate) as that at which the 64B/66B block sequence is directly transmitted.

Furthermore, as shown in FIG. 9B, if an error-correcting code fec is generated for (n) super-blocks S ($S_0$ to $S_{n-1}$), the generated fec is applied to one of the super-blocks S, that is, the super-block $S_{n+1}$, to generate $S+_{n+1}$ [FIG. 10: ST1-16]. The generated super-block S+ is transmitted to the next processing [FIG. 10: ST1-17].

Figure 11:
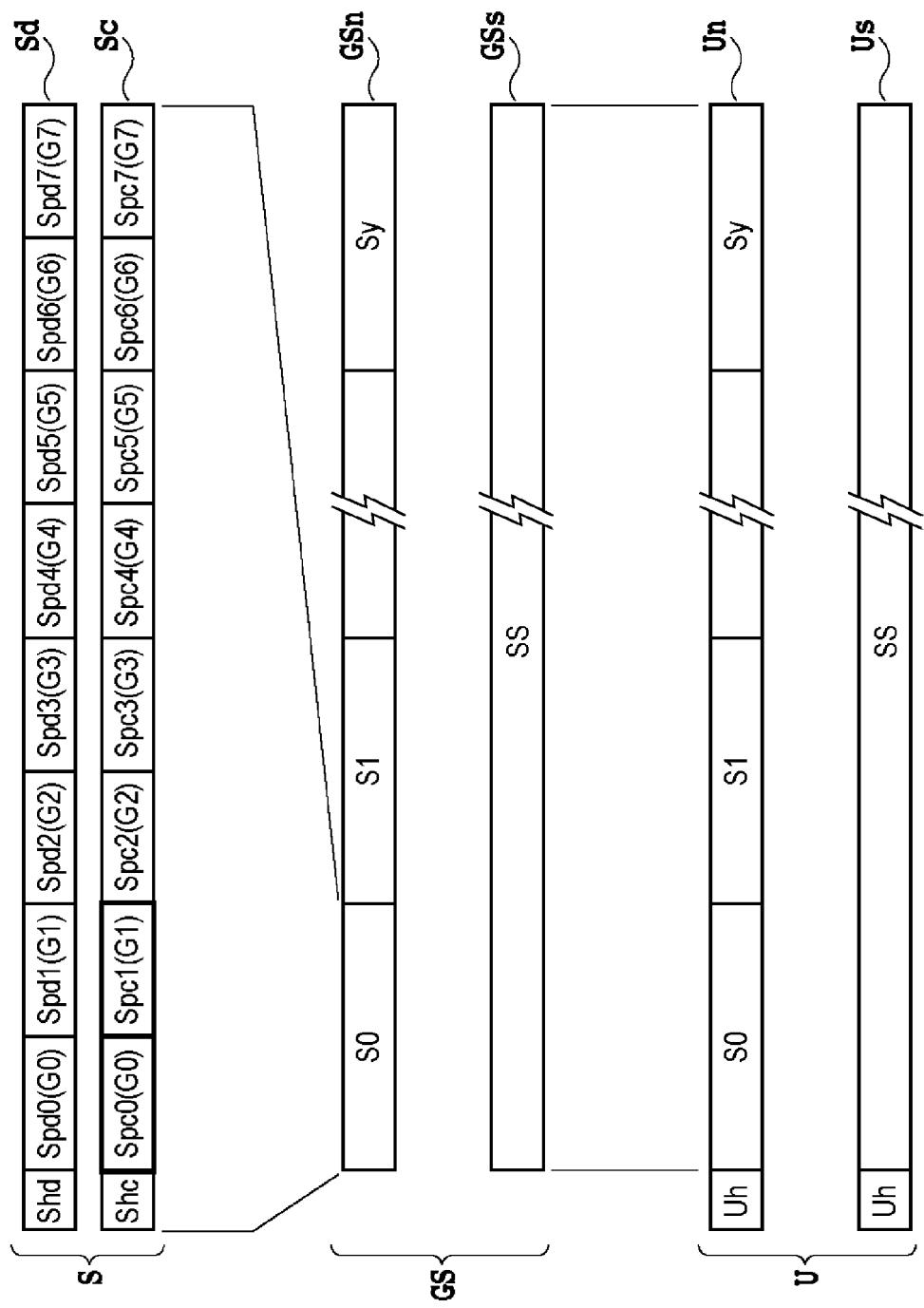
FIG. 11 is a diagram schematically showing an ultra-block according to an embodiment.
Figure 12:
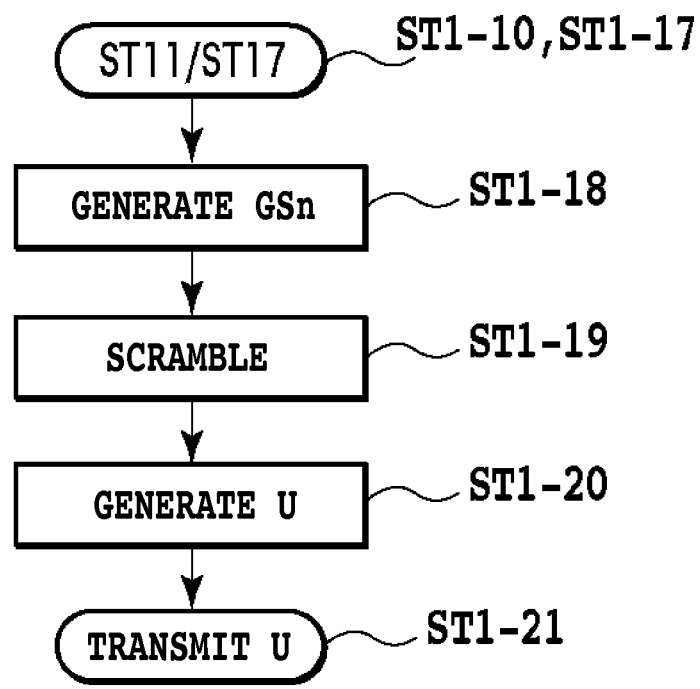
FIG. 12 is a diagram schematically showing the flow of output of the ultra-block according to an embodiment.

Alternatively, a plurality of super-block sequences S or S+ may be bundled to generate an ultra-block, which may then be mapped to the transmission frame. FIG. 11 is a diagram schematically showing an ultra-block U. FIG. 12 is a diagram schematically showing the flow of the output of the ultra-block U. As shown in FIG. 12, the transmitting side forms (y) super-blocks (Sd, Sc) output in ST1-10 or (y) super-blocks S+ output in ST1-17 into one group GSn [FIG. 12: ST1-18]. The receiving side then adds an ultra-block header Uh to the group GSn to generate an ultra-block Un [FIG. 12: ST1-20]. Then the ultra-block Un is mapped to a transmission frame to be output [FIG. 12: ST1-21]. In an embodiment, the group GSn may be constructed of the scramble process predetermined to the receiving side to equalize the bit polarity in the group GSn, thus generating a group GSs [FIG. 12: ST1-19]. Then an ultra-block header Uh is added to the group GSs to generate an ultra-block Un [FIG. 12: ST1-20]. Then the ultra-block Un is mapped to a transmission frame to be output [FIG. 12: ST1-21]. The ultra-block header Uh may be, for example, a 2-bit bit sequence providing the receiving side with synchronization information.

The signal block sequence processing method carried out on the transmitting side has been described. By carrying out the signal block sequence processing method in the reverse order, the receiving side can restore the signal block sequence from the received transmission frame F.

Specifically, the receiving side references the header (the pointer contained at a predetermined position in the header) of the received transmission frame F to extract the first super-block (S) based on the pointer. If an ultra-block is contained in the transmission frame F, the receiving side extracts the ultra-block header and then extracts the super-block from the ultra-block succeeding the ultra-block header. If a plurality of super-blocks is contained in payloads in the transmission frame F, the receiving side extracts the succeeding super-block. If error-correcting codes are used, the receiving side executes error checks and corrections based on the error-correcting code applied to the super-block and relating to the super-block (sequence).

Moreover, the receiving side references the super-block header (Shc, Shd) of the received super-block (references information indicating whether or not the super-block payloads in the super-block include control block payloads Bc') to determine whether or not the super-block payloads in the super-block include control block payloads Bc'. If the super-block payloads in the super-block contain control block payloads Bc', the receiving side places the signal block payloads (Bc', Bd') back at the positions in the group G set before the rearrangement in accordance with the position determination information provided in the control block payloads and a predetermined signal block payload rearrangement rule. Furthermore, the receiving side removes the position determination information from the control block payloads or sets the status of the control block payloads back to the one set before the insertion of the position determination information in accordance with a predetermined rule. If the super-block payloads in the super-block include no control block payload Bc', the receiving side places the data block payloads Bd' back at the positions in the group (G) set before the rearrangement in accordance with the predetermined data block payload rearrangement rule for the group (G). Furthermore, in accordance with the predetermined rule, the receiving side changes the sequence order of the signal block payloads back to the one set before the formation of the signal block payloads into one group. That is, the receiving side rearranges the signal block payloads in the order in which the transmitting side has received the 64B/66B blocks B (the transmitting side has written the 64B/66B blocks B to the memory). Then, the receiving side adds, to each of the signal block payloads, a signal block header (Bch, Bdh) containing information indicating whether the signal block payload is a control block payload in which a control code is contained or a data block payload in which data is contained. The receiving side then outputs the resulting sequence of the signal blocks.

Figure 13:
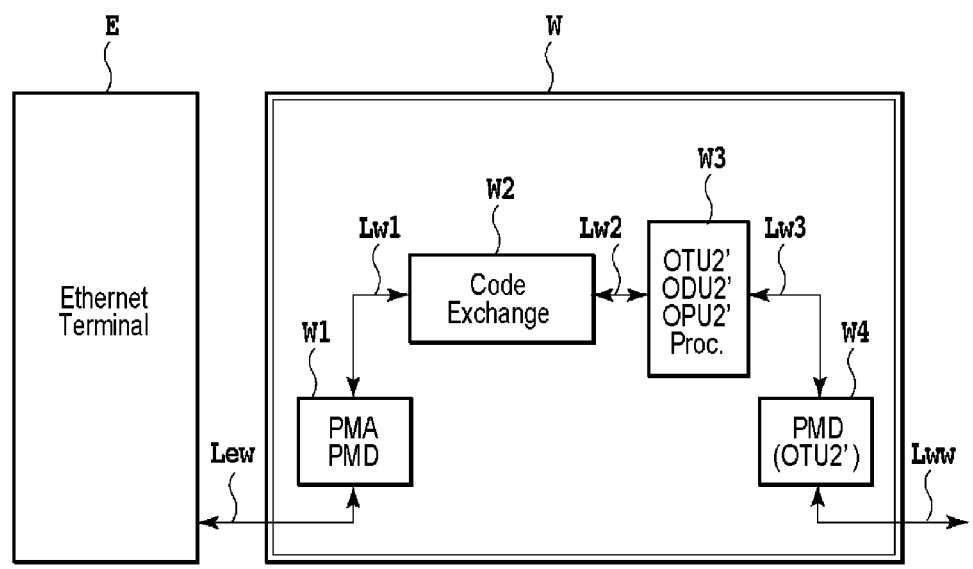
FIG. 13 is a diagram showing the configuration of an optical-signal transmission and reception apparatus according to an embodiment.

Now, with reference to FIG. 13, description will be given of a signal processing apparatus configured to carry out the above-described block signal processing method and an optical-signal transmission apparatus and an optical-signal reception apparatus both of which include the signal processing apparatus. FIG. 13 is a diagram showing an optical-signal transmission apparatus corresponding to an embodiment of the present invention, as a LAN-WAN edge apparatus W installed at the boundary between LAN and WAN. FIG. 13 shows the configuration of the LAN-WAN edge apparatus W. The LAN-WAN edge apparatus W is connected to a 10G Ethernet apparatus E via a signal line Lew such as an optical or electric cable. Here, for easier understanding, the description of the internal configuration of the 10G Ethernet apparatus E is avoided. Similarly, the functions and the like of the LAN-WAN edge apparatus W which do not relate directly to the present invention are simplified or omitted. The optical-signal transmission apparatus described herein converts a transmission frame F into an optical signal and outputs the optical signal. The optical-signal reception apparatus described herein receives the converted transmission frame F. However, of course, the present invention can be implemented as a signal transmission and reception apparatus configured to transmit and receive transmission frames F in the form of electric signals.

In the LAN-WAN edge apparatus W, a PMD (Physical Medium Dependent) and PMA (Physical Medium Attachment) section W1 receives and subjects an optical/electric signal from the 10G Ethernet apparatus E to a serial-parallel conversion. The PMD and PMA section W1 then outputs the resulting 64B/66B block sequence to Lw1. Furthermore, the PMD and PMA section W1 subjects a 64B/66B block sequence from the Lw1 to a parallel-serial conversion and then outputs the resulting optical/electric signal to the signal line Lew.

A signal block conversion section W2 may be composed of a signal block memory configured to store received signal blocks B, a rearrangement section configured to delete a signal block header (Bch, Bdh) from each of a preset number of signal blocks B stored in the signal block memory, form the signal block payloads (Bc, Bd') into one group G, determine whether or not the group G contains control block payloads Bc', provide, if the group G contains control block payloads Bc', the control block payloads Bc' with position determination information indicating the positions of the control block payloads Bc' in the group G, rearrange the signal block payloads (Bc', Bd') in the group G according to a signal block payload rearrangement rule predetermined to the receiving side and specifying the rearrangement positions of the control block payloads Bc' and data block payloads Bd' in the group, and rearrange, if the group G contains no control block payload Bc', the data block payloads Bd' in the group according to a data block payload rearrangement rule predetermined to the receiving side and specifying the rearrangement positions of the data block payloads Bd' in the group, and a super-block output section configured to output a super-block S composed of super-block payloads (Sc, Sd) in which the group with the signal block payloads (Bc', Bd') rearranged therein is contained and super-block headers (Shc, Shd) in which information indicating whether or not the super-block payloads include control block payloads Bc' is contained. The rearrangement section and the super-block output section can be implemented by one or more processors and logically or physically configured integrally or separately.

Furthermore, the signal block conversion section W2 may provide a function to generate an error-correcting code for the super-block (sequence) S and add the code to the super-block (sequence) S.

A framing section W3 frames a super-block (sequence) S or a super-block S+ output by the super-block output section, into a transmission frame F such as OPU2/ODU2/OTU2. The framing section W3 then outputs the framed signal to a signal line Lw3. In FIG. 13, OPU2'/ODU2'/OTU2' indicates that a clock may be used which is slightly higher than OPU2/ODU2/OTU2 and lower than a clock used for direct mapping shown as a conventional example.

An optical-signal output section W4 subjects the transmission frame F input through the signal line LW3 to a parallel-serial conversion by the PMD to generate an optical signal. The optical-signal output section W4 then outputs the resulting transmission frame F to another WAN apparatus.

The optical-signal reception apparatus according to the present invention can be implemented by reversing signal inputs and outputs to and from the above-described sections of the optical-signal transmission apparatus.

Moreover, another embodiment of the optical-signal transmission apparatus and optical-signal reception apparatus according to the present invention will be described with reference to FIG. 14.

FIG. 14 shows that four 10G Ethernet apparatuses E1-4 and a LAN-WAN edge apparatus W are connected together via optical/electric cables Lew1-4. Here, for easier understanding, the internal configuration of the 10G Ethernet apparatuses E1-4 will not be described. Similarly, the functions and the like of the LAN-WAN edge apparatus W which do not relate directly to the present invention are simplified or omitted.

As in the case of the LAN-WAN edge apparatus W shown in FIG. 13, in the LAN-WAN edge apparatus W, each PMD (Physical Medium Dependent) and PMA (Physical Medium Attachment) section W1-4 receives and subjects a corresponding optical/electric signal from the 10G Ethernet apparatus E to a serial-parallel conversion. The PMD and PMA section W1 then outputs the resulting 64B/66B block sequence to Lw1-4.

A signal block conversion section W21-24 processes the 64B/66B block sequence input via Lw1-4 and outputs the resulting super-block (sequence) S or S+ to a signal line Lw21-24.

A multiplexing section W5 receives the super-blocks (sequences) S or S+ via the Lw21-24 to generate a multiplexed bit sequence. The multiplexing section W5 then outputs the multiplexed bit sequence to a signal line Lw3'.

A framing section W3' frames the multiplexed bit sequence obtained by multiplexing the super-blocks (sequences) S or S+, into a transmission frame F. The framing section W3' outputs the framed signal to a signal line Lw4'.

An optical-signal output section W4' subjects the transmission frame F input through the signal line LW4' to a parallel-serial conversion by the PMD to generate an optical signal. The optical-signal output section W4' then outputs the resulting transmission frame F to another WAN apparatus.

Second Embodiment

As described above, according to the present invention, a sequence of signal blocks each composed of a signal block payload and a signal block header is input and processed, and the resultant super-block is output. In the series of processes, signal block headers and a part or the whole of each signal block payload composed only of clock adjusting characters are deleted to reduce the bit rate at which the super-block is transmitted. Furthermore, according to the present invention, an input super-block is processed, and the signal blocks based on which the super-block has been generated are output (restored).

A second embodiment of the present invention will be described below with reference to the drawings.

Figure 15:
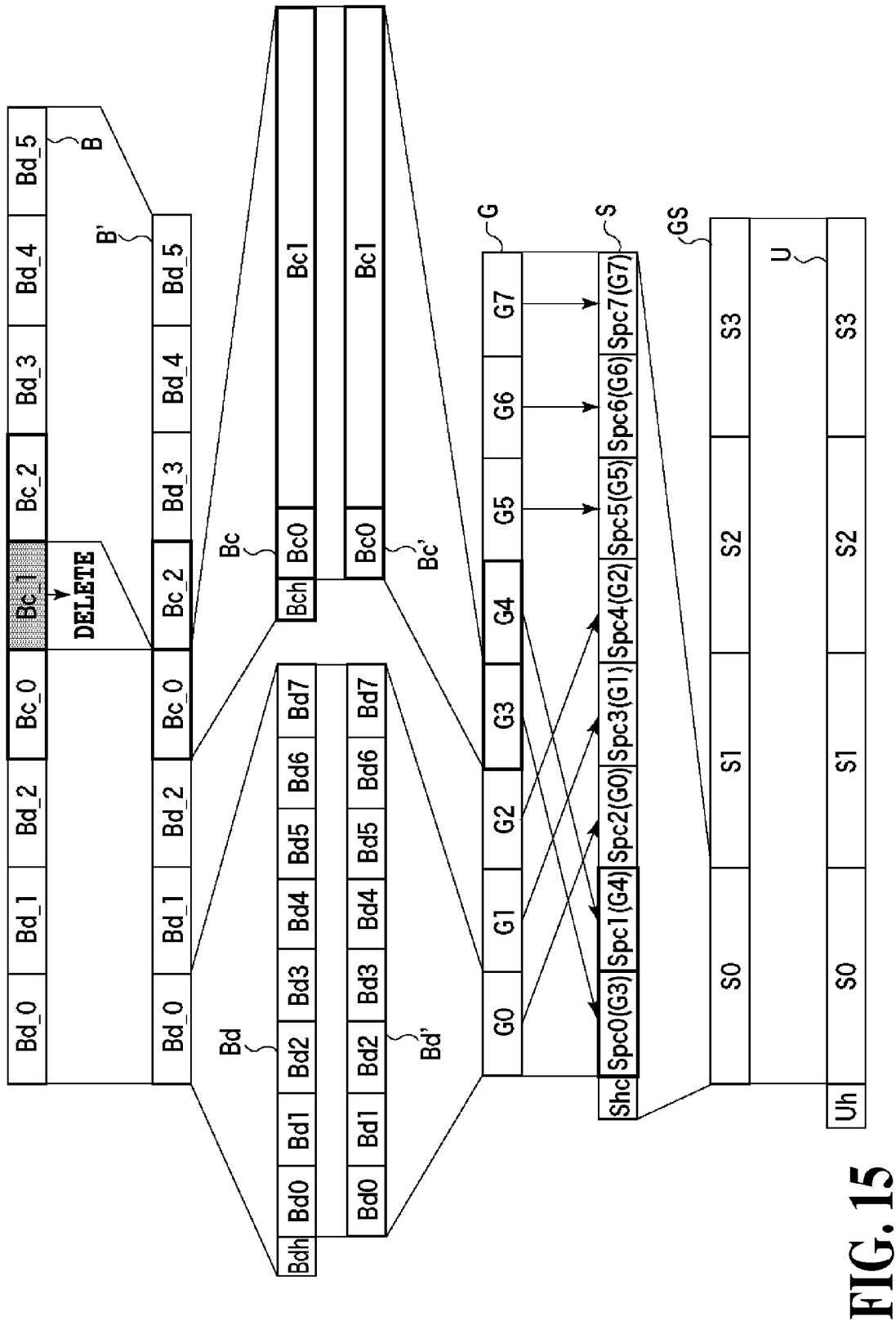
FIG. 15 is a diagram schematically showing how signal blocks are processed.

FIG. 15 is a diagram schematically showing how signal blocks are processed. In FIG. 15, an input sequence of signal blocks is denoted by B. A signal block payload in which data is contained is denoted by Bd'. A signal block payload in which a control code is contained is denoted by Bc'. Furthermore, a signal block header for the data block payload Bd' is denoted by Bdh. A signal block header for the control block payload Bc' is denoted by Bch. Moreover, a signal block composed of data block payloads Bd' and a signal block header Bdh is denoted by Bd. A signal block composed of a control block payload Bc' and a signal block header Bch is denoted by Bc. The signal block header (Bch, Bdh) contains information indicating whether the signal block payload is a control block payload Bc' or a data block payload Bd'. The control block payload Bc' contains information Bc0 indicating the type of a control code Bc1 contained in the control block payload Bc'. A signal block Bc_1 is a signal block in which only clock adjusting characters are contained in the control block payloads Bc'.

According to the present embodiment, signal blocks (Bc_1) each containing a signal block payload Bc' composed only of clock adjusting characters are deleted from the input sequence of signal blocks B. Then, the signal block headers (Bch, Bdh) are deleted from each sequence of signal blocks B' corresponding to the sequence of signal blocks B from which the above-described signal blocks have been deleted. A preset number of signal block payloads (Bc', Bd') are formed into one group G. In FIG. 15, groups each formed of eight signal block payloads are denoted by G0 to G7. G3 and G4 each denote the control block payload Bc'.

Moreover, according to the present embodiment, the signal block payloads in the group G are processed (provision of position determination information to the control block payloads and rearrangement of the signal block payloads). The resultant super-block S is then output. For example, the super-block S is accommodated in payloads in a transmission frame F, which is then transmitted. Alternatively, a plurality of super-blocks S are formed into a group GS, and a synchronization header is provided to the group GS. The group GS is mapped to the transmission frame F in the form of an ultra-block U, which is then transmitted.

Furthermore, according to the present embodiment, an error-correcting code fec can be generated for the generated super-block or sequence of super-blocks and added to the super-block or sequence of super-blocks to generate a super-block S+ with the error-correcting code fec added thereto, which is then output. For example, the super-block S+ is accommodated in payloads in a transmission frame F, which is then transmitted.

As in the case of the above-described first embodiment, in the description below, an Ethernet MAC (10 Gb/s) signal constructed of 64B/66B block coding is used as an example of the signal block B as required. Furthermore, an ODUk/OPUk (k=1, 2, 3) frame is used as an example of the transmission frame F as required. Here, a 64B/66B data block composed only of clock adjusting characters corresponds to a block shown in FIG. 49-7 in Non-Patent Document 1 and having a block type filed with a value of 0x1e.

Figure 16:
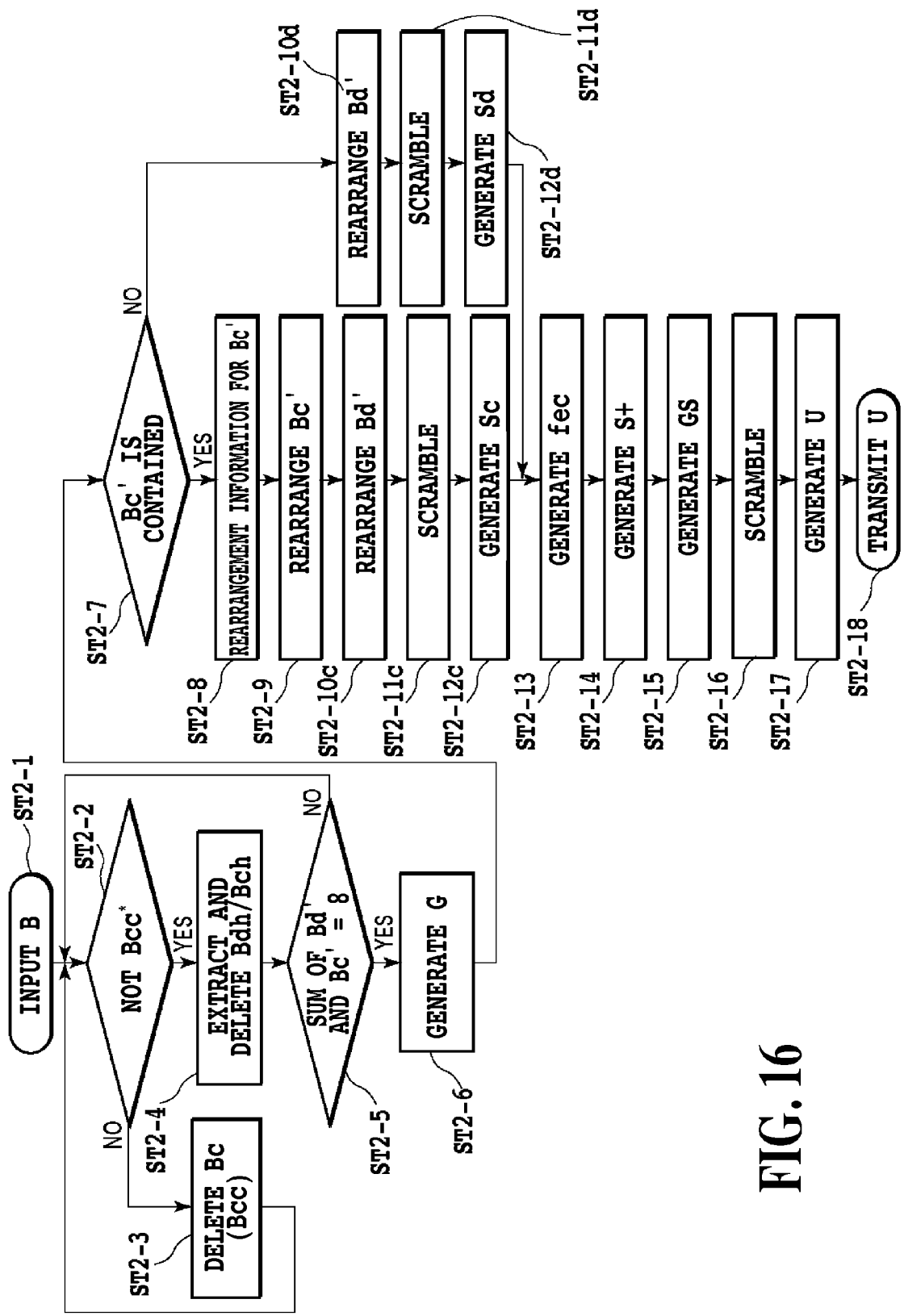
FIG. 16 is a diagram schematically showing the flow of a signal block sequence processing method according to an embodiment.

With reference to FIGS. 15 and 16, an embodiment of a signal block sequence processing method according to the present invention will be described.

FIG. 16 is a diagram schematically showing the flow of a signal block sequence processing method according to the present embodiment. When the signal block sequence processing method according to the present embodiment starts, a signal processing apparatus included in a signal transmission apparatus receives a sequence of 64B/66B blocks B from a 10G Ethernet apparatus [FIG. 16: ST2-1]. The received sequence of 64B/66B blocks B is stored in a memory such as a register.

Then, the method references the block type of each of the 64B/66B blocks in the sequence of 64B/66B blocks received in ST2-1 to determine whether or not the 64B/66B block is composed only of clock adjusting characters (a 64B/66B block composed only of clock adjusting characters is hereinafter denoted as Bcc) [FIG. 16: ST2-2]. If the 64B/66B block is a Bcc, the 64B/66B block is deleted [FIG. 16: ST2-2]. If the 64B/66B block is not a Bcc, the signal block header (Bch, Bdh) is deleted to generate signal block payloads (Bd, Bc') [FIG. 16: ST2-4].

Then, every eight of the signal block payloads (Bd' Bc') generated in ST2-4 are formed into a group G [FIG. 16: ST2-6]. If less than eight signal block payloads (Bd', Bc') have been generated, ST2-1 to ST2-3 are repeated. In FIG. 15, G0 to G2 in the group G denote data block payloads Bd', and G3 and G4 denote control block payloads Bc'.

Then, determination of whether or not the generated group G contains control block payloads Bc' is performed [FIG. 16: ST2-7]. If the determination results in that the generated group G contains control block payloads Bc', the control block payloads Bc' (G3, G4) are provided with position determination information (here also referred to as rearrangement information) allowing determination of the positions of the control block payloads in the sequence of signal blocks B set before the formation of the group G [FIG. 16: ST2-8]. Whether or not the generated group G contains control block payloads Bc' can be determined by referencing the header Bch and/or a block type Bc0 in the control block payload Bc'.

Then, in accordance with a rule (signal block payload rearrangement rule) specifying the rearrangement positions of the data block payloads Bd' and control block payloads Bc' in the group G and predetermined to the receiving side, G3' and G4' are arranged at positions Spc0 and Spc1 in the payloads in the super-block S [FIG. 16: ST2-9]. Subsequently, the data block payloads Bd' (G0 to G2 and G5 to G7) is arranged at Spc2 to Spc7 [FIG. 16: ST2-10c].

On the other hand, upon determining in ST2-7 that the group G contains no control block payloads Bc', the method arranges the data block payloads Bd' at positions Spd0 to Spd7 in the payloads in the super-block S in accordance with a rule (data block payload rearrangement rule) specifying the rearrangement positions of the data block payloads Bd' in the group G and predetermined to the receiving side [FIG. 16: ST2-10d].

Here, after the signal block payloads (Bc', Bd') are arranged at Spc0 to Spc7 (Spd0 to Spd7), the signal block payloads (Bc', Bd') may be constructed of a scramble process predetermined to the receiving side to equalize the bit polarity [FIG. 16: ST2-11c or ST2-11d].

Then, if the group G contains data block payloads Bd' and control block payloads Bc', a header Shc (1 bit: 1) is added to the payloads (Spc0 to Spc7) in the super-block to generate a super-block Sc [FIG. 16: ST2-12c]. On the other hand, if the group G is composed only of data block payloads Bd', a header Shd (1 bit: 0) is added to the payloads (Spc0 to Spc7) to generate a super-block Sd [FIG. 16: ST2-12d]. Thus, the receiving side can easily extract the control block payloads Bc' from the super-block. The generated super-block S can be output without change or processed as described below. The output super-blocks S are sequentially mapped to payloads in an ODUk/OPUk frame.

In this case, a pointer (p) indicating the position of one of the super-blocks S mapped to the payloads in the ODUk/OPUk frame which has the first appearing header (if super-blocks S1 to S4 are mapped to the ODUk/OPUk frame, the pointer in the header (S1h) of the super-block S1) is referenced and contained at a particular position in a reserve area in the ODUk/OPUk frame. If a plurality of super-block sequences S are multiplexed and the multiplexed super-block sequences S are mapped to the payloads in the ODUk/OPUk frame, pointers allowing the multiplexed super-block sequences S to be identified are generated and contained. Thus, the receiving side can easily extract the super-block sequences S from the ODUk/OPUk frame.

As shown in FIG. 16, an error-correcting code fec can be generated from one or more of the super-block S generated in ST2-12*c* or ST2-12*d* [FIG. 16: ST2-13].

If an error-correcting code fec is generated for one super-block, the generated fec is applied to the super-block S to newly generate a super-block S+ [FIG. 16: ST2-14]. Here, provided that the number of 64B/66B blocks is the same as that of signal block payloads (data block payloads Bd' or control block payloads Bc') in the super-block S+ and the length (bit number) of the 64B/64B blocks is the same as that of the signal block payloads, high error-robustness (high redundant) transmission is possible in spite of the same bit rate (clock rate) as that at which the 64B/66B block sequence is directly transmitted.

If an error-correcting code fec is generated for (n) super-blocks S ($S_0$ to $S_{n-1}$), the generated fec is applied to one of the super-blocks S, that is, the super-block $S_{n+1}$, to generate $S+_{n+1}$ [FIG. 16: ST2-14].

Then, a plurality of (for example, four) super-block sequences S generated in ST2-12*c* or ST2-12*d* or a plurality of super-blocks S+ generated in ST2-14 are bundled to generate a group GS [FIG. 16: ST2-15]. The group GS may be constructed of the scramble process predetermined to the receiving side to equalize the bit polarity (a group GS not constructed of the scramble process is hereinafter denoted by GSn, and a group GS constructed of the scramble process is hereinafter denoted by GSs) [FIG. 16: ST2-16].

Moreover, an ultra-block header Uh is added to the group GS to generate an ultra-block U [FIG. 16: ST2-17]. The ultra-block U is then output [FIG. 16: ST2-18]. The ultra-block header Uh may be, for example, a 2-bit bit sequence providing the receiving side with synchronization information. Like the super-blocks S, the ultra-blocks U are sequentially mapped to the payloads in the ODUk/OPUk frame.

In the present embodiment, an example of the signal block payload rearrangement rule is as follows. If the group G contains control block payloads Bc', the control block payloads Bc' (signal block payloads arranged at the positions G3' and G4' in the super-block) are always rearranged consecutively from a predetermined position (consecutively in order of Spc0, Spc1, . . . ), and the data block payloads Bd' are then rearranged at positions where no control block payload Bc' is present with the sequence order of the data block payloads Bd' maintained (that is, with the sequence order of G0, G1, G2, G5, G6, and G7 maintained). In view of the easiness with which the receiving side can extract the control block payloads Bc' from the super-block, this example is more preferable. However, the present invention can be implemented according to any other example.

For example, the signal block payload rearrangement rule may be specified as follows. After the control block payloads Bc' (the signal block payloads arranged at the positions G3 and G4 in the super-block) are always consecutively rearranged at every other position (Spc0, Spc2, Spc4, and Spc6; if the group G contains at least five control codes, then the control block payloads Bc' are arranged at Spc1, Spc3, Spc5, and Spc7 in this order, following Spc6), the data block payloads Bd' are rearranged at positions where no control block payload Bc' is present with the sequence order of the data block payloads Bd' maintained (that is, with the sequence order of G0, G1, G2, G5, G6, and G7 maintained). Alternatively, the signal block payload rearrangement rule may be specified as follows. After the control block payloads Bc' are consecutively rearranged at Spc0 and Spc1 in this order, the data block payloads Bd' are rearranged at positions where no control block payload Bc' is present (Spc2 to Spc7) with the sequence order of the data block payloads Bd' maintained (that is, with the sequence order of G0, G1, G2, G5, G6, and G7 maintained).

On the other hand, an example of the data block payload arrangement rule may be specified as follows. If the group G contains no control block payload Bc', the data block payloads Bd' are rearranged at the positions Spd0 to Spd7 with the sequence order thereof maintained (that is, with the sequence order of G0, G1, G2, G3, G4, G5, G6, and G7 maintained). In view of the easiness with which the receiving side can restore the signal blocks, this example is more preferable. However, the present invention can be implemented according to any other example.

For example, the data block payload rearrangement rule may be specified such that the data block payloads Bd' are rearranged at Spd0 to Spd7 with the reversed sequence order thereof (that is, in order of G7, G6, G5, G4, G3, G2, G1, and G0). Alternatively, the data block payload rearrangement rule may be specified such that the data block payloads Bd' are always arranged consecutively at every other position from a predetermined position (that is, at Spd0, Spd2, Spd4, Spd6, Spd1, Spd3, Spd5, and Spd7 in this order).

The signal block sequence processing method on the transmitting side has been described. By carrying out the signal block processing sequence processing method in the reverse order, the receiving side can restore a sequence of signal blocks B from a received transmission frame F.

Figure 17:
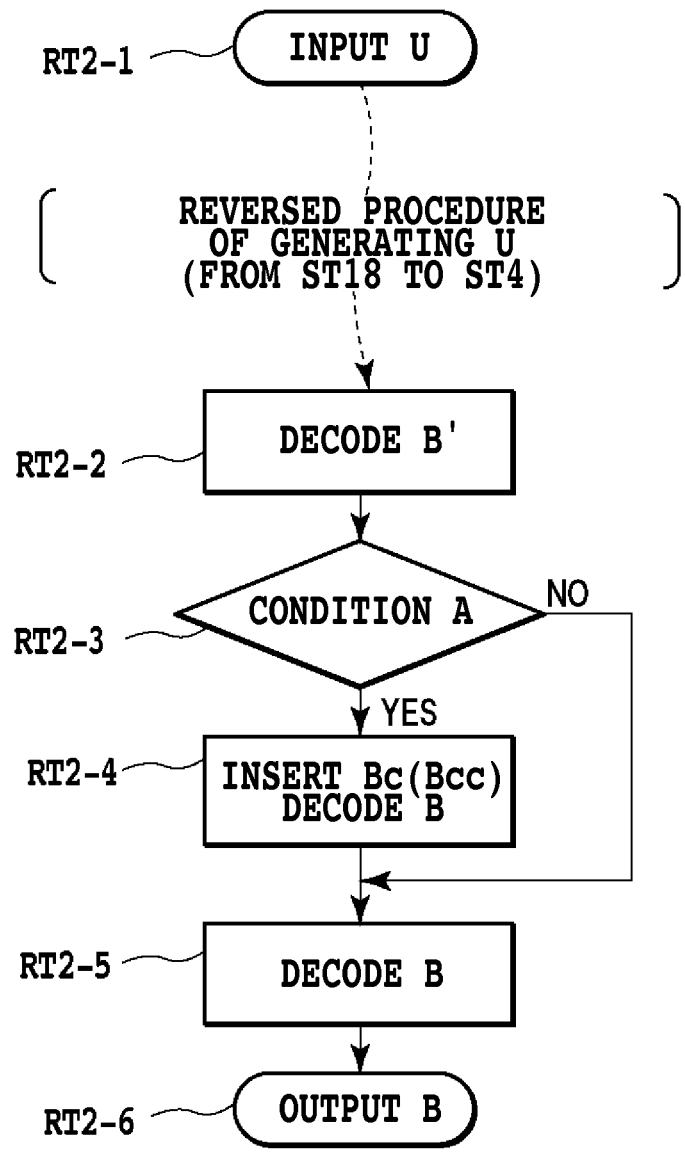
FIG. 17 is a diagram schematically showing the flow of a signal block sequence processing method according to an embodiment.
Figure 18:
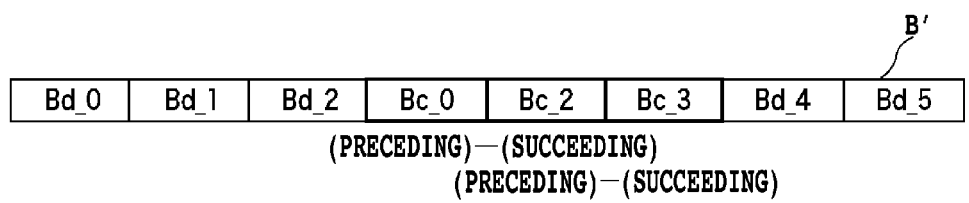
FIG. 18 is a diagram schematically showing the flow of a signal block sequence processing method according to an embodiment.

With reference to FIGS. 17 to 19, a method by which the receiving side restores the sequence of signal blocks B will be described. FIG. 17 is a diagram schematically showing the flow of a signal block sequence processing method according to the present embodiment.

As shown in FIG. 17, if an ultra-block U is contained in the transmission frame F, the method starts with extraction of an ultra-block header from the transmission frame F and extraction of a super-block from the ultra-block succeeding the ultra-block header [FIG. 17: RT2-1]. If no ultra-block is accommodated in the transmission frame F, the method references the header (the pointer contained at a predetermined position in the header) of the received transmission frame F to extract the first super-block (S) based on the pointer. If a plurality of super-blocks are accommodated in the payloads in the transmission frame F, the succeeding super-block are extracted.

Then, the procedure in which the transmitting side generates an ultra-block is reversely carried out, that is, from ST2-16 to ST2-4 to restore a sequence of 64B/66B blocks B' from which 64B/66B blocks Bcc composed only of clock adjusting characters have been deleted [FIG. 17: RT2-2].

If error-correcting codes are used, the receiving side executes error checks and corrections based on the error-correcting code applied to the super-block and relating to the super-block (sequence).

Then, the receiving side references the super-block header (Shc, Shd) of the received super-block (references information indicating whether or not the super-block payloads in the super-block include control block payloads Bc') to determine whether or not the super-block payloads in the super-block include control block payloads Bc'. If the super-block payloads in the super-block contain control block payloads Bc', the receiving side places the signal block payloads (Bc', Bd') back at the positions in the group G set before the rearrangement in accordance with the position determination information provided in the control block payloads and a predetermined signal block payload rearrangement rule. Furthermore, the receiving side removes the position determination information from the control block payloads or sets the status of the control block payloads back to the one set before the insertion of the position determination information in accordance with a predetermined rule. If the super-block payloads in the super-block include no control block payload Bc', the receiving side places the data block payloads Bd' back at the positions in the group (G) set before the rearrangement in accordance with the predetermined data block payload rearrangement rule for the group (G). Furthermore, in accordance with the predetermined rule, the receiving side changes the sequence order of the signal block payloads back to the one set before the formation of the signal block payloads into one group. Then, the receiving side adds, to each of the signal block payloads, a signal block header (Bch, Bdh) containing information indicating whether the signal block payload is a control block payload in which a control code is included or a data block payload in which data is included. The receiving side thus restores the sequence of 64B/66B blocks B' from which the 64B/66B blocks Bcc have been deleted.

Then, the receiving side uses the block type values of two consecutive control blocks Bc in the sequence of 64B/66B block B' as shown in FIG. 18 to determine whether or not the transmitting side has deleted the 64B/66B blocks Bcc composed only of clock adjusting characters from the two control blocks Bc [FIG. 17: RT2-3].

FIG. 19 is a table showing an example of a condition A for the combination of the block type values of the two consecutive control blocks Bc. If the combination of the block type values is any one of patterns 1 to 16, the receiving side inserts a 64B/66B block Bcc composed only of clock adjusting characters between the two control blocks Bc [FIG. 17: RT2-4]. The receiving side thus restores the sequence of signal blocks B input by the transmitting side [FIG. 17: RT2-5] and outputs the restored sequence of signal blocks B [FIG. 17: RT2-6].

The embodiment has been described in which the 64B/66B block Bcc composed only of clock adjusting characters is deleted with reference to the block type. However, a part of the 64B/66B block may be deleted.

An embodiment in which a part of each 64B/66B block is deleted will be described with reference to FIGS. 20A, 20B, and 21.

Figure 20A:
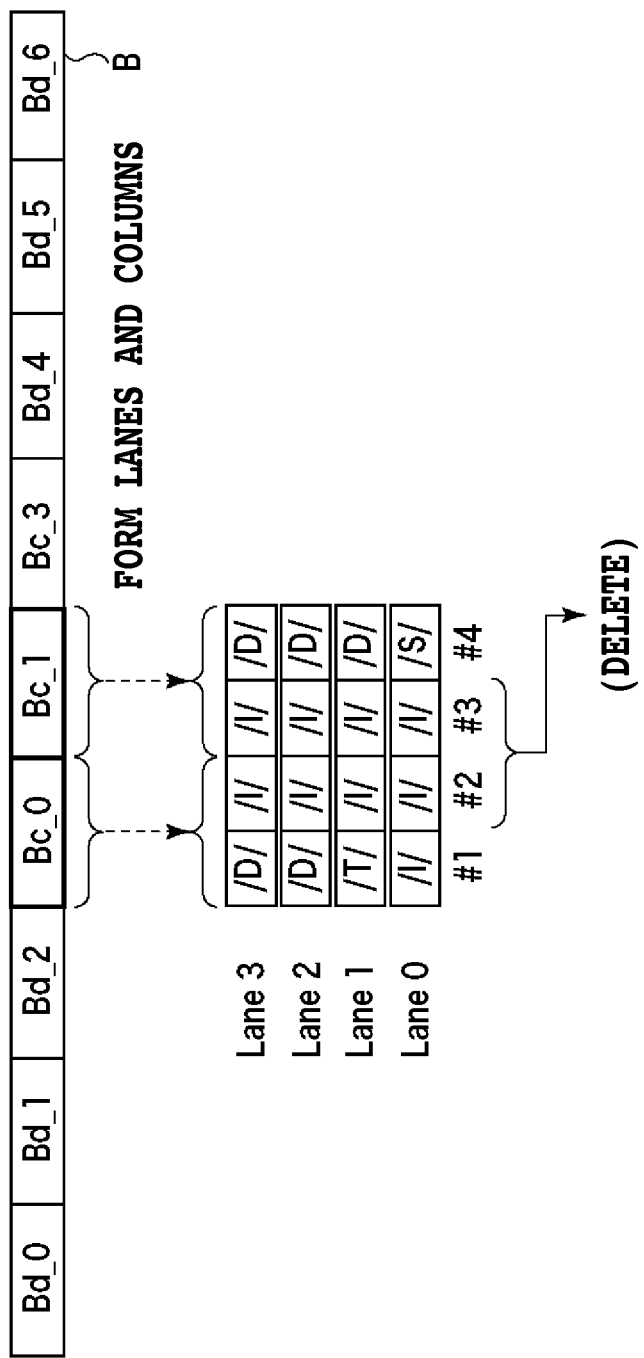
FIG. 20A is a diagram illustrating an embodiment in which a part of each signal block payload composed only of clock adjusting characters is deleted.
Figure 20B:
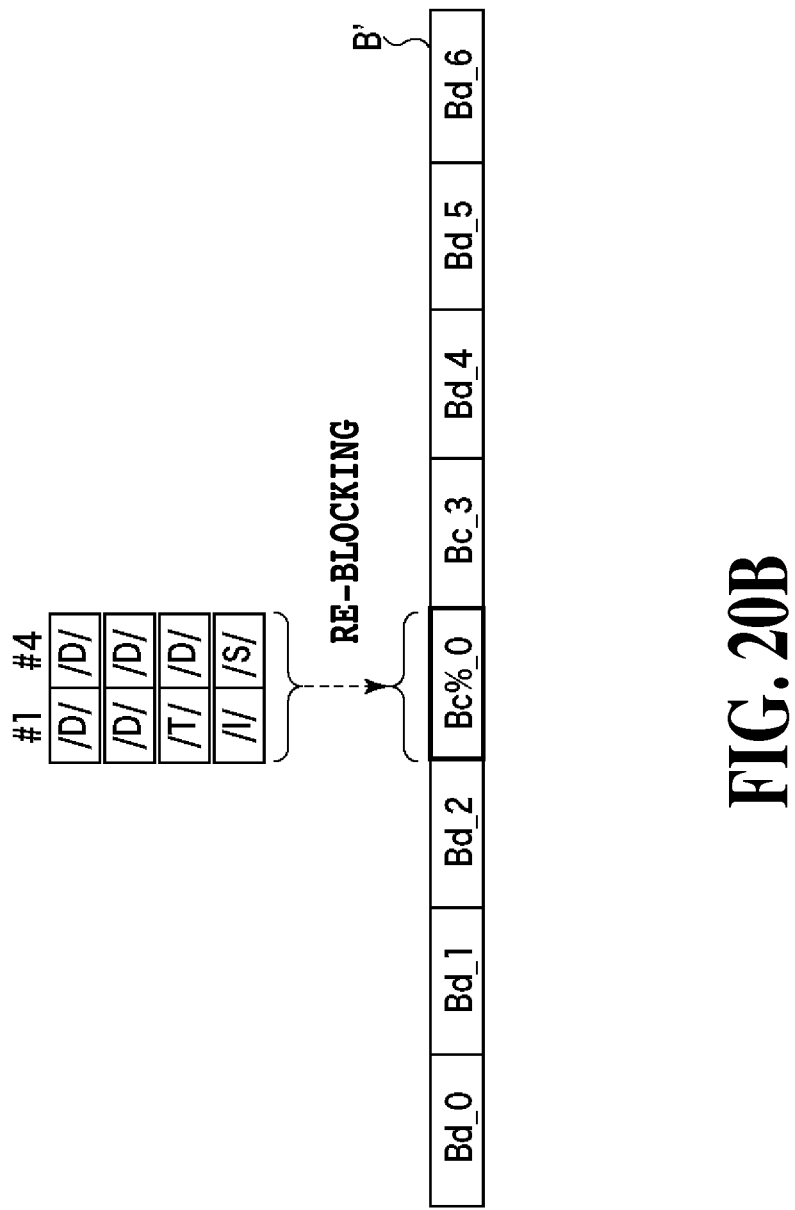
FIG. 20B is a diagram illustrating an embodiment in which a part of each signal block payload composed only of clock adjusting characters is deleted.

FIG. 20A is a diagram showing control codes in the control block payloads Bc' of two signal blocks Bc in an input sequence of signal blocks B in accordance with the concepts of lanes and columns. FIG. 20B is a diagram schematically showing that parts (/I/) of the control codes in the control block payloads Bc' are deleted and reconfigured to one signal block Bc %. FIG. 21 is a diagram schematically showing the flow of deletion of a part of the 64B/66B block Bcc.

Figure 21:
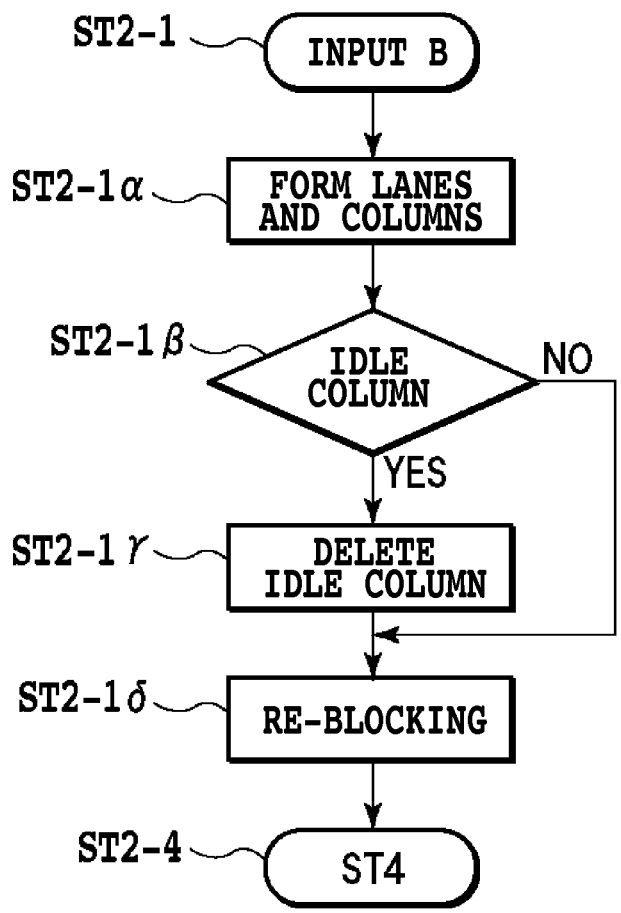
FIG. 21 is a diagram illustrating an embodiment in which a part of each signal block payload composed only of clock adjusting characters is deleted.

First, the optical-signal transmission apparatus receives the sequence of 64B/66B blocks B from the 10G Ethernet apparatus [FIG. 21: ST2-1]. The received sequence of 64B/66B blocks is stored in a memory such as a register.

Then, each of the 64B/66B blocks in the sequence of 64B/66B blocks received in ST2-1 is partitioned into lanes and columns [FIG. 21: ST2-1α]. In FIG. 20A, each column is expressed as a set (#1 to #4) of 4 bites orthogonal to four lanes (lanes 0 to 3).

Then, the process determines whether or not each column is composed only of clock adjusting characters (/I/) [FIG. 21: ST2-1β]. If the column is composed only of clock adjusting characters (/I/) (idle column), the column (columns #2 and #3 in FIG. 20A) is deleted [FIG. 21: ST2-1γ].

Then, the remaining columns (columns #1 and #4 in FIG. 20B) resulting from the deletion of the columns composed only of clock adjusting characters are reconfigured to a new signal block Bc %. Thus, the resultant sequence of 64B/66B blocks B' contains the signal block Bc % [FIG. 21: ST2-1δ]. Moreover, the signal block headers (Bch, Bdh) are deleted to generate signal block payloads (Bd', Bc') [FIGS. 21 and 16: ST2-4].

In the example described with reference to FIGS. 20A, 20B, and 21, the control codes in the two signal block Bc are partitioned into lanes and columns, and the idle columns composed only of clock adjusting characters are deleted and reconfigured to one signal block Bc %. However, as shown in FIGS. 22A, 22B, and 22C, one or more signal blocks B (Bc, Bd) may be partitioned into lanes and columns, and the idle columns may be deleted and reconfigured to one or more signal blocks B % (Bc %, Bd %).

Figure 22A:
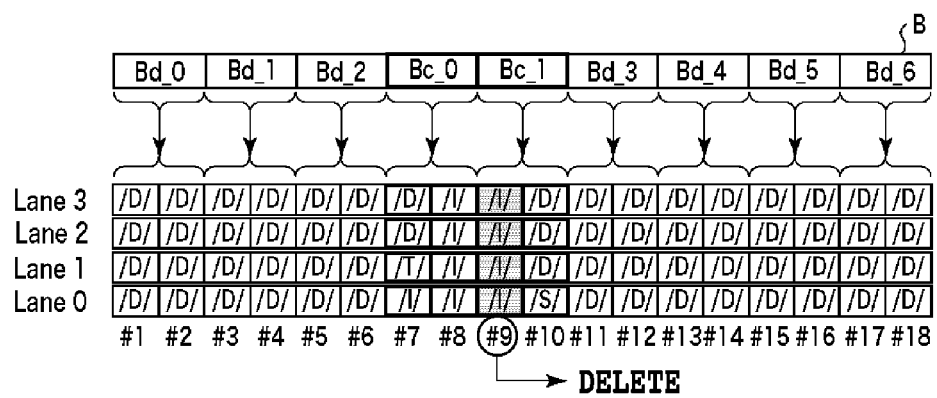
FIG. 22A is a diagram illustrating an embodiment in which a part of each signal block payload composed only of clock adjusting characters is deleted.
Figure 22B:
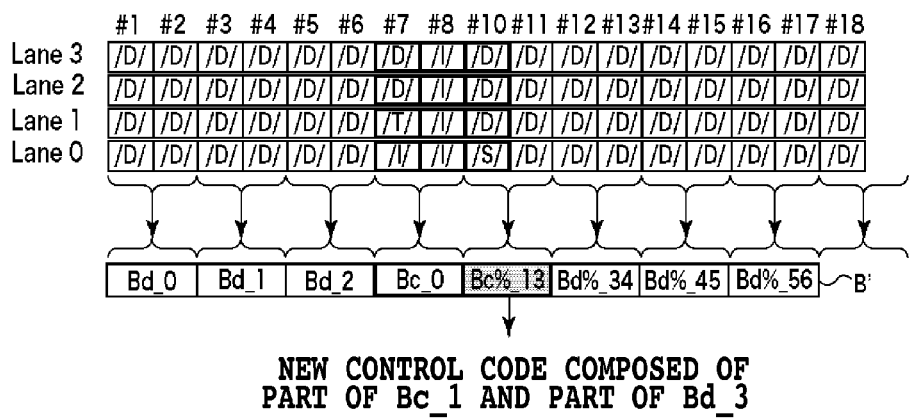
FIG. 22B is a diagram illustrating an embodiment in which a part of each signal block payload composed only of clock adjusting characters is deleted.
Figure 22C:
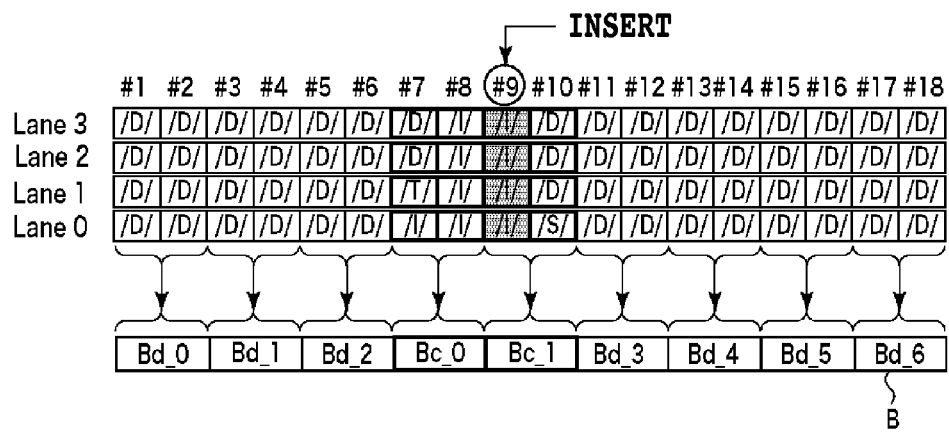
FIG. 22C is a diagram illustrating an embodiment in which a part deleted from each signal block payload composed only of clock adjusting characters is decoded.

FIG. 22A shows that the signal blocks Bd_0 to Bd_2, Bc_0, Bc_1, Bd_3 to Bd_6 are partitioned into lanes and columns and a part of the idle columns contained in Bc_0 and Bc_1 (the idle columns contained in Bc_1) is deleted. Furthermore, FIG. 22B shows that the remaining part of Bc_1 and a part of Bd_3 are reconfigured to a signal block Bc %_13, whereas the remaining part of Bc_3 and a part of Bd_4 are reconfigured to a signal block Bc %_34.

Figure 23A:
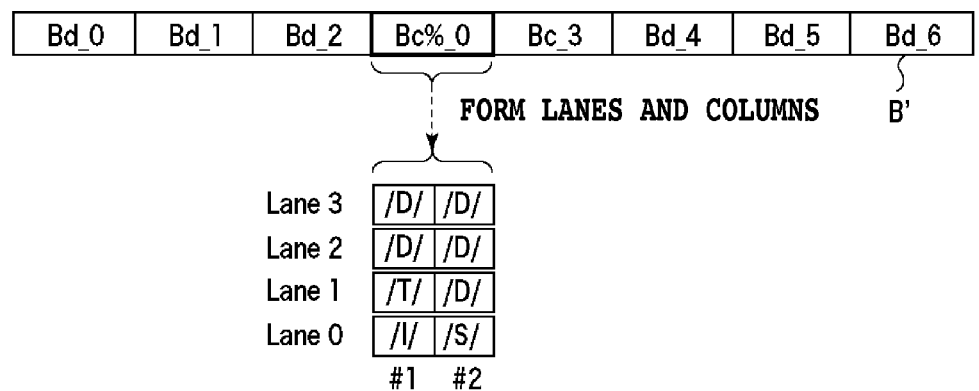
FIG. 23A is a diagram illustrating an embodiment in which a part deleted from each signal block payload composed only of clock adjusting characters is decoded.
Figure 23B:
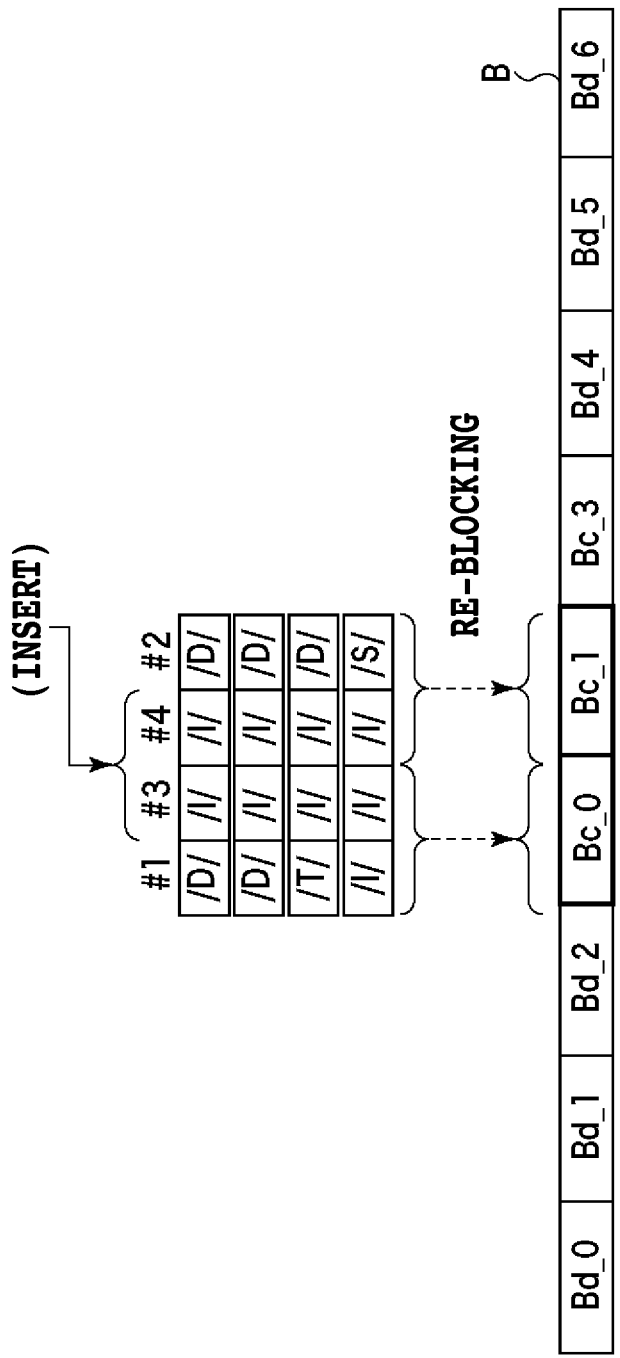
FIG. 23B is a diagram illustrating an embodiment in which a part deleted from each signal block payload composed only of clock adjusting characters is decoded.
Figure 24A:
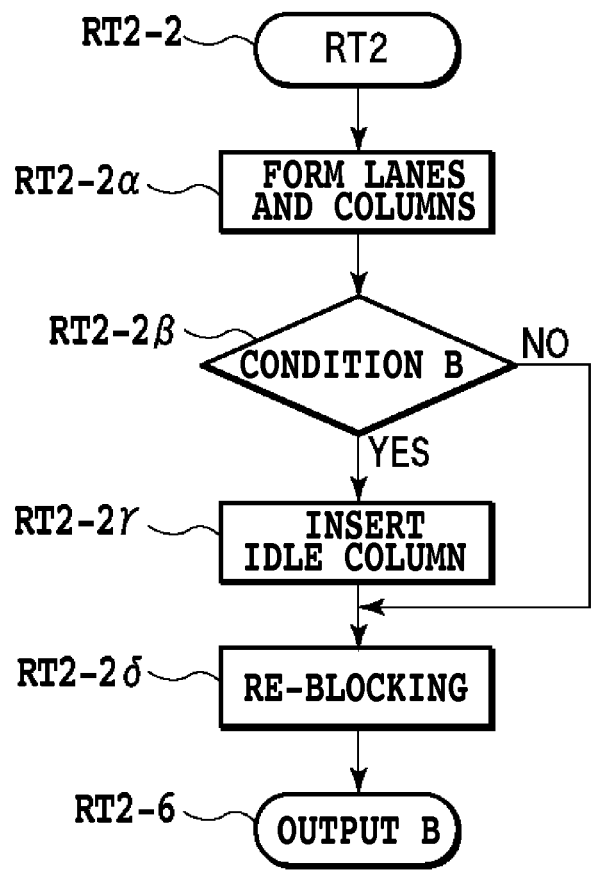
FIG. 24A is a diagram schematically showing the flow in which a part deleted from each signal block payload composed only of clock adjusting characters is decoded.

Now, how the receiving side performs decoding if the transmitting side has deleted a part of the 64B/66B block Bcc will be described with reference to FIGS. 23A, 23B, 24A, and 24B. FIG. 23A is a diagram showing the control code in the 64B/66B block Bc % in the sequence of 64B/66B blocks B' in accordance with the concept of lanes and columns for a parallel common interface XGMII. FIG. 23B is a diagram schematically showing that (/I/) is inserted between columns of the control block payload Bc % to reconfigure the control block payload Bc % to two signal blocks Bc. FIG. 24A is a diagram schematically showing the flow of decoding of a deleted part of a signal block Bc. FIG. 24B is a diagram schematically showing a condition for determining whether or not the transmitting side has deleted columns (idle columns) composed only of clock adjusting characters.

As shown in FIG. 24A, the procedure in which the transmitting side generates an ultra-block is carried out in the reverse order. When the procedure starts, the sequence of 64B/66B blocks B' decoded in RT2-2 (FIG. 17) described above is obtained. Then, each of the 64B/66B blocks in the sequence of 64B/66B blocks B' is partitioned into lanes and columns [FIG. 24A: RT2-2α].

Then, the process uses a combination of consecutive columns to determine whether or not the transmitting side has deleted columns (idle columns) composed only of clock adjusting characters [FIG. 24A: RT2-2β]. As shown in FIG. 24B, a "terminal character /T/" is present in the first of the consecutive columns and a "start character /S/" is present in the second column, idle columns are inserted between the two columns [FIG. 24A: TR2γ]. The number of idle columns to be inserted is determined based on a given condition, for example, the number is between 9 and 15 so that the number of idle characters /I/ including the terminal character /T/ is 12 on an average.

After the insertion of the idle columns, the resulting columns are reconfigured to a signal block B [FIG. 24A: RT2-2δ]. The sequence of signal blocks B input by the transmitting side is thus decoded and output [FIGS. 24A and 17: RT2-6]. In the above-described example in FIGS. 23A and 23B, and 24A and 24B, the control code in one signal block Bc % is partitioned into lanes and columns, idle columns are inserted between the columns in the control code, and the resulting columns are reconfigured to two signal block Bc. However, the following procedure is possible. One or more signal blocks B % (Bc %, Bd %) are partitioned into lanes and columns, idle columns are inserted between the columns in the signal blocks B %, and the resulting columns are reconfigured to one or more signal blocks B (Bc, Bd).

FIG. 22C shows that the receiving side receives a block sequence containing signal blocs Bc %_13, Bc %_34, Bc %_45, and Bd %_56 resulting from reconfiguring by the transmitting side as shown in FIG. 22B, and inserts idle columns into Bc %_13 to restore a sequence of signal blocks B.

For example, a column with the "start character /S/" (for example, #10 in FIG. 22B) may be detected, and idle characters the number of which allows the number of idle characters /I/ contained in the columns preceding the detected column to be set to a predetermined value (for example, the average value) are inserted into the column. Thus, the control block payload corresponding to certain signal blocks B (for example, Bc_1, Bd_3) can be restored. Furthermore, the remaining columns can be used to further restore the control block payload corresponding to other signal blocks B (for example, Bc_4 to Bc_6).

Now, a method for providing the control block payloads Bc' with position determination information [FIG. 16: ST2-8] will be described with reference to FIG. 25. FIG. 25 is a table showing the relationship between 15 types (#1 to #15) of control block formats and a block type value (block type 1) indicating which of these types the control block format belongs and a block type value (block type 2) coded so as to maximize the Humming distance between particular block types and which is provided to each control block payload together with position determination information; the control block format types and the block type 1 are specified in FIG. 49-7 in Non-Patent Document 1.

In the present embodiment, position determination information on each of G3 and G4 can be contained by changing the block type Bc0 of the control code contained in the corresponding signal block Bc'. For example, if the block type Bc0 is composed of 8 bits, the position determination information is contained using ph0 (4 bits) contained in the block type Bc0. Specifically, 3 bits of the 4 bits are used to contain information indicating the position of the control block payload in the sequence of signal blocks B set before formation into the group G. The remaining 1 bit is used to contain information indicating whether or not the succeeding signal block is a control block payload Bc'.

The remaining 4 bits in the block type Bc0, which are different from the 4 bits in which position determination information is contained, are used to contain information indicating one of the 15 types corresponding to the control block Bc1 contained in the control block payload Bc'.

A bit error may prevent the terminal position of an Ethernet frame from being communicated to the higher layer (MAC: Media Access Control layer). In this case, the Ethernet frame may fail to be distinguished from the next frame. As a result, both frames may be discarded or transferred to another Ethernet apparatus with the error uncorrected. This results from replacement of a control block (which conforms to one of the control block formats #8 to #15) containing a control character Tj indicative of the terminal position.

Thus, in the present embodiment, when the 8-bit block type value (block type 1) indicative of one of the 15 types of control codes is coded into a 4-bit block type value (block type 2), control blocks each containing the control character Tj indicative of the terminal position are coded using a combination of 4 bits which allows all the Humming distances to be set to at least 2. Thus, even if a 1-bit error occurs in the 4-bit block type value (block type 2), the corresponding control blocks are determined to be different from those which contain the control character Tj indicative of the terminal position (#8 to #15 in FIG. 25) (see, for example, Non-Patent Document 6).

Figure 26:
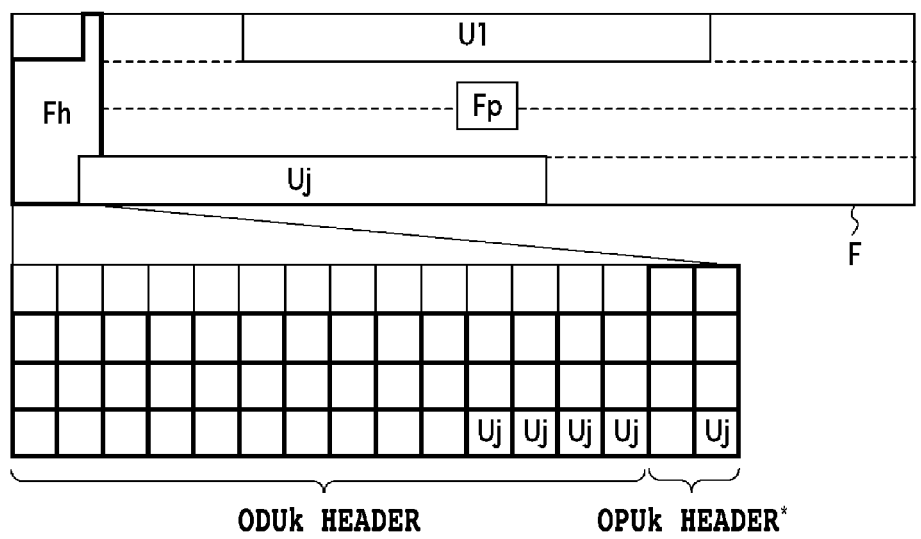
FIG. 26 is a diagram schematically showing mapping of an ultra-block to a transmission frame according to an embodiment.

Now, mapping of an output sequence of super-blocks S (S+) or ultra-blocks U to an ODUk/OPUk frame will be described. As described above, the output sequence of super-blocks S or ultra-blocks U can be sequentially mapped to the payloads in the ODUk/OPUk frame. Furthermore, the blocks can be mapped to a particular area predetermined to the receiving side and including the header area of the ODUk/OPUk frame. FIG. 26 shows that a part of the $j^{th}$ one of the plurality of ultra-blocks U to be mapped to the ODUk/OPUk frame is mapped to the header area (Fh) of the ODUk/OPUk frame, whereas the other ultra-blocks U are mapped to the payload area (Fp) of the ODUk/OPUk frame. The receiving side can sequentially extract plural sequences of super-blocks S (S+) or ultra-blocks U from the predetermined, particular area of the ODUk/OPUk frame.

A plurality of super-blocks S (S+) formed into a group GS may be generated by processing a sequence of signal blocks from the same source (Ethernet apparatus E) or input by a plurality of sources (Ethernet apparatuses).

Figure 27:
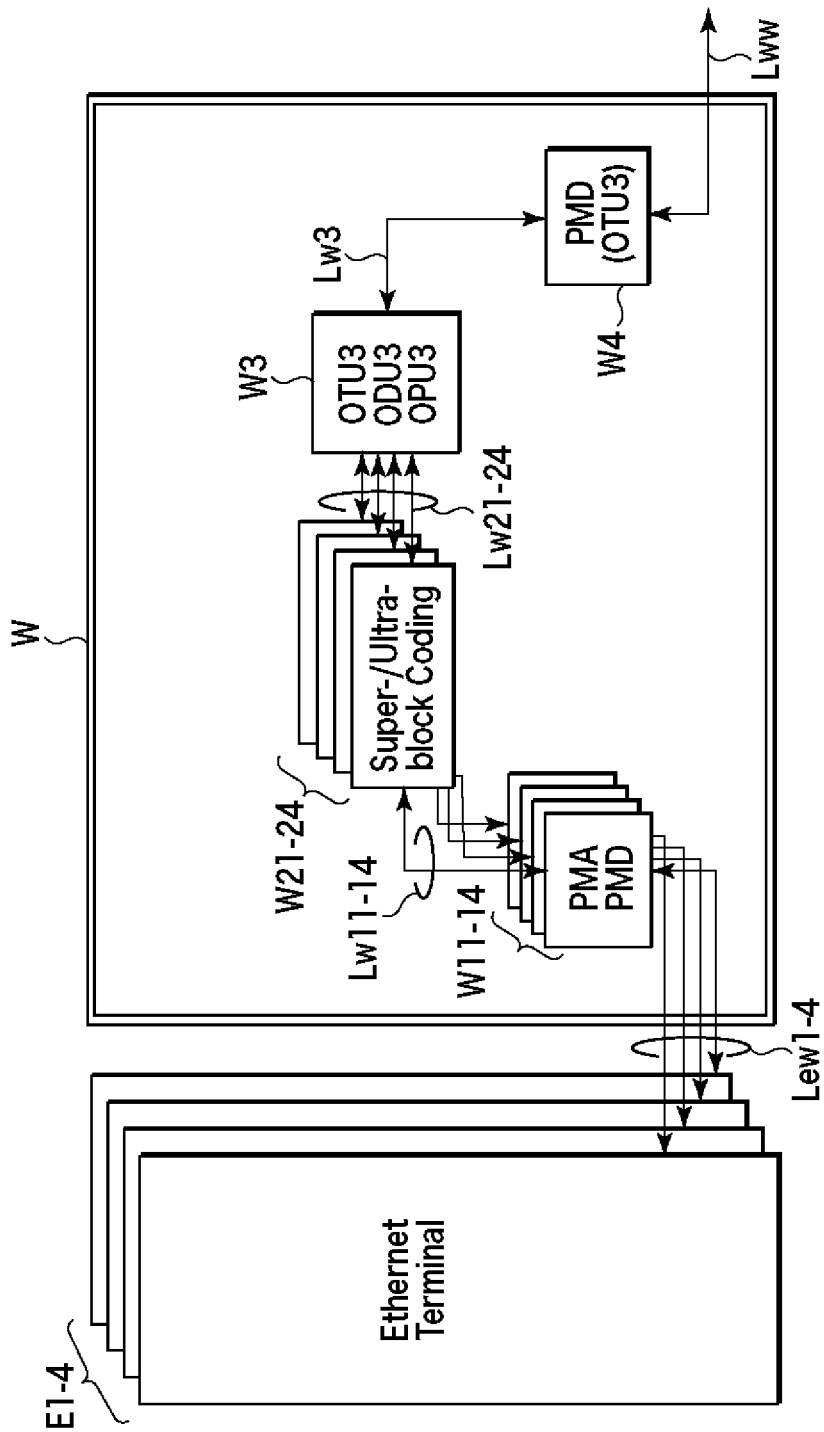
FIG. 27 is a diagram of the configuration of an optical-signal transmission and reception apparatus according to an embodiment.
Figure 28:
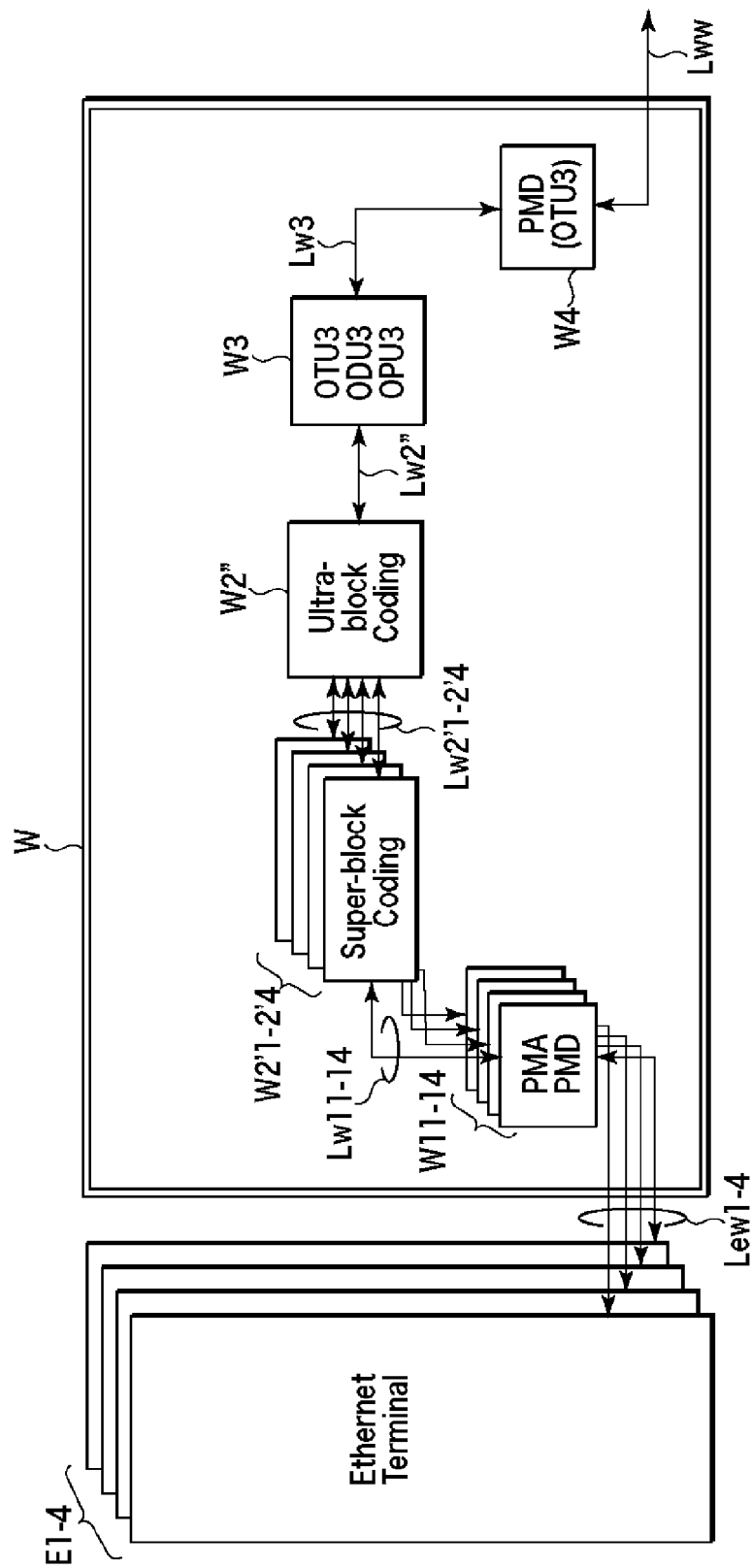
FIG. 28 is a diagram of the configuration of an optical-signal transmission and reception apparatus according to an embodiment.

Now, with reference to FIGS. 27 and 28, description will be given of a signal processing apparatus configured to carry out the above-described block signal processing method and an optical-signal transmission apparatus and an optical-signal reception apparatus both of which include the signal processing apparatus. FIGS. 27 and 28 are diagrams showing an optical-signal transmission apparatus corresponding to an embodiment of the present invention, as a LAN-WAN edge apparatus W installed at the boundary between LAN and WAN. FIGS. 27 and 28 show the configuration of the LAN-WAN edge apparatus W. The LAN-WAN edge apparatus W is connected to four 10G Ethernet apparatuses E via signal lines Lew 1-4 such as optical or electric cables. Here, for easier understanding, the description of the internal configuration of the 10G Ethernet apparatuses E is avoided. Similarly, the functions and the like of the LAN-WAN edge apparatus W which do not relate directly to the present invention are simplified or omitted. The optical-signal transmission apparatus described herein converts a transmission frame F into an optical signal and outputs the optical signal. The optical-signal reception apparatus described herein receives the transmission frame F converted into the optical signal. However, of course, the present invention can be implemented as a signal transmission and reception apparatus configured to transmit and receive transmission frames F in the form of electric signals.

In the LAN-WAN edge apparatuses W, PMD (Physical Medium Dependent) and PMA (Physical Medium Attachment) sections 11-14 receive and subject optical/electric signals from the respective 10G Ethernet apparatuses E1-4 to a serial-parallel conversion. Each of the PMD and PMA sections W11-14 then outputs the resulting 64B/66B block sequence to the corresponding one of Lw11-14. Furthermore, the PMD and PMA section W11-14 subjects a 64B/66B block sequence from the corresponding one of Lw11-14 to a parallel-serial conversion and then outputs the resulting optical/electric signal to the corresponding one of the signal lines Lew1-4.

Signal block conversion sections W21-24 in the optical-signal reception apparatus shown in FIG. 27 each process a sequence of signal blocks B from the corresponding one of the different Ethernet apparatus E1-4 to generate super-blocks S. Each of the signal block conversion sections W21-24 forms the super-blocks S into one group GS and then outputs the group GS. The signal block conversion section W21-24 may be composed of a signal block memory configured to store a received sequence of signal blocks B, a rearrangement section configured to delete signal block headers and a part or the whole of each of the signal block payloads composed only of clock adjusting characters, from the sequence of signal blocks stored in the signal block memory, form a preset number of signal block payloads (Bc, Bd') into one group G, determine whether or not the group G contains control block payloads Bc', provide, if the group G contains control block payloads Bc', the control block payloads Bc' with position determination information (rearrangement information) indicating the positions of the control block payloads Bc' in the group G set before formation into the group G, rearrange the signal block payloads (Bc', Bd') in the group G in accordance with a signal block payload rearrangement rule predetermined to the receiving side and specifying the rearrangement positions of the control block payloads Bc' and data block payloads Bd' in the group, and rearrange, if the group G contains no control block payload Bc', the data block payloads Bd' in the group in accordance with a data block payload rearrangement rule predetermined to the receiving side and specifying the rearrangement positions of the data block payloads Bd' in the group, a super-block output section configured to output a super-block S composed of super-block payloads (Sc, Sd) in which the group with the signal block payloads (Bc' Bd') rearranged therein is contained and super-block headers (Shc, Shd) in which information indicating whether or not the super-block payloads include control block payloads Bc' is contained, and an ultra-block output section configured to form a sequence of super-blocks S output by the super-block output section into a group, add an ultra-header (Uh) to the group to generate a sequence of ultra-blocks U, and output the sequence of ultra-blocks U. The rearrangement section, the super-block output section, and the ultra-block output section can be implemented by one or more processors and logically or physically configured integrally or separately. The super-block output section can includes position determination information in an area in each control block payload which is predetermined to the receiving side and a block value corresponding to the block type value indicating the block type of the control block payload and coded so as to maximize the Humming distance between particular block types.

Furthermore, each of the signal block conversion sections W21-24 may provide a function to generate an error-correcting code for the super-block (sequence) S and add the code to the super-block (sequence) S.

A framing section W3 frames a sequence of super-blocks output by the super-block output section of each of the signal block conversion sections W21-24 or a sequence of ultra-blocks U output by each of the ultra-block output sections, into a transmission frame F such as OPU3/ODU3/OTU3. The framing section W3 then outputs the framed signal to a signal line Lw3. The sequence of super-blocks S or the sequence of ultra-blocks U can be mapped to the payloads in the transmission frame F and to a particular area of the header which is predetermined to the receiving side.

An optical-signal output section W4 subjects the transmission frame F input through the signal line LW3 to a parallel-serial conversion by PMD to generate an optical signal. The optical-signal output section W4 then outputs the optical signal to a signal line Lww such as an optical fiber through which the signal is transmitted to another WAN apparatus.

The optical-signal reception apparatus according to the present invention can be implemented by reversing signal inputs and outputs to and from the above-described sections of the optical-signal transmission apparatus.

On the other hand, signal block conversion sections W2'1-2'4 of the optical-signal reception apparatus shown in FIG. 28 each process a sequence of signal blocks from the corresponding one of the different Ethernet apparatuses E1-4 to generate a super-block S. Each of the signal block conversion sections W2'1-2'4 then outputs the super-block S. Another signal block conversion section W2' forms the super-blocks S (containing the signal block payloads from the different Ethernet apparatuses E1-4) output by the signal block conversion sections W21-24, into one group GS to generate an ultra-block U. The signal block conversion section W2' then outputs the ultra-block U to a framing section W3 via Lw2".

The framing section W3 of the optical-signal conversion apparatus shown in FIG. 28 frames a sequence of ultra-blocks U output by the ultra-block output section of the signal block conversion section W2', into a transmission frame F such as OPU3/ODU3/OTU3. The framing section W3 outputs the framed signal to the signal line Lw3.

The optical-signal output section W4 of the optical-signal reception apparatus shown in FIG. 28 subjects the transmission frame F input through the signal line LW3 to a parallel-serial conversion by PMD to generate an optical signal. The optical-signal output section W4 then outputs the optical signal to the signal line Lww such as an optical fiber through which the signal is transmitted to another WAN apparatus.

The optical-signal reception apparatus according to the present invention can be implemented by reversing signal inputs and outputs to and from the above-described sections of the optical-signal transmission apparatus.

Now, a signal transmission system according to an embodiment of the present invention will be described with reference to FIG. 29. The signal transmission system in FIG. 29 uses the two signal transmission apparatuses described with reference to FIG. 27 or 28, as LAN-WAN edge apparatuses W_1 and W_2, respectively. The LAN-WAN edge apparatuses W_1 and W_2 are connected together via the signal line Lww such as an optical fiber. Ethernet apparatuses E1-4 and E5-8 in FIG. 29 correspond to the Ethernet apparatuses E1-4, respectively, in FIG. 27 or 28.

Third Embodiment

As described above, according to the present invention, the receiving side receives a super-block generated by the transmitting side and checks all the pieces of position determination information provided in control block payloads in the super-block payloads, for duplication. The receiving side further detects possible errors by determining whether or not a predetermined condition is met, using all the block type values contained in the control block payloads in the super-block payloads. This prevents errors from being propagated. Embodiments of the present invention will be described below with reference to the drawings.

Embodiment 3-1

With reference to FIGS. 30 to 34, an embodiment will be described in which the receiving side restores signal blocks from a super-block generated by the transmitting side by deleting a signal block header from a sequence of the signal blocks and grouping the resulting signal block payloads.

(Processing of Signal Blocks on the Transmission Side)

Figure 30:
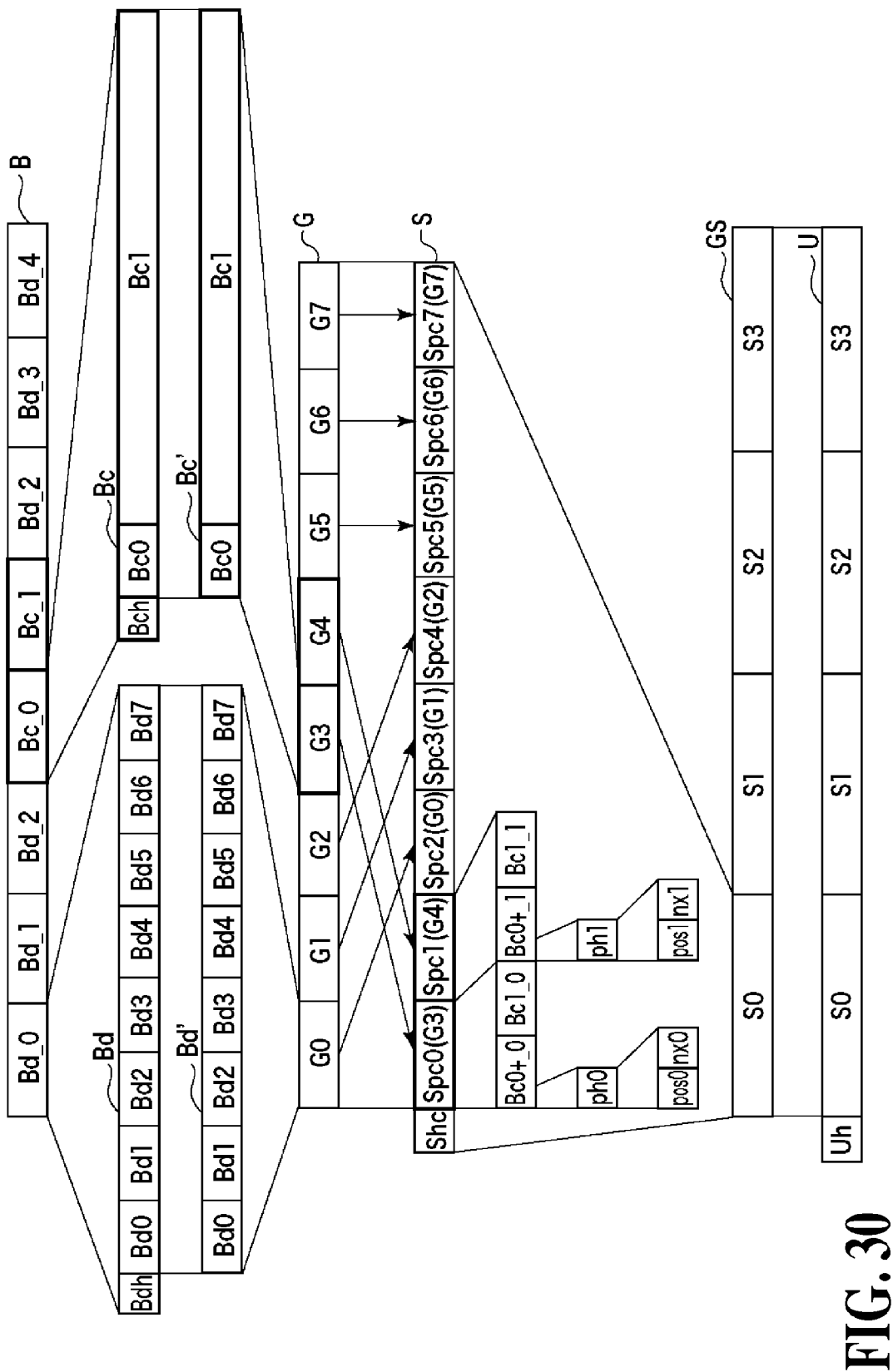
FIG. 30 is a diagram schematically showing how signal blocks are processed according to an embodiment.

FIG. 30 is a diagram schematically showing how signal blocks are processed. As is the case with the above-described first and second embodiments, in FIG. 30, an input sequence of signal blocks is denoted by B. A signal block payload in which data is contained is denoted by Bd'. A signal block payload in which a control code is contained is denoted by Bc'. Furthermore, a signal block header for the data block payload Bd' is denoted by Bdh. A signal block header for the control block payload Bc' is denoted by Bch. Moreover, a signal block composed of data block payloads Bd' and a signal block header Bdh is denoted by Bd. A signal block composed of a control block payload Bc' and a signal block header Bch is denoted by Bc. The signal block header (Bch, Bdh) contains information indicating whether the signal block payload is a control block payload Bc' or a data block payload Bd'. The control block payload Bc' contains information Bc0 indicating the type of a control code Bc1 contained in the control block payload Bc'. A signal block Bc_1 is a signal block in which only clock adjusting characters are contained in the control block payloads Bc'.

According to the present embodiment, the signal block headers (Bch, Bdh) are deleted from each sequence of signal blocks B. A preset number of signal block payloads (Bc', Bd') are formed into one group G. In FIG. 30, groups each formed of eight signal block payloads are denoted by G0 to G7. G3 and G4 each denote a control block payload Bc'.

Moreover, according to the present embodiment, the signal block payloads in the group G are processed (provision of position determination information to the control block payloads and rearrangement of the signal block payloads), and the resultant super-block S is output. For example, the super-block S is accommodated in payloads in a transmission frame F, which is then transmitted. Alternatively, a plurality of super-blocks S are formed into a group GS, and a synchronization header is provided to the group GS. The group GS is mapped to the transmission frame F in the form of an ultra-block U, which is then transmitted.

Furthermore, according to the present embodiment, an error-correcting code fec can be generated for the generated super-block or sequence of super-blocks and added to the super-block or sequence of super-blocks to generate a super-block S+ with the error-correcting code fec added thereto, which is then output. Like the super-block S, the super-block S+ is accommodated in payloads in a transmission frame F, which is then transmitted.

As in the case of the above-described first and second embodiments, in the description below, an Ethernet MAC (10 Gb/s) signal constructed of 64B/66B block coding is used as an example of the signal block B as required. Furthermore, an ODUk/OPUk (k=1, 2, 3) frame is used as an example of the transmission frame F as required.

Figure 31:
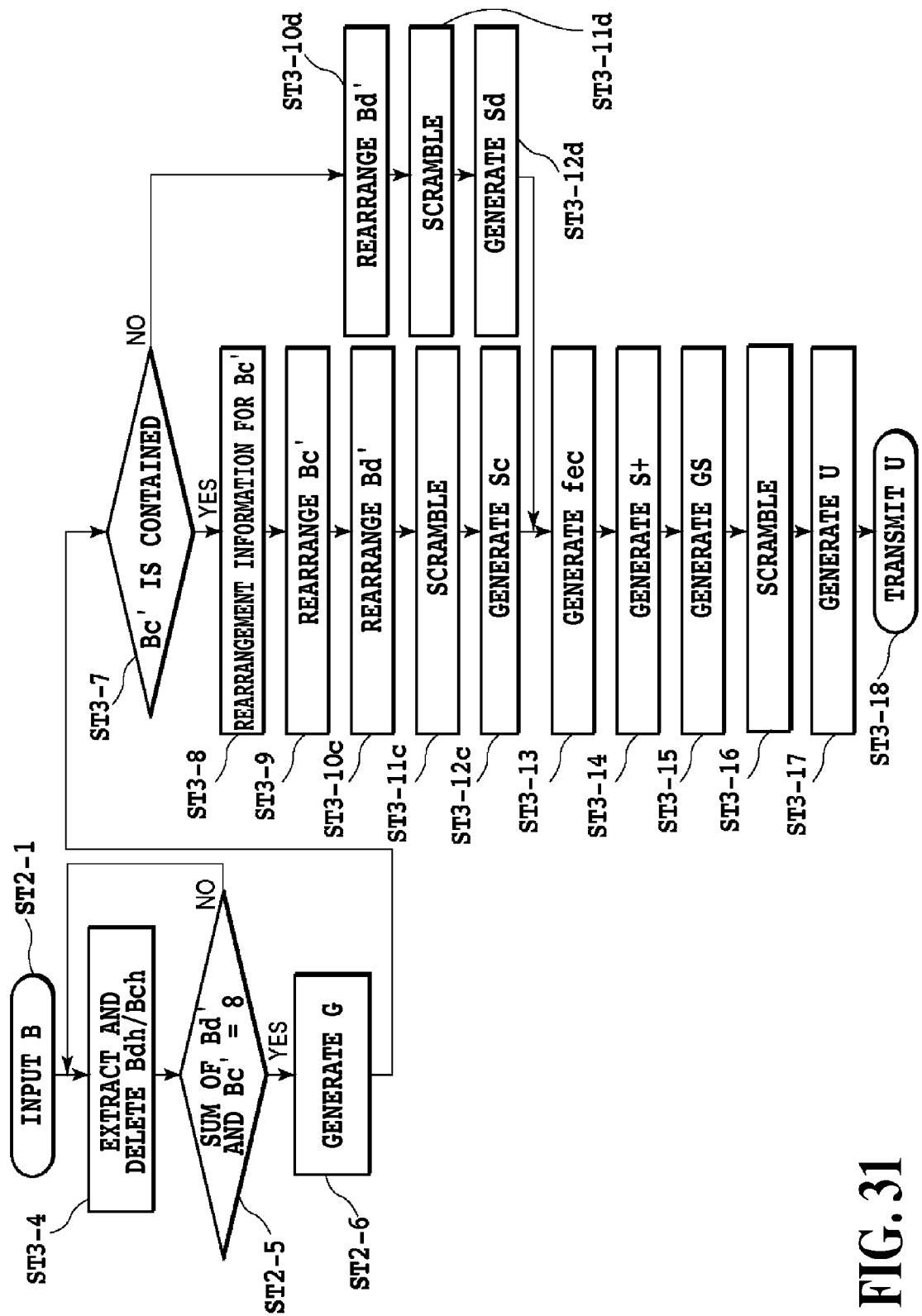
FIG. 31 is a diagram schematically showing the flow of a signal block sequence processing method on the transmitting side according to an embodiment.

With reference to FIGS. 30 and 31, an embodiment according to a signal block sequence processing method will be described.

FIG. 31 is a diagram schematically showing the flow of a signal block sequence processing method according to the present embodiment. When the signal block sequence processing method according to the present embodiment starts, a signal processing apparatus included in a signal transmission apparatus receives a sequence of 64B/66B blocks B from a 10G Ethernet apparatus [FIG. 31: ST3-1]. The received sequence of 64B/66B blocks B is stored in a memory such as a register.

The signal block header (Bch, Bdh) is deleted from each of the 64B/66B blocks in the sequence of 64B/66B blocks B received in ST3-1 to generate signal block payloads (Bd, Bc') [FIG. 31: ST3-4].

Then, every eight of the signal block payloads (Bd' Bc') generated in ST3-4 are formed into a group G [FIG. 31: ST3-6]. If less than eight signal block payloads (Bd', Bc') have been generated, ST3 and ST4 are repeated. In FIG. 30, G0 to G2 in the group G denote data block payloads Bd', and G3 and G4 denote control block payloads Bc'.

Then, determination of whether or not the generated group G contains control block payloads Bc' is performed [FIG. 31: ST3-7]. If the determination results in that the generated group G contains control block payloads Bc', the control block payloads Bc' (G3, G4) are provided with position determination information (here also referred to as rearrangement information) allowing determination of the positions of the control block payloads in the sequence of signal blocks B set before the formation of the group G [FIG. 31: ST3-8]. Whether or not the generated group G contains control block payloads Bc' can be determined by referencing the header Bch and/or a block type Bc0 in the control block payload Bc'. A method for providing the control block payloads Bc' with position determination information will be described below.

Then, in accordance with a rule (signal block payload rearrangement rule) specifying the rearrangement positions of the data block payloads Bd' and control block payloads Bc' in the group G and predetermined to the receiving side, G3 and G4 are arranged at positions Spc0 and Spc1 in the payloads in the super-block S [FIG. 31: ST3-9]. Subsequently, the data block payloads Bd' (G0 to G2 and G5 to G7) is arranged at Spc2 to Spc7 [FIG. 31: ST3-10c].

On the other hand, upon determining in ST3-7 that the group G contains no control block payloads Bc', the method arranges the data block payloads Bd' at positions Spd0 to Spd7 in the payloads in the super-block S in accordance with a rule (data block payload rearrangement rule) specifying the rearrangement positions of the data block payloads Bd' in the group G and predetermined to the receiving side [FIG. 31: ST3-10d].

Here, after the signal block payloads (Bc', Bd') are arranged at Spc0 to Spc7 (Spd0 to Spd7), the signal block payloads (Bc', Bd') may be constructed of a scramble process predetermined to the receiving side to equalize the bit polarity [FIG. 31: ST3-11c or ST3-11d].

Then, if the group G contains data block payloads Bd' and control block payloads Bc', a header Shc (1 bit: 1) is added to the payloads (Spc0 to Spc7) in the super-block to generate a super-block Sc [FIG. 31: ST3-12c]. On the other hand, if the group G is composed only of data block payloads Bd', a header Shd (1 bit: 0) is added to the payloads (Spc0 to Spc7) to generate a super-block Sd [FIG. 31: ST3-12d]. Thus, the receiving side can easily extract the control block payloads Bc' from the super-block. The generated super-block S can be output without change or processed as described below. The output super-blocks S are sequentially mapped to payloads in an ODUk/OPUk frame.

In this case, a pointer (p) indicating the position of one of the super-blocks S mapped to the payloads in the ODUk/OPUk frame which has the first appearing header (if super-blocks S1 to S4 are mapped to the ODUk/OPUk frame, the pointer in the header (S1h) of the super-block S1) is referenced and contained at a particular position in the ODUk/OPUk frame. If a plurality of super-block sequences S are multiplexed and the multiplexed super-block sequences S are mapped to the payloads in the ODUk/OPUk frame, pointers allowing the multiplexed super-block sequences S to be identified are generated and contained. Thus, the receiving side can easily extract the super-block sequences S from the ODUk/OPUk frame.

As shown in FIG. 31, an error-correcting code fec can be generated from one or more of the super-block S generated in ST3-12c or ST3-12d [FIG. 31: ST3-13].

If an error-correcting code fec is generated for one super-block, the generated fec is applied to the super-block S to newly generate a super-block S+ [FIG. 31: ST3-14]. Here, provided that the number of 64B/66B blocks is the same as that of signal block payloads (data block payloads Bd' or control block payloads Bc') in the super-block S+ and the length (bit number) of the 64B/64B blocks is the same as that of the signal block payloads, high error-robustness (high redundant) transmission is possible in spite of the same bit rate (clock rate) as that at which the 64B/66B block sequence is directly transmitted.

If an error-correcting code fec is generated for (n) super-blocks S ($S_0$ to $S_{n-1}$), the generated fec is applied to one of the super-blocks S, that is, the super-block $S_{n+1}$, to generate $S+_{n+1}$ [FIG. 31: ST3-14].

Then, a plurality of (for example, four) super-block sequences S generated in ST3-12c or ST3-12d or a plurality of super-blocks S+ generated in ST3-14 are bundled to generate a group GS [FIG. 31: ST3-15]. The group GS may be constructed of the scramble process predetermined to the receiving side to equalize the bit polarity (a group GS not constructed of the scramble process is hereinafter denoted by GSn, and a group GS constructed of the scramble process is hereinafter denoted by GSs) [FIG. 31: ST3-16].

Moreover, an ultra-block header Uh is added to the group GS to generate an ultra-block U [FIG. 31: ST3-17]. The ultra-block U is then output [FIG. 31: ST3-18]. The ultra-block header Uh may be, for example, a 2-bit bit sequence providing the receiving side with synchronization information. Like the super-blocks S, the ultra-blocks U are sequentially mapped to the payloads in the ODUk/OPUk frame.

The scramble process (FIG. 31: ST3-11c, ST3-11d, ST3-16) may be executed after the super-block has been generated (FIG. 31: ST3-12c, ST3-12d) and/or after the ultra-block U has been generated (FIG. 31: ST3-17). In this case, with a predetermined header masked, only the payloads are scrambled.

In the present embodiment, an example of the signal block payload rearrangement rule is as follows. If the group G contains control block payloads Bc', the control block payloads Bc' (signal block payloads arranged at the positions G3 and G4 in the super-block) are always arranged consecutively from a predetermined position (consecutively in order of Spc0, Spc1, . . . ), and the data block payloads Bd' are then rearranged at positions where no control block payload Bc' is present with the sequence order of the data block payloads Bd' maintained (that is, with the sequence order of G0, G1, G2, G5, G6, and G7 maintained). In view of the easiness with which the receiving side can extract the control block payloads Bc' from the super-block, this example is more preferable. However, the present invention can be implemented according to any other example.

For example, the signal block payload rearrangement rule may be specified as follows. After the control block payloads Bc' (the signal block payloads arranged at the positions G3 and G4 in the super-block) are always consecutively arranged at every other position (Spc0, Spc2, Spc4, and Spc6; if the group G contains at least five control codes, then the control block payloads Bc' are arranged at Spc1, Spc3, Spc5, and Spc7 in this order, following Spc6), the data block payloads Bd' are arranged at positions where no control block payload Bc' is present with the sequence order of the data block payloads Bd' maintained (that is, with the sequence order of G0, G1, G2, G5, G6, and G7 maintained). Alternatively, the signal block payload rearrangement rule may be specified as follows. After the control block payloads Bc' are consecutively arranged at Spc0 and Spc1 in this order, the data block payloads Bd' are arranged at positions where no control block payload Bc' is present (Spc2 to Spc7) with the sequence order of the data block payloads Bd' maintained (that is, with the sequence order of G0, G1, G2, G5, G6, and G7 maintained).

On the other hand, an example of the data block payload arrangement rule may be specified as follows. If the group G contains no control block payload Bc', the data block payloads Bd' are rearranged at the positions Spd0 to Spd7 with the sequence order thereof maintained (that is, with the sequence order of G0, G1, G2, G3, G4, G5, G6, and G7 maintained). In view of the easiness with which the receiving side can restore the signal blocks, this example is more preferable. However, the present invention can be implemented according to any other example.

For example, the data block payload rearrangement rule may be specified such that the data block payloads Bd' are rearranged at Spd0 to Spd7 with the reversed sequence order thereof (that is, in order of G7, G6, G5, G4, G3, G2, G1, and G0). Alternatively, the data block payload rearrangement rule may be specified such that the data block payloads Bd' are always arranged consecutively at every other position from a predetermined position (that is, at Spd0, Spd2, Spd4, Spd6, Spd1, Spd3, Spd5, and Spd7 in this order).

Now, a method for providing the control block payloads Bc' with position determination information [FIG. 31: ST3-8] will be described.

As shown in FIG. 30, position determination information on each of G3 and G4 can be contained by changing the block type Bc0 of the control code contained in Bc'. In FIG. 30, the block types of G3 and G4 for which position information is contained are shown as Bc0+_0 and Bc0+_1, respectively. The position determination information on G3 and G3 is contained as ph0 and ph1 (4 bits) in Bc0+_0 and Bc0+_1 (for example, 8 bits), respectively. Here, pos0 (3 bits) in ph0 indicates the sequence order (the position of G3) in the group G, and nx0 (1 bit: 1) indicates that a control block payloads Bc' is also located at following Spc1. Similarly, post (3 bits) in ph1 indicates the sequence order (the position of G4) in the group G, and nx1 (1 bit: 0) indicates that a data block payload Bd' is located in following Spc2. In the present embodiment, the block type Bc0 is composed of 8 bits, and can use 4 bits different from the 4 bits of ph0 (ph1) to indicate to which of 15 types the control code Bc1 contained in the control block payloads Bc' belongs.

In particular, in the Ethernet specified in IEEE 802. 3ae (see Non-Patent Document 1), a sequence of signal blocks is coded according to 64B/66B, and a control block provides character content information in a 1-byte type field thereof. Furthermore, since the 1-byte type field indicates one of the 15 types of character content information, the control block has a 4-bit redundancy.

In the process of generating position determination information during the process of conversion into a super-block according to the present embodiment, the 8 bits in the type field (block type field) value in a control block coded according to 64B/66B is contained into 4 bits. Furthermore, 1 bit is used as a continuation bit indicating that the succeeding block resulting from the rearrangement of the control block in the payloads in the super-block is a control block, and 3 bits are used as information on the positions set before the rearrangement of the control block. Moreover, a super-block header indicating whether or not the payloads in the super-block include control blocks requires at least 1 bit. As described above, a super-block composed of 512B/513B containing a 512-bit super-block payload into which a sequence of eight 64B/66B blocks is grouped corresponds to the most efficient code conversion rule. Furthermore, when the super-block header is at least 2-bit information (for example, two bit sequences such as 01 and 10 or 001 and 100 which have the longest Humming distance) with a redundancy indicating whether or not the super-block payloads include control block payloads, that is, the super-block is composed of 512B/514B containing a 512-bit super-block payload into which a sequence of eight 64B/66B blocks is grouped, the receiving side can extract the super-block by self synchronization. Furthermore, the bit error detection robustness of the super-block header is improved. Additionally, since the super-block header is redundant information, the above-described process of containing the pointer at the particular position in the header of the ODUk/OPUk frame is unnecessary.

The signal block sequence processing method on the transmitting side has been described. Executing the method in the reverse order allows the receiving side to restore the signal block sequence the received transmission frame F.

<Processing of Signal Blocks on the Reception Side>

If super-block payloads include the above-described control block payloads, all of the position determination information and block type values in the super-block payloads are used to determine whether or not there is any error.

A signal block sequence processing method in which the receiving side restores a sequence of signal blocks B will be described with reference to FIGS. 32, 33, and 34.

Figure 32:
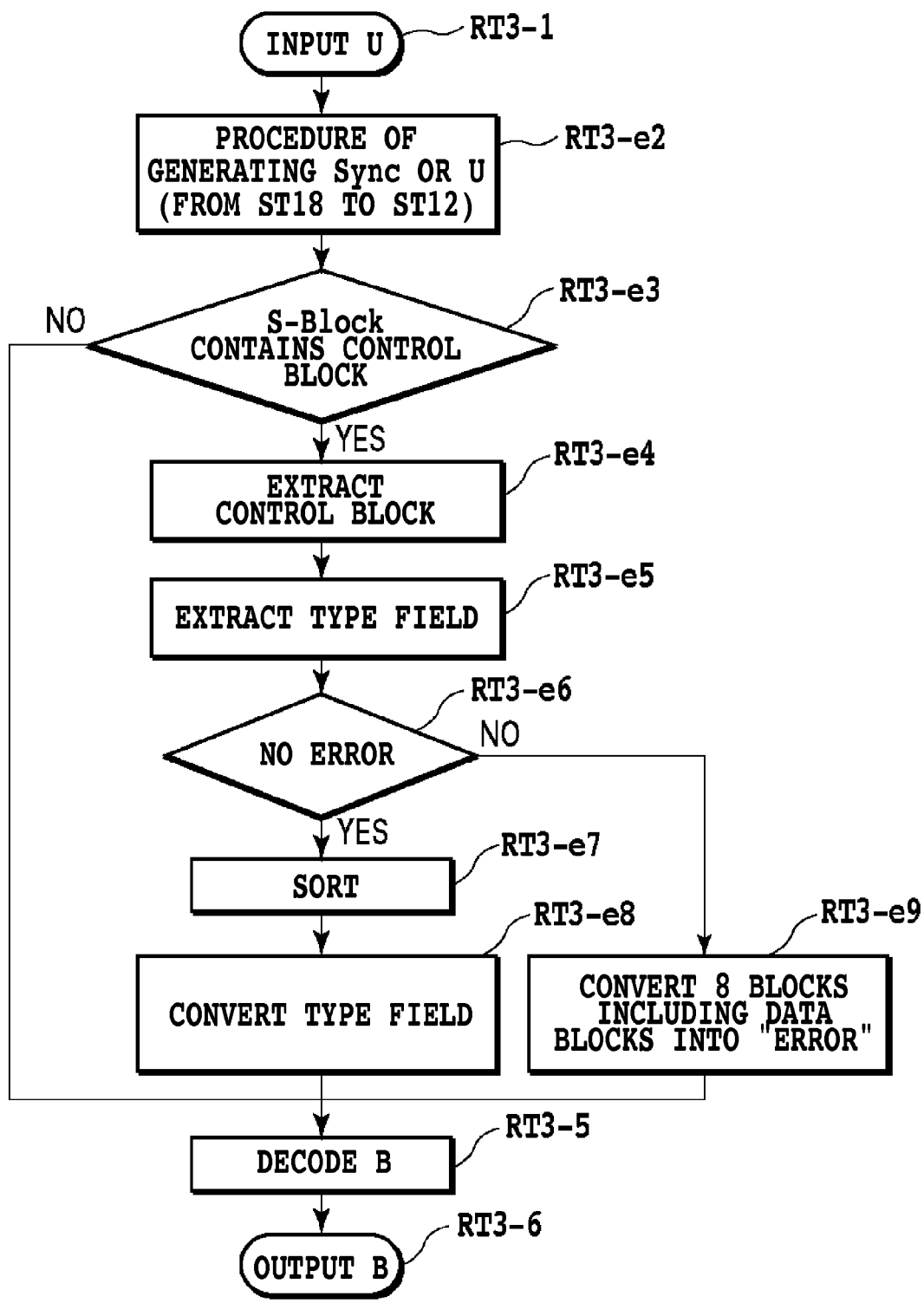
FIG. 32 is a diagram schematically showing the flow of a signal block sequence processing method on the receiving side according to an embodiment.

As shown in FIG. 32, first, an ultra-block U accommodated in a transmission frame F is extracted [FIG. 32: RT3-1].

If a pointer indicating the start position of the super-blocks in the transmission frame F is not used or the super-blocks are received without using the transmission frame, synchronization is performed using the super-block header, to extract the sequence of super-blocks [FIG. 32: RT3-$e$2]. If the pointer is contained in the transmission frame, the header (the pointer contained at a predetermined position in the header) of the received transmission frame F is referenced, and the sequence of super-blocks is extracted based on the pointer [FIG. 32: RT3-$e$2].

Moreover, the procedure of generating an ultra-block on the transmitting side is carried out in the reverse order, that is, from ST3-16 to ST3-12. If error-correcting codes are used, error checks and corrections are performed based on error-correcting codes for the super-blocks (sequence) applied to the super-blocks. If the super-blocks are scrambled, descrambling is also performed.

Then, with referencing the super-block headers (Shc, Shd) of the received super-blocks (information indicating whether or not the super-block payloads in the super-blocks include control block payloads Bc'), determination of whether or not the super-block payloads in the super-blocks include control block payloads Bc' is performed [FIG. 32: RT3-$e$3].

If the super-block payloads in the super-blocks include control block payloads Bc', the control blocks are extracted [FIG. 32: RT3-$e$4]. Based on the position determination information on the control blocks, the information on the positions set before the rearrangement and the block type values are extracted [FIG. 32: RT3-$e$5].

Then, the extracted information on the positions set before the rearrangement and the extracted block type values are used to carry out an error determination [FIG. 32: RT3-$e$6]. The error determination process will be described below with reference to FIGS. 33 and 34. If the error determination results in no error detection, the signal block payloads (Bc', Bd') are sorted in the group G, that is, placed back at the positions in the group G set before the rearrangement in accordance with the position determination information provided in the control block payloads and a predetermined signal block payload rearrangement rule [FIG. 32: RT3-$e$7].

Then, the position determination information is deleted from the control block payloads, or the status of the control block payloads is converted into the one set before the insertion of the position determination information on the transmitting side in accordance with the predetermined signal block payload rearrangement rule [FIG. 32: RT3-$e$8].

If an error is detected, all of the eight signal block payloads in the super-block payloads are converted into error control block payloads in which a code indicative of occurrence of an error (for example, an error character /E/ defined in IEEE 802.3ae) is contained [FIG. 32: RT3-$e$9].

Then, the signal block header (Bch, Bdh) containing the following information is added to each of the signal block payloads: the information indicating whether the signal block payload is a control block payloads in which a control code is contained or a data block payloads Bd' in which data is contained. Thus, a sequence of 64B/66B blocks B is decoded [R32: RT3-5] and output [FIG. 32: RT3-6].

If the super-block payloads include no control block payload Bc' [FIG. 32: RT3-$e$3], the data block payloads Bd' are placed back at the positions in the group G set before the rearrangement in accordance with the predetermined data block payload rearrangement rule. The signal block header Bdh is added to the data block payloads Bd' to decode the sequence of 64B/66B blocks B [FIG. 32: RT3-5]. The decoded sequence of 64B/66B blocks B is then output [FIG. 32: RT3-6].

The error determination process will be described with reference to FIGS. 33 and 34. FIG. 33 is a diagram schematically showing the flow of the error determination process according to the present embodiment. FIG. 34 is a diagram schematically showing the status transition of a flag used for the error determination process.

Figure 33:
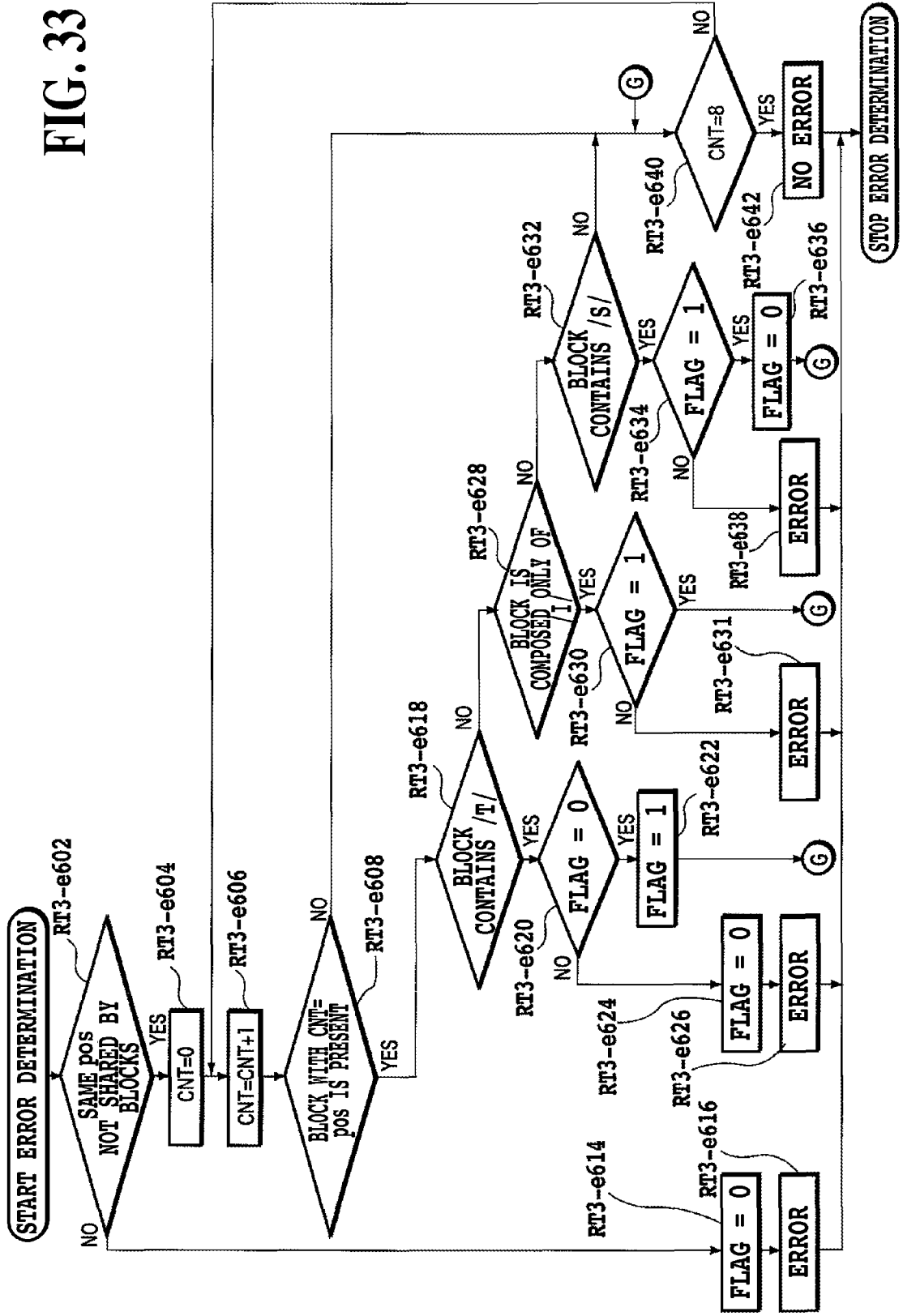
FIG. 33 is a diagram schematically showing the flow of an error determination process according to an embodiment.

As shown in FIG. 33, first, as a first error determination process, the position information on all the control blocks contained in the super-block is checked for consistency [FIG. 33: RT3-$e$602]. More specifically, the process extracts all the pieces of position determination information pos provided in the respective control block payloads Bc' and allowing determination of the corresponding positions in the group G. The process then determines whether or not any extracted pieces of position determination information are duplicate (that is, whether or not any control block payloads Bc' are indicated to be located at the same position). If any pieces of position determination information are duplicate, the flag is set to zero [FIG. 33: RT3-$e$614]. Information indicating the presence of an error is output [FIG. 33: RT3-$e$616]. The error determination is then terminated.

If no pieces of position determination information are duplicate, a second error determination process is executed. The second error determination process uses the block type values of all the control block payloads Bc' in the super-blocks to determine whether or not the block type value indicates a predetermined condition for the block type (control code). Here, the predetermined condition for the block type corresponds to checking whether or not the appearance of control code characters is kept in order of a terminal character /T/, an idle character /I/, and a start character /S/.

Since eight signal block payloads (Bd', Bc') are contained in the super-block, the condition determination needs to be sequentially repeated for up to eight control block payloads Bc'. Thus, a counter (CNT) is used.

In the second error determination process, first, the counter value is initialized to zero [FIG. 33: RT3-$e$604]. Every time the condition determination process is subsequently executed, the counter value is incremented by one [FIG. 33: RT3-$e$606].

Then, determination of whether or not any control block payload Bc' has position determination information pos with a value equal to the current counter value is performed [FIG. 33: RT3-e608]. If no block payload Bc' has position determination information pos with a value equal to the current counter value, determination of whether or not the current counter value is 8 is performed [FIG. 33: RT3-e640] and the method returns to the step of incrementing the counter value [FIG. 33: RT3-e606].

If a control block payload Bc' is detected which has position determination information pos with a value equal to the current counter value [FIG. 33: RT3-e608], the block type value of the control block payload is referenced to determine whether or not the control block payload contains /T/ [FIG. 33: RT3-e618]. If the control block payload contains /T/, determination of whether or not the status of the flag is zero is performed [FIG. 33: RT3-e620]. If the status of the flag is zero, the value of the flag is set to one. Then determination of whether or not the current counter value is 8 is performed [FIG. 33: RT3-e640] and the method returns to the step of incrementing the counter value [FIG. 33: RT3-e606].

Figure 34:
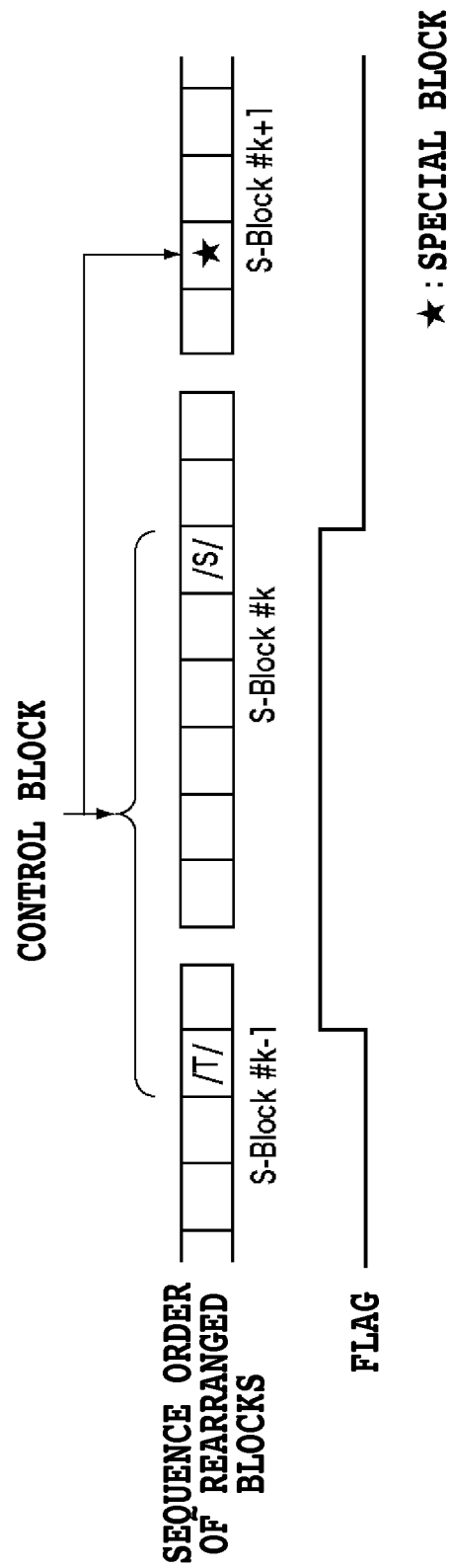
FIG. 34 is a diagram illustrating the status transition of a flag used for the error determination process according to an embodiment.

As shown in FIG. 34, the status of the flag changes to one when a control block payload with /T/ is detected and to zero when a control block payload with /S/ is detected. That is, the flag set to one functions to indicate that before the control block payload of interest is detected, a control block payload with /T/ has detected but no control block payload with /S/ has been detected.

If the status of the flag is one [FIG. 33: RT3-e620], the flag indicates that before the control block payload of interest containing /T/ is detected, a control block payload with /T/ has detected but no control block payload with /S/ has detected, that is, the appearance of the control code characters is not kept in order of /T/, /I/, and /S/. Thus, the value of the flag is set to zero [FIG. 33: RT3-e624]. Information indicative of the presence of an error is output [FIG. 33: RT3-e626]. The error determination is then terminated.

If the control block payload contains no /T/ [FIG. 33: RT3-e618], determination of whether or not the control block payload is composed only of /I/ is performed [FIG. 33: RT3-e628]. If the control block payload is composed only of /I/, determination of whether or not the status of the flag is one is performed [FIG. 33: RT3-e630]. If the status of the flag is one, determination of whether or not the current counter value is 8 is performed [FIG. 33: RT3-e640] and the method returns to the step of incrementing the counter value [FIG. 33: RT3-e606].

If the status of the flag is zero [FIG. 33: RT3-e630], the flag indicates that the appearance of the control code characters is not kept in order of /T/, /I/, and /S/. Thus, information indicative of the presence of an error is output [FIG. 33: RT3-e631]. The error determination is then terminated.

If the control block payload is not composed only of /I/ [FIG. 33: RT3-e628], determination of whether or not the control block payload contains /S/ is performed [FIG. 33: RT3-e632]. If the control block payload contains /S/, determination of whether or not the status of the flag is one is performed [FIG. 33: RT3-e634]. If the status of the flag is one, the value of the flag is set to zero [FIG. 33: RT3-e636]. Then determination of whether or not the current counter value is 8 is performed [FIG. 33: RT3-e640] and the method returns to the step of incrementing the counter value [FIG. 33: RT3-e606].

If the status of the flag is one, the flag indicates that the appearance of the control code characters is not kept in order of /T/, /I/, and /S/. Thus, information indicative of the presence of an error is output [FIG. 33: RT3-e638]. The error determination is then terminated.

As described above, the predetermined condition for the control blocks corresponds to checking whether or not the appearance of the control code characters is kept in order of /T/, /I/, and /S/.

In particular, in determining whether or not the control block payload contains /T/, the method can use a flag (FIG. 34) memorizing the status of the already-arrived sequence of super-blocks to determine whether or not a sequence of blocks covering multiple super-frames is in the correct order.

According to the present embodiment, even if a bit error results in an error in type field value, a 2-bit error can be detected 100% in the patterns of all the control code characters contained in the sequence of control block payloads. The relevant control block payload can then be converted into an error-indicating control block payload to which a particular error code indicative of an error is assigned.

Furthermore, if the super-block header is information with a redundancy of at least 2 bits, then in the step of extracting super-blocks [FIG. 32: RT3-e2], a third error determination process may be executed. That is, a bit error determination is performed on the super-block header. If an error occurs in the super-block header, the eight signal block payloads contained in the corresponding super-block payloads are converted into error control block payloads indicative of occurrence of an error.

Embodiment 3-2

Figure 35:
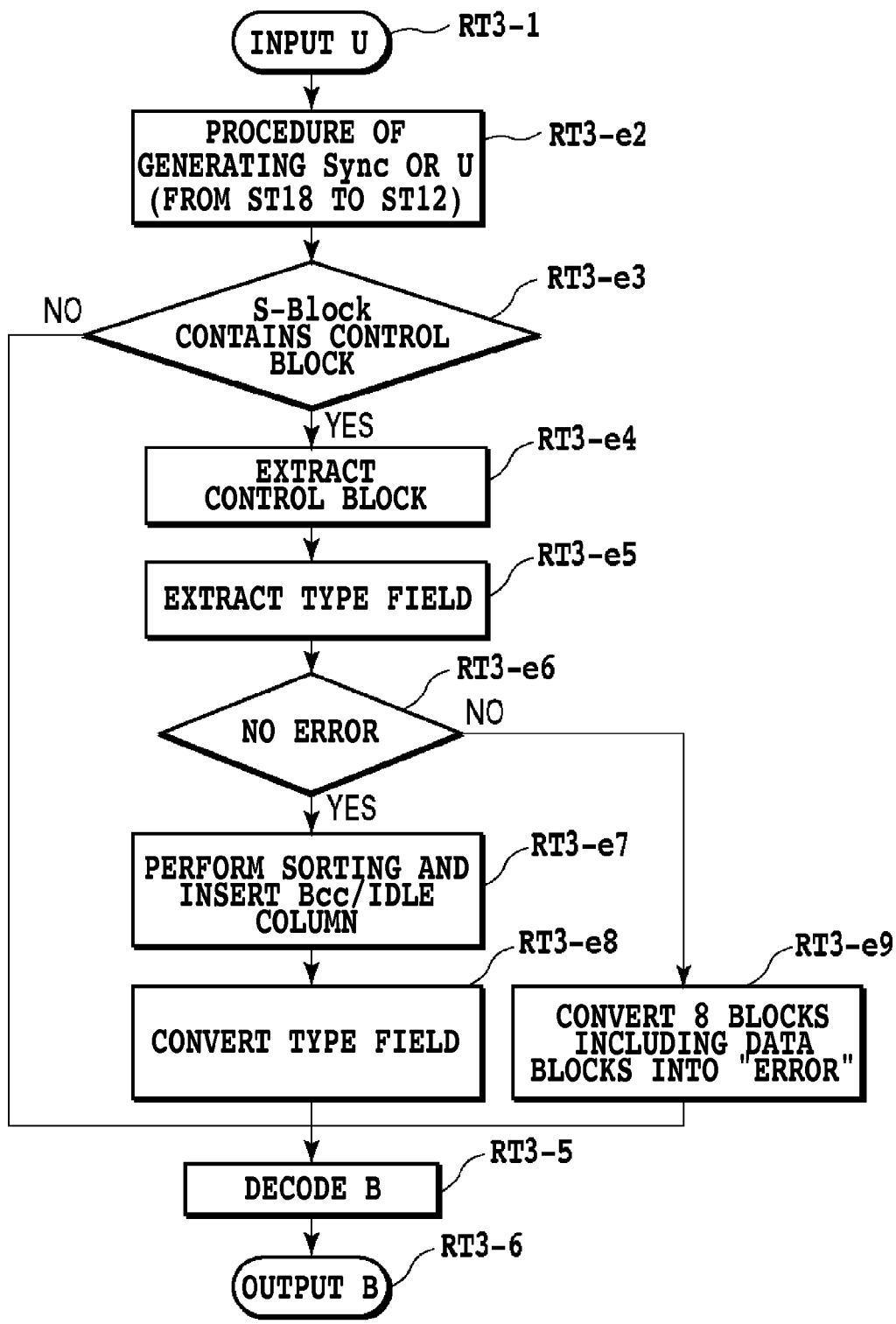
FIG. 35 is a diagram schematically showing the flow of a signal block sequence processing method on the receiving side according to an embodiment.
Figure 36:
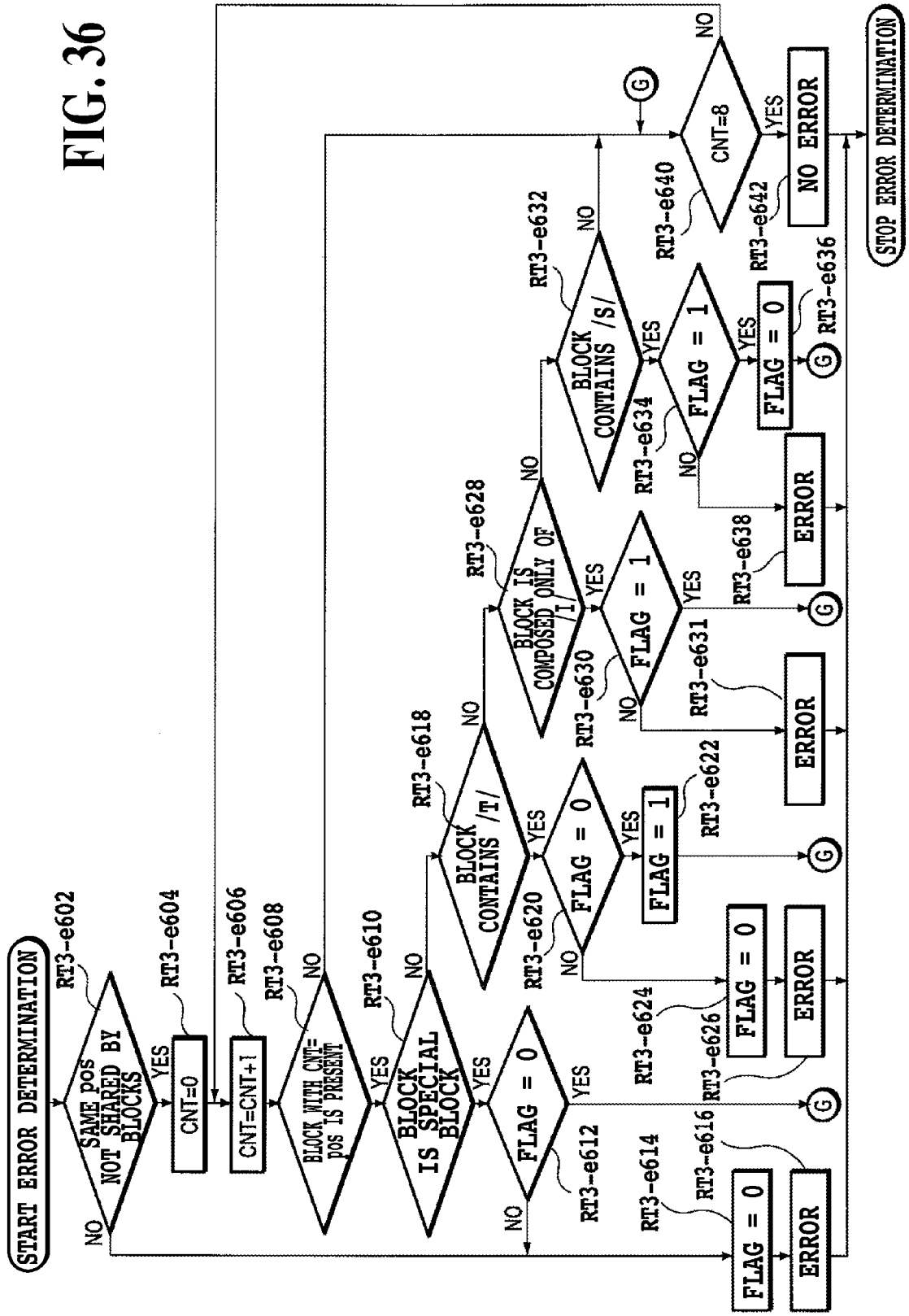
FIG. 36 is a diagram schematically showing the flow of an error determination process according to an embodiment.
Figure 37:
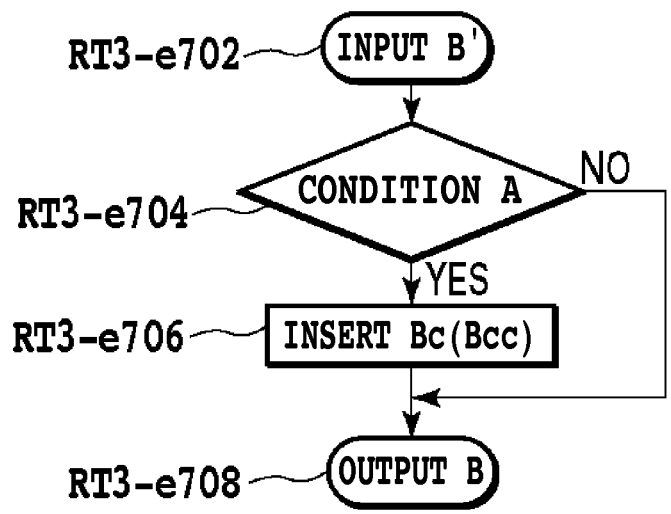
FIG. 37 is a diagram schematically showing the flow of a signal block sequence processing method on the receiving side according to an embodiment.

With reference to FIGS. 35 to 37, an embodiment will be described in which the transmitting side deletes, from a sequence of signal blocks, signal block headers and a part or the whole of each signal block payload composed only clock adjusting characters and groups the resulting signal block payloads to generate a super-blocks and in which the receiving side restores the signal blocks from the super-block generated. According to the present embodiment, in the series of processes, the signal block headers and a part or the whole of each signal block payload composed only clock adjusting characters are deleted to reduce the bit rate at which the super-block is transmitted. Descriptions overlapping those of the above-described embodiments are omitted.

(Processing of Signal Blocks on the Transmission Side)

The transmitting side uses the signal processing method according to the above-described second embodiment to generate a super-block S or S+ by deletion of a signal block header and a part or the whole of each signal block payload composed only clock adjusting characters. The transmitting side then accommodates the super-block S or S+ in payloads in a transmission frame F and transmits the transmission frame F.

As is the case with Embodiment 3-1 described above, position determination information on each of G3 and G4 can be contained by changing the block type Bc0 of a control code contained in Bc'.

A bit error may prevent the terminal position of an Ethernet frame from being communicated to the higher layer (MAC: Media Access Control layer). In this case, the Ethernet frame may fail to be distinguished from the next frame. As a result, both frames may be discarded or may be transferred to another Ethernet apparatus with the error uncorrected. This results from replacement of a control block (which conforms to one of the control block formats #8 to #15) containing a control character Tj indicative of the terminal position.

Thus, in the present embodiment, when the 8-bit block type value (block type 1) indicative of one of the 15 types of control codes is coded into a 4-bit block type value (block type 2), control blocks each containing the control character Tj indicative of the terminal position are coded using a combination of 4 bits which sets all the Humming distances to at least 2. Thus, even if a 1-bit error occurs in the 4-bit block type value (block type 2), the corresponding control blocks are determined to be different from those which contain the control character Tj indicative of the terminal position (#8 to #15 in FIG. 25) (see, for example, Non-Patent Document 6).

Furthermore, a block type value (in the example shown in FIG. 25, "0100", which is called a special block type value; a control block payload to which the special block type value is assigned is called a special control block payload) not used as a block type value (block type 2) compressed to 4 bits is assigned to a pattern (for example, the pattern in which /T/ and /S/ are contained in the same control block payload) different from patterns indicated by an 8-bit block type value (block type 1).

The signal block sequence processing method on the transmitting side has been described. Executing the method in the reverse order allows the receiving side to restore the signal block sequence the received transmission frame F.

<Processing of Signal Blocks on the Reception Side>

If super-block payloads include the above-described control block payloads, all of the position determination information and block type values in the super-block payloads are used to determine whether or not there is any error.

A signal block sequence processing method in which the receiving side restores a sequence of signal blocks B will be described with reference to FIGS. 35 to 37. FIG. 35 is a diagram schematically showing the flow of the signal block sequence processing method according to the present embodiment.

As shown in FIG. 35, first, an ultra-block U accommodated in a transmission frame F is extracted [FIG. 35: RT3-1].

If a pointer indicating the start position of the super-blocks in the transmission frame F is not used or the super-blocks are received without using the transmission frame, synchronization is performed using the super-block header, to extract the sequence of super-blocks [FIG. 35: RT3-e2]. If the pointer is contained in the transmission frame, the header (the pointer contained at a predetermined position in the header) of the received transmission frame F is referenced, and the sequence of super-blocks is extracted based on the pointer [FIG. 35: RT3-e2].

Moreover, the procedure of generating an ultra-block on the transmitting side is carried out in the reverse order, that is, from ST16 to ST12 shown in FIG. 16. If error-correcting codes are used, an error check and an error correction are performed based on the error-correcting code for the super-block (sequence) applied to the super-block. If the super-block is scrambled, descrambling is also performed.

Then, referencing the super-block headers (Shc, Shd) of the received super-blocks (information indicating whether or not the super-block payloads in the super-blocks include control block payloads Bc'), determination of whether or not the super-block payloads in the super-blocks include control block payloads Bc' is performed [FIG. 35: RT3-e3].

If the super-block payloads in the super-blocks include control block payloads Bc', the control blocks are extracted [FIG. 35: RT3-e4]. Based on the position determination information on the control blocks, the information on the positions set before the rearrangement and the block type values are extracted [FIG. 35: RT3-e5].

Then, the extracted information on the positions set before the rearrangement and the extracted block type values are used to carry out an error determination [FIG. 35: RT3-e6]. The error determination process will be described below with reference to FIG. 36.

If the error determination results in no error detection, the signal block payloads (Bc', Bd') are sorted in the group G, that is, the signal block payloads (Bc', Bd') are placed back at the positions in the group G set before the rearrangement in accordance with the position determination information provided in the control block payloads and a predetermined signal block payload rearrangement rule [FIG. 35: RT3-e7]. Moreover, a part or the whole of each signal block payload composed only of clock adjusting characters which part or whole has been removed by the transmitting side is inserted. A method for inserting the whole of each signal block payload composed only of clock adjusting characters will be described below with reference to FIGS. 18, 19, and 37. A method for inserting a part of each signal block payload composed only of clock adjusting characters has been described above with reference to FIGS. 23A, 23B, 24A, and 24B. Thus, duplicate descriptions are omitted.

Then, the position determination information is removed from the control block payloads, or the status of the control block payloads is converted into the one set before the insertion of the position determination information on the transmitting side in accordance with the predetermined signal block payload rearrangement rule [FIG. 35: RT3-e8].

If an error is detected, all of the eight signal block payloads in the super-block payloads are converted into error control block payloads in which a code indicative of occurrence of an error (for example, an error character /E/ defined in IEEE 802.3ae) is contained [FIG. 35: RT3-e9].

Then, the signal block header (Bch, Bdh) containing the following information is added to each of the signal block payloads: the information indicating whether the signal block payload is a control block payloads in which a control code is contained or a data block payloads Bd' in which data is contained. Thus, a sequence of 64B/66B blocks B is decoded [R35: RT3-5] and output [FIG. 35: RT3-6].

If the super-block payloads include no control block payload Bc' [FIG. 35: RT3-e3], the data block payloads Bd' are placed back at the positions in the group G set before the rearrangement in accordance with the predetermined data block payload rearrangement rule. The signal block header Bdh is added to the data block payloads Bd' to decode the sequence of 64B/66B blocks B [FIG. 35: RT3-5]. The decoded sequence of 64B/66B blocks B is then output [FIG. 35: RT3-6].

The error determination process will be described with reference to FIG. 36. FIG. 36 is a diagram schematically showing the flow of the error determination process according to the present embodiment.

The flow of the error determination process according to the present embodiment (FIG. 36) is different from the flow of the error determination process according to Embodiment 3-1 described above in that a process executed if the super-block payloads include special control block payloads is added to the former. Thus, duplicate descriptions are omitted.

In the present embodiment, in the steps of a second error determination process, if a control block payload Bc' is detected which has position determination information pos with a value equal to the current counter value [FIG. 36: RT3-e608], the block type value of the control block payload is referenced to determine whether or not the control block payload is a special control block payload.

If the control block payload is a special control block payload, determination of whether or not the status of the flag is zero is performed [FIG. 36: RT3-e612]. If the status of the flag is zero, determination of whether or not the current counter value is 8 is performed [FIG. 36: RT3-e640] and the method returns to the step of incrementing the counter value [FIG. 36: RT3-e606].

If the status of the flag is one [FIG. 36: RT3-e612], the flag indicates that before the control block payload of interest containing /T/ and /S/ is detected, a control block payload with /T/ has detected but no control block payload with /S/ has been detected, that is, the appearance of the control code characters is not kept in order of /T/, /I/, and /S/. Thus, the value of the flag is set to zero [FIG. 36: RT3-e624]. Information indicative of the presence of an error is output [FIG. 36: RT3-e616]. The error determination is then terminated.

If the control block payload is not a special control block payload [FIG. 36: RT3-e610], referencing the block type of the control block payload, the method proceeds to a step of determining whether or not the control block payload contains /T/ [FIG. 36: RT3-e618]. Then, a condition determination process similar to that described above is executed.

Furthermore, if the super-block header is information with a redundancy of at least 2 bits, then in the step of extracting super-blocks [FIG. 36: RT3-e2], a third error determination process may be executed as is the case with Embodiment 3-1 described above.

Now, a method for inserting the whole of each signal block payload composed only of clock adjusting characters will be described with reference to FIGS. 18, 19, and 37.

As shown in FIG. 37, the method starts with input of a sequence of signal block payloads (Bc', Bd') corresponding to a sequence of signal blocks B placed back at the positions in the group G set before the rearrangement [FIG. 37: RT3-e702].

Then, the block type values of two consecutive control block payloads Bc' as shown in FIG. 18 are used to determine whether or not the transmitting side has deleted a 64B/66B block Bcc composed only of clock adjusting characters has from the two control blocks [FIG. 37: RT3-e704].

FIG. 19 is a table showing an example of a condition A for a combination of the block type values of two consecutive control block payloads Bc'. If the combination of block type values corresponds to any of the patterns 1 to 16, a control block payload corresponding to the 64B/66B block Bcc composed only of clock adjusting characters is inserted between the two control blocks Bc [FIG. 37: RT3-e706]. The resulting control blocks are then output [FIG. 37: RT3-e708].

Embodiment 3-3

Figure 38A:
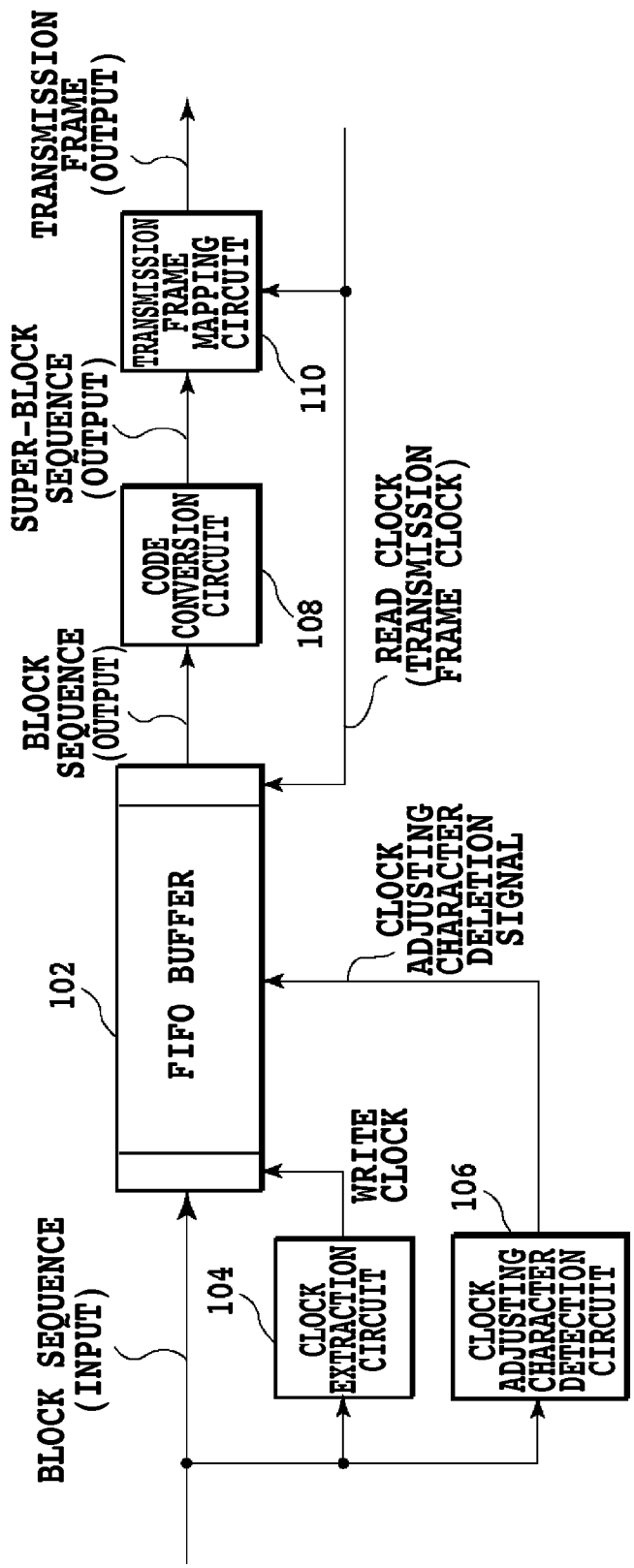
FIG. 38A is a function block diagram of a signal processing apparatus on the transmitting side according to an embodiment.
Figure 38B:
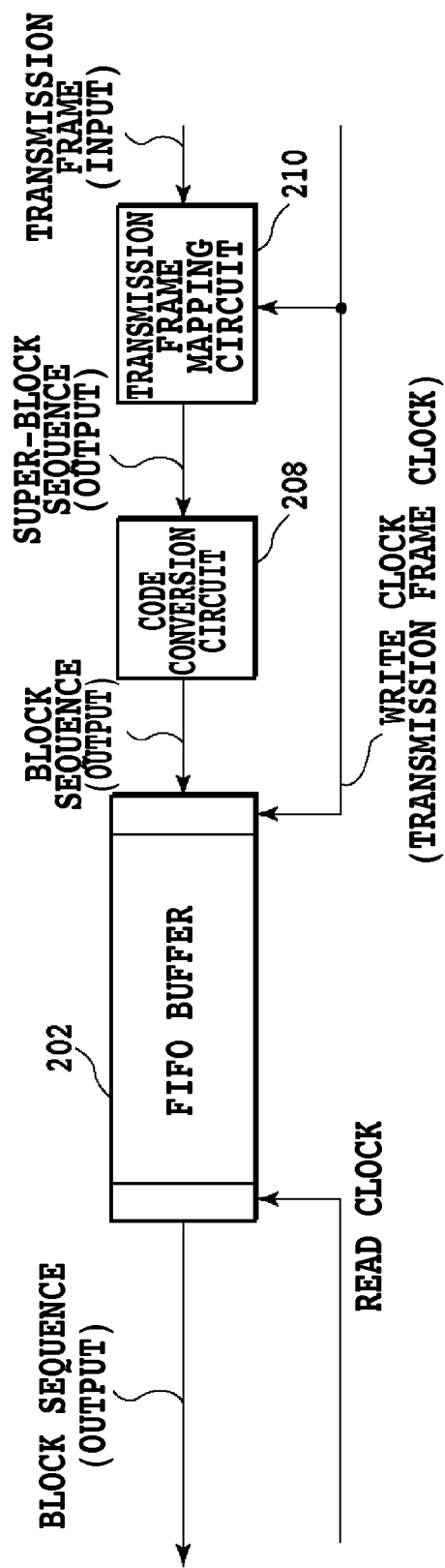
FIG. 38B is a function block diagram of a signal processing apparatus on the receiving side according to an embodiment.

A third embodiment will be described with reference to FIGS. 38A and 38B. FIGS. 38A and 38B are function block diagrams of a signal processing apparatus configured to execute the above-described signal block sequence processing. FIG. 38A shows function blocks of a transmission-side signal processing apparatus. FIG. 38B shows function blocks of a reception-side signal processing apparatus.

As shown in FIG. 38A, the transmission-side signal block processing apparatus includes a clock extraction circuit 104 configured to extract a clock from an input signal block sequence B and to supply the write clock to a FIFO buffer 102, the FIFO buffer 102 configured to store the signal block sequence B in accordance with the clock supplied by the clock extraction circuit, a code conversion circuit 108 configured to convert a group G of the block sequence read from the FIFO buffer into a super-block sequence S or an ultra-block sequence U, and a transmission frame mapping circuit 110 configured to map the super-block sequence or ultra-block sequence output by the code conversion circuit to the transmission frame F.

The code conversion circuit functions to delete signal block headers, rearrange signal block payloads, and apply position determination information to control block payloads [FIG. 31: ST3-4 to ST3-17].

The signal block processing apparatus configured to execute the signal block sequence processing described in Embodiment 3-2 further includes a clock adjusting character detection circuit 106 configured to detect clock adjusting characters in the input signal block sequence B and give an instruction to delete a part or the whole of each signal block payload composed only of clock adjusting characters from FIFO.

As a read clock for the FIFO buffer, a transmission frame clock that is the same as an operation clock for the transmission frame mapping circuit is supplied. Thus, the block sequence from which clock adjusting characters the amount of which is the same as that of jitters corresponding to a clock frequency error specified for signal transmissions have been deleted is read from the FIFO buffer. The code conversion circuit then converts the block sequence into a super-block sequence. The transmission frame mapping circuit 110 then contains the super-block sequence in the payloads in the transmission frame and outputs the transmission frame.

As shown in FIG. 38B, the reception-side signal block processing apparatus includes a transmission frame mapping circuit 210 configured to extract the super-blocks S from the input transmission frame F, a code conversion circuit 208 configured to decode the super-blocks S from the transmission frame mapping circuit into the signal block sequence B, and a FIFO buffer configured to store the signal block sequence B decoded by the code conversion circuit.

The code conversion circuit 208 functions to execute various error determination processes described above in Embodiments 3-1 and 3-2 and the process of inserting clock adjusting characters as described in Embodiment 3-2 [FIGS. 32 and 35: RT3-e3 to RT3-6].

Embodiment 3-4

Now, with reference to FIGS. 27 and 28, description will be given of a signal processing apparatus configured to execute the above-described block signal processing method as well as a optical-signal transmission apparatus and an optical-signal reception apparatus both containing the signal processing apparatus. FIGS. 27 and 28 show the optical-signal transmission apparatus configured to execute the above-described block signal processing method, as a LAN-WAN edge apparatus installed at the boundary between LAN and WAN.

FIGS. 27 and 28 show the configuration of the LAN-WAN edge apparatus. The detailed description of FIGS. 27 and 28 overlaps the description of the above-described second embodiment and is thus omitted.

Signal block conversion sections W21-24 of the optical-signal transmission apparatus shown in FIG. 27 each process a sequence of signal blocks from a corresponding one of different Ethernet apparatuses E1-E4 to generate super-blocks S. The signal block convention section W21-24 further forms the super-blocks S into one group GS and outputs the group GS. The signal block conversion section W21-24 may include, for example, function blocks other than a transmission frame mapping circuit 110 and a transmission frame demapping circuit 210 shown in FIGS. 38A and 38B, respectively.

A framing section W3 may include, for example, the function blocks of the transmission frame mapping circuit 110 and transmission frame demapping circuit 210 shown in FIGS. 38A and 38B.

The optical-signal reception apparatus can be implemented by reversing signal inputs and outputs to and from the above-described sections of the optical-signal transmission apparatus.

Embodiment 3-5

Now, a signal transmission system according to an embodiment of the present invention which executes the above-described block signal processing method will be described with reference to FIG. 29. In the signal transmission system shown in FIG. 29, the two signal transmission apparatuses described with reference to FIG. 27 or 28 are used as LAN-WAN edge apparatuses W_1 and W_2, respectively, and connected together via a signal line Lww such as an optical fiber. Ethernet apparatuses E1-4 and E5-8 in FIG. 29 correspond to the Ethernet apparatuses E1-4 in FIG. 27 or 28.

Fourth Embodiment

As described above, according to the present invention, plural sequences of signal blocks each composed of a signal block payload and a signal block header are input in parallel. The transmitting side processes the input sequences of signal blocks and outputs the processed signal blocks. In the series of processes, signal block headers and a part or the whole of each signal block payload composed only clock adjusting characters are deleted to reduce the bit rate at which the super-blocks are transmitted.

The plurality of signal block sequences input in parallel are executed sequence by sequence to allow super-blocks corresponding to each of the sequences to be output. The output sequence of super-blocks is formed into one group, which is then output. Alternatively, signal blocks contained in different signal blocks are processed to generate one super-block, which is then output.

Furthermore, the receiving side receives the super-block generated by the transmitting side. The receiving side then checks for errors by checking all the pieces of position determination information provided in the control block payloads in the super-block payloads for duplication and by determination of whether or not a predetermined condition is met by using all the block type values contained in the control block payloads in the super-block payloads. Thus, propagation of errors is prevented. A fourth embodiment of the present invention will be described with reference to the drawings.

Figure 39:
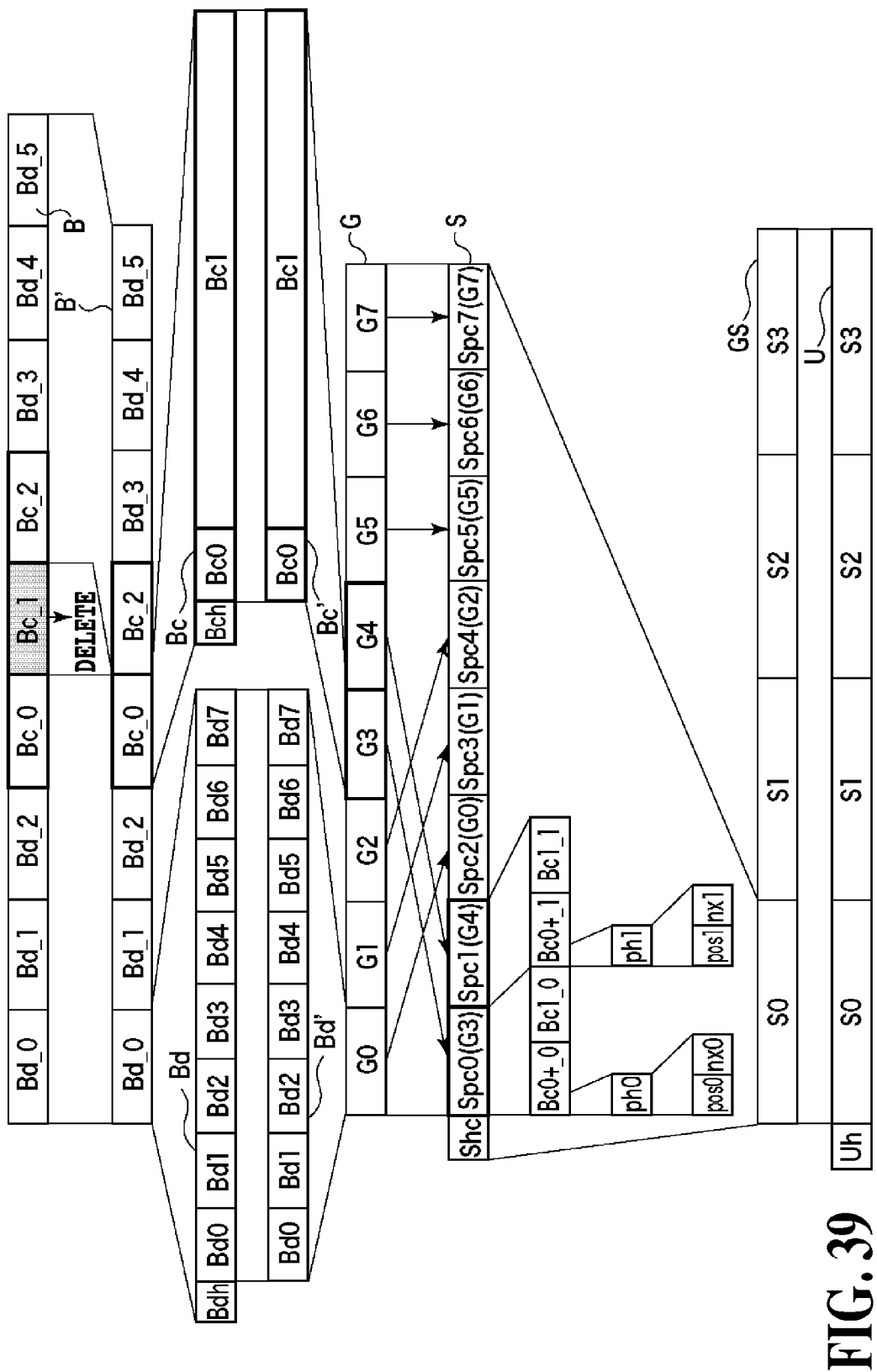
FIG. 39 is a diagram showing how signal blocks are processed according to an embodiment.

FIG. 39 is a diagram schematically showing how signal block processing is executed. As is the case with the first and second embodiments, in FIG. 39, a sequence of signal blocks processed into one super-block according to the present embodiment is denoted by B. A signal block payload in which data is contained is denoted by Bd'. A signal block payload in which a control code is contained is denoted by Bc'. Furthermore, a signal block header for the data block payload Bd' is denoted by Bdh. A signal block header for the control block payload Bc' is denoted by Bch. Moreover, a signal block composed of data block payloads Bd' and a signal block header Bdh is denoted by Bd. A signal block composed of a control block payload Bc' and a signal block header Bch is denoted by Bc. The signal block header (Bch, Bdh) contains information indicating whether the signal block payload is a control block payload Bc' or a data block payload Bd'. The control block payload Bc' stores information Bc0 indicating the type of a control code Bc1 contained in the control block payload Bc'. A signal block Bc_1 is a signal block in which only clock adjusting characters are contained in the control block payloads Bc'.

According to the present embodiment, a signal block (Bc_1) containing signal block payloads Bc' each composed only of clock adjusting characters is deleted from the input sequences of signal blocks B. Then, the signal block headers (Bch, Bdh) are deleted from each sequence of signal blocks B' corresponding to the sequence of signal blocks B from which the above-described signal block has been deleted. A preset number of signal block payloads (Bc', Bd') are formed into one group G. In FIG. 39, groups each formed of eight signal block payloads are denoted by G0 to G7. G3 and G4 each denote a control block payload Bc'.

Moreover, according to the present embodiment, the signal block payloads in the group G are processed (provision of position determination information to the control block payloads and rearrangement of the signal block payloads), and the resultant super-block S is output. For example, the super-block S is accommodated in payloads in a transmission frame F, which is then transmitted. Alternatively, a plurality of super-blocks S are formed into a group GS, and a synchronization header is provided to the group GS. The group GS is mapped to the transmission frame F in the form of an ultra-block U, which is then transmitted.

Furthermore, according to the present embodiment, an error-correcting code fec can be generated for the generated super-block or sequence of super-blocks and added to the super-block or sequence of super-blocks to generate a super-block S+ with the error-correcting code fec added thereto, which is then output. Like the super-block S, the super-block S+ is accommodated in payloads in a transmission frame F, which is then transmitted.

As in the case of the above-described second embodiment, in the description below, an Ethernet MAC (10 Gb/s) signal constructed of 64B/66B block coding is used as an example of the signal block B as required. Furthermore, an ODUk/OPUk (k=1, 2, 3) frame is used as an example of the transmission frame F as required. Here, a 64B/66B data block corresponds to the signal block Bd. A 64B/66B control block corresponds to the control block Bc. Furthermore, the signal block header (Bch, Bdh) corresponds to a sync code shown in FIG. 49-7 in Non-Patent Document 1. Bd0 to Bd7 in the data block payload Bd' in the signal block Bd corresponds to 8-bit MAC frame data. Bc0 in the control block payload Bc' indicates a block type and corresponds to a block type field shown in FIG. 49-7 in Non-Patent Document 1. Bc1 in the control block payloads Bc' corresponds to a control code. For a 64B/66B block composed only of clock adjusting characters, the block type field shown in FIG. 49-7 in Non-Patent Document 1 has a value of 0x1e. An ODUk/OPUk frame is a transmission frame composed of 50-byte (ODUk header=42 bytes, OPUk header=8 bytes) header Fh and a 15,232-byte payload Fp. Furthermore, in the present embodiment, for easy understanding, the number of bits, data write positions, signal types, bit rates, frames, and the like are clearly specified. However, the present embodiment is not limited to these elements.

As a signal block sequence processing method according to the present embodiment, the flow of the signal processing method according to the second embodiment described above with reference to FIG. 16 is applied. Descriptions overlapping those of the second embodiment are partly omitted. In the present embodiment, a sequence of 64B/66B blocks B may be one of a plurality of signal block sequences input in parallel to a signal processing apparatus included in a signal transmission apparatus by a plurality of 10G Ethernet apparatuses E or may be extracted from different signal block sequences. That is, the process shown in FIG. 16 (ST2-1 to ST2-18) is applied to the signal blocks input to the signal processing apparatus in parallel. Duplicate descriptions of the process shown in FIG. 16 are omitted.

A scramble process (FIG. 16: ST2-11c, ST2-11d, ST2-16) may be executed after the super-block has been generated (FIG. 16: ST2-12c, ST3-12d) and/or after the ultra-block U has been generated (FIG. 16: ST2-17). In this case, with a predetermined header masked, only the payloads are scrambled.

The embodiment has been described in which the 64B/66B block Bcc composed only of clock adjusting characters is deleted with reference to the block type. However, a part of the 64B/66B block may be deleted.

According to the present embodiment, the processing method described with reference to FIGS. 20A, 20B, and 21 may be applied to delete a part of the 64B/66B block. The description of the process of deleting a part of the 64B/66B block is omitted.

Now, a method of providing the control block payload Bc' with position determination information [FIG. 16: ST2-8] will be described.

As shown in FIG. 39, the position determination information on each of G3 and G4 can be contained by modifying the block type Bc0 of the control code contained in Bc'. In FIG. 39, the block types of G3 and G4 in which position information is contained are denoted by Bc0+_0 and Bc0+_1, respectively. The position determination information on G3 and G4 is contained as ph0 and ph1 (4 bits) contained in Bc0+_0 and Bc0+_1 (for example, 8 bits), respectively. Here, pos0 (3 bits) in ph0 indicates the sequence order (the position of G3) in the group G, and nx0 (1 bit: 1) indicates that a control block payload Bc' is also located in following Spc1. Similarly, post (3 bits) in ph1 indicates the sequence order (the position of G4) in the group G, and nx1 (1 bit: 0) indicates that a data block payload Bd' is located in following Spc2. In the present embodiment, the block type Bc0 is composed of 8 bits, and can use 4 bits different from the 4 bits of ph0 (ph1) to indicate to which of 15 types the control code Bc1 contained in the control block payloads Bc' belongs.

Figure 49:
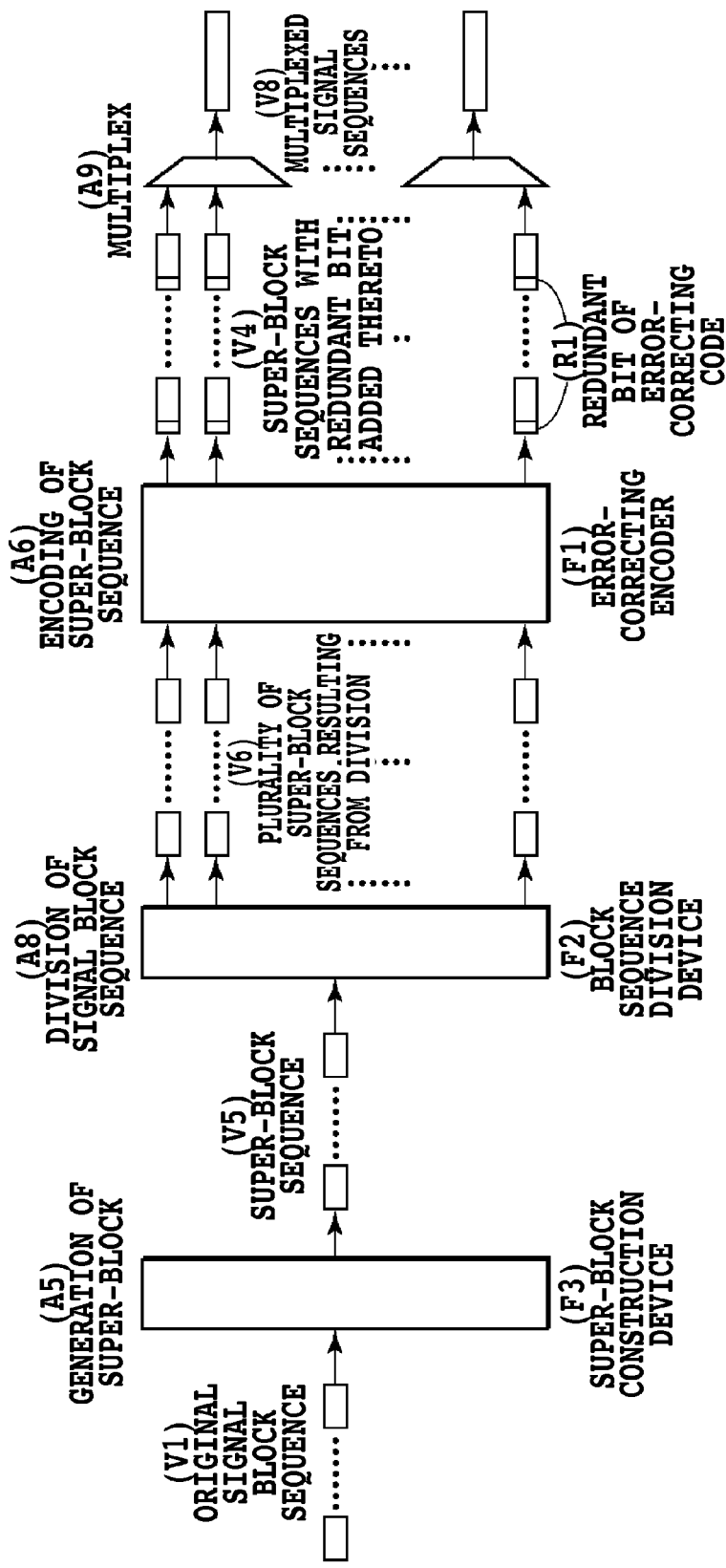
FIG. 49 is a diagram schematically showing the configuration of a signal block processing apparatus according to an embodiment.

FIG. 25 is a table showing the relationship between 15 types of control block formats specified in FIG. 49-7 in Non-Patent Document 1 and the block type value (block type 1) indicating which of these types the control block format belongs and a block type value (block type 2) coded so as to maximize the Humming distance between particular block types and which is provided to each control block payload together with position determination information; the control block format types and bloc type 1 are specified in FIG. 49-7 in Non-Patent Document 1.

Also in the present embodiment, a bit error may prevent the terminal position of an Ethernet frame from being communicated to the higher layer (MAC: Media Access Control layer). In this case, the Ethernet frame may fail to be distinguished from the next frame. As a result, both frames may be discarded or may be transferred to another Ethernet apparatus with the error uncorrected. This results from replacement of a control block (which conforms to one of the control block formats #8 to #15) containing a control character Tj indicative of the terminal position.

Thus, also in the present embodiment, when the 8-bit block type value (block type 1) indicative of one of the 15 types of control codes is coded into a 4-bit block type value (block type 2), control blocks each containing the control character Tj indicative of the terminal position are coded using a combination of 4 bits which sets all the Humming distances to at least 2. Thus, even if a 1-bit error occurs in the 4-bit block type value (block type 2), the corresponding control blocks are determined to be different from those which contain the control character Tj indicative of the terminal position (#8 to #15 in FIG. 25) (see, for example, Non-Patent Document 6).

Furthermore, a block type value (special block type value: in the example shown in FIG. 25, "0100") not used as a block type value (block type 2) compressed to 4 bits is assigned to a pattern (for example, the pattern in which /T/ and /S/ are contained in the same control block payload) different from the patterns indicated by an 8-bit block type value (block type 1).

In particular, in the Ethernet specified in IEEE 802.3ae (Non-Patent Document 1), a sequence of signal blocks is coded according to 64B/66B, and a control block provides character content information in a 1-byte type field thereof. Furthermore, since the 1-byte type field indicates one of the 15 types of character storage information, the control block has a 4-bit redundancy.

In the process of generating position determination information during the process of conversion into a super-block according to the present embodiment, the 8 bits in the type field (block type field) value in a control block coded according to 64B/66B is contained into 4 bits. Furthermore, 1 bit is used as a continuation bit indicating that the succeeding block resulting from the rearrangement of the control block in the payloads in the super-block is a control block, and 3 bits are used as information on the positions set before the rearrangement of the control block. Moreover, a super-block header indicating whether or not the payloads in the super-block include control blocks requires at least 1 bit. As described above, a super-block composed of 512B/513B containing a 512-bit super-block payload into which a sequence of eight 64B/66B blocks is grouped corresponds to the most efficient code conversion rule. Furthermore, when the super-block header is at least 2-bit information (for example, two bit sequences such as 01 and 10 or 001 and 100 which offer the longest Humming distance) with a redundancy indicating whether or not the super-block payloads include control block payloads, that is, the super-block is composed of 512B/514B containing a 512-bit super-block payload into which a sequence of eight 64B/66B blocks is grouped, the receiving side can extract the super-block by self synchronization. Furthermore, the bit error detection robustness of the super-block header is improved. Additionally, since the super-block header is redundant information, the above-described process of containing the pointer at the particular position in the header of the ODUk/OPUk frame is unnecessary.

Furthermore, by executing the signal block sequence processing method on the transmitting side in the reverse order, the receiving side can restore the sequence of signal blocks B from the received transmission frame F.

The signal block sequence processing for restoring the sequence of signal blocks B on the receiving side according to the present embodiment can be configured as follows by application of the signal processing method described above in the third embodiment with reference to FIGS. 35 to 37. If the super-block payloads include the above-described control block payloads, all of the position determination information and block type values in the super-block payloads are used to determine whether or not there is any error.

Referring to FIGS. 35 to 37 again, a signal block sequence processing method for recovering the sequence of signal blocks B on the receiving side will be described. FIG. 35 is a diagram schematically showing the flow of the signal block sequence processing method according to the present embodiment.

As shown in FIG. 35, first, an ultra-block U accommodated in a transmission frame F is extracted [FIG. 35: RT3-1].

If a pointer indicating the start position of the super-blocks in the transmission frame F is not used or the super-blocks are received without using the transmission frame, synchronization is performed using the super-block header, to extract the sequence of super-blocks [FIG. 35: RT3-e2]. If the pointer is contained in the transmission frame, the header (the pointer contained at a predetermined position in the header) of the received transmission frame F is referenced, and the sequence of super-blocks is extracted based on the pointer [FIG. 35: RT3-e2].

Moreover, the procedure of generating an ultra-block on the transmitting side is carried out in the reverse order, that is, from ST16 to ST12 shown in FIG. 16. If error-correcting codes are used, an error check and an error correction are performed based on the error-correcting code for the super-block (sequence) applied to the super-block. If the super-block is scrambled, descrambling is also performed.

Then, referencing the super-block headers (Shc, Shd) of the received super-blocks (information indicating whether or not the super-block payloads in the super-blocks include control block payloads Bc'), determination of whether or not the super-block payloads in the super-blocks include control block payloads Bc' is performed [FIG. 35: RT3-e3].

If the super-block payloads in the super-blocks include control block payloads Bc', the control blocks are extracted [FIG. 35: RT3-e4]. Based on the position determination information on the control blocks, the information on the positions set before the rearrangement and the block type values are extracted [FIG. 35: RT3-e5].

Then, the extracted information on the positions set before the rearrangement and the extracted block type values are used to carry out an error determination [FIG. 35: RT3-e6]. The error determination process will be described below with reference to FIG. 36.

If the error determination results in no error detection, the signal block payloads (Bc', Bd') are sorted in the group G, that is, the signal block payloads (Bc', Bd') are placed back at the positions in the group G set before the rearrangement in accordance with the position determination information provided in the control block payloads and a predetermined signal block payload rearrangement rule [FIG. 35: RT3-e7]. Moreover, a part or the whole of each signal block payload composed only of clock adjusting characters which part or whole has been removed by the transmitting side is inserted. A method for inserting a part or the whole of each signal block payload composed only of clock adjusting characters has been described above with reference to FIGS. 18, 19, and 37. The description of the method is thus omitted.

Then, the position determination information is removed from the control block payloads, or the status of the control block payloads is converted into the one set before the insertion of the position determination information on the transmitting side in accordance with the predetermined signal block payload rearrangement rule [FIG. 35: RT3-e8].

If an error is detected, all of the eight signal block payloads in the super-block payloads are converted into error control block payloads in which a code indicative of occurrence of an error (for example, an error character /E/ defined in IEEE 802.3ae) is contained [FIG. 35: RT3-e9].

Then, the signal block header (Bch, Bdh) containing the following information is added to each of the signal block payloads: the information indicating whether the signal block payload is a control block payloads in which a control code is contained or a data block payloads Bd' in which data is contained. Thus, a sequence of 64B/66B blocks B is decoded [R35: RT3-5] and output [FIG. 35: RT3-6].

If the super-block payloads include no control block payload Bc' [FIG. 35: RT3-e3], the data block payloads Bd' are placed back at the positions in the group G set before the rearrangement in accordance with the predetermined data block payload rearrangement rule. The signal block header Bdh is added to the data block payloads Bd' to decode the sequence of 64B/66B blocks B [FIG. 35: RT3-5]. The decoded sequence of 64B/66B blocks B is then output [FIG. 35: RT3-6].

The error determination process will be described with reference to FIGS. 36 and 34. FIG. 36 is a diagram schematically showing the flow of the error determination process according to the present embodiment. FIG. 34 is a diagram schematically showing the status transition of a flag used for the error determination process.

As shown in FIG. 33, first, as a first error determination process, the position information on all the control blocks contained in the super-block is checked for consistency [FIG. 36: RT3-e602]. More specifically, the process extracts all the pieces of position determination information pos provided in the respective control block payloads Bc' and allowing determination of the corresponding positions in the group G. The process then determines whether or not any extracted pieces of position determination information are duplicate (that is, whether or not any control block payloads Bc' are indicated to be located at the same position). If any pieces of position determination information are duplicate, the flag is set to zero [FIG. 36: RT3-e614]. Information indicating the presence of an error is output [FIG. 36: RT3-e616]. The error determination is then terminated.

If no pieces of position determination information are duplicate, a second error determination process is executed. The second error determination process uses the block type values of all the control block payloads Bc' in the super-blocks to determine whether or not the block type value indicates a predetermined condition for the block type (control code). Here, the predetermined condition for the block type corresponds to checking whether or not the appearance of control code characters is kept in order of a terminal character /T/, an idle character /I/, and a start character /S/.

Since eight signal block payloads (Bd', Bc') are contained in the super-block, the condition determination needs to be sequentially repeated for up to eight control block payloads Bc'. Thus, a counter (CNT) is used.

In the second error determination process, first, the counter value is initialized to zero [FIG. 36: RT3-e604]. Every time the condition determination process is subsequently executed, the counter value is incremented by one [FIG. 36: RT3-e606].

Then, determination of whether or not any control block payload Bc' has position determination information pos with a value equal to the current counter value is performed [FIG. 33: RT3-e608]. If no block payload Bc' has position determination information pos with a value equal to the current counter value, determination of whether or not the current counter value is 8 is performed [FIG. 36: RT3-e640] and the method returns to the step of incrementing the counter value [FIG. 36: RT3-e606].

If a control block payload Bc' is detected which has position determination information pos with a value equal to the current counter value [FIG. 36: RT3-e608], the block type value of the control block payload is referenced to determine whether or not the control block payload is a special control block payload [FIG. 36: RT3-e610].

If the control block payload is a special control block payload, determination of whether or not the status of the flag is zero is performed [FIG. 36: RT3-e612]. If the status of the flag is zero, determination of whether or not the current counter value is 8 is performed [FIG. 36: RT3-e640] and the method returns to the step of incrementing the counter value [FIG. 36: RT3-e606].

If the status of the flag is one [FIG. 36: RT3-e612], the flag indicates that before the control block payload of interest containing /T/ and /S/ is detected, a control block payload with /T/ has detected but no control block payload with /S/ has been detected, that is, the appearance of the control code characters is not kept in order of /T/, /I/, and /S/. Thus, the value of the flag is set to zero [FIG. 36: RT3-e624]. Information indicative of the presence of an error is output [FIG. 36: RT3-e616]. The error determination is then terminated.

If the control block payload is not a special control block payloads [FIG. 36: RT3-e610], referencing the block type of the control block payload, determination of whether or not the control block payload contains /T/ is performed [FIG. 36: RT3-e618]. If the control block payload contains /T/, determination of whether or not the status of the flag is zero is performed [FIG. 36: RT3-e620]. If the status of the flag is zero, the value of the flag is set to one. Then determination of whether or not the current counter value is 8 is performed [FIG. 36: RT3-e640] and the method returns to the step of incrementing the counter value [FIG. 36: RT3-e606].

As shown in FIG. 34, the status of the flag changes to one when a control block payload with /T/ is detected and to zero when a control block payload with /S/ is detected. That is, the flag set to one functions to indicate that before the control block payload of interest is detected, a control block payload with /T/ has detected but no control block payload with /S/ has been detected.

If the status of the flag is one [FIG. 36: RT3-e620], the flag indicates that before the control block payload of interest containing /T/ is detected, a control block payload with /T/ has detected but no control block payload with /S/ has detected, that is, the appearance of the control code characters is not kept in order of /T/, /I/, and /S/. Thus, the value of the flag is set to zero [FIG. 36: RT3-e624]. Information indicative of the presence of an error is output [FIG. 36: RT3-e626]. The error determination is then terminated.

If the control block payload contains no /T/ [FIG. 36: RT3-e618], determination of whether or not the control block payload is composed only of /I/ is performed [FIG. 36: RT3-e628]. If the control block payload is composed only of /I/, determination of whether or not the status of the flag is one is performed [FIG. 36: RT3-e630]. If the status of the flag is one, determination of whether or not the current counter value is 8 is performed [FIG. 36: RT3-e640] and the method returns to the step of incrementing the counter value [FIG. 36: RT3-e606].

If the status of the flag is zero [FIG. 36: RT3-e630], the flag indicates that the appearance of the control code characters is not kept in order of /T/, /I/, and /S/. Thus, information indicative of the presence of an error is output [FIG. 36: RT3-e631]. The error determination is then terminated.

If the control block payload is not composed only of /I/ [FIG. 36: RT3-e628], determination of whether or not the control block payload contains /S/ is performed [FIG. 36: RT3-e632]. If the control block payload contains /S/, determination of whether or not the status of the flag is one is performed [FIG. 36: RT3-e634]. If the status of the flag is one, the value of the flag is set to zero [FIG. 36: RT3-e636]. Then determination of whether or not the current counter value is 8 is performed [FIG. 36: RT3-e640] and the method returns to the step of incrementing the counter value [FIG. 36: RT3-e606].

If the status of the flag is one, the flag indicates that the appearance of the control code characters is not kept in order of /T/, /I/, and /S/. Thus, information indicative of the presence of an error is output [FIG. 36: RT3-e638]. The error determination is then terminated.

As described above, the predetermined condition for the control blocks corresponds to checking whether or not the appearance of the control code characters is kept in order of /T/, /I/, and /S/.

In particular, in determining whether or not the control block payload contains /T/, the method can also use a flag (FIG. 34) memorizing the status of the already-arrived sequence of super-blocks to determine whether or not a sequence of blocks covering multiple super-frames is in the correct order.

According to the present embodiment, even if a bit error results in an error in type field value, a 2-bit error can be detected 100% in the patterns of all the control code characters contained in the sequence of control block payloads. The relevant control block payload can then be converted into an error-indicating control block payload to which a particular error code indicative of an error is assigned.

Furthermore, if the super-block header is information with a redundancy of at least 2 bits, then in the step of extracting super-blocks [FIG. 35: RT3-e2], a third error determination process may be executed. That is, a bit error determination is performed on the super-block header. If an error occurs in the super-block header, the eight signal block payloads contained in the corresponding super-block payloads are converted into error control block payloads indicative of occurrence of an error.

A signal block sequence processing apparatus configured to execute the above-described signal block sequence processing method will be described with reference to FIGS. 38A and 38B. FIGS. 38A and 38B are function block diagrams of the signal processing apparatus. FIG. 38A shows function blocks of a transmitting side signal processing apparatus. FIG. 38B shows function blocks of a reception-side signal processing apparatus.

As shown in FIG. 38A, the transmission-side signal block processing apparatus includes a clock extraction circuit 104 configured to extract a clock from an input signal block sequence B and to supply the write clock to a FIFO buffer 102, the FIFO buffer 102 configured to store the signal block sequence B in accordance with the clock supplied by the clock extraction circuit, a code conversion circuit 108 configured to convert a group G of the block sequence read from the FIFO buffer into a super-block sequence S or an ultra-block sequence U, and a transmission frame mapping circuit 110 configured to map the super-block sequence or ultra-block sequence output by the code conversion circuit to the transmission frame F.

Additionally, the signal block processing apparatus configured to execute the signal block sequence processing further includes a clock adjusting character detection circuit 106 configured to detect clock adjusting characters in the input signal block sequence B and give an instruction to delete a part or the whole of each signal block payload composed only of clock adjusting characters from FIFO.

As a read clock for the FIFO buffer, a transmission frame clock that is the same as an operation clock for the transmission frame mapping circuit is supplied. Thus, the block sequence from which clock adjusting characters the amount of which is the same as that of jitters corresponding to a clock frequency error specified for signal transmissions have been deleted is read from the FIFO buffer. The code conversion circuit then converts the block sequence into a super-block sequence. The transmission frame mapping circuit 110 then contains the super-block sequence in the payloads in the transmission frame and outputs the transmission frame.

The code conversion circuit 108 functions to delete signal block headers, rearrange signal block payloads, and apply position determination information to control block payloads [FIG. 16: ST2-4 to ST2-17].

As shown in FIG. 38B, the reception-side signal block processing apparatus includes a transmission frame mapping circuit 210 configured to extract super-blocks S from an input transmission frame F, a code conversion circuit 208 configured to decode the super-blocks S from the transmission frame mapping circuit into a signal block sequence B, and a FIFO buffer configured to store the signal block sequence B decoded by the code conversion circuit.

The code conversion circuit 208 functions to execute the above-described various error determination processes and the process of inserting clock adjusting characters [FIG. 35: RT3-$e$3 to RT3-6].

Figure 40:
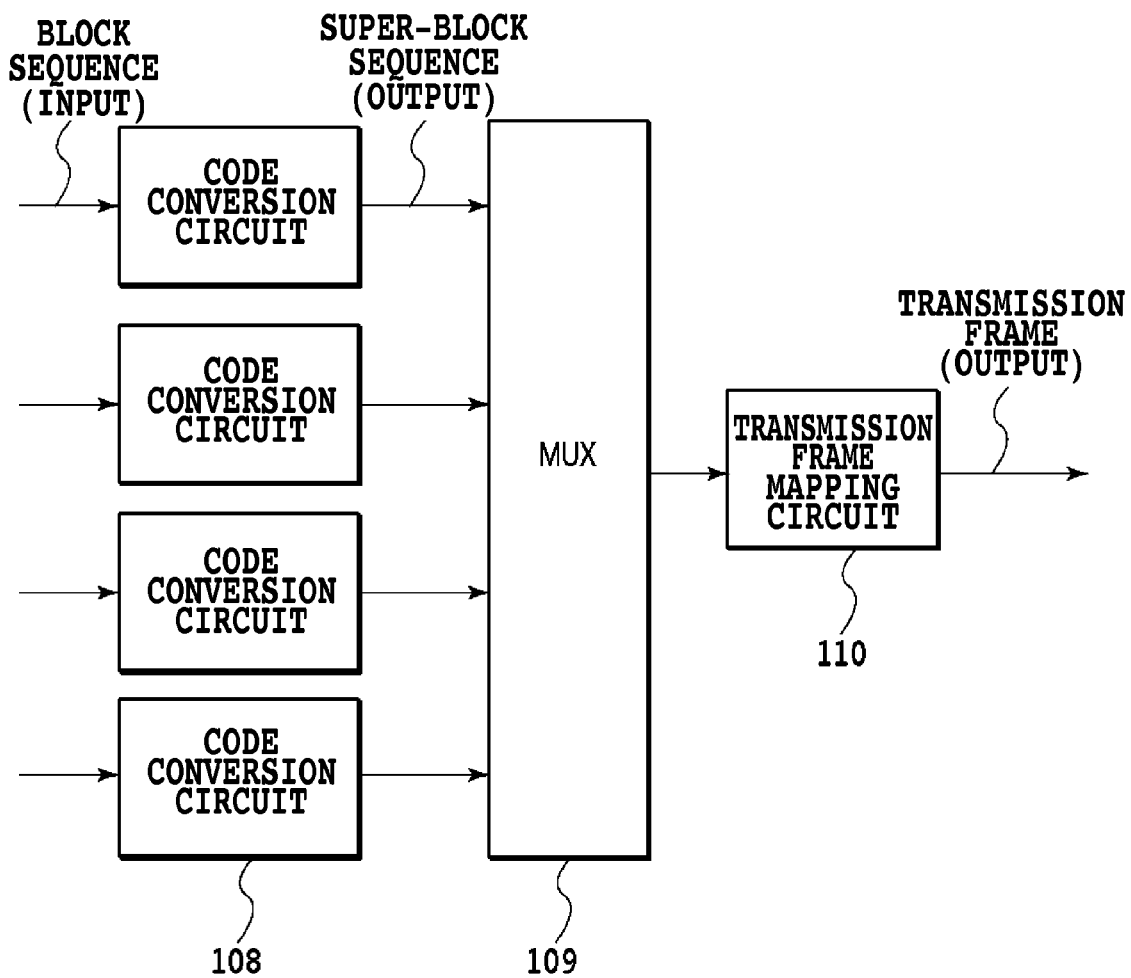
FIG. 40 is a function block diagram of a signal processing apparatus according to an embodiment.

To allow a plurality of signal block sequences input in parallel to be processed sequence by sequence to generate super-blocks corresponding to the respective sequences for multiplexing, a multiplexing (MUX) circuit 109 is located between the transmission frame mapping circuit 110 and the code conversion circuits 108, the number of which is the same as that of the signal block sequences input in parallel, as shown in FIG. 40. Thus, the super-blocks are accommodated in the payloads in the transmission frame by means of assignment of time slots in units of bits or predetermined bits.

FIG. 41 shows a region of OPU3 frame in which four 10-Gb Ethernet signals are multiplexed and accommodated.

For asynchronous mapping to an OPU3 frame, justification control is defined so as to absorb a difference in rate.

On the other hand, a 10-Gb Ethernet signal defined in IEEE 802.3 suffers ±100-ppm clock jitters. Thus, the bit rate is between 9.999 Gbps and 10.001 Gbps.

When the 10-Gb Ethernet signal is constructed of a code conversion according to 512B/514B, the bit rate is between 10.03805859 Gbps and 10.04006641 Gbps in view of jitters. The rate can be adjusted to 10.03805859 Gbps by deleting the maximum amount of clock adjusting characters (idle characters). When four 10-Gb Ethernet signals are constructed of multiplexing, the signal rate is 40.15223437 Gbps.

Thus, when constructed of clock adjustment by deleting clock adjusting characters and to a code conversion according to 512B/514B, the 10G-Ethernet signals can be accommodated in OPU3 payloads.

Now, with reference to FIGS. 42 and 43, the configuration of a signal processing apparatus will be described which is configured to extract signal blocks contained in different signal block sequences input in parallel and to process the extracted plural signal block sequences to generate one super-block.

Figure 42:
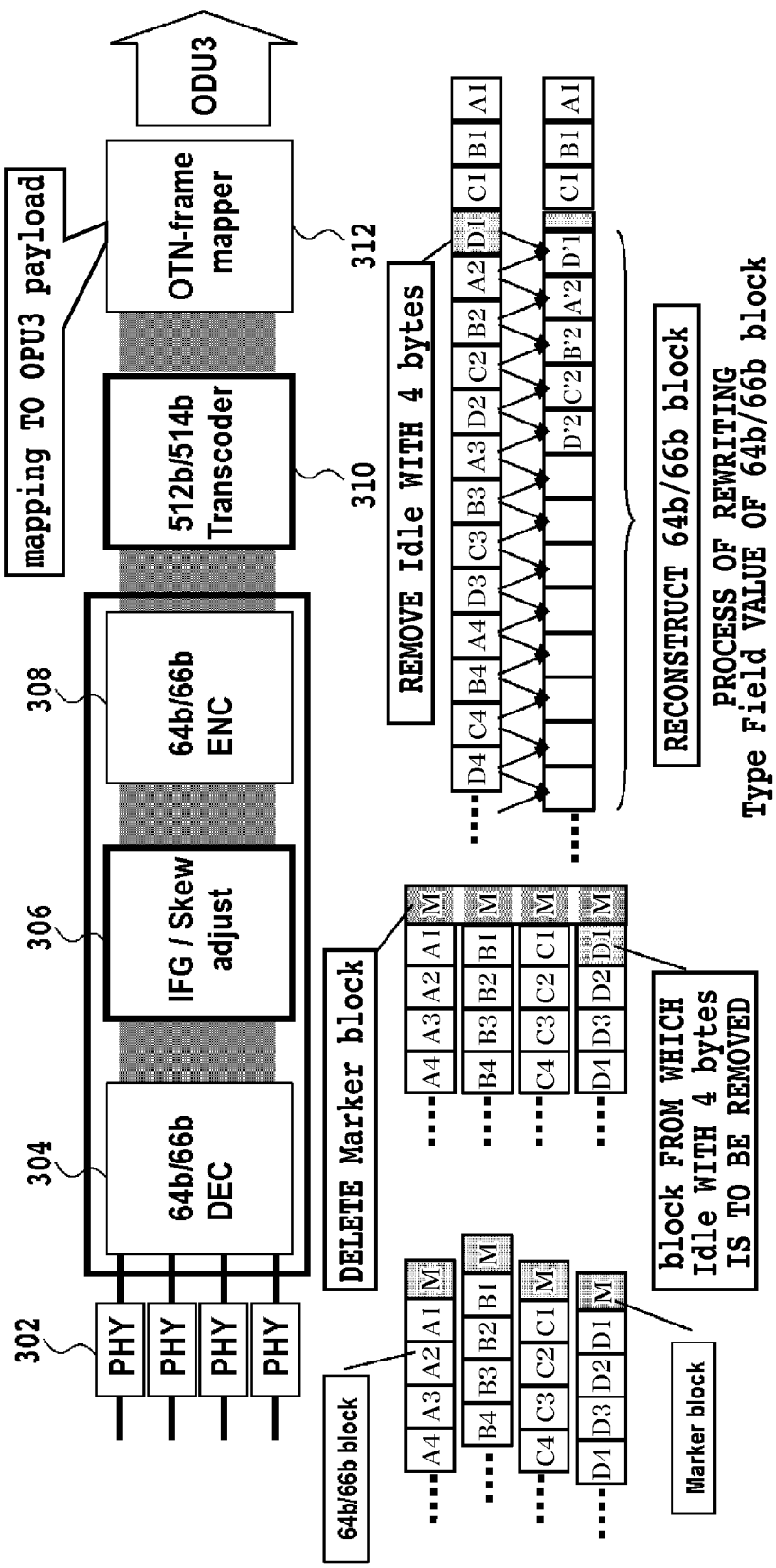
FIG. 42 is a function block diagram of a signal processing apparatus on the transmitting side according to an embodiment.

FIG. 42 shows function blocks of a transmission-side signal block processing apparatus. FIG. 43 shows function blocks of a receiving side signal block processing apparatus.

As shown in FIG. 42, the transmission-side signal block processing apparatus includes, for example, four physical interfaces (PHY) 304 connected to respective different 10G Ethernet apparatuses to receive signals from the 10G Ethernet apparatuses, a 64B/66B decoding section 306 configured to decode 64B/66B block sequences from each of the received signals and to output the decoded 64B/66B blocks, a propagation delay time difference adjustment section 306 configured to adjust the difference in propagation delay time (skew) between the decoded 64B/66B blocks and to delete clock adjusting characters from signal block payloads, a 64B/66B coding section 308 configured to reconfigure the signal block payloads from which the clock adjusting characters have been deleted, into 64B/66B blocks, a 512B/514B conversion section 310 configured to form every eight 64 Bs (signal block payloads) from the sequence of the reconfigured signal blocks into one group (G), and an OTN frame mapping section 312 configured to map the 512B/514B blocks to an OTN frame.

In FIG. 42, 64B/66B block sequences decoded from signals input by the respective four physical interfaces (PHY) 304 are denoted by A1 to A4, B1 to B4, C1 to C4, and D1 to D4. Furthermore, in FIG. 42, marker blocks periodically appearing in the 64B/66B block sequences are denoted by M. The marker block M indicates the phase between the signal block sequences. Additionally, a signal block D1 is a signal block from which idle columns /I/are deleted.

The propagation delay time difference adjustment section 306 references the marker blocks to adjust the difference in propagation delay time (skew) between the 64B/66B block sequences. The propagation delay time difference adjustment section 306 then deletes the marker blocks. The propagation delay time difference adjustment section 306 further executes, for example, the processing described with reference to FIGS. 20A and 22A to delete clock adjusting characters from the signal block payloads. Moreover, the propagation delay time difference adjustment section 306 outputs one signal block sequence by outputting the signal blocks from the four signal block sequences in an order predetermined to the receiving side.

The 64B/66B coding section 308 executes, for example, the processing described with reference to FIGS. 20B and 22B to reconfigure the signal blocks from the propagation delay time difference adjustment section 306 into the 64B/66B signal blocks.

The sequence of the reconfigured signal blocks is input to the 512B/514B conversion section 310. The 512B/514B conversion section 310 forms every eight 64Bs (signal block payloads) into one group (G) to generate a 512B super-block payload. The 512B/514B conversion section 310 further adds a 2-bit super-block header to the 512B super-block payload to covert the 512B super-block payload into a 512B/514B block (super-block S). That is, the 512B/514B conversion section 310 functions to execute the signal block processing described with reference to FIG. 16 (ST2-4 to ST2-12).

In the above description, the 64B/66B coding section 308 determines whether or not the signal block payload contains a control code. The 64B/66B coding section 308 then adds a signal block header to the signal block payload for reconfiguring. On the other hand, the 512B/514B conversion section 310 determines whether or not the super-block payload contains a control block payload. The 512B/514B conversion section 310 then adds a super-block header to the super-block payload. Furthermore, the 512B/514B conversion section 310 deletes the signal block header added by the 64B/66B coding section 308. To avoid the redundancy of the processing executed by the 64B/66B coding section 308 and the 512B/514B conversion section 310 to simplify the circuit, the 64B/66B coding section 308 may be configured to output a sequence composed only of signal block payloads and having no signal block header addition, to the 512B/514B conversion section 310 and to output, every eight signal block payloads, information with a redundancy of 2 bits indicating which of the signal block payloads contain control blocks. Thus, the 512B/514B conversion section 310 can convert eight signal block payloads from the 64B/66B coding section 308 into a 512B/514B block (super-block S) by executing a rearrangement process and a scrambling process on the eight signal block payloads to generate a super-block payload and adding 2-bit information from the 64B/66B coding section 308 to the super-block payload as a super-block header.

In FIG. 42, a signal block obtained by reconfiguring a part of A2 and the signal block D1 from which idle columns /I/ have been deleted is denoted by D'1. Furthermore, a signal block obtained by reconfiguring the remaining part of A2 and a part of B2 is denoted by A'2.

In the present embodiment, the 512B/514B conversion section 310 generates a super-block with a super-block header with a 2-bit redundancy added thereto.

Figure 43:
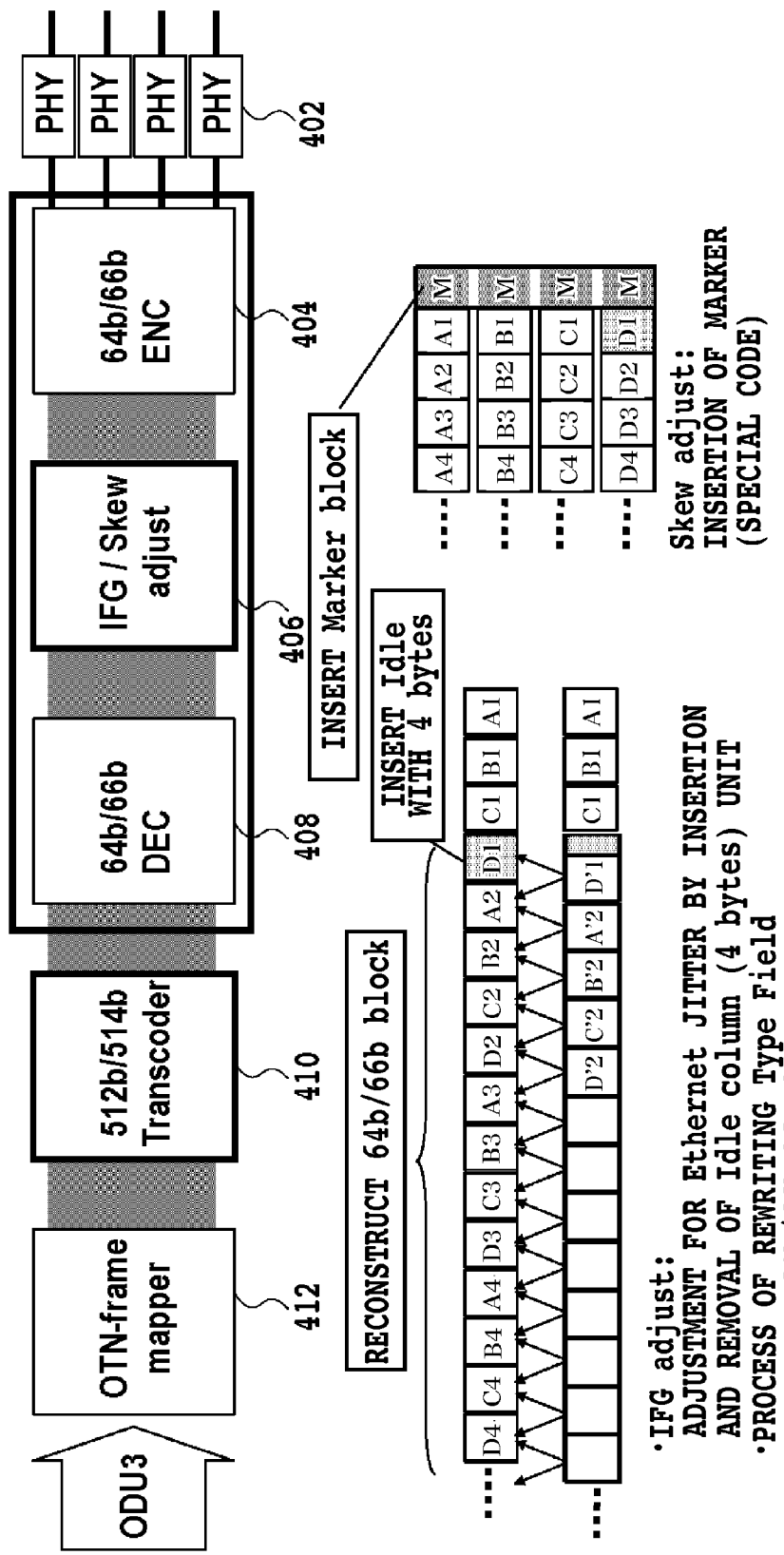
FIG. 43 is a function block diagram of a signal processing apparatus on the transmitting side according to an embodiment.

As shown in FIG. 43, the reception-side signal block processing apparatus includes an OTN frame demapping section 412 configured to receive an ODU3 signal and to extract 512B/514B blocks from an OTN frame, a 512B/514B conversion section 410, a 64B/66B decoding section 408, a propagation delay time difference adjustment section 406, a 64B/66B coding section 404, and four physical interfaces (PHY) 402.

The OTN frame demapping section 412 detects a super-block header with a 2-bit redundancy to synchronize super-block sequences.

The 512B/514B conversion section 410 executes processing such as descrambling to extract super-blocks.

The 64B/66B decoding section 408 determines whether or not the super-block sequence contains control blocks, based on a super-block header value. If the super-block sequence contains control blocks, the 64B/66B block decoding section 408 functions to extract the control blocks, extract information on the positions set before rearrangement and block types from the position determination information in the control blocks, perform an error determination, and output a sequence of 64B/66B blocks B. That is, the 64B/66B decoding section 408 functions to execute the signal block sequence processing described with reference to FIG. 35 (RT3-*e* to RT3-6).

The propagation delay time difference adjustment section 406 separates the signal blocks from one sequence of 64B/66B signal blocks serially output by the 64B/66B decoding section 408, into four signal block sequences. The propagation delay time difference adjustment section 406 then inserts marker blocks into each of the four signal block sequences at a predetermined period.

The 64B/66B coding section 404 processes the marker blocks and the 64B/66B signal blocks and outputs the processed marker blocks and 64B/66B signal blocks to the PHY interfaces 402.

Now, with reference to FIGS. 27 and 28, description will be given of a signal processing apparatus configured to carry out the above-described block signal processing method and an optical-signal transmission apparatus and an optical-signal reception apparatus both of which include the signal processing apparatus. FIGS. 27 and 28 are diagrams showing an optical-signal transmission apparatus corresponding to an embodiment of the present invention, as a LAN-WAN edge apparatus W installed at the boundary between LAN and WAN. FIGS. 27 and 28 show the configuration of the LAN-WAN edge apparatus W. The LAN-WAN edge apparatus W is connected to four 10G Ethernet apparatuses E via signal lines Lew 1-4 such as optical or electric cables. Here, for easier understanding, the description of the internal configuration of the 10G Ethernet apparatuses E is avoided. Similarly, the functions and the like of the LAN-WAN edge apparatus W which do not relate directly to the present invention are simplified or omitted. The optical-signal transmission apparatus described herein converts a transmission frame F into an optical signal and outputs the optical signal. The optical-signal reception apparatus described herein receives the transmission frame F converted into the optical signal. However, of course, the present invention can be implemented as a signal transmission and reception apparatus configured to transmit and receive transmission frames F in the form of electric signals.

In the LAN-WAN edge apparatuses W, PMD (Physical Medium Dependent) and PMA (Physical Medium Attachment) sections W11-14 receive and subject optical/electric signals from the respective 10G Ethernet apparatuses E1-4 to a serial-parallel conversion. Each of the PMD and PMA sections W11-14 then outputs the resulting 64B/66B block sequence to the corresponding on of Lw11-14. Furthermore, the PMD and PMA section 11-14 subjects a 64B/66B block sequence from the corresponding one of Lw11-14 to a parallel-serial conversion and then outputs the resulting optical/electric signal to the corresponding one of the signal lines Lew1-4.

Signal block conversion sections W21-24 in the optical-signal reception apparatus shown in FIG. 27 each process a sequence of signal blocks from the corresponding one of the different Ethernet apparatuses E1-4 to generate super-blocks S. Each of the signal block conversion sections W21-24 forms the super-blocks S into one group GS to generate an ultra-block U and then outputs the ultra-block U. The signal block conversion section W21-24 may include, for example, the function blocks other than the transmission frame mapping 110 and transmission frame demapping circuit 210 shown in FIGS. 38A and 38B.

A framing section W3 frames a sequence of super-blocks output by the super-block output section of each of the signal block conversion sections W21-24 or a sequence of ultra-blocks U output by each of the ultra-block output sections, into a transmission frame F such as OPU3/ODU3/OTU3. The framing section W3 then outputs the framed signal to a signal line Lw3. The sequence of super-blocks S or the sequence of ultra-blocks U can be mapped to the payloads in the transmission frame F and to a particular area of the header which is predetermined to the receiving side. The framing section W3 include, for example, the functions of the transmission frame mapping circuit 110 and transmission frame demapping circuit 210 shown in FIGS. 38A and 38B and the functions of the multiplexing (MUX) circuit 109 shown in FIG. 40.

An optical-signal output section W4 subjects the transmission frame F input through the signal line LW3 to a parallel-serial conversion by PMD to generate an optical signal. The optical-signal output section W4 then outputs the optical signal to a signal line Lww such as an optical fiber through which the signal is transmitted to another WAN apparatus.

On the other hand, signal block conversion sections W2'1-2'4 of the optical-signal reception apparatus shown in FIG. 28 each process a sequence of signal blocks from the corresponding one of the different Ethernet apparatuses E1-4 to generate a super-block S. Each of the signal block conversion sections W2'1-2'4 then outputs the super-block S. Another signal block conversion section W2' forms the super-blocks S (containing the signal block payloads from the different Ethernet apparatuses E1-4) output by the signal block conversion sections W21-24, into one group GS to generate an ultra-block U. The signal block conversion section W2' then outputs the ultra-block U to a framing section W3 via Lw2".

The framing section W3 of the optical-signal conversion apparatus shown in FIG. 28 frames a sequence of ultra-blocks U output by the ultra-block output section of the signal block conversion section W2', into a transmission frame F such as OPU3/ODU3/OTU3. The framing section W3 outputs the framed signal to the signal line Lw3.

The optical-signal output section W4 of the optical-signal reception apparatus shown in FIG. 28 subjects the transmission frame F input through the signal line LW3 to a parallel-serial conversion by PMD to generate an optical signal. The optical-signal output section W4 then outputs the optical signal to the signal line Lww such as an optical fiber through which the signal is transmitted to another WAN apparatus.

The optical-signal reception apparatus according to the present invention can be implemented by reversing signal inputs and outputs to and from the above-described sections of the optical-signal transmission apparatus.

Now, a signal transmission apparatus according to an embodiment of the present invention will be described with reference to FIG. 29. The signal transmission system in FIG. 29 uses the two signal transmission apparatuses described with reference to FIG. 27 or 28, as LAN-WAN edge apparatuses W_1 and W_2, respectively. The LAN-WAN edge apparatuses W_1 and W_2 are connected together via the signal line Lww such as an optical fiber. Ethernet apparatuses E1-4 and E5-8 in FIG. 29 correspond to the Ethernet apparatuses E1-4, respectively, in FIG. 27 or 28.

Fifth Embodiment

As described above, according to the present invention, a signal block composed of a signal block payload and a signal block header is processed, and the resultant super-block is output. In the series of processes, signal block headers are deleted to reduce the bit rate at which the super-block is transmitted. Furthermore, according to the present invention, the super-block is processed, and the signal blocks based on which the super-block has been generated are output.

An embodiment of the present invention will be described with reference to the drawings.

Signal block processing is executed which is similar to that described above in the first embodiment with reference to FIG. 1 to FIG. 7.

Moreover, according to the present embodiment, the signal block payloads in the group G are processed, and the resultant super-block S is output. The super-block S is used as information bits in an error-correcting code to generate redundant bits of the error-correcting code. The super-block S to which the redundant bits of the error-correcting code are added is accommodated in payloads in a transmission frame F, which is then transmitted. In FIG. 1, G' denotes the status of a group G observed while the super-block S is being output from the group G. Furthermore, in FIG. 1, a super-block containing control block payloads Bc' is shown as a super-block Sc. A super-block containing no control block payload Bc' (a super-block composed only of data block payloads Bd') is shown as a super-block Sd.

Figure 44:
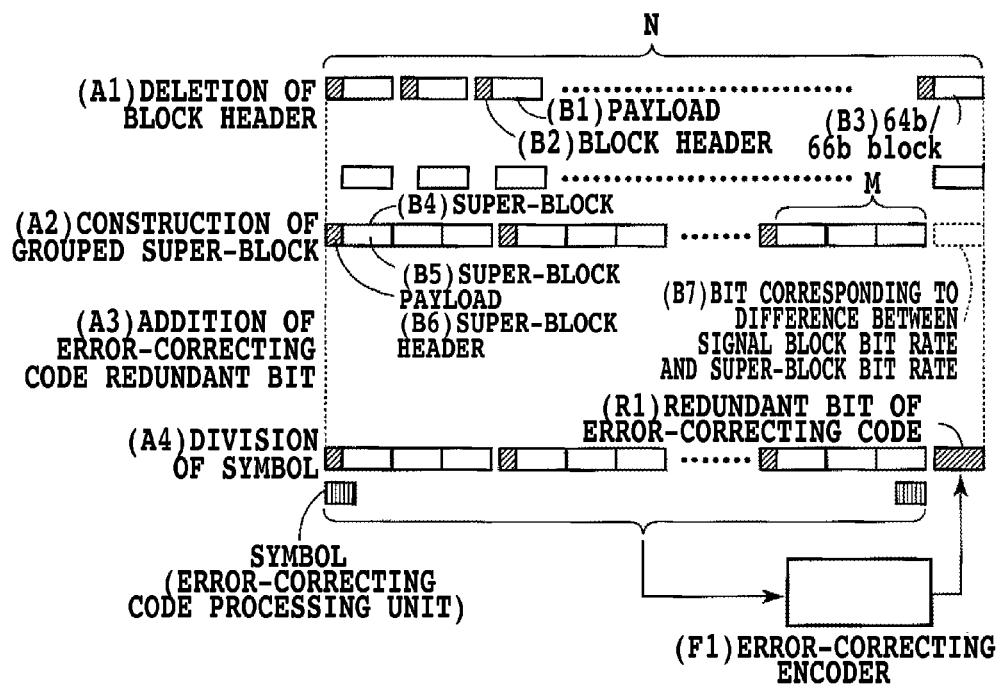
FIG. 44 is a diagram schematically showing the addition of redundant bits for an error-correcting code to a super-block.

With reference to FIG. 44 to FIG. 49, a signal processing method according to the present embodiment will be described which uses a super-block as information bits for an error-correcting code to generate and add redundant bits of the error-correcting code. FIG. 44 is a diagram schematically showing the addition of the redundant bits of the error-correcting code for the super-block. FIG. 45 to FIG. 49 are diagrams schematically showing the configuration of a signal block processing apparatus.

In FIG. 44, a 64B/66B block denoted by B3 corresponds to the signal block denoted by B (Bc, Bd) in FIG. 1. A super-block denoted by B4 corresponds to the super-block denoted by S (Sc, Sd) in FIG. 1. Furthermore, in FIG. 45 to FIG. 49, a sequence of original signal blocks denoted by V1 corresponds to the sequence of signal blocks denoted by B (Bc, Bd) in FIG. 1. Moreover, in FIG. 45 to FIG. 49, V3, V5, V6, and V9 correspond to sequences of super-blocks denoted by S (Sc, Sd) in FIG. 1.

The signal block processing apparatus shown in FIG. 45 to FIG. 49 includes a super-block construction device F3 and an error correction encoder F1. The error correction encoder F1 uses sequences of super-blocks (V3, V5, V6, V9) generated by the super-block construction apparatus F3 as information bits for error-correcting codes to generate redundant bits (R1) of the error-correcting codes. The error correction encoder F1 adds the redundant bits to the sequences of super-blocks and outputs the resultant sequences of super-blocks (V4, V10).

Embodiment 5-1

Figure 45:
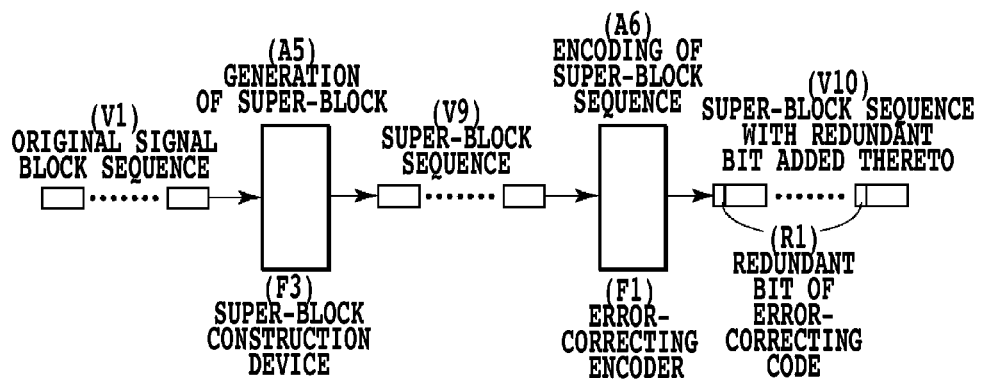
FIG. 45 is a diagram schematically showing the configuration of a signal block processing apparatus according to an embodiment.

As shown in FIGS. 44 and 45, the super-block construction device F3 in the signal block processing apparatus deletes a signal block header B2 from each signal block B3 in the input sequence of signal blocks V1 (the sequence of N signal blocks B3; N is an integer of at least one) (A1). The super-block construction device F3 groups the remaining N signal block payloads B1 to construct a sequence of super-blocks B4 each containing M (M is an integer of at least one and at most N) signal block payloads (A2). This results in bits B7 corresponding to the difference between the bit rate (block size) for signal blocks and the bit rate (block size) for super-blocks. These processes have been described in detail with reference to FIG. 1 to FIG. 6, and repeated descriptions are thus omitted.

The error correction encoder F1 in the signal block processing apparatus uses a super-block as information bits for an error-correcting code to generate redundant bits R1 of the error-correcting code (A4). The error correction encoder F1 can thus use some or all of the bits 7 (an excess band resulting from a reduced bit rate) resulting from construction of the super-block from the signal blocks, for addition of the generated redundant bits R1 of the error-correcting code to output (A3).

More specifically, the error correction encoder F1 divides the input sequence of super-blocks into symbols each composed of at least 1 bit and corresponding to a processing unit for the error-correcting code. The error correction encoder F1 then uses the resulting symbols to calculate the redundant bits R1 of the error-correcting code (A4). The symbol corresponding to the processing unit for the error-correcting code is also called a byte in, for example, Reed-Solomon coding.

For example, if the super-block B4 is a 512B/514B block code (super-block header B6=2 bits and a super-block payload B5=512 bits), N=32, and M=8, then N signal blocks as a whole are composed of 2,112 (=66×32) bits. N/M signal blocks as a whole are composed of 2,056 (514×4) bits. Then, the bits B7 corresponding to an excess band are 56 bits. Thus, the error-correcting coder F1 may include error-correcting codes such that at most 56 redundant bits are generated. For example, the error-correcting codes may be cyclic codes. In this case, the error-correcting coder F1 includes a shift register, a buffer, and a table which are derived from a generator matrix. The error-correcting coder F1 is configured to calculate redundant bits using an input bit sequence (super-block sequence) as an input.

Moreover, different examples of error-correcting codes that can be provided in the error-correcting coder F1 will be described.

Embodiment 5-2

The error-correcting coder F1 may include cyclic Fire codes and shortened cyclic Fire codes as error-correcting codes. In this case, provided that the number of redundant bits based on the error-correcting codes is defined as (r), the number of correctable burst errors is limited to at most (r+1)/3. Thus, a generator polynomial is obtained and applied with setting as the selected number of correctable burst errors is at most (r+1)/3, calculation time is equal to or shorter than a time desired for a system to which arithmetic operations for error-correcting codes are applied, and the code length of the correction code is equal to or larger than the code length of M/N super-blocks.

If the super-block B4 is a 512B/514B block code (super-block header B6=2 bits and a super-block payload B5=512 bits), N=32, and M=8 as in the case of the above-described cyclic codes, then the bits B7 corresponding to an available excess band are 56 bits. In this case, when a generator polynomial $g(x)=(x^{37}+1)\times(19\text{th-order irreducible polynomial})$, a cyclic Fire code is obtained which enables a burst error of length at most 19 bits to be corrected. The cyclic Fire code thus obtained originally has a large code length. Thus, in the present embodiment, the cyclic Fire code is shortened to a code length of 2112 and an information bit length of 2056.

Table 1 shows the relationship between N/M and the number of available redundant bits and the maximum correctable burst error length (expressed as length in the table) and the generator polynomial.

TABLE 1

Correctable burst error length and generator polynomial

| N/M | Redundant bits | length | Example of generator polynomial g (x) |
|---|---|---|---|
| 1 | 14 | 4 | $(x^7 + 1)(x^7 + x^3 + 1)$ |
| 2 | 28 | 9 | $(x^{17} + 1)(x^{11} + x^2 + 1)$ |
| 3 | 42 | 14 | $(x^{27} + 1)(x^{15} + x^{10} + x^5 + x^4 + 1)$ |
| 4 | 56 | 19 | $(x^{37} + 1)(x^{19} + x^{13} + x^8 + x^5 + x^4 + x^3 + 1)$ |
| 5 | 70 | 23 | $(x^{45} + 1)(x^{25} + x^3 + 1)$ |

Embodiment 5-3

Alternatively, the error-correcting coder F1 may include cyclic BCH codes and shortened cyclic BCH codes as error-correcting codes. In this case, the upper limit of the number of correctable random errors is set by the length of information bits and the number of redundant bits. Thus, a generator polynomial is obtained and applied with setting as the selected number of correctable random errors depends on the number of redundant bits (r) of the error-correcting codes, calculation time is equal to or shorter than a time desired for a system to which arithmetic operations for the error-correcting codes are applied, and the code length of the correction code is equal to or larger than the code length of M/N super-blocks.

If the super-block B4 is a 512B/514B block code (super-block header B6=2 bits and a super-block payload B5=512 bits), N=32, and M=8 as in the case of the above-described cyclic codes, then the bits B7 corresponding to an available excess band are 56 bits. In this case, with a Galois field $GF(2^{12})$ taken into account, a BCH code enabling up to 4 bits of errors to be corrected is obtained. The BCH code thus obtained has a large code length. Thus, in the present embodiment, the BCH code is shortened for use.

Table 2 shows the relationship between N/M and the number of available redundant bits and the maximum number of correctable bit errors.

TABLE 2

Maximum number of correctable bit errors

| N/M | Redundant bits | Number of correctable bits |
|---|---|---|
| 1 | 14 | 1 |
| 2 | 28 | 2 |
| 3 | 42 | 3 |
| 4 | 56 | 4 |
| 5 | 70 | 5 |

Embodiment 5-4

Alternatively, the error-correcting coder F1 may include cyclic Reed-Solomon codes and shortened cyclic Reed-Solomon codes as error-correcting codes. In this case, arithmetic Reed-Solomon operations are restricted in terms of the number of contained in one byte ((m) bits) and the maximum number of correctable bytes ((t) bytes). Thus, a generator polynomial is obtained and applied with setting as the selected values of (m) and (t) meet the conditions described below, calculation time is equal to or shorter than a time desired for a system to which arithmetic operations for the error-correcting codes are applied, and the code length of the correction code is equal to or larger than the code length of M/N super-blocks.

First, with robustness against random errors taken into account, the maximum (t) is selected such that r≥2mt. Then, in connection with the selected (t), the maximum (m) is selected such that r≥2mt. However, (m) and (t) are both natural numbers.

If the super-block B4 is a 512B/514B block code (super-block header B6=2 bits and a super-block payload B5=512 bits), N=32, and M=8 as in the case of the above-described cyclic codes, then the bits B7 corresponding to an available excess band are 56 bits. In this case, based on the condition 2mt≤56 and the code length, the condition m≥9 needs to be met. Thus, when t=3 and m=9, a Reed-Solomon code is obtained in which 1 byte is composed of 9 bits and which enables up to 3 bytes to be corrected. The Reed-Solomon code thus obtained has a large code length. Thus, in the present embodiment, the Reed-Solomon code is shortened for use.

Table 3 shows the relationship between N/M and the number of available redundant bits and the preferable values of (m) and (t) meeting the above-described conditions.

TABLE 3

Reed-Solomon and m and t

| N/M | Redundant bits | m | t |
|---|---|---|---|
| 1 | 14 | 7 | 1 |
| 2 | 28 | 8 | 1 |
| 3 | 42 | 8 | 2 |
| 4 | 56 | 9 | 3 |
| 5 | 70 | 11 | 3 |

Embodiment 5-5

Figure 46:
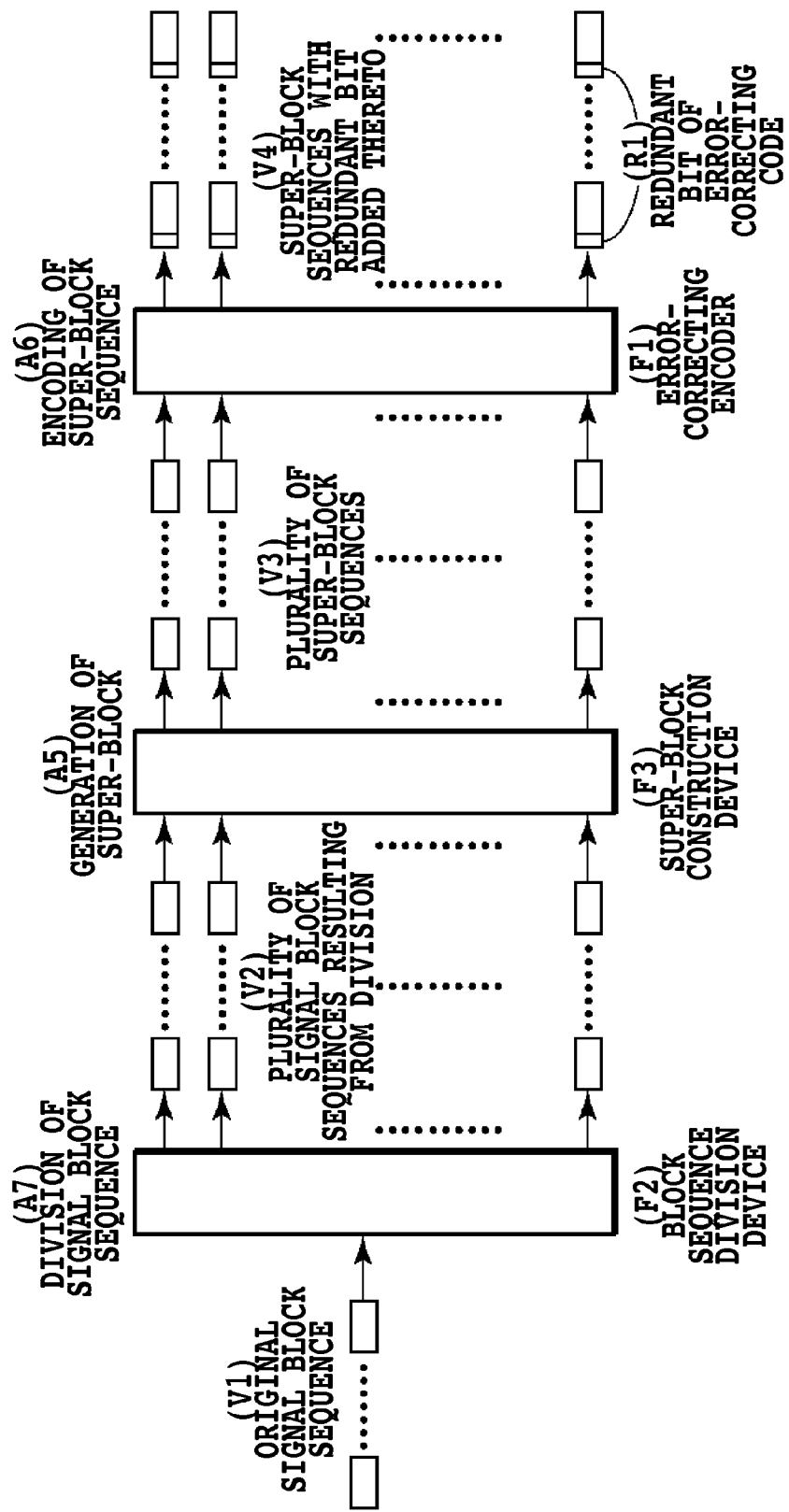
FIG. 46 is a diagram schematically showing the configuration of a signal block processing apparatus according to an embodiment.

The signal block processing apparatus shown in FIG. 46 is different from that shown in FIG. 45 as follows. The signal block processing apparatus shown in FIG. 46 includes a block sequence dividing device F2 configured to divide a sequence of signal blocks V1 into a plurality of signal block sequences V2. Furthermore, the super-block constructing device F3 receives, as an input, the signal block sequences V2 resulting from the division by the block sequence dividing device F2 and outputs a plurality of super-block sequences V3 corresponding to the respective signal block sequences V2. Moreover, the error-correcting coder F1 calculates redundant bits R1 for each of the plurality of super-block sequences V3 and outputs a plurality of super-block sequences V4 with the redundant bits R1 added thereto. The signal block processing apparatus shown in FIG. 46 is preferable for transmitting the input sequence of signal blocks V1 in parallel via a plurality of transmission paths. In this case, the block sequence dividing device F2 is configured to divide the sequence of signal blocks V1 into signal block sequences V2 the number of which corresponds to the number of the transmission paths.

Embodiment 5-6

Figure 47:
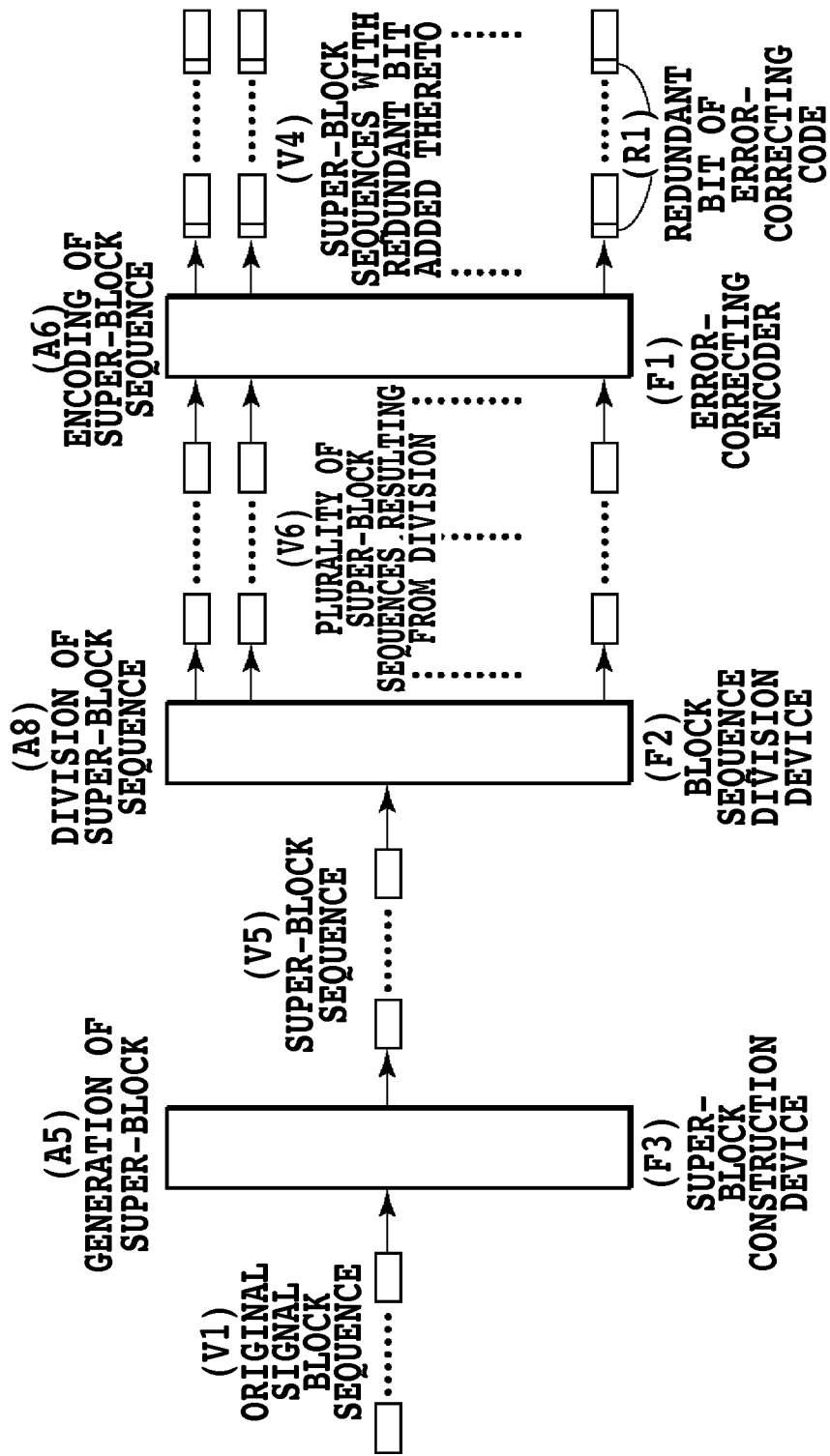
FIG. 47 is a diagram schematically showing the configuration of a signal block processing apparatus according to an embodiment.

The signal block processing apparatus shown in FIG. 47 is different from that shown in FIG. 45 as follows. The signal block processing apparatus shown in FIG. 47 includes a block sequence dividing device F2 configured to divide a sequence of signal blocks V5 generated by the super-block construction device F3 into a plurality of signal block sequences V6. Furthermore, the error-correcting coder F1 calculates redundant bits R1 for each of the plurality of super-block sequences V6 and outputs a plurality of super-block sequences V4 with the redundant bits R1 added thereto. Like the signal block processing apparatus shown in FIG. 46, the signal block processing apparatus shown in FIG. 47 is preferable for transmitting the input sequence of signal blocks V1 in parallel via a plurality of transmission paths.

Embodiment 5-7

Figure 48:
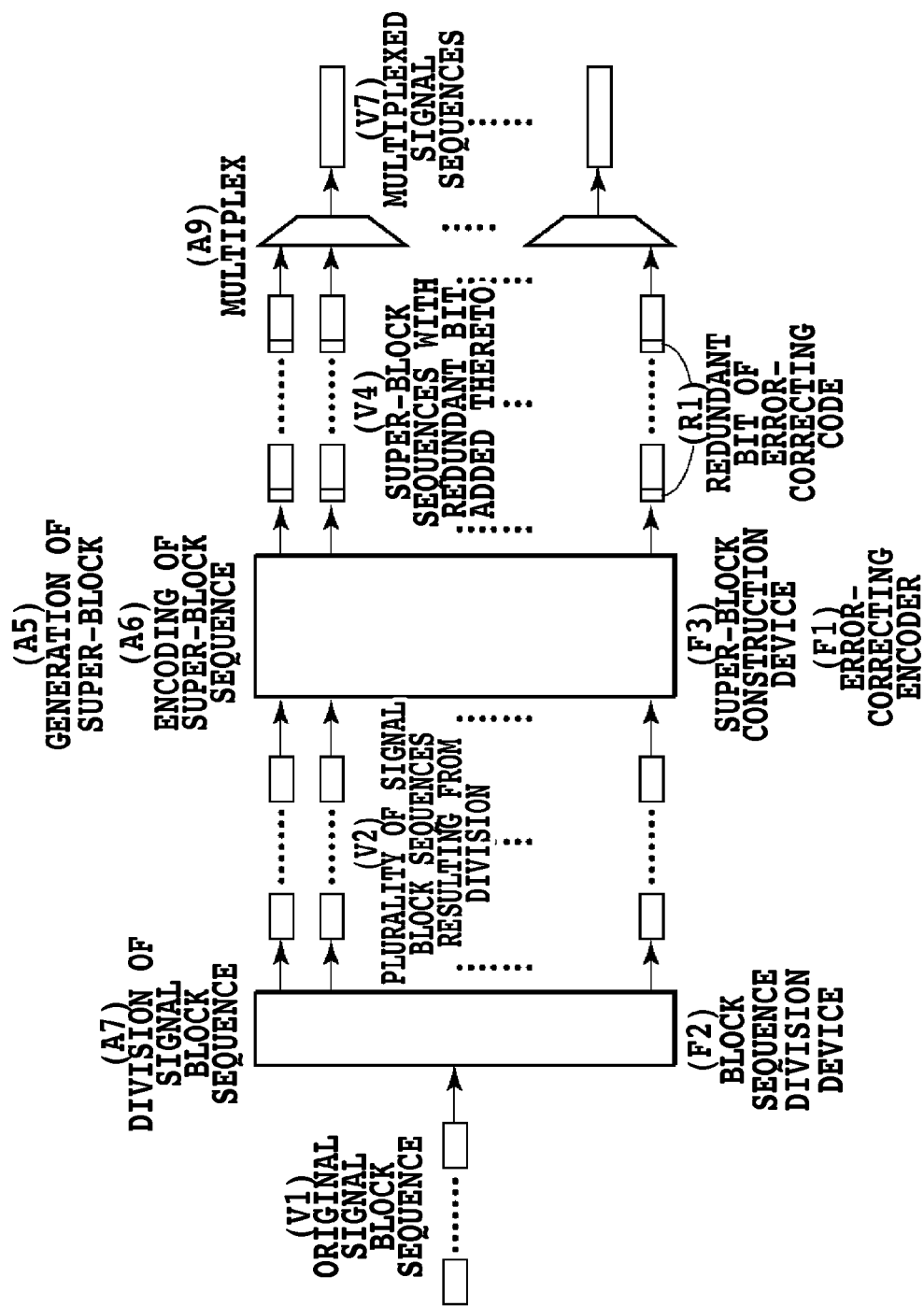
FIG. 48 is a diagram schematically showing the configuration of a signal block processing apparatus according to an embodiment.

The signal block processing apparatus shown in FIG. 48 includes a block sequence dividing device F2 configured to divide a sequence of signal blocks V1 into a plurality of signal block sequences V2, a processing section in which the functions of the super-block construction device F3 and the functions of the error-correcting code F1 are integrated together and which receives, as an input, each of a plurality of signal block sequences V2 and outputs a plurality of super-block sequences V4 with redundant bits added thereto, and one or more multiplexing devices configured to multiplex some or all of the plurality of super-block sequences V4 in any unit (units of bits, bytes (8 bits), or super-blocks). Like the signal block processing apparatus shown in FIG. 46, the signal block processing apparatus shown in FIG. 48 is preferable for transmitting the input sequence of signal blocks V1 in parallel via a plurality of transmission paths.

Embodiment 5-8

The signal block processing apparatus shown in FIG. 49 is different from that shown in FIG. 47 in that the former includes one or more multiplexing devices configured to multiplex some or all of a plurality of super-block sequences V4 output by the error-correcting coder F1 and including redundant bits R1 added thereto, in any unit (units of bits, bytes (8 bits), or super-blocks). Like the signal block processing apparatus shown in FIG. 46, the signal block processing apparatus shown in FIG. 49 is preferable for transmitting the input sequence of signal blocks V1 in parallel via a plurality of transmission paths.

The multiplexing devices shown in FIGS. 48 and 49 can be configured to read and multiplex a predetermined amount of bits from input plural sequences of super-blocks S by, for example, a round method. If a burst error occurs in a transmission path and the signal sequences bit-multiplexed by the receiving side are reconfigured into a plurality of block sequences, the burst error length of each of the block sequences is smaller than the length of the burst error occurring in the transmission path. That is, the multiplexing devices increase the probability of being capable of correcting an errors occurring in the transmission path, using the error-correcting codes.

The signal block sequence processing method carried out on the transmitting side has been described. Carrying out the method in the reverse order allows the receiving side to restore a signal block sequence from a received transmission frame F.

Specifically, the receiving side references the header (the pointer contained at a predetermined position in the header) of the received transmission frame F to extract the first super-block (S) based on the pointer. If a plurality of super-blocks is accommodated in the payloads in the transmission frame F, the succeeding super-block is extracted. If error-correcting codes are used, the receiving side executes an error check and an error correction based on the redundant bits of the error-correcting code applied to the super-block and relating to the super-block sequence.

Moreover, the receiving side references the super-block header (Shc, Shd) of the received super-block (references information indicating whether or not the super-block payloads in the super-block include control block payloads Bc') to determine whether or not the super-block payloads in the super-block include control block payloads Bc'. If the super-block payloads in the super-block include control block payloads Bc', the receiving side places the signal block payloads (Bc', Bd') back at the positions in the group G set before the rearrangement in accordance with the position determination information provided in the control block payloads and a predetermined signal block payload rearrangement rule. Furthermore, the receiving side removes the position determination information from the control block payloads or sets the status of the control block payloads back to the one set before the insertion of the position determination information in accordance with a predetermined rule. If the super-block payloads in the super-block include no control block payload Bc', the receiving side places the data block payloads Bd' back at the positions in the group (G) set before the rearrangement in accordance with the predetermined data block payload rearrangement rule for the group (G). Furthermore, in accordance with the predetermined rule, the receiving side changes the sequence order of the signal block payloads back to the one set before the formation of the signal block payloads into one group. That is, the receiving side rearranges the signal block payloads in the order in which the transmitting side has received the 64B/66B blocks B (the transmitting side has written the 64B/66B blocks B to the memory). Then, the receiving side adds, to each of the signal block payloads, a signal block header (Bch, Bdh) containing information indicating whether the signal block payload is a control block payload in which a control code is contained or a data block payload in which data is contained. The receiving side then outputs the resulting sequence of the signal blocks.

In the above-described embodiment, by way of example, sequences of super-blocks with redundant bits of error-correcting codes added thereto are transmitted via the transmission path. However, the transmission scheme for a sequence of super-blocks with redundant bits of error-correcting codes added thereto is not limited to this aspect.

Furthermore, the present embodiment has been described in association with the first embodiment. However, of course, the present embodiment can be provided for any other embodiment in the specification.

Sixth Embodiment

As described above, according to the present invention, a sequence of signal blocks each composed of a signal block payload and a signal block header is input and processed. The resultant super-block is then output. An embodiment will be described below. According to the embodiment, in a series of processes, signal block headers and a part or the whole of each signal block payload composed only of clock adjusting characters are deleted to reduce the bit rate at which the super-block is transmitted. However, the bit rate at which the super-block is transmitted can also be reduced by deleting only the signal block headers instead of the signal block headers and a part or the whole of each signal block payload composed only of clock adjusting characters. Furthermore, according to the present invention, the input super-block is processed, and the signal blocks on which the super-block is based is output (restored).

An embodiment of the present invention will be described below with reference to the drawings.

FIG. 15 is a diagram schematically showing signal block processing according to the present embodiment. In FIG. 15, an input sequence of signal blocks is denoted by B. A signal block payload in which data is contained is denoted by Bd'. A signal block payload in which a control code is contained is denoted by Bc'. Furthermore, a signal block header for the data block payload Bd' is denoted by Bdh. A signal block header for the control block payload Bc' is denoted by Bch. Moreover, a signal block composed of data block payloads Bd' and a signal block header Bdh is denoted by Bd. A signal block composed of a control block payload Bc' and a signal block header Bch is denoted by Bc. The signal block header (Bch, Bdh) contains information indicating whether the signal block payload is a control block payload Bc' or a data block payload Bd'. The control block payload Bc' contains information Bc0 indicating the type of a control code Bc1 contained in the control block payload Bc'. A signal block Bc_1 is a signal block in which only clock adjusting characters are contained in the control block payloads Bc'.

According to the present embodiment, signal blocks (Bc_1) each containing a signal block payload Bc' composed only of clock adjusting characters are deleted from the input sequence of signal blocks B. Then, the signal block headers (Bch, Bdh) are deleted from each sequence of signal blocks B' corresponding to the sequence of signal blocks B from which the above-described signal blocks have been deleted. A preset number of signal block payloads (Bc', Bd') are formed into one group G. In FIG. 15, groups each formed of eight signal block payloads are denoted by G0 to G7. G3 and G4 each denote the control block payload Bc'.

Moreover, according to the present embodiment, the signal block payloads in the group G are processed (provision of position determination information to the control block payloads and rearrangement of the signal block payloads). The resultant super-block S is then output. Moreover, a plurality of super-blocks S is formed into a group MG composed of the super-block payloads in the super-blocks A. A meta-super-block header MSh generated from the super-block headers Shc of the plurality of super-blocks S is added to the group G. The resultant meta-super-block MS is then output. The meta-super-block MS is accommodated in payloads in a transmission frame F, which is then transmitted. Alternatively, a plurality of meta-super-blocks S are formed into a group MSG, and a synchronization header is provided to the group MSG. The group GS is mapped to the transmission frame F in the form of an ultra-block U, which is then transmitted.

Furthermore, according to the present embodiment, an error-correcting code fec can be generated for the generated super-block or sequence of super-blocks and added to the super-block or sequence of super-blocks to generate a super-block S+ with the error-correcting code fec added thereto, which is then output. Like the super-block S, the super-block S+ is accommodated in the payloads in the transmission frame F in the form of a meta-super-block MS or an ultra-block U, which is then transmitted.

As in the case of the above-described other embodiments, in the description below, an Ethernet MAC (10 Gb/s) signal constructed of 64B/66B block coding is used as an example of the signal block B as required. Furthermore, an ODUk/OPUk (k=1, 2, 3) frame is used as an example of the transmission frame F as required.

Figure 50:
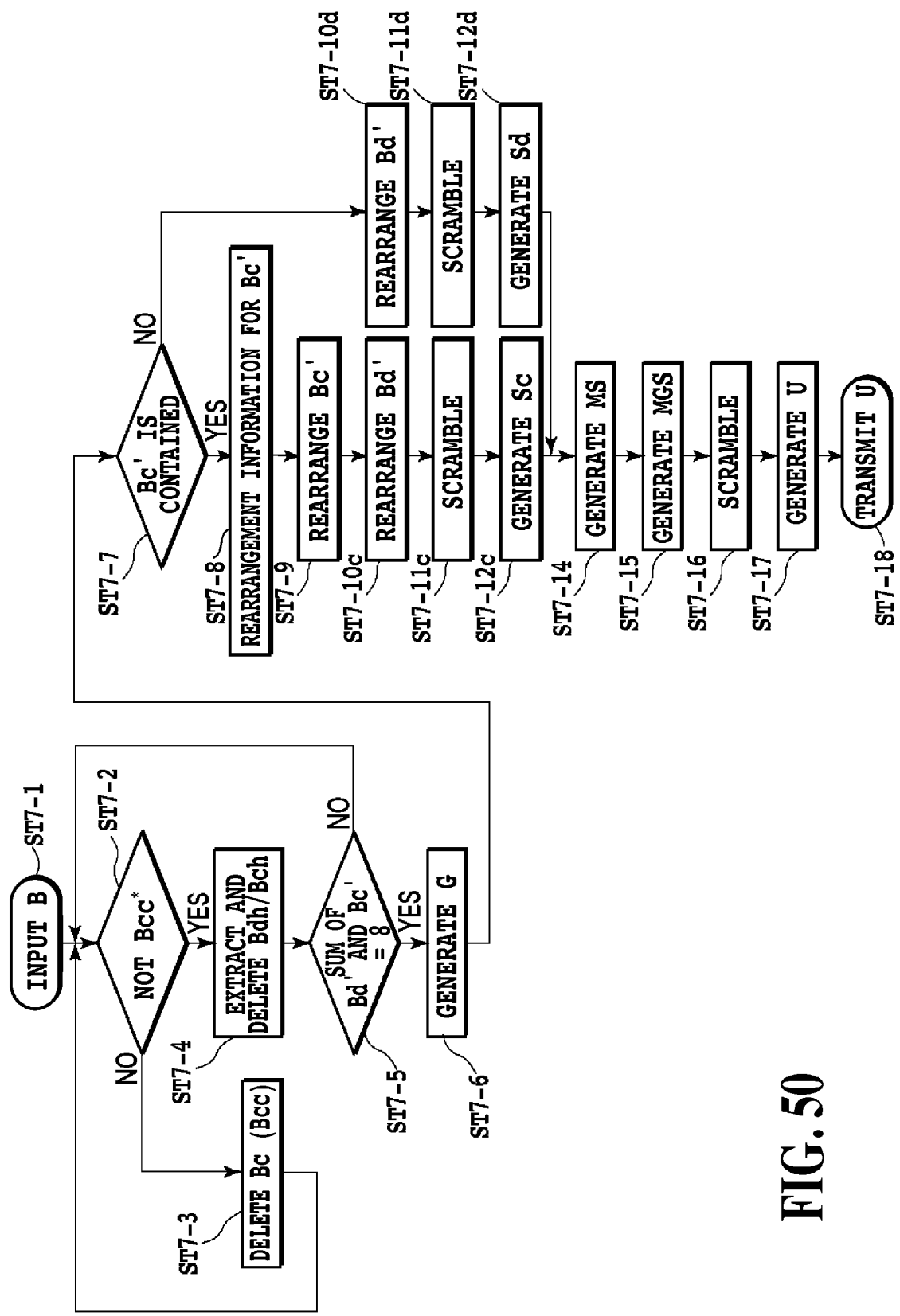
FIG. 50 is a diagram schematically showing the flow of a signal block sequence processing method according to an embodiment.

With reference to FIGS. 15 and 50, an embodiment according to a signal block sequence processing method according to the present invention will be described.

FIG. 50 is a diagram schematically showing the flow of a signal block sequence processing method according to the present embodiment. When the signal block sequence processing method according to the present embodiment starts, a signal processing apparatus included in a signal transmission apparatus receives a sequence of 64B/66B blocks B from a 10G Ethernet apparatus E [FIG. 50: ST7-1]. The received sequence of 64B/66B blocks B is stored in a memory such as a register.

Then, the method references the block type of each of the 64B/66B blocks in the sequence of 64B/66B blocks received in ST7-1 to determine whether or not the 64B/66B block is composed only of clock adjusting characters [FIG. 50: ST7-2]. If the 64B/66B block is a Bcc, the 64B/66B block is deleted [FIG. 50: ST7-3]. If the 64B/66B block is not a Bcc, the signal block header (Bch, Bdh) is deleted to generate signal block payloads (Bd, Bc') [FIG. 50: ST7-4]. In an embodiment in which a super-block is generated by deleting only a signal block header instead of a part or the whole of each signal block payload composed only of clock adjusting characters, ST7-2 and ST7-3 described above are omitted. In the subsequent processing starting with ST7-4, signal blocks Bc with control block payloads Bc' are processed.

Then, every eight of the signal block payloads (Bd' Bc') generated in ST7-4 are formed into a group G [FIG. 50: ST7-6]. If less than eight signal block payloads (Bd', Bc') have been generated, ST7-1 to ST7-4 are repeated. In FIG. 15, G0 to G2 in the group G denote data block payloads Bd', and G3 and G4 denote control block payloads Bc'.

Then, determination of whether or not the generated group G contains control block payloads Bc' is performed [FIG. 50: ST7-7]. If the determination result in that the generated group G contains control block payloads Bc', the control block payloads Bc' (G3, G4) are provided with position determination information allowing determination of the positions of the control block payloads in the sequence of signal blocks B set before the formation of the group G [FIG. 50: ST7-8]. Whether or not the generated group G contains control block payloads Bc' can be determined by referencing the header Bch and/or a block type Bc0 in the control block payload Bc'.

Then, in accordance with a rule (signal block payload rearrangement rule) specifying the rearrangement positions of the data block payloads Bd' and control block payloads Bc' in the group G and predetermined to the receiving side, G3 and G4 are arranged at positions Spc0 and Spc1 in the payloads in the super-block S [FIG. 50: ST7-9]. Subsequently, the data block payloads Bd' (G0 to G2 and G5 to G7) is arranged at Spc2 to Spc7 [FIG. 50: ST7-10c].

On the other hand, upon determining in ST7-5 that the group G contains no control block payloads Bc', the method arranges the data block payloads Bd' at positions Spd0 to Spd7 in the payloads in the super-block S in accordance with a rule (data block payload rearrangement rule) specifying the rearrangement positions of the data block payloads Bd' in the group G and predetermined to the receiving side [FIG. 16: ST2-10d].

Here, after the signal block payloads (Bc', Bd') are arranged at Spc0 to Spc7 (Spd0 to Spd7), the signal block payloads (Bc', Bd') may be constructed of a scramble process predetermined to the receiving side to equalize the bit polarity [FIG. 50: ST7-11c or ST7-11d].

Then, if the group G contains data block payloads Bd' and control block payloads Bc', a header Shc (1 bit: 1) is added to the payloads (Spc0 to Spc7) in the super-block to generate a super-block Sc [FIG. 50: ST7-12c]. On the other hand, if the group G is composed only of data block payloads Bd', a header Shd (1 bit: 0) is added to the payloads (Spc0 to Spc7) to generate a super-block Sd [FIG. 50: ST7-12d].

An error-correcting code fec can be generated from one or more of the super-block S generated in ST2-12c or ST2-12d as described above and can then be added to the super-blocks S.

If an error-correcting code fec is generated for one super-block, the generated fec is applied to the super-block S to newly generate a super-block S+ [FIG. 50: ST7-12]. Here, provided that the number of 64B/66B blocks is the same as that of signal block payloads (data block payloads Bd' or control block payloads Bc') in the super-block S+ and the length (bit number) of the 64B/64B blocks is the same as that of the signal block payloads, high error-robustness (high redundant) transmission is possible in spite of the same bit rate (clock rate) as that at which the 64B/66B block sequence is directly transmitted.

If an error-correcting code fec is generated for (n) super-blocks S ($S_0$ to $S_{n-1}$), the generated fec is applied to one of the super-blocks S, that is, the super-block $S_{n+1}$, to generate $S+_{n+1}$ [FIG. 50: ST7-12].

Then, a group MS is generated from a plurality of (for example, four) super-block sequences S or a plurality of super-blocks S+ generated in ST7-12c or ST7-12d [FIG. 50: ST7-15]. Moreover, a group MSG is generated from a plurality of meta-super-blocks MS [FIG. 50: ST7-15]. The group MSG may be constructed of the scramble process predetermined to the receiving side to equalize the bit polarity (MSG) [FIG. 50: ST7-16]. The generation of the meta-super-block S will be described below.

The generated meta-super-block MS may be directly output or sequentially mapped to an ODUk/OPUk frame, which is then output. If the meta-super-block MS is sequentially mapped to the ODUk/OPUk frame for output, a pointer (p) indicating the position of one of the meta-super-blocks MS which has the first appearing header (if meta-super-blocks MS0 to MS43 are mapped to the ODUk/OPUk frame, the pointer in the header (MSh) of the meta-super-block MS0) is referenced and contained at a particular position in the ODUk/OPUk frame. If a plurality of meta-super-blocks MS are multiplexed and the multiplexed meta-super-blocks MS are mapped to the payloads in the ODUk/OPUk frame, pointers allowing the multiplexed meta-super-blocks MS to be identified are generated and contained. Thus, the receiving side can easily extract the meta-super-blocks MS from the ODUk/OPUk frame.

Moreover, an ultra-block header Uh is added to the group MSG to generate an ultra-block U [FIG. 50: ST7-17]. The ultra-block U is then output [FIG. 50: ST7-18]. The ultra-block header Uh may be, for example, a 2-bit bit sequence providing the receiving side with synchronization information. The generated ultra-block U may be constructed of the scramble process predetermined to the receiving side to equalize the bit polarity. Furthermore, an error-correcting code may be generated from one or more generated ultra-blocks U and added to the ultra-blocks U, which are then output.

In the present embodiment, an example of the signal block payload rearrangement rule is as follows. If the group G contains control block payloads Bc', the control block payloads Bc' (signal block payloads arranged at the positions G3 and G4 in the super-block) are always rearranged consecutively from a predetermined position (consecutively in order of Spc0, Spc1, . . . ), and the data block payloads Bd' are then rearranged at positions where no control block payload Bc' is present with the sequence order of the data block payloads Bd' maintained (that is, with the sequence order of G0, G1, G2, G5, G6, and G7 maintained). In view of the easiness with which the receiving side can extract the control block payloads Bc' from the super-block, this example is more preferable. However, the present invention can be implemented according to any other example.

For example, the signal block payload rearrangement rule may be specified as follows. After the control block payloads Bc' (the signal block payloads arranged at the positions G3 and G4 in the super-block) are always consecutively rearranged at every other position (Spc0, Spc2, Spc4, and Spc6; if the group G contains at least five control codes, then the control block payloads Bc' are arranged at Spc1, Spc3, Spc5, and Spc7 in this order, following Spc6), the data block payloads Bd' are rearranged at positions where no control block payload Bc' is present with the sequence order of the data block payloads Bd' maintained (that is, with the sequence order of G0, G1, G2, G5, G6, and G7 maintained). Alternatively, the signal block payload rearrangement rule may be specified as follows. After the control block payloads Bc' are consecutively rearranged at Spc0 and Spc1 in this order, the data block payloads Bd' are rearranged at positions where no control block payload Bc' is present (Spc2 to Spc7) with the sequence order of the data block payloads Bd' maintained (that is, with the sequence order of G0, G1, G2, G5, G6, and G7 maintained).

On the other hand, an example of the data block payload arrangement rule may be specified as follows. If the group G contains no control block payload Bc', the data block payloads Bd' are rearranged at the positions Spd0 to Spd7 with the sequence order thereof maintained (that is, with the sequence order of G0, G1, G2, G3, G4, G5, G6, and G7 maintained). In view of the easiness with which the receiving side can restore the signal blocks, this example is more preferable. However, the present invention can be implemented according to any other example.

For example, the data block payload rearrangement rule may be specified such that the data block payloads Bd' are rearranged at Spd0 to Spd7 with the sequence order thereof reversed (that is, in order of G7, G6, G5, G4, G3, G2, G1, and G0). Alternatively, the data block payload rearrangement rule may be specified such that the data block payloads Bd' are always arranged consecutively at every other position from a predetermined position (that is, at Spd0, Spd2, Spd4, Spd6, Spd1, Spd3, Spd5, and Spd7 in this order).

The signal block sequence processing method on the transmitting side has been described. By carrying out the signal block processing sequence processing method in the reverse order, the receiving side can restore a sequence of signal blocks B from a received transmission frame F.

Now, the generation of a meta-super-block S and an ultra-block U will be described in detail with reference to FIG. 52 to FIGS. 55A, 55B, and 55C.

Figure 52:
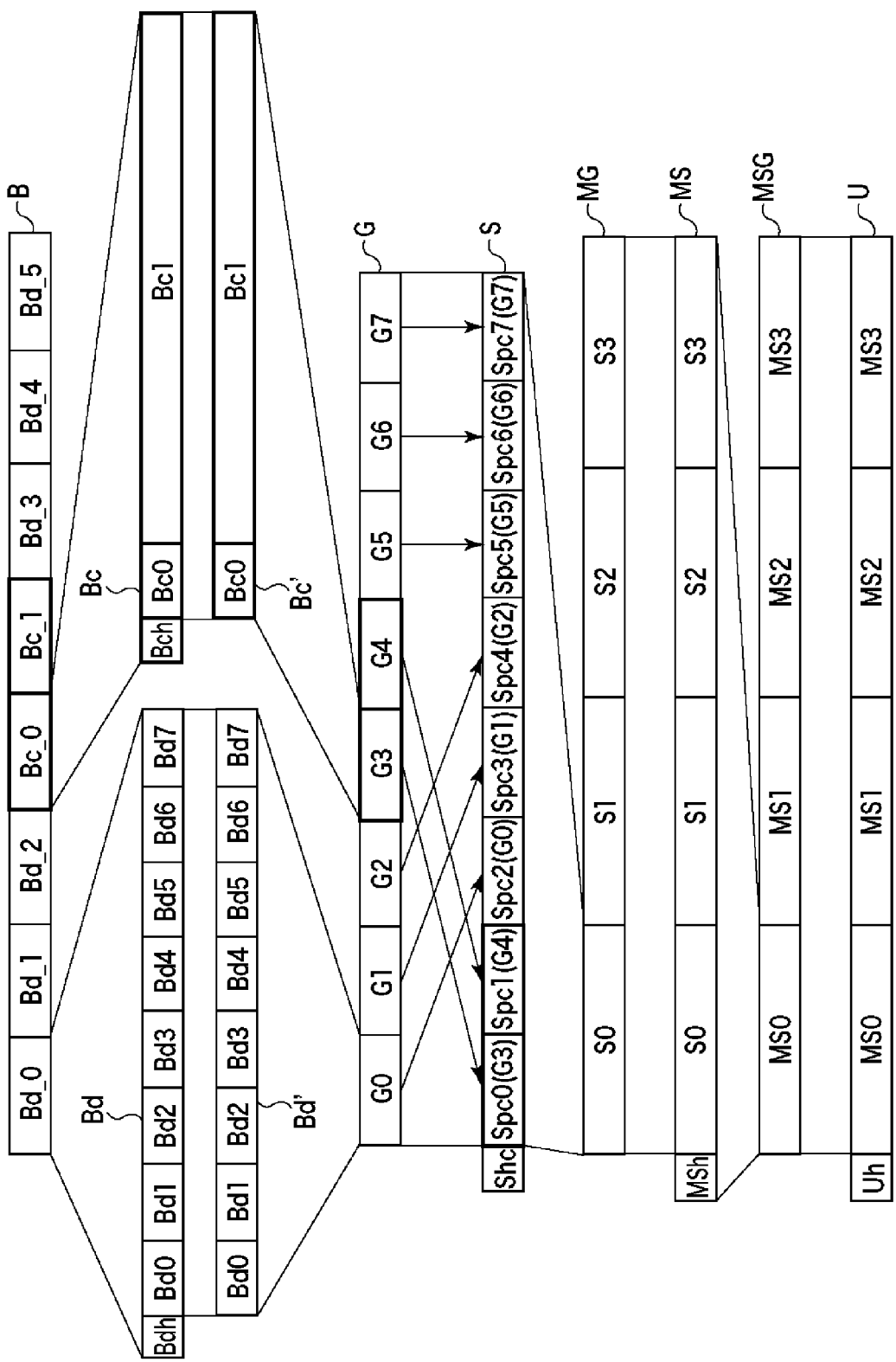
FIG. 52 is a diagram schematically showing how signal blocks are processed according to an embodiment.

FIG. 52 is a diagram schematically showing how signal block processing is executed. FIG. 52 includes a part of FIG. 15 and shows the relationship between a super-block S and a meta-super-block MS and the relationship between the meta-super-block MS and an ultra-block U. In FIG. 52, the meta-super-block MS contains a group MG into which the payloads S0 to S3 of a preset number of (for example, four) super-blocks are formed, and a meta-super-block header HSh generated based on the headers of a preset number of super-blocks and containing group configuration information. The ultra-block U contains MSG into which a preset number of (for example, four) meta-super-blocks MS0 to MS3 are formed, and an ultra-block header Uh.

Figure 53:
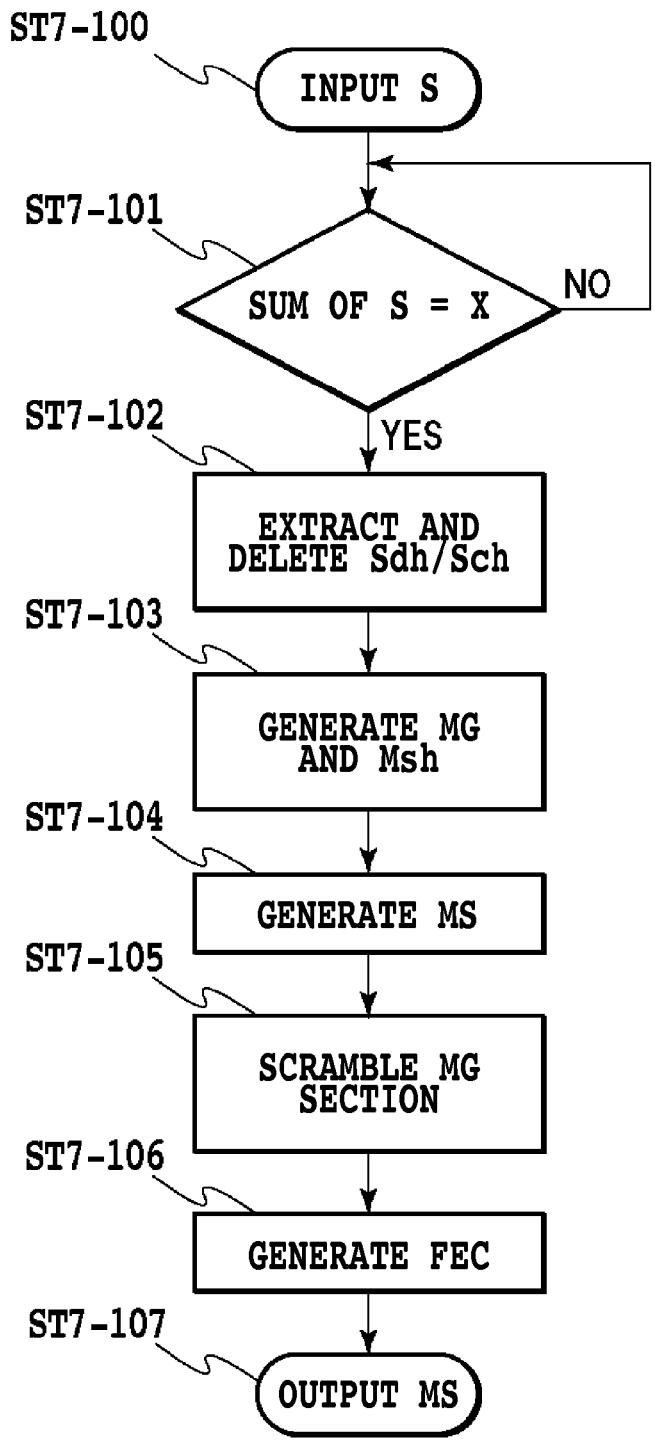
FIG. 53 is a diagram schematically showing the flow of a method for generating a meta-super-block according to an embodiment.

FIG. 53 is a diagram schematically showing the flow of generation of a meta-super-block MS according to the present embodiment. When the method for generating a meta-super-block MS as shown in FIG. 53 starts, the super-block S generated in ST7-12 (FIG. 50) is received [FIG. 53: ST7-100]. Determination of whether or not a predetermined number X (for example, four) of super-blocks S have been received is performed [FIG. 53: ST7-101]. Super-block headers (Sdh, Sch) are then extracted and deleted from the X super-blocks (S0 to S3 in FIG. 52). The payloads of the X super-blocks are then formed into a group MG. Furthermore, based on the extracted super-block headers, a meta-super-block header MSh is generated [FIG. 53: ST7-103]. The generated meta-super-block header MSh is added to the group MG to generate a meta-super-block MS [FIG. 53: ST7-104]. The meta-super-block MS is then output [FIG. 53: ST7-104]. The output meta-super-block MS is supplied to ST7-15 (FIG. 50). Furthermore, before the output of the meta-super-block MS, a scramble process predetermined to the receiving side may be executed on the group MG to equalize the bit polarity [FIG. 53: ST7-105]. Alternatively, an error-correcting code FEC may be generated for one or more meta-super-blocks MS and added to the meta-super-blocks MS [FIG. 53: ST7-106].

The meta-super-block header MSh generated in ST7-103 contains information depending on the configuration (sequence order) of the group MG of super-block payloads. The structure information on the group MG may be a type value obtained by coding the sequence order of the super-block payloads.

FIGS. 55A, 55B, and 55C show examples of the type value. The type value shown in FIGS. 55A, 55B, and 55C is configured to have a Humming distance of 2 between type values. Furthermore, the type value shown in FIGS. 55A, 55B, and 55C is configured to be able to be used as synchronization information allowing detection of synchronization of meta-super-blocks upon reception of the meta-super-blocks. Moreover, each of the tables in FIGS. 55A, 55B, and 55C shows two classes. The type value may be selected from one of the two classes or from both classes. Alternatively, the type value may be alternately selected from the two classes so as to average the number of times that the bit polarity (0 or 1) appears during a unit time, for example, one second. In the present embodiment (X=4), the meta-super-block header MSh is composed of at least 5 bits (see the table in FIG. 55C). For example, if one group MG is composed of three consecutive super-block payloads each containing a control code followed by one super-block payload containing no control code, "01010" or "10101" is selected from the table in FIG. 55C and added to the group MG as a meta-super-block header MSh. The meta-super-block MS is then output [FIG. 53: ST7-107].

A super-block S+ may be used instead of the generated super-block S. Furthermore, the following configuration is possible. Without the need to receive super-blocks with the super-block header Shc added thereto, super-block payloads are formed into a group MG, and a meta-super-block header MSh is added to the group MG to generate (output) a meta-super-block MS. For example, processor processing may be executed by referencing a memory or the like in which the status observed after the processing in step ST7-10*c* or ST7-10*d* (or ST7-12*c* or ST7-12*d*) in FIG. 50 is stored so that the meta-super-block MS can be generated (output) directly from the signal block payloads.

Figure 54:
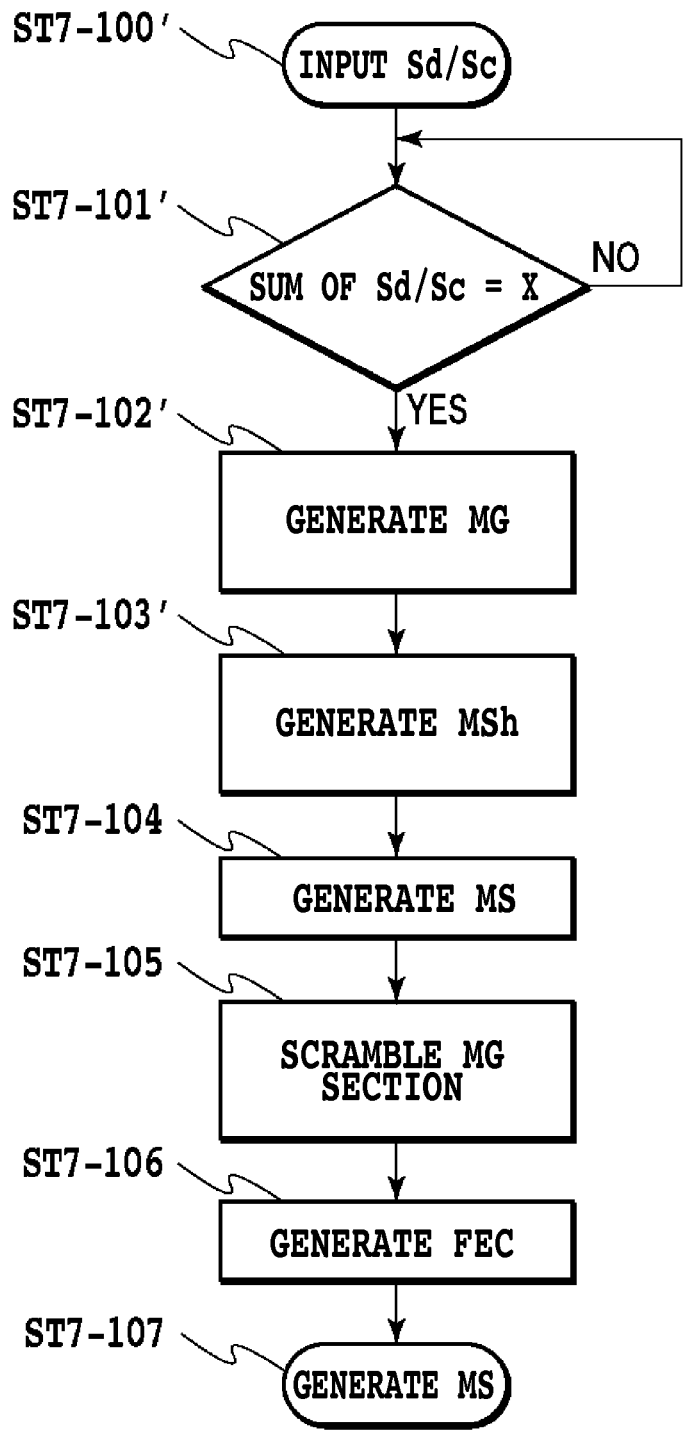
FIG. 54 is a diagram schematically showing the flow of a method for generating a meta-super-block according to an embodiment.

FIG. 54 is a diagram schematically showing the flow of generation of a meta-super-block MS according to the present embodiment which is different from the method for generating a meta-super-block MS as shown in FIG. 53. When the method for generating a meta-super-block MS as shown in FIG. 54 starts, the payload Sd or Sc of the super-block S generated in ST7-12 (FIG. 50) is received [FIG. 54: ST7-100']. Determination of whether or not the payloads Sd or Sc of a predetermined number X (for example, four) of super-blocks S have been received is performed [FIG. 54: ST7-101']. The payloads of the X super-blocks are then formed into a group MG [FIG. 54: ST7-102']. A meta-super-block header MSh is then generated by referencing super-block headers stored in a memory or the like and corresponding to the input X super-blocks [FIG. 54: ST7-103']. Thereafter, as is the case with the method shown in FIG. 53, the generated meta-super-block header MSh is added to the group MG to generate a meta-super-block MS [FIG. 54: ST7-104']. The meta-super-block MS is then output [FIG. 54: ST7-104']. The output meta-super-block MS is supplied to ST7-15 (FIG. 50). Furthermore, before the output of the meta-super-block MS, the scramble process predetermined to the receiving side may be executed on the group MG to equalize the bit polarity [FIG. 54: ST7-105']. Alternatively, an error-correcting code FEC may be generated for one or more meta-super-blocks MS and added to the meta-super-blocks MS [FIG. 54: ST7-106'].

A super-block S+ may be used instead of the generated super-block S. Furthermore, as described above, the following configuration is possible. Without the need to receive super-blocks with the super-block header Shc added thereto, super-block payloads are formed into a group MG, and a meta-super-block header MSh is added to the group MG to generate (output) a meta-super-block MS.

Now, a method for restoring a sequence of signal blocks B on the receiving side will be described with reference to FIG. 17 to FIG. 19. FIG. 17 is a diagram schematically showing the flow of a signal block sequence processing method according to the present embodiment.

As shown in FIG. 17, if an ultra-block is accommodated in a transmission frame F, then, first, an ultra-block header is extracted from the ultra-block. Then, a plurality of meta-super-blocks MS are extracted from the succeeding ultra-block [FIG. 17: RT2-1]. If no ultra-block is accommodated in the transmission frame F, the header (a pointer contained at a predetermined position in the header) of the received transmission frame F is referenced, and the first meta-super-block is extracted based on the pointer. If a plurality of meta-superblocks MS are accommodated in payloads in the transmission frame F, the succeeding meta-super-block MS is extracted.

Moreover, with reference to the header MSh (group configuration information) of the meta-super-block MS, the super-block payloads S0 to S3 are extracted from the meta-super-block MS. Furthermore, the deleted super-block header (Bdh or Bch) is restored. Thus, the super-block S can be restored. For example, the following procedure is possible. The tables shown in FIGS. 55A, 55B, and 55C are compared with the type value contained in the header MSh to establish synchronization of the meta-super-blocks. The super-block payloads S0 to S3 are extracted. The type of each of the super-block payloads S0 to S3 is determined. The deleted super-block header (Bdh or Bch) is then restored.

Then, the procedure of generating an ultra-block on the transmission frame is carried out in the reverse order, that is, from ST7-12 to ST7-4 shown in FIG. 50. Thereafter, a sequence of 64B/66B blocks B' is decoded from which 64B/66B blocks Bcc each composed only of clock adjusting characters have been deleted [FIG. 17: RT2-2].

If error-correcting codes are used, an error check and an error correction are performed based on the error-correcting code for the ultra-block or super-block (sequence) applied to the ultra-block or super-block. Furthermore, if a scrambling process is used, a descrambling process is executed.

Then, the method references the super-block header (Shc, Shd) of the restored super-block (references information indicating whether or not the super-block payloads in the super-block include control block payloads Bc') to determine whether or not the super-block payloads in the super-block include control block payloads Bc'. If the super-block payloads in the super-block include control block payloads Bc', the signal block payloads (Bc', Bd') are placed back at the positions in the group G set before the rearrangement in accordance with the position determination information provided in the control block payloads and a predetermined signal block payload rearrangement rule. Furthermore, the position determination information is removed from the control block payloads or the status of the control block payloads is set back to the one set before the insertion of the position determination information in accordance with a predetermined rule. If the super-block payloads in the super-block include no control block payload Bc', the data block payloads Bd' are placed back at the positions in the group (G) set before the rearrangement in accordance with the predetermined data block payload rearrangement rule for the group (G). Furthermore, in accordance with the predetermined rule, the sequence order of the signal block payloads is changed back to the one set before the formation of the signal block payloads into one group. Then, a signal block header (Bch, Bdh) is added to each of the signal block payloads; the signal block header (Bch, Bdh) contains information indicating whether the signal block payload is a control block payload in which a control code is contained or a data block payloads Bd' in which data is contained. The sequence of 64B/66B blocks B' from which the 64B/66B blocks Bcc have been deleted is decoded.

Then, the method uses the block type values of two consecutive control blocks Bc in the sequence of 64B/66B block B' as shown in FIG. 18 to determine whether or not the transmitting side has deleted the 64B/66B blocks Bcc composed only of clock adjusting characters from the two control blocks Bc [FIG. 17: RT2-3].

FIG. 19 is a table showing an example of a condition A for a combination of the block type values of two consecutive control block payloads Bc. If the combination of block type values corresponds to any of the patterns 1 to 16, a control block payload corresponding to the 64B/66B block Bcc composed only of clock adjusting characters is inserted between the two control blocks Bc [FIG. 17: RT2-4]. The sequence of signal blocks input by the transmitting side is decoded [FIG. 17: RT2-5] and then output [FIG. 17: RT2-6].

If the transmitting side avoids deleting a part or the whole of each signal block payload composed only of clock adjusting characters, the method determines in RT2-3 that the transmitting side has avoided deleting a part or the whole of each signal block payload composed only of clock adjusting characters. Thus, RT2-4 is omitted.

The embodiment has been described in which the 64B/66B block Bcc composed only of clock adjusting characters is deleted with reference to the block type.

An embodiment in which a part of the 64B/66B block Bcc is deleted will be described with reference to FIGS. 20A, 20B, and 21.

FIG. 20A is a diagram showing control codes in the control block payloads Bc' of two signal blocks Bc in an input sequence of signal blocks B, in accordance with the concept of lanes and columns for a parallel common interface XGMII. FIG. 20B is a diagram schematically showing that parts (/I/) of the control block payloads Bc' are deleted and reconfigured to one signal block Bc %. FIG. 21 is a diagram schematically showing the flow of deletion of a part of the 64B/66B block Bcc.

First, an optical-signal transmission apparatus receives a sequence of 64B/66B blocks B from a 10G Ethernet apparatus E [FIG. 21: ST2-1]. The received sequence of 64B/66B blocks B is stored in a memory such as a register.

Then, each of the 64B/66B blocks in the sequence of 64B/66B blocks received in ST2-1 is partitioned into lanes and columns [FIG. 21: ST2-1α]. In FIG. 20A, each column is expressed as a set (#1 to #4) of 4 bites orthogonal to four lanes (lanes 0 to 3).

Then, the process determines whether or not each column is composed only of clock adjusting characters (/I/) [FIG. 21: ST2-1β]. If the column is composed only of clock adjusting characters (/I/) (idle column), the column (columns #2 and #3 in FIG. 20A) is deleted [FIG. 21: ST2-1γ].

Then, the remaining columns (columns #1 and #4 in FIG. 20B) resulting from the deletion of the columns composed only of clock adjusting characters are reconfigured to a new signal block Bc %. Thus, the resultant sequence of 64B/66B blocks B' contains the signal block Bc % [FIG. 21: ST2-1δ]. Moreover, the signal block headers (Bch, Bdh) are deleted to generate signal block payloads (Bd', Bc') [FIG. 21: ST2-4 and FIG. 50: ST7-4].

In the example described with reference to FIGS. 20A, 20B, and 21, the control codes in the two signal block Bc are partitioned into lanes and columns, and the idle columns composed only of clock adjusting characters are deleted and reconfigured to one signal block Bc %. However, as shown in FIGS. 22A, 22B, and 22C, one or more signal blocks B (Bc, Bd) may be partitioned into lanes and columns, and the idle columns may be deleted and reconfigured to one or more signal blocks B % (Bc %, Bd %).

FIG. 22A shows that the signal blocks Bd_0 to Bd_2, Bc_0, Bc_1, Bd_3 to Bd_6 are partitioned into lanes and columns and a part of the idle columns contained in Bc_0 and Bc_1 (the idle columns contained in Bc_1) is deleted. Furthermore, FIG. 22B shows that the remaining part of Bc_1 and a part of Bd_3 are reconfigured to a signal block Bc %_13, whereas the remaining part of Bc_3 and a part of Bd_4 are reconfigured to a signal block Bc %_34.

Now, how the receiving side performs decoding if the transmitting side has deleted a part of the 64B/66B block Bcc will be described with reference to FIGS. 23A, 23B, 24A, and 24B. FIG. 23A is a diagram showing the control code in the 64B/66B block Bc % in the sequence of 64B/66B blocks B' in accordance with the concept of lanes and columns for a parallel common interface XGMII. FIG. 23B is a diagram schematically showing that (/I/) is inserted between columns of the control block payload Bc % to re-block the control block payload Bc % into two signal blocks Bc. FIG. 24A is a diagram schematically showing the flow of decoding of a deleted part of a signal block Bc. FIG. 24B is a diagram schematically showing a condition for determining whether or not the transmitting side has deleted columns (idle columns) composed only of clock adjusting characters.

As shown in FIG. 24A, the procedure in which the transmitting side generates an ultra-block is carried out in the reverse order. When the procedure starts, the sequence of 64B/66B blocks B' decoded in RT2-2 (FIG. 17) described above is obtained. Then, each of the 64B/66B blocks in the sequence of 64B/66B blocks B' is partitioned into lanes and columns [FIG. 24A: RT2-2α].

Then, the process uses a combination of consecutive columns to determine whether or not the transmitting side has deleted columns (idle columns) composed only of clock adjusting characters [FIG. 24A: RT2-2β]. As shown in FIG. 24B, a "terminal character /T/" is present in the first of the consecutive columns and a "start character /S" is present in the second column, idle columns are inserted between the two columns [FIG. 24A: TR2γ]. The number of idle columns to be inserted is determined based on a given condition, for example, the number is between 9 and 15 so that the number of idle characters /I/ including the terminal character /T/ is 12 on an average.

After the insertion of the idle columns, the resulting columns are reconfigured to a signal block B [FIG. 24A: RT2-2δ]. The sequence of signal blocks B input by the transmitting side is thus decoded and output [FIGS. 24A and 17: RT2-6]. In the above-described example in FIGS. 23A and 23B, and 24A and 24B, the control code in one signal block Bc % is partitioned into lanes and columns, idle columns are inserted between the columns in the control code, and the resulting columns are reconfigured to two signal block Bc. However, the following procedure is possible. One or more signal blocks B % (Bc %, Bd %) are partitioned into lanes and columns, idle columns are inserted between the columns in the signal blocks B %, and the resulting columns are reconfigured to one or more signal blocks B (Bc, Bd).

FIG. 22C shows that the receiving side receives a block sequence containing signal blocs Bc %_13, Bc %_34, Bc %_45, and Bd %_56 resulting from reconfiguring by the transmitting side as shown in FIG. 22B, and inserts idle columns into Bc %_13 to restore a sequence of signal blocks B.

For example, a column with the "start character /S/" (for example, #10 in FIG. 22B) may be detected, and idle characters the number of which allows the number of idle characters /I/ contained in the columns preceding the detected column to be set to a predetermined value (for example, the average value) are inserted into the column. Thus, the signal blocks B (for example, Bc_1, Bd_3) can be restored. Furthermore, the remaining columns can be used to further restore other signal blocks B (for example, Bc_4 to Bc_6).

Now, a method for providing the control block payloads Bc' with position determination information [FIG. 50: ST7-8] will be described with reference to FIG. 25. FIG. 25 is a table showing the relationship between 15 types (#1 to #15) of control block formats and a block type value (block type 1) indicating which of these types the control block format belongs and a block type value (block type 2) coded so as to maximize the Humming distance between particular block types and which is provided to each control block payload together with position determination information; the control block format types and the block type 1 are specified in FIG. 49-7 in Non-Patent Document 1.

In the present embodiment, position determination information on each of G3 and G4 can be contained by changing the block type Bc0 of the control code contained in the corresponding signal block Bc'. For example, if the block type Bc0 is composed of 8 bits, the position determination information is contained using ph0 (4 bits) contained in the block type Bc0. Specifically, 3 bits of the 4 bits are used to contain information indicating the position of the control block payload in the sequence of signal blocks B set before formation into the group G. The remaining 1 bit is used to contain information indicating whether or not the succeeding signal block is a control block payload Bc'.

The remaining 4 bits in the block type Bc0, which are different from the 4 bits in which position determination information is contained, are used to contain information indicating one of the 15 types corresponding to the control block Bc1 contained in the control block payload Bc'.

A bit error may prevent the terminal position of an Ethernet frame from being communicated to the higher layer (MAC: Media Access Control layer). In this case, the Ethernet frame may fail to be distinguished from the next frame. As a result, both frames may be discarded or transferred to another Ethernet apparatus with the error uncorrected. This results from replacement of a control block (which conforms to one of the control block formats #8 to #15) containing a control character Tj indicative of the terminal position.

Thus, in the present embodiment, when the 8-bit block type value (block type 1) indicative of one of the 15 types of control codes is coded into a 4-bit block type value (block type 2), control blocks each containing the control character Tj indicative of the terminal position are coded using a combination of 4 bits which allows all the Humming distances to be set to at least 2. Thus, even if a 1-bit error occurs in the 4-bit block type value (block type 2), the corresponding control blocks are determined to be different from those which contain the control character Tj indicative of the terminal position (#8 to #15 in FIG. 25) (see, for example, Non-Patent Document 6).

Now, mapping of an output sequence of meta-super-blocks MS or ultra-blocks U to an ODUk/OPUk frame will be described. As described above, the output sequence of meta-super-blocks MS or ultra-blocks U can be sequentially mapped to the payloads in the ODUk/OPUk frame. Furthermore, the blocks can be mapped to a particular area predetermined to the receiving side and including the header area of the ODUk/OPUk frame. FIG. 26 shows that a part of the $j^{th}$ one of the plurality of ultra-blocks U to be mapped to the ODUk/OPUk frame is mapped to the header area (Fh) of the ODUk/OPUk frame, whereas the other ultra-blocks U are mapped to the payload area (Fp) of the ODUk/OPUk frame. The receiving side can sequentially extract plural sequences of meta-super-blocks MS or ultra-blocks U from the predetermined, particular area of the ODUk/OPUk frame.

A plurality of super-blocks S (S+) formed into one meta-super-block MA may be generated by processing a sequence of signal blocks from the same source (Ethernet apparatus E) or input by a plurality of sources (Ethernet apparatuses).

Figure 51A:
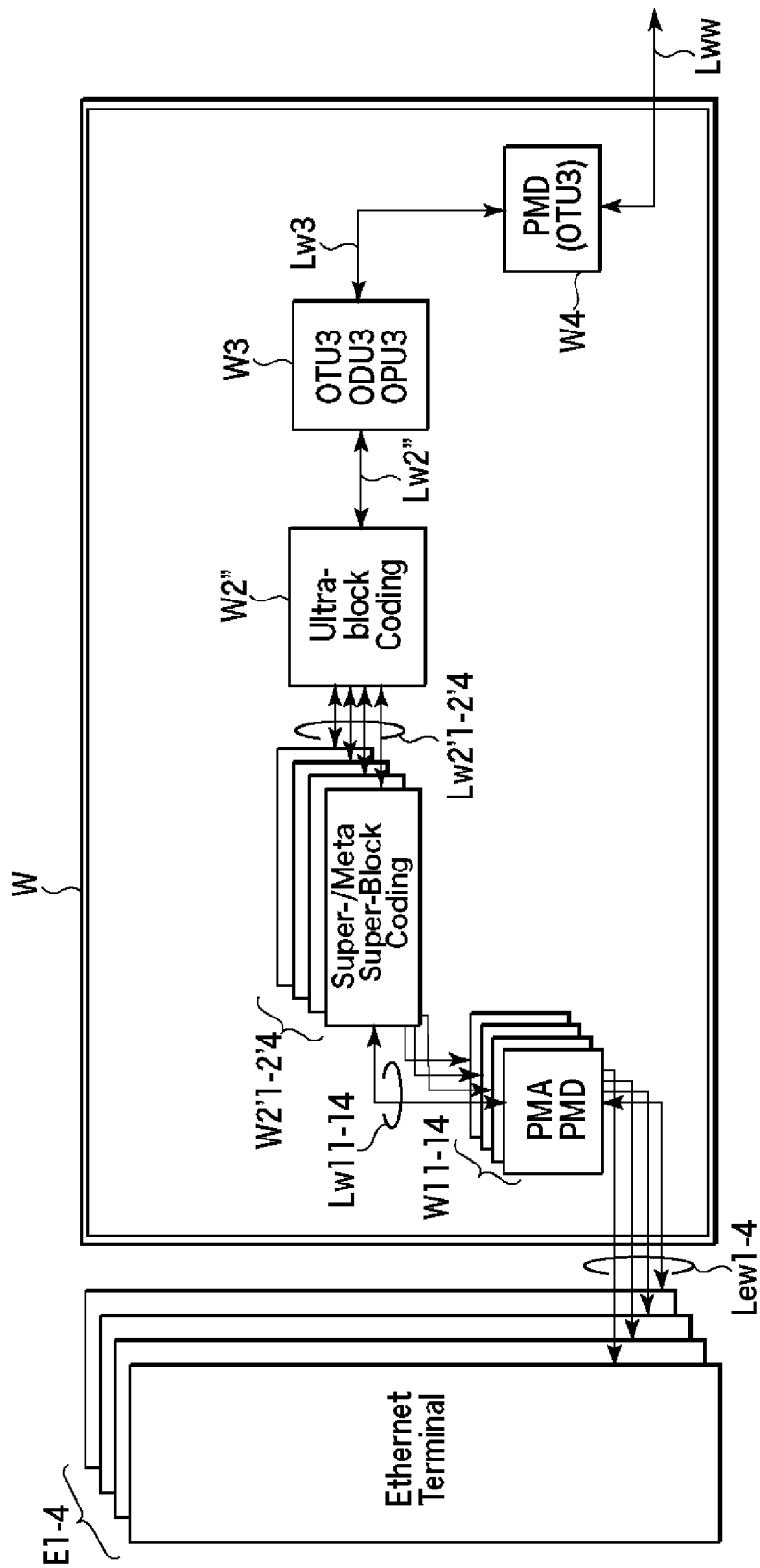
FIG. 51A is a diagram of the configuration of an optical-signal transmission and reception apparatus according to an embodiment.
Figure 51B:
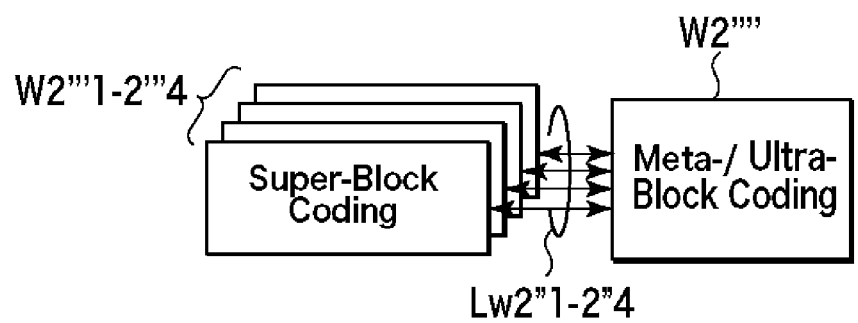
FIG. 51B is a diagram showing a variation of a part of the configuration in FIG. 51A.

Now, with reference to FIGS. 25, 51A, and 51B, description will be given of a signal processing apparatus configured to carry out the above-described block signal processing method and an optical-signal transmission apparatus and an optical-signal reception apparatus both of which contain the signal processing apparatus. FIGS. 27, 51A, and 51B are diagrams showing an optical-signal transmission apparatus corresponding to an embodiment of the present invention, as a LAN-WAN edge apparatus W installed at the boundary between LAN and WAN. FIGS. 27, 51A, and 51B show the configuration of the LAN-WAN edge apparatus W. The LAN-WAN edge apparatus W is connected to four 10G Ethernet apparatuses E via signal lines Lew 1-4 such as optical or electric cables. Here, for easier understanding, the description of the internal configuration of the 10G Ethernet apparatuses E is avoided. Similarly, the functions and the like of the LAN-WAN edge apparatus W which do not relate directly to the present invention are simplified or omitted. The optical-signal transmission apparatus described herein converts a transmission frame F into an optical signal and outputs the optical signal. The optical-signal reception apparatus described herein receives the transmission frame F converted into the optical signal. However, of course, the present invention can be implemented as a signal transmission and reception apparatus configured to transmit and receive transmission frames F in the form of electric signals.

In the LAN-WAN edge apparatuses W, PMD (Physical Medium Dependent) and PMA (Physical Medium Attachment) sections 11-14 receive and subject optical/electric signals from the respective 10G Ethernet apparatuses E1-4 to a serial-parallel conversion. Each of the PMD and PMA sections W11-14 then outputs the resulting 64B/66B block sequence to the corresponding one of Lw11-14. Furthermore, the PMD and PMA section W11-14 subjects a 64B/66B block sequence from the corresponding one of Lw11-14 to a parallel-serial conversion and then outputs the resulting optical/electric signal to the corresponding one of the signal lines Lew1-4.

Signal block conversion sections W21-24 in the optical-signal reception apparatus shown in FIG. 27 each process a sequence of signal blocks B from the corresponding one of the different Ethernet apparatus E1-4 to generate super-blocks S. Each of the signal block conversion sections W21-24 forms the super-blocks S into one group MS to generate a meta-super-block MS and then outputs the meta-super-block MS or forms a plurality of meta-super-blocks MS into one group GS to generate an ultra-block U and outputs the ultra-block U. The signal block conversion section W21-24 may be composed of a signal block memory configured to store a received sequence of signal blocks B, a rearrangement section configured to delete signal block headers or a part or the whole of each signal block payload composed only of clock adjusting characters, from each of the sequence of signal blocks stored in the signal block memory, form a preset number of signal block payloads (Bc, Bd') into one group G, determine whether or not the group G contains control block payloads Bc', provide, if the group G contains control block payloads Bc', the control block payloads Bc' with position determination information (rearrangement information) indicating the positions of the control block payloads Bc' in the group G set before formation into the group G, rearrange the signal block payloads (Bc', Bd') in the group G in accordance with a signal block payload rearrangement rule predetermined to the receiving side and specifying the rearrangement positions of the control block payloads Bc' and data block payloads Bd' in the group, and rearrange, if the group G contains no control block payload Bc', the data block payloads Bd' in the group in accordance with a data block payload rearrangement rule predetermined to the receiving side and specifying the rearrangement positions of the data block payloads Bd' in the group, a super-block output section configured to output a super-block S composed of super-block payloads (Sc, Sd) in which the group with the signal block payloads (Bc' Bd') rearranged therein is contained and super-block headers (Shc, Shd) in which information indicating whether or not the super-block payloads include control block payloads Bc' is contained, an meta-super-block output section configured to receive a sequence of super-blocks S output by the super-block output section, as an input, form the sequence of super-blocks S into a group MG composed of the super-blocks S of the plurality of super-blocks S, generate the super-block headers Shc of the plurality of super-blocks S into a meta-super-block header MSh, adds the meta-super-block header MSh to the group MS, and output a meta-super-block MS, and an ultra-block output section configured to receive meta-super-blocks MS output by the meta-super-block output section, as an input, form the meta-super-block MS into a group MSG composed of the plurality of meta-super-blocks MS, add an ultra-header (Uh) to the group MSG to generate a sequence of ultra-blocks U, and output the sequence of ultra-blocks U. The rearrangement section, the super-block output section, the meta-super-block output section, and the ultra-block output section can be implemented by one or more processors and logically or physically configured integrally or separately. The super-block output section can contain position determination information in an area in each control block payload which is predetermined to the receiving side and a block value corresponding to the block type value indicating the block type of the control block payload and coded so as to maximize the Humming distance between particular block types.

Furthermore, each of the signal block conversion sections W21-24 may provide a function to generate an error-correcting code for the super-block (sequence) S and/or the MG section of the meta-super-block and add the code to the super-block (sequence) S and/or the MG section.

A framing section W3 frames a sequence of meta-super-blocks MS output by the super-block output section of each of the signal block conversion sections W21-24 or a sequence of ultra-blocks U output by each of the ultra-block output sections, into a transmission frame F such as OPU3/ODU3/OTU3. The framing section W3 then outputs the framed signal to a signal line Lw3. The sequence of meta-super-blocks or the sequence of ultra-blocks U can be mapped to the payloads in the transmission frame F and to a particular area of the header which is predetermined to the receiving side. Alternatively, the framing section W3 may frame the sequence of meta-super-blocks MS output by the super-block output section of each of the signal block conversion sections W21-24 or the sequence of ultra-blocks U output by each of the ultra-block output sections, into a lower-order OPU (for example, OPU2) and then map the sequence to OPU3/ODU3/OTU.

An optical-signal output section W4 subjects the transmission frame F input through the signal line LW3 to a parallel-serial conversion by PMD to generate an optical signal. The optical-signal output section W4 then outputs the optical signal to a signal line Lww such as an optical fiber through which the signal is transmitted to another WAN apparatus.

The optical-signal reception apparatus according to the present invention can be implemented by reversing signal inputs and outputs to and from the above-described sections of the optical-signal transmission apparatus.

On the other hand, signal block conversion sections W2'1-2'4 of the optical-signal reception apparatus shown in FIG. 51A each process a sequence of signal blocks from the corresponding one of the different Ethernet apparatuses E1-4 to generate a super-block S. Each of the signal block conversion sections W2'1-2'4 further generates a meta-super-block and outputs the meta-super-block to the corresponding one of Lw2'1-2'4. Another signal block conversion section W2" forms the super-blocks S (containing the signal block payloads from the different Ethernet apparatuses E1-4) output by the signal block conversion sections W21-24, into one group GS to generate an ultra-block U. The signal block conversion section W2" then outputs the ultra-block U to a framing section W3 via Lw2". Another signal block conversion section W2" forms the super-blocks MS (containing the signal block payloads from the different Ethernet apparatuses E1-4) output by the signal block conversion sections W21-24, into one group MSG, and provides the group MSG with a synchronization header to generate an ultra-block U. The signal block conversion section W2" then outputs the ultra-block U to a framing section W3 via Lw2".

The framing section W3 of the optical-signal conversion apparatus shown in FIG. 51A frames a sequence of ultra-blocks U output by the ultra-block output section of the signal block conversion section W2", into a transmission frame F such as OPU3/ODU3/OTU3. The framing section W3 outputs the framed signal to the signal line Lw3. Alternatively, the framing section W3 may frame a sequence of ultra-blocks U output by the signal block conversion section W2" into a lower-order OPU (for example, OPU2) and then map the framed signal to OPU3/ODU3/OTU3.

The optical-signal output section W4 of the optical-signal reception apparatus shown in FIG. 51A subjects the transmission frame F input through the signal line LW3 to a parallel-serial conversion by PMD to generate an optical signal. The optical-signal output section W4 then outputs the optical signal to the signal line Lww such as an optical fiber through which the signal is transmitted to another WAN apparatus.

The signal block conversion sections W2'1-2'4 and signal block conversion section W2" of the optical-signal reception apparatus shown in FIG. 51A may be replaced with signal block conversion sections W2'"1-2'"4 and a signal block conversion section W2"" shown in FIG. 51A, respectively. In FIG. 51B, each of the signal block conversion sections W2'"1-2'"-4 processes a sequence of signal blocks from the corresponding one of the different Ethernet apparatuses E1-4 to generate a super-block S. The signal block conversion sections W2'"1-2'"-4 then outputs the super-block S to the corresponding one of Lw2"1-2"4. Another signal block conversion section W2"" forms super-blocks S (containing signal block payloads from the different Ethernet apparatuses E1-4) output by the signal block conversion sections W2'"1-2'"4, into one meta-super-block MS. The signal block conversion section W2"" forms a group MSG composed of meta-super-blocks MS and provides the group MSG with a synchronization header to generate an ultra-block U. The signal block conversion section W2"" then outputs the ultra-block U to the framing section W3 via Lw2".

The optical-signal reception apparatus according to the present invention can be implemented by reversing signal inputs and outputs to and from the above-described sections of the optical-signal transmission apparatus.

Now, a signal transmission system according to an embodiment of the present invention will be described with reference to FIG. 29. The signal transmission system in FIG. 29 uses the two signal transmission apparatuses described with reference to FIG. 27, 51A, or 51B, as LAN-WAN edge apparatuses W_1 and W_2, respectively. The LAN-WAN edge apparatuses W_1 and W_2 are connected together via the signal line Lww such as an optical fiber. Ethernet apparatuses E1-4 and E5-8 in FIG. 29 correspond to the Ethernet apparatuses E1-4, respectively, in FIG. 27, 51A, or 51B.

Now, an example will be described in which the present invention is applied to a transmission system into which a mechanism called a virtual lane is introduced.

With reference to the drawings, transmission of skew adjustment markers for explicit notification will be described.

Figure 29:
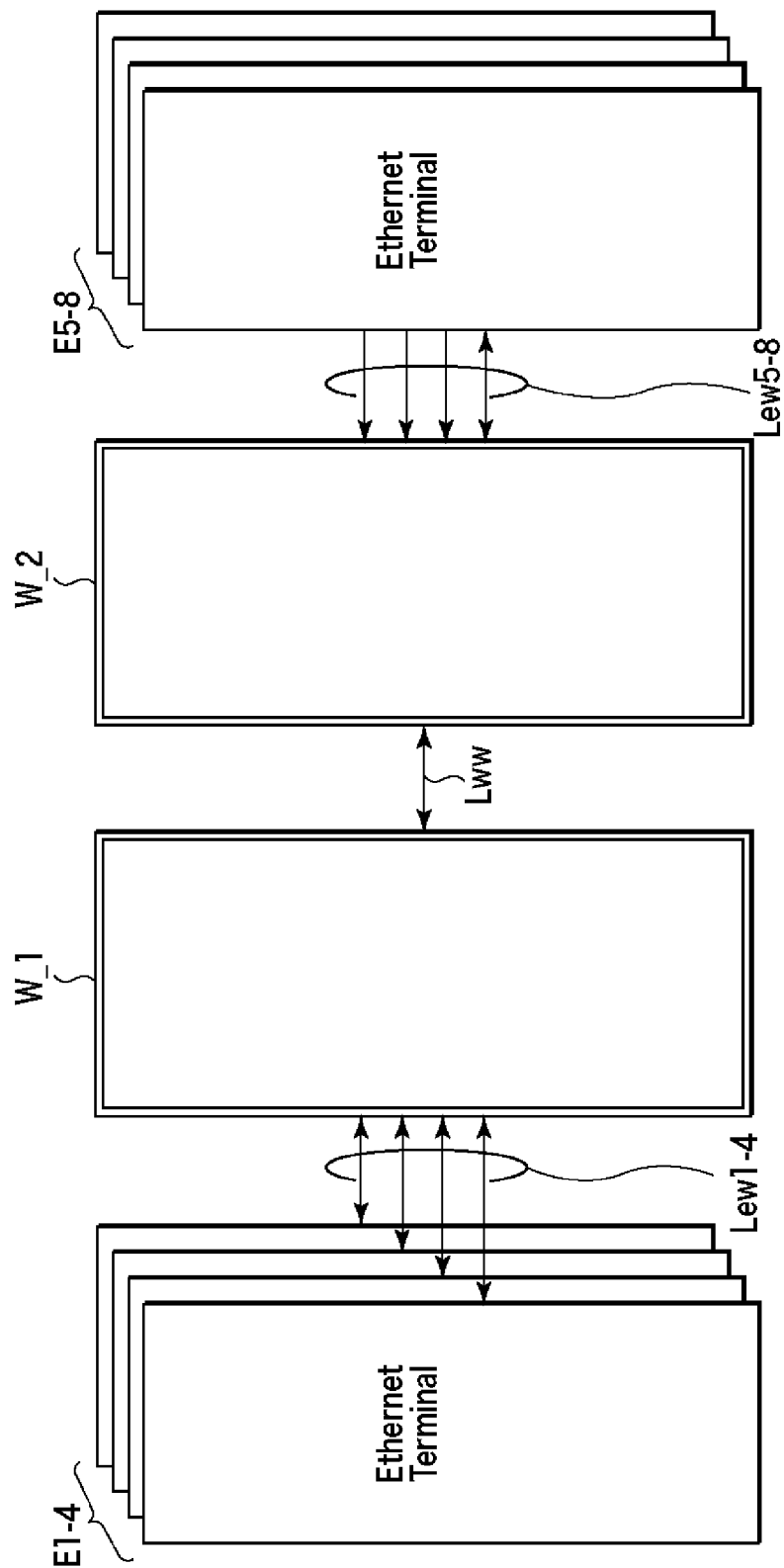
FIG. 29 is a diagram of the configuration of an optical-signal transmission and reception apparatus according to an embodiment.
Figure 56A:
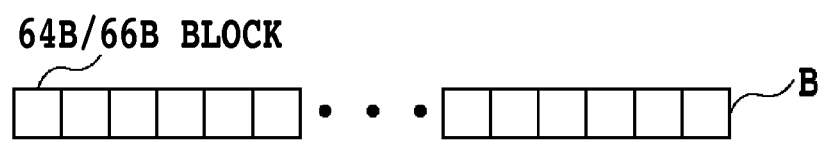
FIG. 56A is a diagram showing the state of a sequence of 64B/66B signal blocks in an Ethernet apparatus in which the sequence of 64B/66B signal blocks is input to the apparatus.
Figure 56B:
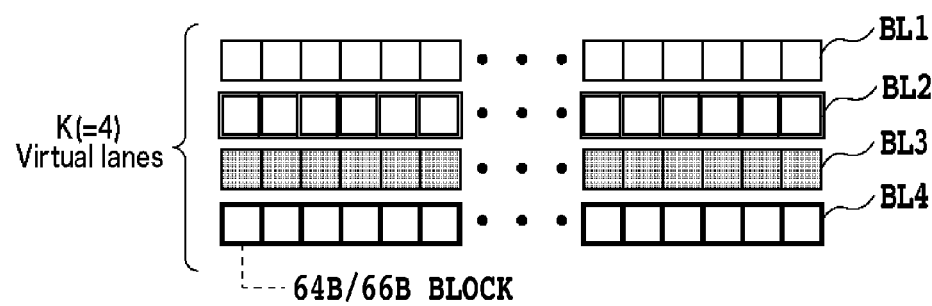
FIG. 56B is a diagram showing the state of a sequence of 64B/66B signal blocks in an Ethernet apparatus in which the sequence of 64B/66B signal blocks is divided into virtual lanes.
Figure 56C:
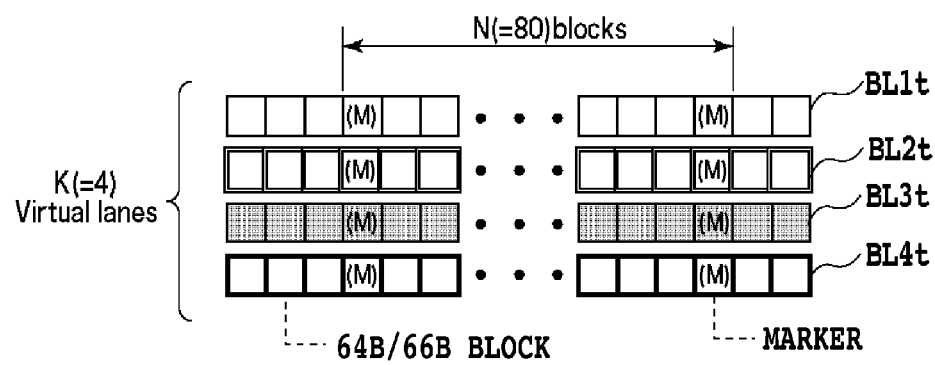
FIG. 56C is a diagram showing the state of a sequence of 64B/66B signal blocks in an Ethernet apparatus into which skew adjusting markers (M) are inserted into the virtual lanes.

FIG. 56A shows an input sequence of 64B/66B signal blocks B in the Ethernet apparatus E (FIG. 27 to FIG. 29). The Ethernet apparatus E divides the input sequence of 64B/66B signal blocks B into K (for example, K=4) virtual lanes (BL1 to BL4) in accordance with a round robin scheme (FIG. 56B). Moreover, the Ethernet apparatus inserts skew adjustment markers (M) into each of the virtual lanes at a given period. The skew adjustment marker (M) is a 64B/66B code signal block composed of a signal block payload in which a skew adjustment code is contained and to which a header indicative of a control block is added. Each skew adjustment marker (M) is periodically inserted for every N (for example, N=80) signal blocks (FIG. 56C).

Figure 56D:
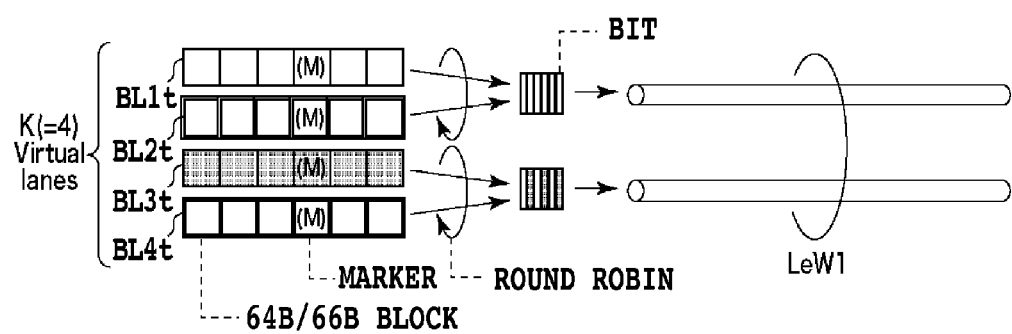
FIG. 56D is a diagram showing the state of a sequence of 64B/66B signal blocks in an Ethernet apparatus in which the Ethernet apparatus transmits the virtual lanes to a LAN-WAN edge apparatus.

The virtual lanes with the skew adjustment markers (M) inserted therein are transmitted in parallel by the Ethernet apparatus E1 via Lw11 composed of a plurality of (N: N≤K) physical paths. FIG. 56D shows an example in which four virtual lanes with skew adjustment markers (M) inserted therein are sorted bit by bit into two physical paths in round-robin fashion and transmitted from the Ethernet apparatus E1 to the LAN-WAN edge apparatus W in parallel.

Figure 57A:
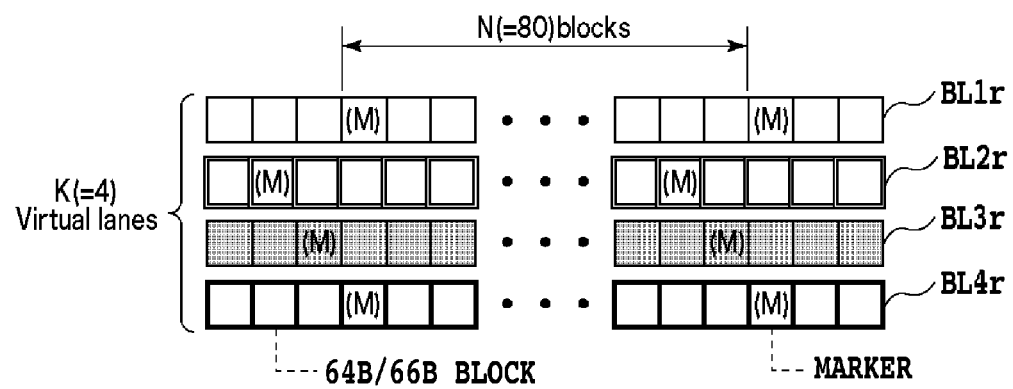
FIG. 57A is a diagram illustrating how skew is adjusted according to an embodiment and showing the state of virtual lanes in which skew has occurred.

FIG. 57A shows that virtual lanes (BL1r, . . . , BL4r) are reproduced, by W21 (FIG. 27) or W2'1 (FIG. 51A or 51B) in the LAN-WAN edge apparatus W, from a signal received from the Ethernet apparatus. As shown in FIG. 57A, skew occurs among the virtual lanes under transmission conditions in the physical path between the Ethernet apparatus E1 and the LAN-WAN edge apparatus W.

Figure 57B:
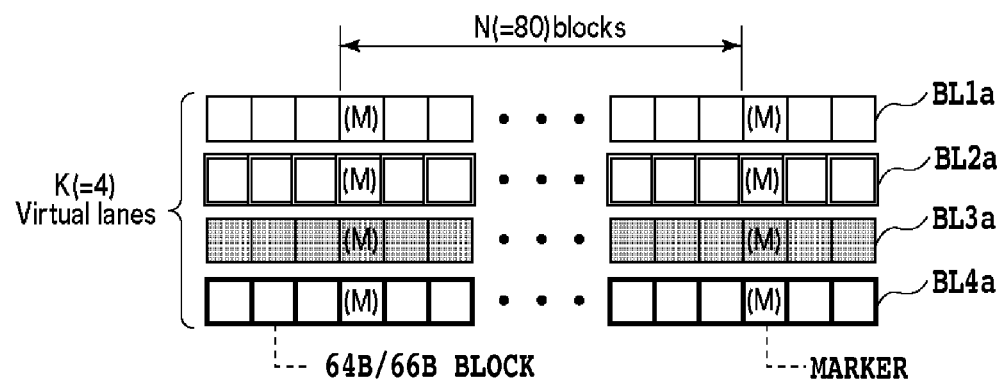
FIG. 57B is a diagram illustrating how skew is adjusted according to an embodiment and showing the state of the virtual lanes in which the skew has been adjusted.
Figure 57C:
FIG. 57C is a diagram illustrating how skew is adjusted according to an embodiment and showing a sequence of serial signal blocks generated from the virtual lanes.

In the present embodiment, the virtual lanes with skew occurring therein are aligned, by W21 (FIG. 27) or W2'1 (FIG. 51A or 51B) in the LAN-WAN edge apparatus W, with one another using the skew adjustment markers. That is, skew adjustment is performed. FIG. 57B shows the status of the virtual lanes (BL1a, . . . , BL4a) constructed of the skew adjustment. After the skew adjustment, W21 (FIG. 27) or W2'1 (FIG. 51A or 51B) in the LAN-WAN edge apparatus W generates K virtual lanes into one sequence of serial signal blocks (Bm) in round-robin fashion (FIG. 57C). In FIG. 57C, the sequence of signal blocks (Bm) shows an example in which a sequence of N×K (=320) 64B/66B signal blocks is periodically generated.

The sequence of signal blocks (Bm) containing skew adjustment markers is processed similarly to the sequence of 64B/66B blocks B in the signal block processing method described in the above-described embodiments. Thus, a super-block S or a meta-super-block MS is generated. During the signal block processing, the skew adjustment markers may be processed as control blocks or data blocks.

Figure 58:
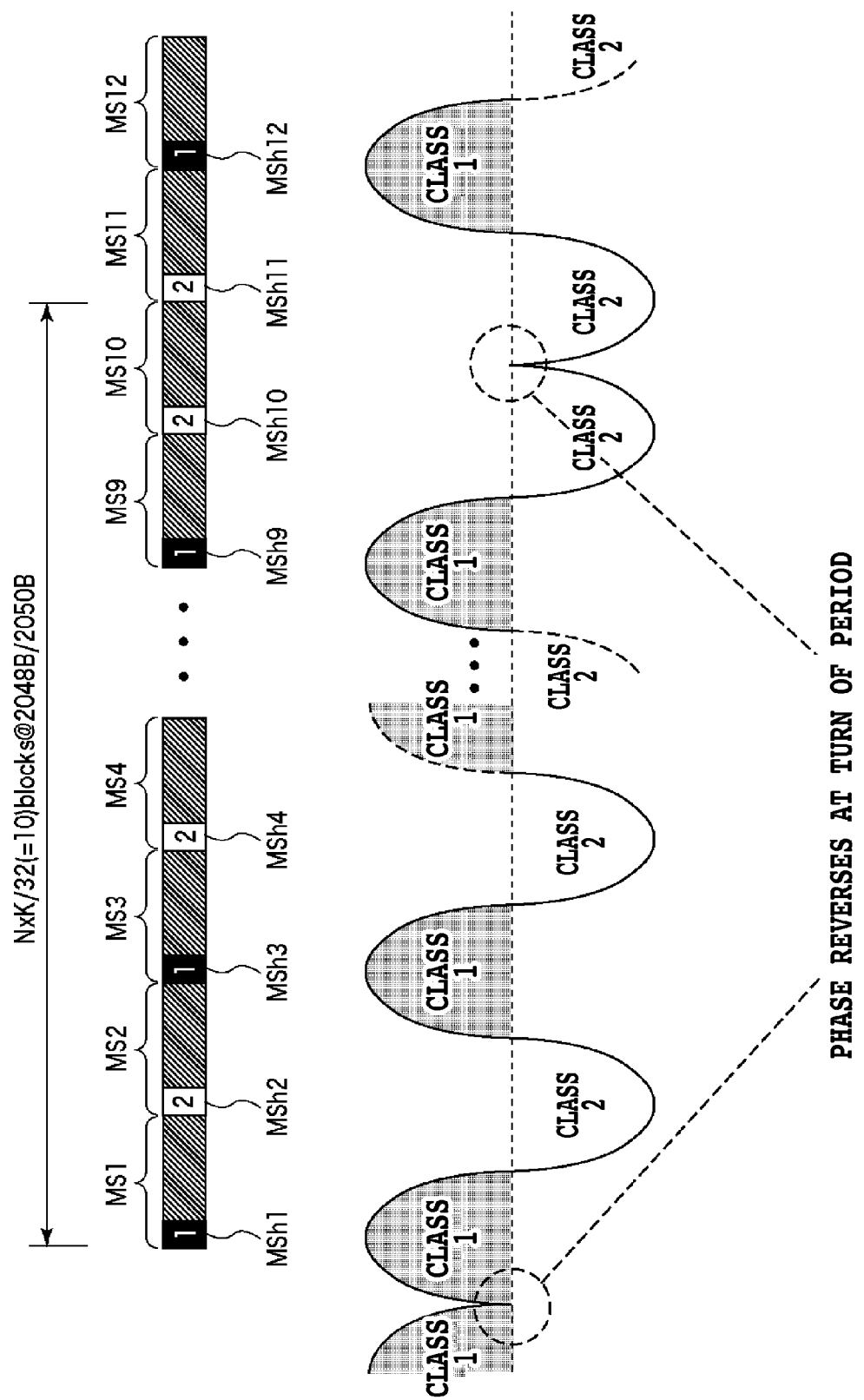
FIG. 58 is a diagram showing that meta-super-block headers have been provided to a meta-super-block containing skew adjusting markers according to an embodiment.

Furthermore, in the step of generating a meta-super-block header MSh (FIG. 53: ST7-103), the following configuration is possible. A sequence of meta-super-blocks each containing skew adjustment markers (for example, between a meta-super-block MS1 and a meta-super-block MS11 in FIG. 58) are defined to be one period. A class (FIGS. 55A, 55B, and 55C) provided to the meta-super-block headers MSh in the same period is periodically varied. The same class is consecutively provided to the meta-super-block headers MSh preceding and succeeding the turn of the period. This allows the phase of the class provided to the meta-super-block header MSh to be reversed at the turn of the period. For example, the header MSh1 of the meta-super-block MS1 can be selected from the class 1, whereas the header MSh2 of the succeeding metasuper-block MS2 can be selected from the class 1. By alternately changing the classes provided to the meta-super-block headers MSh in the same period, the numbers of positive and negative bits appearing in the header can be equalized among the headers. Furthermore, for example, class 2 is provided to the meta-super-block headers MSh10 and MSh11 preceding and succeeding the turn of the period so as to reverse the phase of the class provided to the meta-super-block header MSh, at the turn of the period. Then, the different classes are alternately provided to the headers MSh of the meta-super-block MS12 and the succeeding meta-super-blocks again. Then, the receiving side can easily detect the leading position of the period to correctly reproduce the sequence of 64B/66B blocks Bm. FIG. 58 shows an example in which a sequence of N×K/32 (=10) 2048 B/2050 B signal blocks is defined to be one period.

The following processing is also possible. The same class is consecutively provided to meta-super-block headers MSh in the same period. The class provided to the meta-super-block header MSh is changed at the turn of the period.

Another example will be described in which the present invention is applied to a transmission system into which the mechanism of virtual lanes is introduced.

With reference to the drawings, description will be given of non-explicit notification of inserted skew adjustment markers, that is, notification of inserted skew adjustment markers without transmission of the skew adjustment markers themselves.

Figure 59A:
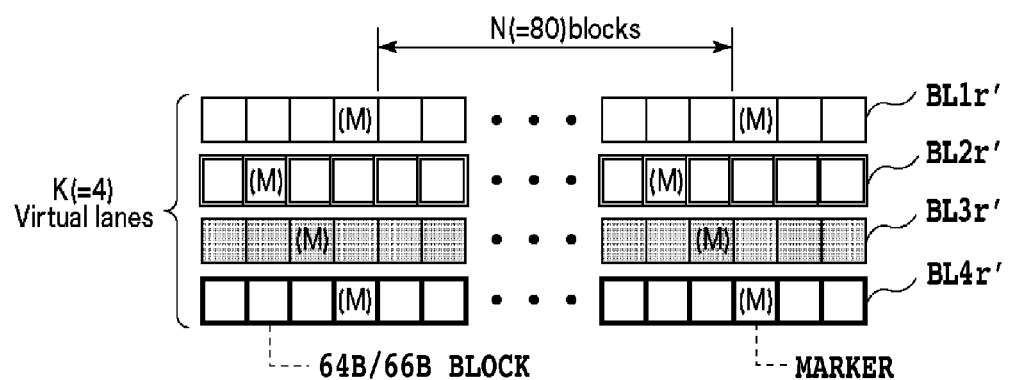
FIG. 59A is a diagram illustrating how skew is adjusted according to an embodiment and showing the state of virtual lanes in which skew has occurred.
Figure 59B:
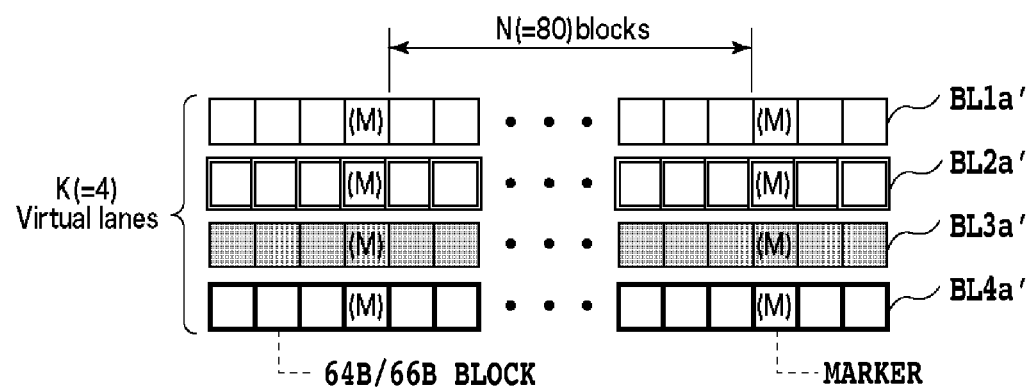
FIG. 59B is a diagram illustrating how skew is adjusted according to an embodiment and showing the state of the virtual lanes in which the skew has been adjusted.
Figure 59C:
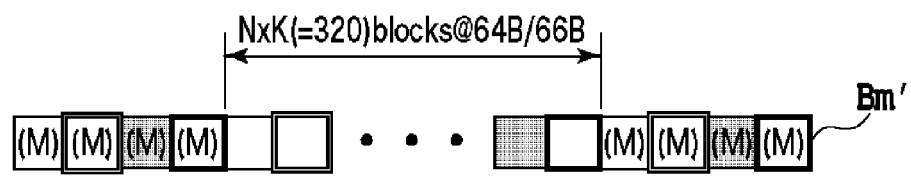
FIG. 59C is a diagram illustrating how skew is adjusted according to an embodiment and showing a sequence of serial signal blocks generated from the virtual lanes.

FIG. 59A shows that virtual lanes (BL1r', BL4r') are reproduced, by W21 (FIG. 27) or W2'1 (FIG. 51A or 51B) in the LAN-WAN edge apparatus W, from a signal received from the Ethernet apparatus. As described above with reference to FIG. 57A, skew occurs among the virtual lanes under the transmission conditions in the physical path between the Ethernet apparatus E1 and the LAN-WAN edge apparatus W. As described above, the virtual lanes with skew occurring therein are aligned, by W21 (FIG. 27) or W2' 1 (FIG. 51A or 51B) in the LAN-WAN edge apparatus W, with one another using the skew adjustment markers. That is, skew adjustment is performed. FIG. 59B shows the status of the virtual lanes (BL1a', ..., BL4a') constructed of the skew adjustment. After the skew adjustment, W21 (FIG. 27) or W2'1 (FIG. 51A or 51B) in the LAN-WAN edge apparatus W generates K virtual lanes into one sequence of serial signal blocks (Bm') in round-robin fashion (FIG. 59C). FIG. 59C shows that the sequence of signal blocks (Bm') except the signal blocks of the skew adjustment markers (M), that is, N×M (=320) 64B/66B signal blocks, are to be contained in a super-block S or a meta-super-block MS, as described below.

The sequence of signal blocks (Bm') containing skew adjustment markers are processed similarly to the sequence of 64B/66B blocks B in the signal block processing method described above with reference to FIGS. 55A, 55B, and 55C. Thus, a super-block S or a meta-super-block MS is generated. During the signal block processing, the skew adjustment markers avoid being contained in the super-block S or meta-super-block MS. For example, the following additional step may be provided between step ST7-1 and step ST7-2 in FIG. 50. The signal blocks of the skew adjustment markers (M) are removed from the sequence of 64B/66B signal blocks Bm'. Then, a flag allowing the presence of the skew adjustment markers to be recognized later is set on the memory. Alternatively, in the processing between step ST7-2 and step ST7-5, the skew adjustment markers (M) avoid being processed. Thus, in step ST7-6 in FIG. 50, eight signal block payloads (Bd', Bc'), which are different from the skew adjustment markers (M), are formed into a group G. Then, the processing in the subsequent steps is executed.

Figure 60A:
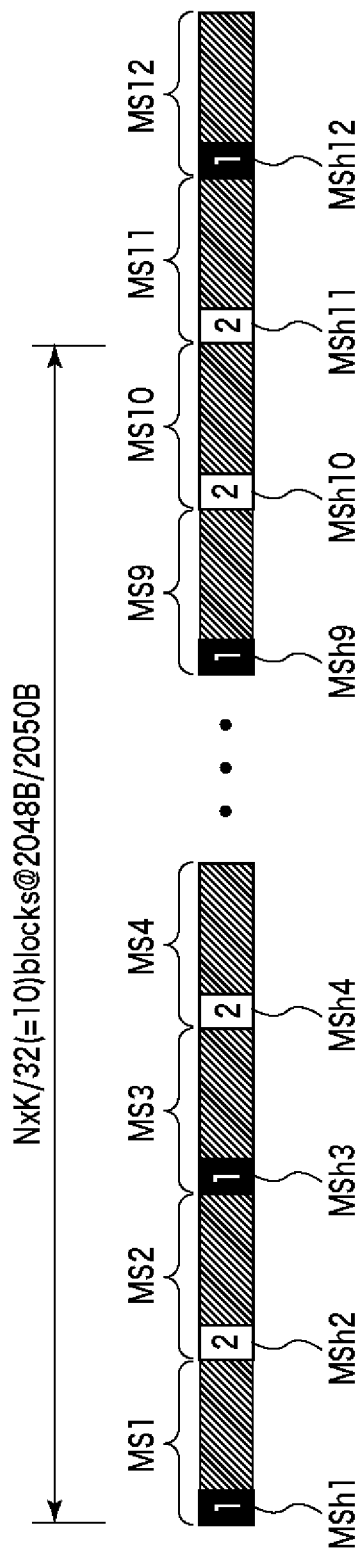
FIG. 60A is a diagram showing that meta-super-block headers have been provided to a meta-super-block containing no skew adjusting marker according to an embodiment.
Figure 60B:
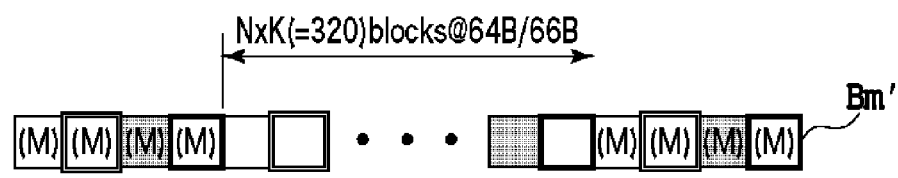
FIG. 60B is a diagram showing a signal block sequence in which skew adjusting markers have been restored.

Furthermore, in the step of generating a meta-super-block header MSh (FIG. 53: ST7-103), the following configuration is possible. A sequence of meta-super-blocks into each of which skew adjustment markers are to be inserted (if the skew adjustment markers are to be contained in the super-block S or meta-super-block MS) (for example, the meta-super-blocks between a meta-super-block MS1 and a meta-super-block MS11 in FIG. 60A) are defined to be one period. The class (FIGS. 55A, 55B, and 55C) provided to the meta-super-block headers MSh in the same period is periodically varied. The same class is consecutively provided to the meta-super-block headers MSh preceding and succeeding the turn of the period. This allows the phase of the class provided to the meta-super-block header MSh to be reversed at the turn of the period. For example, the header MSh1 of the meta-super-block MS1 can be selected from the class 1, whereas the header MSh2 of the succeeding meta-super-block MS2 can be selected from the class 1. By alternately changing the classes provided to the meta-super-block headers MSh in the same period, the numbers of positive and negative bits appearing in the header can be set equalized among in the headers. Furthermore, for example, class 2 is provided to the meta-super-block headers MSh10 and MSh11 preceding and succeeding the turn of the period so as to reverse the phase of the class provided to the meta-super-block header MSh, at the turn of the period. Then, the different classes are alternately provided to the headers MSh of the meta-super-block MS12 and the succeeding meta-super-blocks again. Then, the receiving side can easily detect the leading position of the period and the positions from which the skew adjustment markers have been removed. Thus, as shown in FIG. 60B, the skew adjustment markers can be inserted into the original positions to allow the sequence of 64B/66B blocks Bm to be correctly reproduced. FIG. 60A shows an example in which a sequence of N×K/32 (=10) 2048B/2050B signal blocks is defined to be one period.

More specifically, the signal blocks are sequentially read from the signal block sequence B'm (FIG. 59C) reproduced by W21 or W2'1 in the LAN-WAN edge apparatus and stored in the memory, generating a predetermined number of (for example, four) super-block payloads. The super-block payloads are then grouped to generate a meta-super-block payload (group MG). At this time, the skew adjustment markers are skipped and avoid being read from the memory. Instead, when the skew adjustment marker is skipped, a flag allowing the presence of the skew adjustment marker (M) to be recognized later is set on (to "1"). Then, with reference to the status of the flag, a meta-super-block header MSh is applied to each meta-super-block payload. Here, when the flag is set on, the phase of the class to be applied is reversed to set the flag off ("0"). Even if clock adjusting characters are removed or inserted to adjust the clock difference between the Ethernet apparatus and the LAN/WAN edge apparatus, meta-super-block headers MSh can be similarly generated.

Furthermore, if W21 or W2'1 in the reception-side LAN-WAN edge apparatus reproduces the signal block sequence B'm from the meta-super-block MS, changes in the phase of the meta-super-block header MSh are detected. If a change in the phase of the meta-super-block header, the flag on the memory is set on ("1"). Then, with reference to the flag on the memory, the signal block sequence is reproduced from the reproduced super-blocks. Here, when the flag is set on, skew adjustment markers are inserted into the signal block sequence. The number and order of the skew adjustment markers depend on the manner (round-robin fashion) in which the skew adjustment markers are sorted into the predetermined virtual lanes. Even if clock adjusting characters are inserted or removed, the signal block sequence B'm can be similarly reproduced.

The following processing is also possible. The same class is consecutively provided to the meta-super-block headers MSh in the same period. The class provided to the meta-super-block header MSh is changed at the turn of the period.

Now, with reference to FIGS. 61B and 62, an example will be described in which the present invention is applied to a transmission system into which a mechanism of virtual lanes which can deal with various numbers of physical lanes. When skew adjustment markers are transmitted for explicit notification, particularly if the number of virtual lanes is increased, the skew adjustment markers may need to be divisively contained in a plurality of meta-super-blocks before transmission depending on the length of the meta-super-block MS.

Figure 61A:
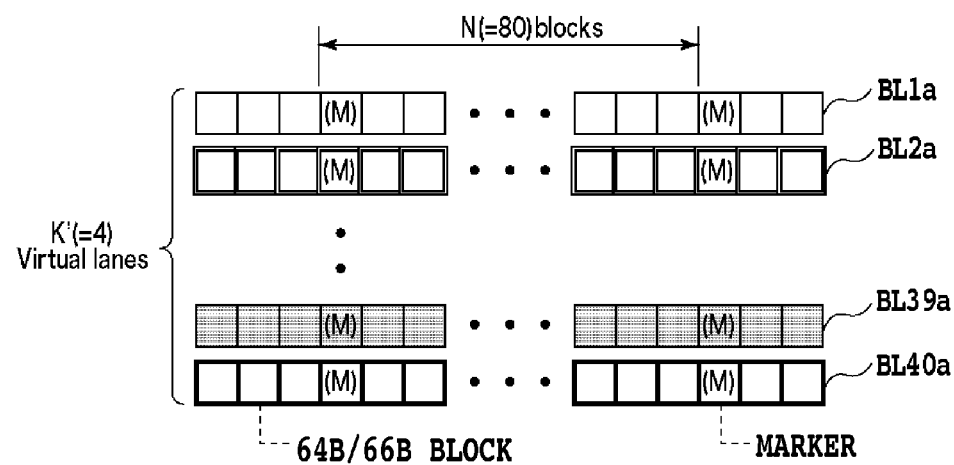
FIG. 61A is a diagram illustrating how skew is adjusted according to an embodiment and showing the state of virtual lanes in which the skew has been adjusted.
Figure 61B:
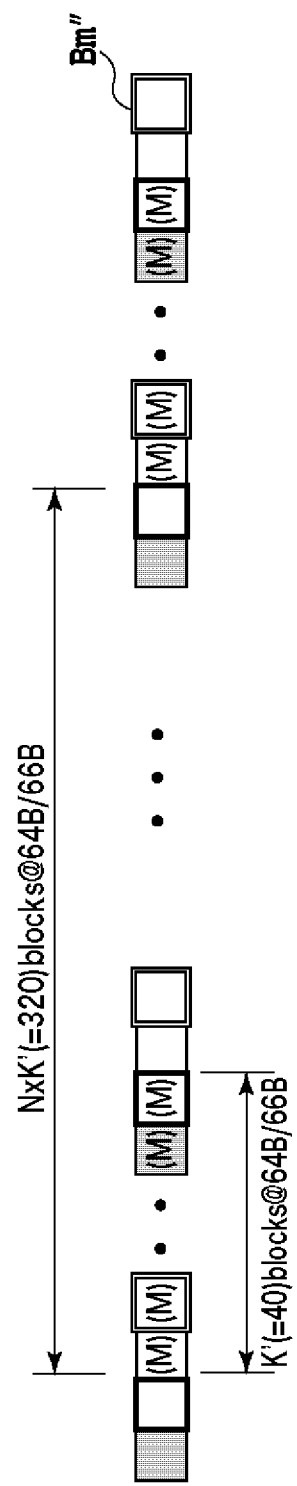
FIG. 61B is a diagram illustrating how skew is adjusted according to an embodiment and showing a sequence of serial signal blocks generated from the virtual lanes.

FIG. 61A shows the status of K' (=40) virtual lanes (BL1a, . . . , BL40a) constructed of the skew adjustment by the LAN-WAN edge apparatus. FIG. 61B shows the status of one sequence of serial signal blocks Bm" generated, in round-robin fashion, from the K virtual lanes constructed of the skew adjustment. As shown in FIG. 61B, as many skew adjustment marker groups as the virtual lanes (K' virtual lanes) are periodically arranged in the sequence of signal blocks Bm".

The sequence of signal blocks (Bm") containing skew adjustment markers is processed similarly to the sequence of 64B/66B blocks B in the signal block processing method described in the above-described embodiments. Thus, a super-block S or a meta-super-block MS is generated. During the signal block processing, the skew adjustment markers may be processed as control blocks or data blocks.

Figure 62:
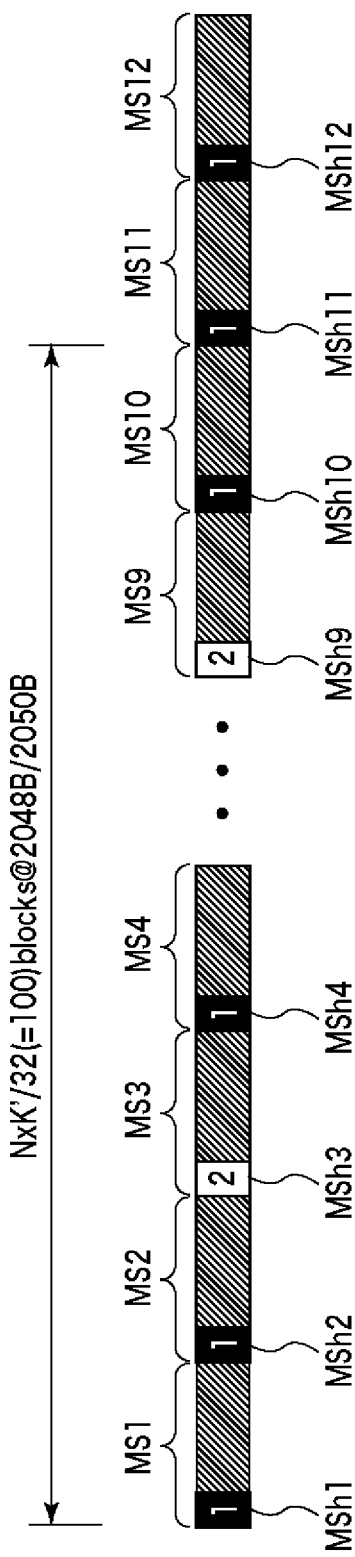
FIG. 62 is a diagram showing that meta-super-block headers have been provided to a meta-super-block containing skew adjusting marker according to an embodiment.

FIG. 62 shows that K' (=24) skew adjustment markers are contained across two meta-super-blocks MS each having a length of 2,048 bits. The meta-super-blocks MS1, MS2, MS11, and MS12 contain skew adjustment markers. FIG. 62 shows that a header MSh belonging to the same class is consecutively provided to the meta-super-blocks in which the skew adjustment markers are divisively contained, thus reversing the phase of the class provided to the meta-super-block header MSh, and that a periodically varying class is provided (different classes are alternately provided) to those of the meta-super-blocks in the same period which contain no skew adjustment marker. For example, class 1 is provided to the meta-super-blocks MSh1 and MSh2, whereas classes 1 and 2 are alternately provided to the meta-super-block headers MSh3 to MSh10. Moreover, the same class 1 is consecutively assigned to the MSh10 and MSh11, between which the period changes. Then, by detecting the number of consecutive same classes, the receiving side can determine the number of skew adjustment markers. Furthermore, the receiving side can easily detect the leading position of the period to correctly reproduce the sequence of 64B/66B signal blocks Bm.

Alternatively, the following configuration is possible. A header MSh belonging to the same class is consecutively provided to the meta-super-blocks in which the skew adjustment markers are divisively contained. Headers MSh belonging to different classes are consecutively provided to those of the meta-super-blocks in the same period. For example, class 1 is provided to the meta-super-blocks MSh1 and MSh2, whereas class 2 is provided to the meta-super-block headers MSh3 to MSh10. In this case, the meta-super-blocks in the next period contain skew adjustment markers. Thus, class 11 is provided to the 1 meta-super-block header HSh11.

Alternatively, the skew adjustment markers can be applied to non-explicit notification. In this case, the following configuration is possible. A meta-super-block header belong to the same class is consecutively provided to as many meta-super-blocks into each of which skew adjustment markers are to be inserted (if the skew adjustment markers are to be contained in the super-block S or meta-super-block MS). Meta-super-block headers belonging to different classes are periodically (alternately) provided to the remaining meta-super-blocks in the period. Moreover, a meta-super-block header belonging to the same class is consecutively provided to the meta-super-blocks between which the period changes.

Various embodiments of the present invention have been described. Of course, characteristics described in some of the embodiments may be applied to other embodiments.

The invention claimed is:

1. A signal block sequence processing method of processing a sequence of signal blocks each comprising a signal block payload and a signal block header containing information indicating whether the signal block payload is a control block payload in which a control code is contained or a data block payload in which data is contained, and outputting a super-block, the method comprising steps of:

deleting the signal block header from each of the sequence of signal blocks and forming a preset number of signal block payloads into one group and deleting a part or all of each signal block payload comprising only clock adjusting characters;

determining whether or not the group contains the control block payload, and if the group contains the control block payload, providing the control block payload with position determination information allowing determination of a position of the control block payload in the sequence of signal blocks set before the formation into the group and rearranging the signal block payloads in the group in accordance with a signal block payload rearrangement rule specifying rearrangement positions of the control block payloads and data block payloads in the group and predetermined to a receiving side; and outputting a super-block comprising a super-block payload in which the group with the signal block payloads rearranged therein is contained and a super-block header in which information indicating whether or not the super-block payload contains the control block payload is contained.

2. The signal block sequence processing method according to claim 1, wherein the step of outputting the meta-super-block comprises providing an error-correcting code for the sequence of super-blocks.

3. The signal block sequence processing method according to claim 1, wherein the providing the control block payload with the position determination information allowing determination of the position of the control block payload in the group comprises:

containing the position determination information in an area in the control block payload predetermined to the receiving side.

4. The signal block sequence processing method according to claim 3, wherein together with the position determination information, a block value corresponding to a block type value indicating a block type of the control block payload and coded so as to maximize a Hamming distance between particular block types is contained in the area in the control block payload predetermined to the receiving side.

5. The signal block sequence processing method according to claim 4, wherein if as a result of removal of a part of each signal block payload comprising only the clock adjusting characters, the block type value indicating the block type of the control block payload does not correspond to any particular block type, a special block type value not corresponding to any block type value and coded so as to maximize the Hamming distance is contained in the area in the control block payload predetermined to the receiving side.

6. The signal block sequence processing method according to claim 1, wherein the signal block payload rearrangement rule specifies the rearrangement positions such that the control block payloads are consecutively arranged in the group.

7. The signal block sequence processing method according to claim 1, wherein the signal block payload rearrangement rule specifies the rearrangement positions such that the data block payloads are rearranged in the group in a sequence order of the data block payloads in the group set before the rearrangement of the signal block payloads.

8. The signal block sequence processing method according to claim 1, further comprising a step of, if the group contains no control block payload, rearranging the data block payloads in the group in accordance with a data block payload rearrangement rule specifying the rearrangement positions of the data block payloads in the group and predetermined to the receiving side, and
wherein the data block payload rearrangement rule specifies the rearrangement positions such that the data block payloads are rearranged in the group in a sequence order of the data block payloads in the group set before the rearrangement of the signal block payloads.

9. The signal block sequence processing method according to claim 1, wherein a plurality of sequences of the signal blocks is input in parallel.

10. The signal block sequence processing method according to claim 1, wherein each of the sequences of the signal blocks includes a skew adjustment marker.

11. A signal block sequence processing method of processing a sequence of signal blocks each comprising a signal block payload and a signal block header containing information indicating whether the signal block payload is a control block payload in which a control code is contained or a data block payload in which data is contained, and outputting a meta-super-block, the method comprising steps of:
deleting the signal block headers from the sequence of signal blocks each comprising the signal block payload and the signal block header and forming a preset number of signal block payloads into one group and deleting, from the sequence of signal blocks, a part or all of each signal block payload comprising only clock adjusting characters;
determining whether or not the group contains the control block payload, and if the group contains the control block payload, providing the control block payload with position determination information allowing determination of a position of the control block payload in the sequence of signal blocks set before the formation into the group and rearranging the signal block payloads in the group in accordance with a signal block payload rearrangement rule specifying rearrangement positions of the control block payloads and data block payloads in the group and predetermined to a receiving side;
forming a second predetermined number of super-block payloads each comprising the group with the signal block payloads rearranged therein, into a second group;
generating a meta-super-block header containing group structure information on the super-block payloads in the second group; and
outputting a meta-super-block comprising the second group to which the meta-super-block header is applied.

12. The signal block sequence processing method according to claim 11, further comprising a step of outputting a super-block comprising a super-block payload and a super-block header in which information indicating whether or not the super-block payload contains the control block payload is contained, and
wherein the generating a meta-super-block header generates the meta-super-block header containing group structure information on the super-block payloads in the second group, from headers of the second preset number of super-blocks corresponding to super-block payloads formed into the second group.

13. The signal block sequence processing method according to claim 11, wherein the providing the control block payload with position determination information allowing determination of the position of the control block payload in the group comprises:
containing the position determination information in an area in the control block payload predetermined to the receiving side.

14. The signal block sequence processing method according to claim 13, wherein together with the position determination information, a block value corresponding to a block type value indicating a block type of the control block payload and coded so as to maximize a Hamming distance between particular block types is contained in the area in the control block payload predetermined to the receiving side.

15. The signal block sequence processing method according to claim 14, wherein if as a result of removal of a part of each signal block payload comprising only the clock adjusting characters, the block type value indicating the block type of the control block payload does not correspond to any particular block type, a special block type value not corresponding to any block type value and coded so as to maximize the Hamming distance is contained in the area in the control block payload predetermined to the receiving side.

16. The signal block sequence processing method according to claim 11, wherein the signal block payload rearrangement rule specifies the rearrangement positions such that the control block payloads are consecutively arranged in the group.

17. The signal block sequence processing method according to claim 11, wherein the signal block payload rearrangement rule specifies the rearrangement positions such that the data block payloads are rearranged in the group in a sequence order of the data block payloads in the group set before the rearrangement of the signal block payloads.

18. The signal block sequence processing method according to claim 11, further comprising a step of, if the group contains no control block payload, rearranging the data block payloads in the group in accordance with a data block payload rearrangement rule specifying rearrangement positions of the data block payloads in the group and predetermined to the receiving side, and
wherein the data block payload rearrangement rule specifies the rearrangement positions such that the data block payloads are rearranged in the group in a sequence order of the data block payloads in the group set before the rearrangement of the signal block payloads.

19. The signal block sequence processing method according to claim 11, wherein a plurality of sequences of the signal blocks is input in parallel.

20. The signal block sequence processing method according to claim 11, wherein each of the sequences of the signal blocks includes a skew adjustment marker.

21. The signal block sequence processing method according to claim 11, wherein meta-super-block header contains a type value coded so as to set a Hamming distance between type values to at least two.

22. The signal block sequence processing method according to claim 11, wherein the group structure information contained in the meta-super-block header is used as synchronization information allowing synchronization of the meta-super-blocks to be detected when the meta-super-blocks are received.

23. The signal block sequence processing method according to claim 11, wherein the type value indicative of the type of the meta-super-block header is selected so as to equalize the numbers of appearing positive and negative bits.

24. The signal block sequence processing method according to claim 11, wherein the step of generating the super-block header comprises generating a type value corresponding to appearance of a skew adjustment marker.

25. The signal block sequence processing method according to claim 11, wherein the step of outputting the meta-super-block comprises providing an error-correcting code for the meta-super-block.

26. A signal block sequence processing method of receiving a super-block generated from a group comprising a preset number of signal block payloads in a sequence of signal blocks each comprising a signal block payload and a signal block header containing information indicating whether the signal block payload is a control block payload in which a control code is contained or a data block payload in which data is contained, processing the super-block, and outputting the sequence of signal blocks, the method comprising steps of:
  determining whether or not a super-block payload in the super-block includes the control block payload based on information contained in a super-block header of the received super-block and indicating whether or not the super-block payload in the super-block contains the control block payload, which control block payload is distinct from the super-block header, and if the super-block payload in the super-block contains the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group;
  adding, to each of the signal block payloads, a signal block header containing information indicating whether the signal block payload is a control block payload in which a control code is contained or a data block payload in which data is contained, and outputting the sequence of signal blocks;
  wherein the super-block payloads contained in the received super-block is generated from the group comprising the preset number of the signal block payloads from which a part or all of each signal block payload comprising only clock adjusting characters has been deleted, and
  wherein the signal block sequence processing method further comprises: a step of determining whether or not a combination of block type values contained in the control block payloads in respective two consecutive signal block payloads or a combination of control code characters contained in the control block payloads in the signal block payloads meets a predetermined condition, and if the combination of the block type values meets the predetermined condition, inserting a signal block payload comprising only clock adjusting characters between the two consecutive signal block payloads, if the combination of the control code characters meets the predetermined condition, inserting clock adjusting characters into the signal block payloads, and outputting the sequence of signal blocks.

27. The signal block sequence processing method according to claim 26, wherein the super-block header is defined by a bit sequence having a redundancy coded so as to maximize a Hamming distance of at least 2 bits and indicates whether or not the super-block payload includes control block payloads, and
  wherein the signal block sequence processing method further comprises a third error determination step of determining whether or not the received super-block header is the defined bit sequence, and if the received super-block header is the defined bit sequence, converting the signal block payloads in the super-block payloads into error control block payloads indicating that an error has occurred.

28. The signal block sequence processing method according to claim 26, wherein the position determination information is contained in a predetermined area in the control block payload.

29. The signal block sequence processing method according to claim 26, wherein the signal block payload rearrangement rule specifies the rearrangement positions such that the control block payloads are consecutively arranged in the group, and
  wherein the placing the data block payloads back at the positions in the group set before the rearrangement comprises placing the data block payloads consecutively rearranged in the group, back at the positions set before the rearrangement.

30. The signal block sequence processing method according to claim 26, wherein the signal block payload rearrangement rule specifies that a transmitting side rearranges the data block payloads in the group in a sequence order of the data block payloads set before the rearrangement of the signal block payloads in the group, and
  wherein the placing the data block payloads back at the positions in the group set before the rearrangement comprises maintaining the positions of the data block payloads in the group.

31. The signal block sequence processing method according to claim 26, further comprising a step of, if the super-block payload in the super-block includes no control block payload, placing the data block payloads back at positions in the group set before the rearrangement in accordance with a predetermined data block payload rearrangement rule specifying the rearrangement positions of the data block payloads in the group, and
  wherein the data block payload rearrangement rule specifies that the transmitting side rearranges the data block payloads in the group in the sequence order of the data block payloads set before the rearrangement of the data block payloads in the group, and
the step of placing the data block payloads back at the positions in the group set before the rearrangement comprises maintaining the positions of the data block payloads in the group.

32. The signal block sequence processing method according to claim 26, wherein a plurality of the sequences of the signal blocks is input in parallel.

33. The signal block sequence processing method according to claim 26, wherein the sequence of signal blocks contains a skew adjustment marker.

34. A signal block sequence processing method of receiving a meta-super-block containing a second group into which a second preset number of super-block payloads in a super-block are formed, the super-block being generated from a group comprising a preset number of super-block payloads in a super-block generated from a group comprising a preset number of signal block payloads obtained by deleting signal block headers from a sequence of signal blocks each comprising the signal block payload and the signal block header containing information indicating whether the signal block payload is a control block payload in which a control code is contained or a data block payload in which data is contained, and processing the meta-super-block, and outputting the sequence of signal blocks, the meta-super-block including a meta-super-block header containing group structure information on the super-block payloads in the second group, the method comprising steps of:

receiving a meta-super-block;

referencing the group structure information in the received meta-super-block header to extract the second preset number of super-block payloads from the second group, applying, to the super-block payloads, a super-block header containing information indicating whether or not the super-block payloads include the control block payload, and outputting the super-block;

determining whether or not the super-block payloads include the control block payload based on information contained in the super-block header of the super-block and indicating whether or not the super-block payloads in the super-block include the control block payload, which control block payload is distinct from the super-block header, if the super-block payloads in the super-block include the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group; and adding, to each of the signal block payloads, a signal block header containing information indicating whether or not the signal block payload is a control block payload in which a control code is contained or a data block payload in which data is contained, and outputting the signal block payload with the signal block header added thereto;

wherein the super-block payloads contained in the received super-block are generated from a group comprising a preset number of the signal block payloads from which a part or all of each signal block payload comprising only clock adjusting characters has been deleted, and wherein the signal block sequence processing method further comprises: a step of determining whether or not a combination of block type values contained in the control block payloads in respective two consecutive signal block payloads or a combination of control code characters contained in the control block payloads in the signal block payloads meets a predetermined condition, and if the combination of the block type values meets the predetermined condition, inserting a signal block payload comprising only the clock adjusting characters between the two consecutive signal block payloads, if the combination of the control code characters meets the predetermined condition, inserting the clock adjusting characters into the signal block payloads, and outputting the sequence of signal blocks.

35. The signal block sequence processing method according to claim 34, wherein the super-block header is defined by a bit sequence having a redundancy coded so as to maximize a Hamming distance of at least 2 bits and indicates whether or not the super-block payloads include control block payloads, and wherein the signal block sequence processing method further comprises a third error determination step of determining whether or not the received super-block header is the defined bit sequence, and if the received super-block header is the defined bit sequence, converting the signal block payloads in the super-block payloads into error control block payloads indicating that an error has occurred.

36. The signal block sequence processing method according to claim 34, wherein the position determination information is contained in a predetermined area in the control block payload.

37. The signal block sequence processing method according to claim 34, wherein the signal block payload rearrangement rule specifies the rearrangement positions such that the control block payloads are consecutively arranged in the group, and wherein the placing the data block payloads back at the positions in the group set before the rearrangement comprises placing the data block payloads consecutively rearranged in the group, back at the positions set before the rearrangement.

38. The signal block sequence processing method according to claim 34, wherein the signal block payload rearrangement rule specifies that a transmitting side rearranges the data block payloads in the group in a sequence order of the data block payloads set before the rearrangement of the signal block payloads in the group, and wherein the placing the data block payloads back at the positions in the group set before the rearrangement comprises maintaining the positions of the data block payloads in the group.

39. The signal block sequence processing method according to claim 34, further comprising a step of, if the super-block payloads in the super-block include no control block payload, placing the data block payloads back at positions in the group set before the rearrangement in accordance with a predetermined data block payload rearrangement rule specifying the rearrangement positions of the data block payloads in the group, and wherein the data block payload rearrangement rule specifies that the transmitting side rearranges the data block payloads in the group in the sequence order of the data block payloads set before the rearrangement of the data block payloads in the group, and the step of placing the data block payloads back at the positions in the group set before the rearrangement comprises maintaining the positions of the data block payloads in the group.

40. The signal block sequence processing method according to claim 34, wherein a plurality of sequences of the signal blocks is input in parallel.

41. The signal block sequence processing method according to claim 34, wherein the sequence of signal blocks contains a skew adjustment marker.

42. The signal block sequence processing method according to claim 34, wherein the meta-super-block header contains a type value coded so as to set a Hamming distance between type values to at least two.

43. The signal block sequence processing method according to claim 34, wherein the outputting the super-block comprises using the group structure information contained in the meta-super-block header to detect synchronization of the meta-super-blocks and extracting the second preset number of super-block payloads.

44. The signal block sequence processing method according to claim 34, wherein the type value of the meta-super-block header is selected so as to equalize the numbers of appearing positive and negative bits.

45. The signal block sequence processing method according to claim 34, wherein the type value of the meta-super-block header is generated according to appearance of a skew adjustment marker.

46. A signal block sequence processing method of receiving a meta-super-block containing a second group into which a second preset number of super-block payloads in a super-block are formed, the super-block being generated from a group comprising a preset number of super-block payloads in a super-block generated from a group comprising a preset number of signal block payloads obtained by deleting signal block headers from a sequence of signal blocks each comprising the signal block payload and the signal block header containing information indicating whether the signal block payload is a control block payload in which a control code is contained or a data block payload in which data is contained, and processing the meta-super-block, and outputting the sequence of signal blocks, the meta-super-block including a meta-super-block header containing group structure information on the super-block payloads in the second group, the method comprising steps of:

receiving the meta-super-block;

referencing the group structure information in the received meta-super-block header to extract the second preset number of super-block payloads from the second group, applying, to the super-block payloads, a super-block header containing information indicating whether or not the super-block payloads include the control block payload, and outputting the super-block;

determining whether or not the super-block payloads include the control block payload based on information contained in the super-block header of the super-block and indicating whether or not the super-block payloads in the super-block include the control block payload, which control block payload is distinct from the super-block header, if the super-block payloads in the super-block include the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group;

adding, to each of the signal block payloads, a signal block header containing information indicating whether or not the signal block payload is a control block payload in which a control code is contained or a data block payload in which data is contained, and outputting the signal block payload with the signal block header added thereto;

a first error determination step of, if super-block payloads in the super-block include the control block payloads, extracting all the pieces of position determination information provided in each of the control block payloads and allowing determination of the position of the control block payloads in the group, determining whether or not any extracted pieces of position determination information are duplicate, and if any extracted pieces of position determination information are duplicate, converting all the signal block payloads in the super-block payloads into error control block payloads indicating that an error has occurred; and a second error determination step of, if none of the extracted pieces of position determination information are duplicate, extracting all block type values of the control block payloads, determining whether or not the extracted block type values indicate a predetermined condition for the block type in the control block payloads, and if the extracted block type values indicate the predetermined condition for the block type, converting all the signal block payloads in the super-block payloads into error control block payloads indicating that an error has occurred, and wherein the placing the signal block payloads in the positions in the group set before the rearrangement comprises, if the predetermined condition for the block type is not indicated in the second error determination step, placing the signal block payloads back at positions in the group set before rearrangement in accordance with the position determination information provided in each of the control block payloads and allowing determination of the position of the control block payload in the sequence of signal blocks set before formation into the group as well as the predetermined signal block payload rearrangement rule specifying the rearrangement positions of the control block payloads and data block payloads in the group.

47. A signal block sequence processing apparatus configured to process a sequence of signal blocks each comprising a signal block payload and a signal block header containing information indicating whether the signal block payload is a control block payload in which a control code is contained or a data block payload in which data is contained and to output a super-block, the apparatus comprising:

signal block storing means for storing the received signal blocks;

rearrangement means for deleting the signal block header from each of a preset number of input signal blocks stored in the signal block storing means, forming a preset number of signal block payloads into one group, determining whether or not the group contains the control block payload, if the group contains the control block payload, providing the control block payload with position determination information allowing determination of a position of the control block payload in the sequence of signal blocks set before the formation into the group and rearranging the signal block payloads in the group in accordance with a signal block payload rearrangement rule specifying rearrangement positions of the control block payloads and data block payloads in the group and predetermined to a receiving side, and deleting a part or all of each signal block payload comprising only clock adjusting characters; and super-block output means for outputting a super-block comprising a super-block payload in which the group with the signal block payloads rearranged therein is contained and a super-block header in which information indicating whether or not the super-block payload contains the control block payload is contained.

48. A signal block sequence processing apparatus configured to process a sequence of signal blocks each comprising a signal block payload and a signal block header containing information indicating whether the signal block payload is a control block payload in which a control code is contained or a data block payload in which data is contained and to output a meta-super-block, the apparatus comprising:

signal block storing means for storing the received signal blocks;

rearrangement means for deleting the signal block headers from the sequence of signal blocks stored in the signal block storing means and each comprising the signal block payload and the signal block header, forming a preset number of signal block payloads into one group, determining whether or not the group contains the control block payload, if the group contains the control block payload, providing the control block payload with position determination information allowing determination of a position of the control block payload in the sequence of signal blocks set before the formation into the group and rearranging the signal block payloads in the group in accordance with a signal block payload rearrangement rule specifying rearrangement positions of the control block payloads and data block payloads in the group and predetermined to a receiving side, and deleting, from the sequence of signal blocks, a part or all of each signal block payload comprising only clock adjusting characters; and means for forming a second predetermined number of super-block payloads each comprising the group with the signal block payloads rearranged therein, into a second group, generating a meta-super-block header containing group structure information on the super-block payloads in the second group, and outputting a meta-super-block comprising the second group to which the meta-super-block header is applied.

49. A signal block sequence processing apparatus configured to receive a super-block generated from a group comprising a preset number of signal block payloads in a sequence of signal blocks each comprising the signal block payload and a signal block header containing information indicating whether the signal block payload is a control block payload in which a control code is contained or a data block payload in which data is contained and to process the super-block and output the sequence of signal blocks, the method being characterized by comprising:

signal block storing means for storing the received super-block; arrangement restoring means for determining whether or not a super-block payload in the super-block contains the control block payload based on information contained in a super-block header of the received super-block and indicating whether or not the super-block payload in the super-block contains the control block payload, which control block payload is distinct from the super-block header, and if the super-block payload in the super-block contains the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group; and signal block sequence output means for adding, to each of the signal block payloads, a signal block header containing information indicating whether the signal block payload is a control block payload in which a control code is contained or a data block payload in which data is contained and outputting the sequence of signal blocks;

wherein the received super-block is generated from the group comprising the preset number of the signal block payloads from which a part or all of each signal block payload comprising only clock adjusting characters has been deleted, and wherein the arrangement restoring means further comprises means for determining whether or not a combination of block type values contained in the control block payloads in respective two consecutive signal block payloads or a combination of control code characters contained in the control block payloads in the signal block payloads meets a predetermined condition, and if the combination of the block type values meets the predetermined condition, inserting a signal block payload comprising only the clock adjusting characters between the two consecutive signal block payloads, if the combination of the control code characters meets the predetermined condition, inserting the clock adjusting characters into the signal block payloads, and outputting the sequence of signal blocks.

50. A signal block sequence processing apparatus configured to receive a meta-super-block containing a second group into which a second preset number of super-block payloads in a super-block are formed, the super-block being generated from a group comprising a preset number of super-block payloads in a super-block generated from a group comprising a preset number of signal block payloads obtained by deleting signal block headers from a sequence of signal blocks each comprising the signal block payload and the signal block header containing information indicating whether the signal block payload is a control block payload in which a control code is contained or a data block payload in which data is contained, and to process the meta-super-block and output the sequence of signal blocks, the meta-super-block including a meta-super-block header containing group structure information on the super-block payloads in the second group, the apparatus comprising:

signal block storing means for storing the received meta-super-block;

means for referencing the group structure information in the received meta-super-block header to extract the second preset number of super-block payloads from the second group, applying, to the super-block payloads, a super-block header containing information indicating whether or not the super-block payloads include the control block payload, and outputting the super-block;

arrangement restoring means for determining whether or not the super-block payloads include the control block payload based on information contained in the super-block header of the super-block and indicating whether or not the super-block payloads in the super-block include the control block payload, which control block payload is distinct from the super-block header, if the super-block payloads in the super-block include the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group; and signal block sequence output means for adding, to each of the signal block payloads, a signal block header containing information indicating whether or not the signal block payload is a control block payload in which a control code is contained or a data block payload in which data is contained, and outputting the signal block payload with the signal block header added thereto;

wherein the super-block payloads contained in the received super-block are generated from a group comprising a preset number of the signal block payloads from which a part or all of each signal block payload comprising only clock adjusting characters has been deleted, and wherein the arrangement restoring means comprises means for determining whether or not a combination of block type values contained in the control block payloads in respective two consecutive signal block payloads or a combination of control code characters contained in the control block payloads in the signal block payloads meets a predetermined condition, and if the combination of the block type values meets the predetermined condition, inserting a signal block payload comprising only the clock adjusting characters between the two consecutive signal block payloads, if the combination of the control code characters meets the predetermined condition, inserting the clock adjusting characters into the signal block payloads, and outputting the sequence of signal blocks.

51. A signal block sequence processing method of receiving a super-block generated from a group comprising a preset number of signal block payloads in a sequence of signal blocks each comprising a signal block payload and a signal block header containing information indicating whether the signal block payload is a control block payload in which a control code is contained or a data block payload in which data is contained, processing the super-block, and outputting the sequence of signal blocks, the method comprising steps of:

determining whether or not a super-block payload in the super-block includes the control block payload based on information contained in a super-block header of the received super-block and indicating whether or not the super-block payload in the super-block contains the control block payload, which control block payload is distinct from the super-block header, and if the super-block payload in the super-block contains the control block payload, placing the signal block payloads back at positions in the group set before rearrangement in accordance with position determination information provided in the control block payload and allowing determination of a position of the control block payload in the sequence of signal blocks set before formation into the group as well as a predetermined signal block payload rearrangement rule specifying rearrangement positions of the control block payloads and data block payloads in the group;

adding, to each of the signal block payloads, a signal block header containing information indicating whether the signal block payload is a control block payload in which a control code is contained or a data block payload in which data is contained, and outputting the sequence of signal blocks;

a first error determination step of, if the super-block payload in the super-block includes the control block payloads, extracting all the pieces of position determination information provided in each of the control block payloads and allowing determination of the position of the control block payloads in the group, determining whether or not any extracted pieces of position determination information are duplicate, and if any extracted pieces of position determination information are duplicate, converting all the signal block payloads in the super-block payloads into error control block payloads indicating that an error has occurred; and a second error determination step of, if none of the extracted pieces of position determination information are duplicate, extracting all block type values of the control block payloads, determining whether or not the extracted block type values indicate a predetermined condition for the block type in the control block payloads, and if the extracted block type values indicate the predetermined condition for the block type, converting all the signal block payloads in the super-block payloads into error control block payloads indicating that an error has occurred, and wherein the placing the signal block payloads in the positions in the group set before the rearrangement comprises, if the predetermined condition for the block type is not indicated in the second error determination step, placing the signal block payloads back at positions in the group set before rearrangement in accordance with the position determination information provided in each of the control block payloads and allowing determination of the position of the control block payload in the sequence of signal blocks set before formation into the group as well as the predetermined signal block payload rearrangement rule specifying rearrangement positions of the control block payloads and data block payloads in the group.

* * * * *